United States Patent [19]
Reifman et al.

[11] Patent Number: 5,438,433
[45] Date of Patent: Aug. 1, 1995

[54] SYSTEM AND METHOD FOR FACSIMILE COVER PAGE STORAGE AND USE

[75] Inventors: Jeffrey B. Reifman, Seattle; Kurt D. DelBene, Bellevue; Chris E. Tobey; Renée Marceau, both of Seattle, all of Wash.

[73] Assignee: Microsoft Corporation, Redmond, Wash.

[21] Appl. No.: 221,681

[22] Filed: Mar. 31, 1994

Related U.S. Application Data

[62] Division of Ser. No. 73,511, Jun. 7, 1993.

[51] Int. Cl.⁶ .............................................. H04N 1/00
[52] U.S. Cl. ..................................... 358/468; 358/400
[58] Field of Search ................ 358/400, 402–404, 358/407, 409, 468

[56] References Cited

U.S. PATENT DOCUMENTS

| | | | |
|---|---|---|---|
| 4,800,582 | 1/1989 | D'Agosto, III et al. | 379/216 |
| 4,825,461 | 4/1989 | Kurita et al. | 379/93 |
| 4,903,146 | 2/1990 | Nakahara | 358/468 |
| 4,908,853 | 3/1990 | Matsumoto | 379/355 |
| 4,941,170 | 7/1990 | Herbst | 379/100 |
| 4,942,599 | 7/1990 | Gordon et al. | 379/93 |
| 4,996,707 | 2/1991 | O'Malley et al. | 379/100 |
| 5,033,859 | 7/1991 | Yamamoto | 358/468 |
| 5,070,467 | 12/1991 | Todome | 395/166 |
| 5,099,335 | 3/1992 | Kato | 358/296 |
| 5,101,427 | 3/1992 | Kotani et al. | 379/100 |
| 5,130,818 | 7/1992 | Tadokoro | 358/407 |
| 5,136,637 | 8/1992 | Rust et al. | 379/356 |
| 5,175,634 | 12/1992 | Matsuzaki | 358/407 |
| 5,204,758 | 4/1993 | Sakamoto | 358/444 |
| 5,239,385 | 8/1993 | Ejiri | 358/434 |
| 5,267,047 | 11/1993 | Argenta et al. | 358/403 |
| 5,274,467 | 12/1993 | Takehiro et al. | 358/440 |
| 5,287,199 | 2/1994 | Zoccolillo | 358/402 |

FOREIGN PATENT DOCUMENTS

0354703 2/1990 European Pat. Off. .... H04M 1/274

OTHER PUBLICATIONS

Dos Fax Pro User's Guide Derlina Corp. 1992 pp. 3–20.
"Your Most Important Business Tools Connected At Last," WindowPhone TM Advertisement, Sep. 29, 1992.
BitFax/SR ® for Windows TM User's Manual, BIT Software, Inc., pp. 3-1 to 4-11, 1992.
BitFax/SR ® for Windows TM User's Manual, BIT Software, Inc., pp. 5-1 to 8-7, 1992.
Joel Dreyfuss, "The Fax Solution," PC Magazine, pp. 275–276, 278, 282, 284, 286–288, 295–297, 304–307, 310, 315–316, 320, 322, 326, 329–330, 337–338, 342–344, 346, 348–349, 351–353, 356, 358–359, and 361, 1992.

Primary Examiner—Stephen Brinich
Attorney, Agent, or Firm—Seed and Berry

[57] ABSTRACT

A user interface simplifies operation of a intelligent facsimile machine (IFAX). A display screen displays a plurality of menus and allows the user to select from the menus. The IFAX can store a plurality of digital cover pages to minimize transmission time for a facsimile cover page. The user may select from a list of stored digital cover pages. The user may also attach a binary data file to a facsimile message and transfer the data to another facsimile machine. The IFAX uses a storage location for storing outgoing facsimile messages. The IFAX periodically check the storage location to determine if more than one facsimile message is to be transmitted to the same location and transmits the facsimile messages in one facsimile telephone call. If the IFAX is coupled to a second IFAX on a network, the two IFAX machines can balance the work load by sending a load transfer request if the number of outgoing facsimile messages exceeds a predetermined threshold level. The IFAX can also route incoming facsimile messages to a variety of destinations such as a floppy disk or other storage device, or an external computer. The IFAX can also relay incoming facsimile messages to another facsimile machine, using a set or relay instructions. The relay instructions may be stored in the IFAX or may be a portion of the incoming facsimile message. The relay instructions may be nested, and the IFAX sends the facsimile message to a second IFAX with instructions for the second IFAX to relay the facsimile message to a third facsimile machine. The IFAX contains security measures to prevent unauthorized relaying.

10 Claims, 77 Drawing Sheets

MAILBOX FUNCTION FLOWCHART
(continued)

SYSTEM AND METHOD FOR FACSIMILE COVER PAGE STORAGE AND USE

Cross-Reference to Related Application

This application is a division of U.S. patent application Ser. No. 08/073,511, filed Jun. 7, 1993.

TECHNICAL FIELD

This application relates generally to a user interface for an intelligent facsimile machine (IFAX) and, more specifically, to a system and method for controlling user interaction with the IFAX.

BACKGROUND OF THE INVENTION

The modern workplace has become increasingly dependent on electronic devices. Machines such as photocopiers, computers, modems, and facsimiles are now considered essential tools for the office. Many of these tools are extremely sophisticated, which can make them difficult to use. The increased capability of these tools has often outpaced the ability of the average user to efficiently operate them.

For example, an old style facsimile (FAX) machine had few options and was relatively easy to operate. Early FAX machines used an acoustical modem to couple the FAX signal to a standard telephone handset. The person sending a facsimile message simply dialed the FAX telephone number of the recipient and plugged the telephone handset into the acoustical modem when they heard an audible tone generated by the recipient's FAX machine over the handset. The FAX machine was easy to use, but had few or no options.

More modern IFAX machines have direct telephone lines as well as a long list of sophisticated options. For example, the user can elect to send a facsimile message immediately, or delay transmission to a later time at which it is automatically sent, such as at nighttime when the telephone rates decrease. The facsimile message is read by the IFAX and a digital image of the message is stored in memory within the IFAX until the designated transmission time.

With another option, the user may elect to send a facsimile message to a group of recipients that can be specified by a group identifier. The IFAX stores a list of facsimile telephone numbers, sometimes called addresses, and can be programmed to recognize various groups. The user need only provide the IFAX with the instruction to send a facsimile message to a group, such as "Sales Managers", for example, and the IFAX will automatically send the facsimile message to each facsimile telephone number associated with the group of sales managers.

Numerous other features such as speed dialing, automatic redialing, confidential facsimile transmission and reception, facsimile forwarding, facsimile relaying and facsimile polling are now available on modern IFAXs.

One problem with the advanced technological features of the modern IFAX is that they are difficult for the average user utilize without extensive training. Further, once learned, if a new IFAX is purchased, the user may have to be retrained to efficiently utilize the same features on the new IFAX.

Therefore, it can be appreciated that there is a significant need for a system and method of facsimile communication that allows a user to easily interact with the IFAX without extensive training.

SUMMARY OF THE INVENTION

The present invention is embodied in an intelligence facsimile machine (IFAX) having a display and a user input device for transmitting a facsimile cover page comprising the steps of maintaining a stored set of cover pages containing a plurality of different possible cover pages to be transmitted as a cover page to the facsimile message. The IFAX displays on the display a list of the set of stored cover pages and senses a user input on a user input device to select a particular one of the stored set of cover pages from the list. The facsimile selects the particular cover page in response to the user input and transmits the particular cover page before transmitting the facsimile message.

The method may further include the steps of storing a user created cover page as one of the set of stored cover pages and adding the user created cover page to the list of cover pages.

In an alternative embodiment, the IFAX containing a user input device is used for defining a personal facsimile cover page and maintains a stored set of cover pages containing a plurality of different cover pages. The IFAX senses the user input on the user input device to select a particular stored cover pages for use by a particular individual. In response, the IFAX selects the selected cover page and uses it as personal cover page for that individual. The IFAX may store a user created cover page as one of the stored set of cover pages and add the stored user created cover page to the list of cover pages.

In another alterative embodiment, an IFAX is coupled to a communications link and stores a binary data file in a storage location within the IFAX. A facsimile telephone number for a second IFAX is entered into the IFAX. The IFAX associates the binary data file with the facsimile message and transmits the facsimile message and the binary data file to the second IFAX over the communication link such that the binary data file is transmitted to the second IFAX as a portion of the facsimile message.

In an alterative embodiment, the IFAX has a storage location for storing facsimile messages and determines a first facsimile telephone number to which a facsimile message will be sent. The IFAX stores the facsimile message in the storage location for later transmission to the first facsimile telephone number. The storage location also contains at least one other stored facsimile message with a second facsimile telephone number to which the other facsimile message is to be sent. The IFAX compares the storage location to determine if the first facsimile telephone number matches with the second facsimile telephone number indicating that the stored facsimile message and the other stored facsimile message are both to be transmitted to the first facsimile telephone number. If the first and second facsimile telephone numbers match, the IFAX transmits the stored facsimile message and the other stored facsimile message to the first facsimile number during a single facsimile telephone call.

In an alternative embodiment, the first and second IFAXs are coupled together to form a network. The first IFAX has a quantity of stored data files awaiting transmission and determines a value indicative of the quantity of stored data files. If the value exceeds a predetermined value, the first IFAX transfers at least one stored data file to the second IFAX over the network so that the transferred data file is transmitted by the second IFAX. The method may include the further step of determining the value after the transfer of the stored data file. The first IFAX may continue to transfer stored data files to the second IFAX until the value does not exceed the predetermined value.

In another alternative embodiment, the IFAX has a user input device and display and is coupled to a communication link and maintains a storage location containing a set of routing instructions. The routing instructions specify the manner in which an incoming facsimile message received over the communication link will be processed by the IFAX. The IFAX receives the incoming facsimile message from the second IFAX and routes the incoming facsimile message according to the routing instructions. A plurality of incoming facsimile messages may be routed according to the routing instructions.

The method may include the further steps of sensing user input to modify the routing instructions and the incoming facsimile messages will be routed according to the modified routing instructions. The facsimile messages may be routed to a personal computer, a storage device coupled to the first IFAX, or to a third IFAX.

The routing instructions may also include determining if an incoming facsimile message is capable of being stored in an in box storage location within a IFAX. If the incoming facsimile message is not capable of being stored in the machine, the IFAX may generate an overflow indicator. Alternatively, the IFAX may route the incoming facsimile message according to a set of overflow routing instructions.

In an alternative embodiment, the IFAX is coupled to a communication link. It comprises the steps of detecting a signal on the communication link indicating the arrival of an incoming facsimile message from a second IFAX. The first IFAX receives the incoming facsimile message over the communication link and stores the incoming facsimile message. The first IFAX then relays the incoming facsimile message to a third IFAX in accordance with a set of relay instructions.

The relay instructions may instruct the first IFAX to relay all incoming facsimile messages to a predetermined IFAX. Alternatively, the relay instructions may contain a relay prefix instructing the first IFAX to relay the incoming facsimile message to the third IFAX associated with the relay prefix. The method may include the further step of checking the predetermined list of authorized IFAXs to determine if the third IFAX is on the authorized IFAX list. The second IFAX will relay the incoming facsimile message only if the third IFAX is in the list.

The relay instructions may also contain a set of nested relay instructions, with the method further including the step of transmitting the set of nested relay instructions from the first IFAX to the third IFAX with the third IFAX using the set of nested relay instructions to relay the incoming facsimile message to a fourth IFAX in accordance with the set of nested relay instructions. The method may include the further step of checking a predetermined list of authorized IFAXs to determine if the fourth IFAX is in the list with the third IFAX relaying the incoming facsimile message only if the fourth IFAX is on the list. Alternatively, the first IFAX may contain a set of predetermined relay instructions.

In an alternative embodiment, the IFAX having a plurality of status sensors monitors the operation of the IFAX using the status sensors. The IFAX detects an error condition indicated by the status sensors and, in response to the detection of the error condition, generates an error message. The facsimile automatically notifies a key operator by routing the error message to the key operator.

The error message may be routed to a key operator computer coupled to the IFAX. Alternatively, the error message may be routed to an individual user other than the key operator if the error message is related to a facsimile operation requested by the individual user. The error message may be routed to the individual user's computer.

DETAILED DESCRIPTION OF THE INVENTION

Figure 1:
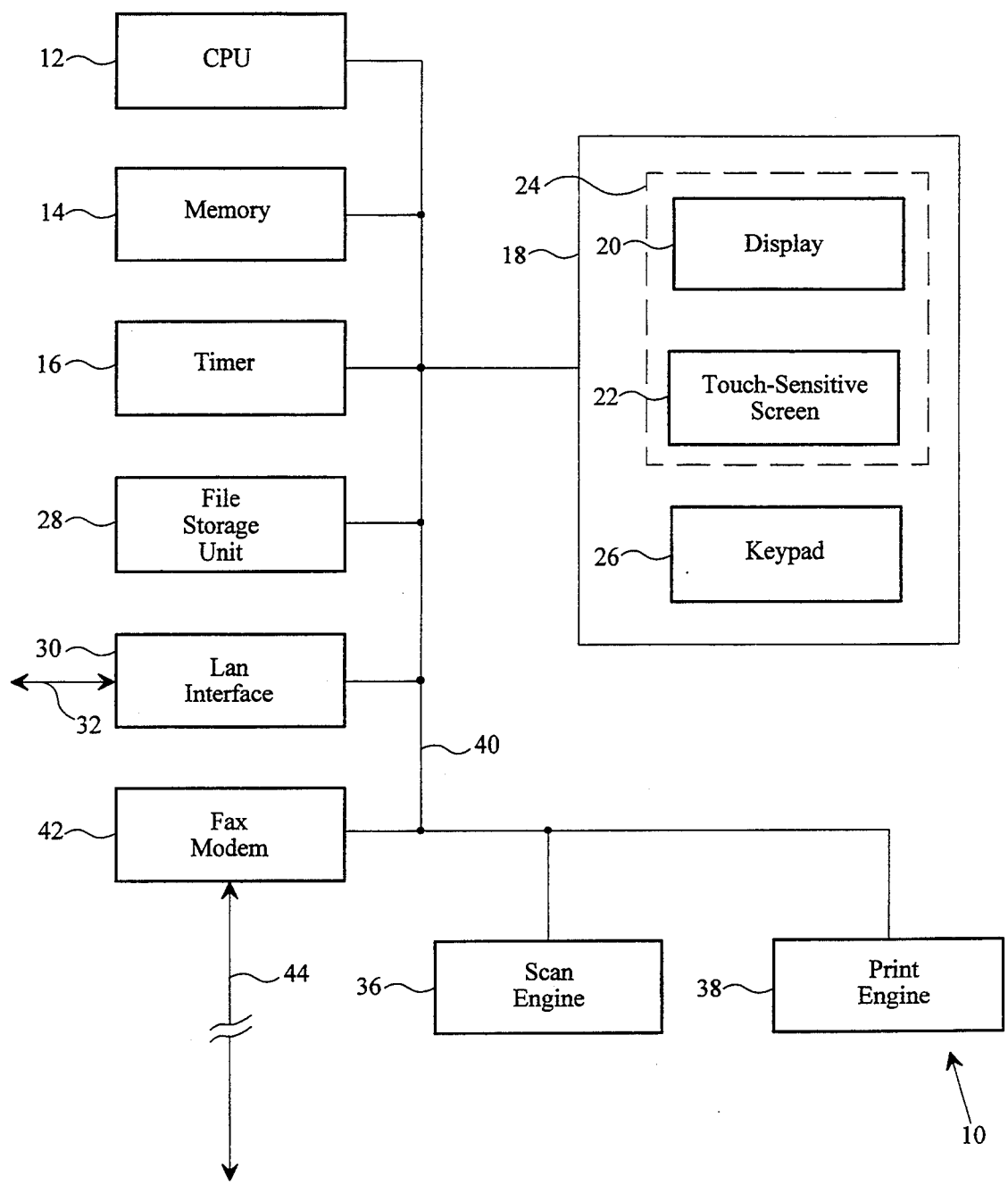
FIG. 1 is a functional block diagram of an IFAX according to the present invention.

As shown in the drawings for purposes of illustration, the present invention is embodied in an IFAX 10 and a simple method for using the IFAX which does not require extensive training. A user interface described herein allows a user with little or no training in the use of the IFAX to take full advantage of all the highly sophisticated technical features provided on the modem IFAX. The various menus and displays utilized allow the user to see at a glance, all the relevant options available to the user. When the user selects a particular option, the user interface displays other appropriate menus or takes some action dependent on the particular menu and the particular user selection.

The IFAX 10 containing the user interface of the present invention is shown in the functional block diagram of FIG. 1. The IFAX 10 contains a central processing unit 12, and a memory, 14, which may comprise a random access memory (RAM), a nonvolatile RAM (NV-RAM), and a read-only memory (ROM). In addition, the IFAX 10 has a timer 16 and a user interface element 18. The user interface element 18 contains a display 20, which utilizes a touch-sensitive screen 22. The touch-sensitive screen 22 overlays the display 20 in a well-known manner to form a touch-sensitive display 24. A selection is entered on the touch-sensitive display 24 by pressing on a predetermined position of the touch-sensitive display. The selection is indicated on the display 20 by showing the predetermined portion of the touch-sensitive display 24 as a button in a depressed, or selected, position when the user initially touches the touch-sensitive display. The action associated with the selection is performed when the user removes his finger from the predetermined portion of the touch-sensitive display 24. Thus, the IFAX 10 indicates a selection when the user touches the touch-sensitive display 24, and reacts to the user removing his finger by performing the action associated with the selection. The user may change selections by sliding his finger to a different location before removing his finger from the touch-sensitive display 24. The selection process will be discussed in detail below. The user interface element 18 also includes an optional hardware numeric keypad 26 to provide an alternative method of selection by data entry.

The IFAX 10 has a file storage unit 28 such as a floppy disk unit or a hard disk. The IFAX 10 may also include serial and parallel interface hardware (not shown) to allow the FAX machine to be coupled to an external computer (not shown) or a second IFAX of the same construction. A local area network (LAN) interface 30 allows the IFAX 10 to be coupled to a LAN 32.

The IFAX 10 has a scan engine 36 to scan paper documents and create a digital image of the scanned document and a print engine 38 to print documents received from another IFAX of the same construction or prior art FAX machines. The print engine 38 may be a thermal print engine as is common in prior art FAX machines or a laser print engine. Alternatively, the IFAX 10 may be coupled to an external printer such as a laser printer. The scan engine 36 and the print engine 38 are well known in the art and will not be described in detail herein.

A data bus 40 interconnects the above-described portions of the IFAX 10 and operates in a manner well known to those of ordinary skill in the art. The IFAX 10 with a laser print engine 38 may act as a laser printer when coupled to the external computer (not shown). A FAX modem 42 couples the IFAX 10 to a telephone line 44. The FAX modem 42 provides the necessary circuitry to provide the standard facsimile tone frequencies. The standards for facsimile transmission are established by The International Telegraph and Telephone Consultative Committee (CCITT). References to CCITT standards will be made throughout this disclosure. The CCITT standards are well known and will not be discussed in detail.

Figure 2:
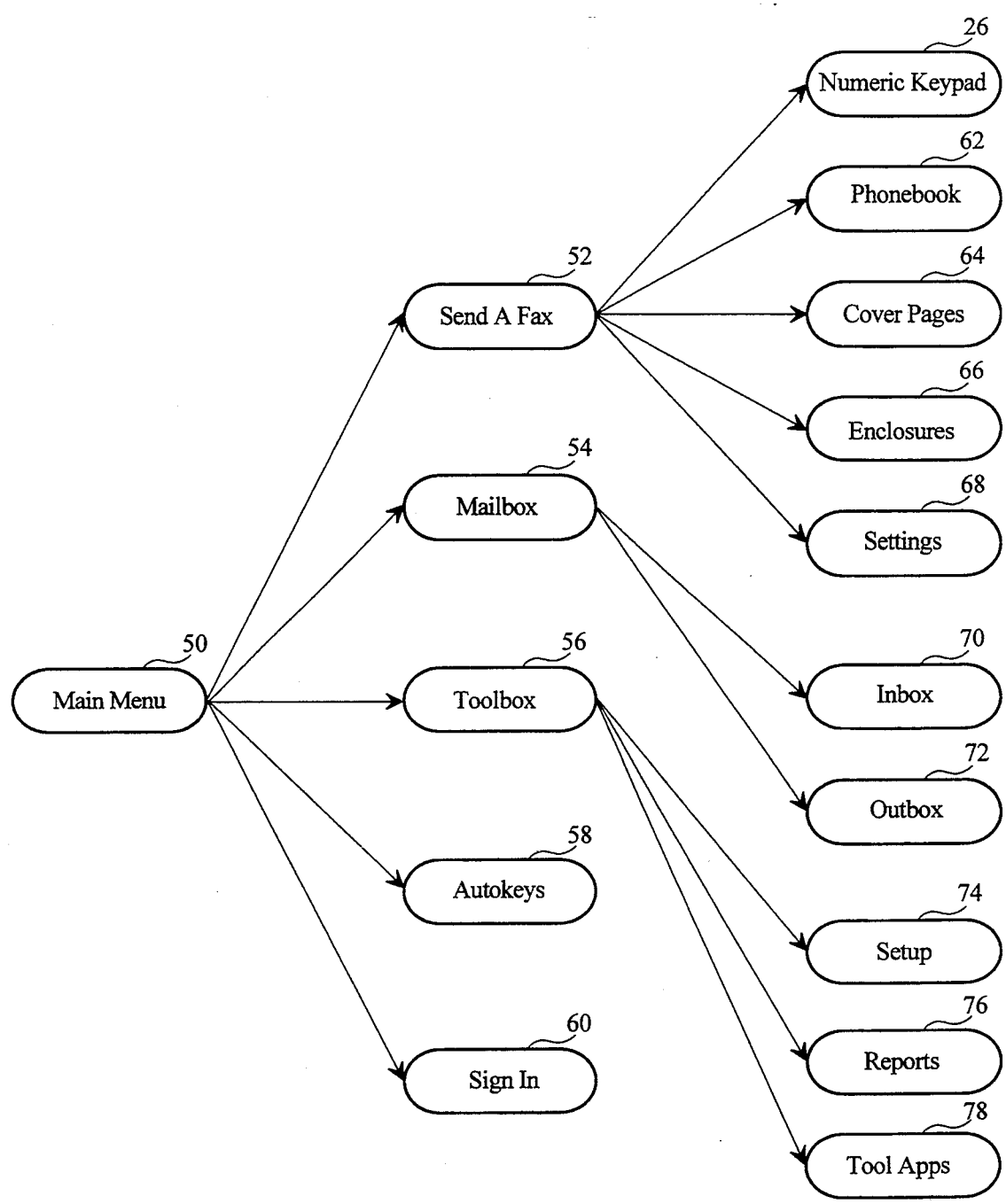
FIG. 2 is an operational flowchart of the IFAX shown in FIG. 1.
Figure 3:
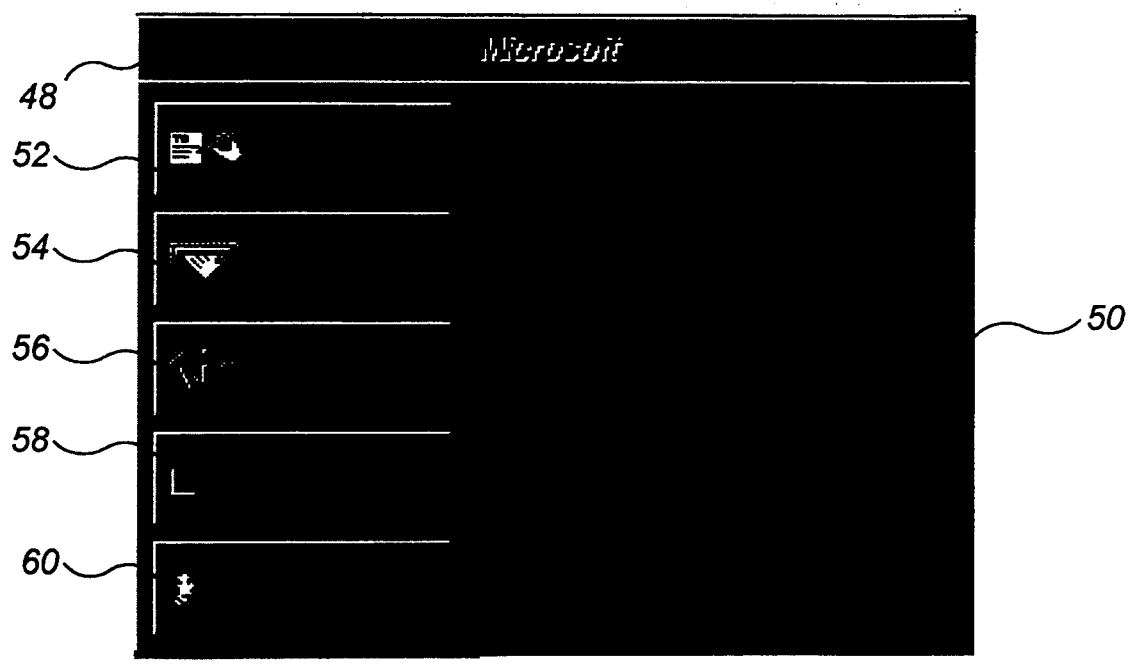
FIG. 3 is a screen display of the main menu of the IFAX of FIG. 1.

An operational flowchart for the IFAX 10 is shown in FIG. 2. When the IFAX 10 is first powered up, or is reset, a Main Menu 50, shown in the screen display of FIG. 3, is displayed on the touch-sensitive display 24. The following description is best understood in conjunction with the flowchart of FIG. 2 and the display of FIG. 3. The Main Menu 50 includes entries for the most important and frequently used options that a user selects. The user may select a Send a Fax option by touching a "Send A Fax" button 52, a Mailbox option by touching a "Mailbox" button 54, a Toolbox option by touching a "Toolbox" button 56, an AutoKeys option by touching an "AutoKeys" button 58, or a Sign In option by touching a "Sign In" button 60. Details of operation of each of these options is provided below.

The touch-sensitive display 24 is designed so that the options are displayed with the appearance of buttons. A selected option appears to have its associated button in a depressed position so that the user can determine at a glance which option is selected and which options are not selected. The buttons are labeled for easy interpretation by the user and provide the inputs for IFAX 10. The user simply touches the touch-sensitive display 24 in the location corresponding to a button corresponding to the option desired, such as the Send A Fax button 52. As the IFAX 10 changes from one menu to another, the touch-sensitive display 24 is also changed so that the predetermined input portions to be touched by the user always correspond to the labeled buttons.

The IFAX 10 uses a series of context-sensitive display menus to simplify. the user interaction. For example, entering numbers on the optional hardware numeric keypad 26 (see FIG. 1) relates to entering a facsimile telephone number if the user is sending a facsimile message, but relates to entering a new recipient telephone number if the user is in a different mode of operation.

A prompt 48 is displayed on a portion of each menu to provide the user with instructions or information related to the operation of the IFAX 10. The prompt 48 may contain graphical symbols and words to instruct the user what action may be taken next. The prompt 48 changes for each of the screen displays displaced on the touch-sensitive display 24.

Selection of the Send A Fax option by touching the Send A Fax button 52 begins the process of sending a facsimile message. This option permits the user to send one or more facsimile messages to designated recipients as well as the selection of various options related to sending a facsimile message. The Send a Fax option may involve the use of the numeric keypad 26 (see FIG. 1) and a phonebook 62 (see FIG. 2) that stores the telephone numbers of other IFAX of the same construction and prior art FAX machines. The user can select a stored cover page 64 for a facsimile message and may attach enclosures 66 such as a data file that will accompany the facsimile message, and can alter settings 68-on the IFAX 10 associated with scanning a document, such as contrast.

Selection of the Mailbox option by touching the Mailbox button 54 allows the user to view and print received facsimile messages as well as modify outgoing facsimile messages. The Mailbox option uses an inbox 70 that stores received facsimile messages, and an outbox 72 that stores outgoing facsimile messages. The designation of inbox 70 and outbox 72 are terms easily understood by the user to describe documents waiting to be read (Inbox) and documents waiting to be transmitted (Outbox). The number of received facsimile messages and outgoing facsimile messages is updated on the touch-sensitive display 24.

Selection of the Toolbox option by touching the Toolbox button 56 allows the user to change both user and system settings, print reports or install, remove, or run IFAX Tool applications. The Toolbox option uses a setup control 74 to alter the user and system settings, a reports control 76 to print reports on usage of the IFAX 10, and tool applications 78. Tool applications 78 will be explained in greater detail below.

Selection of the AutoKeys option by touching the AutoKeys button 58 allows the user to define or run macros. The Sign In option selected by touching the Sip In button 60 allows the user to log in with his particular password. When a user logs in. any previously altered user settings are updated. These features will be explained in greater detail below.

Figure 4A:
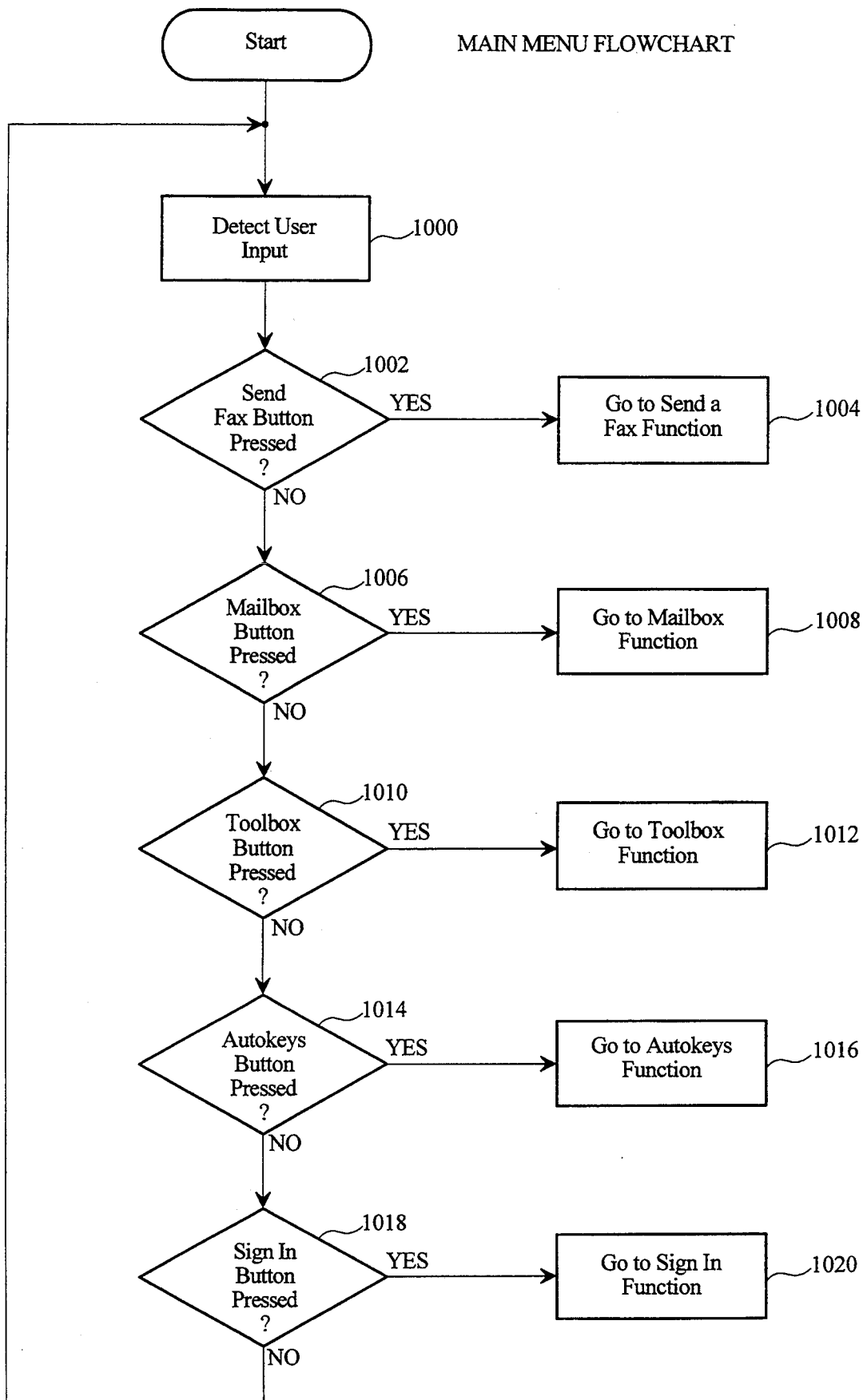
FIGS. 4A-K are operational flowcharts used by the IFAX of FIG. 1 to send a facsimile.

Operation of the IFAX 10 can be best understood in conjunction with the operational flowcharts of FIG. 4A–4L. The main menu flowchart is shown in FIG. 4A. As seen in FIG. 4A, the IFAX detects a user input at step 1000. In decision 1002, the IFAX determines whether the Send Fax button was depressed. If the Send Fax button was depressed, the result of decision 1002 is YES, and the IFAX goes to the Send A Fax function in step 1004. If the Send Fax button was not depressed, the result of decision 1002 is NO, and in decision 006 the IFAX determines whether the Mailbox button was depressed. If the Mailbox button was depressed, the results of decision 1006 is YES and the IFAX 10 goes to the Mailbox function in step 1008. If the Mailbox button was not depressed. the result of decision 1006 is NO, and in decision 10 10, the IFAX 10 determines whether the Toolbox button was depressed. If the Toolbox button was depressed, the result of decision 1010 is YES, and in step 1012 the IFAX 10 goes to the Toolbox function. If the Toolbox button was not depressed, the result of decision 1010 is NO, and in decision 10 14 the IFAX 10 determines whether the Autokeys button was depressed. If the Autokeys button was depressed, the result of decision 1014 is YES, and in step 1016 the IFAX 10 goes to the Autokeys function. If the Autokeys button was not depressed, the result of decision 1014 is NO, and in decision 1018 the IFAX 10 determines whether the Sign In button was depressed. If the Sign In button was depressed, the result of decision 1018 is YES, and in step 1020 the IFAX 10 goes to the Sign In function. If the Sign In button was not depressed, the result of decision 10 18 is NO, and the IF AX 10 returns to step 1000.

Figure 4B:
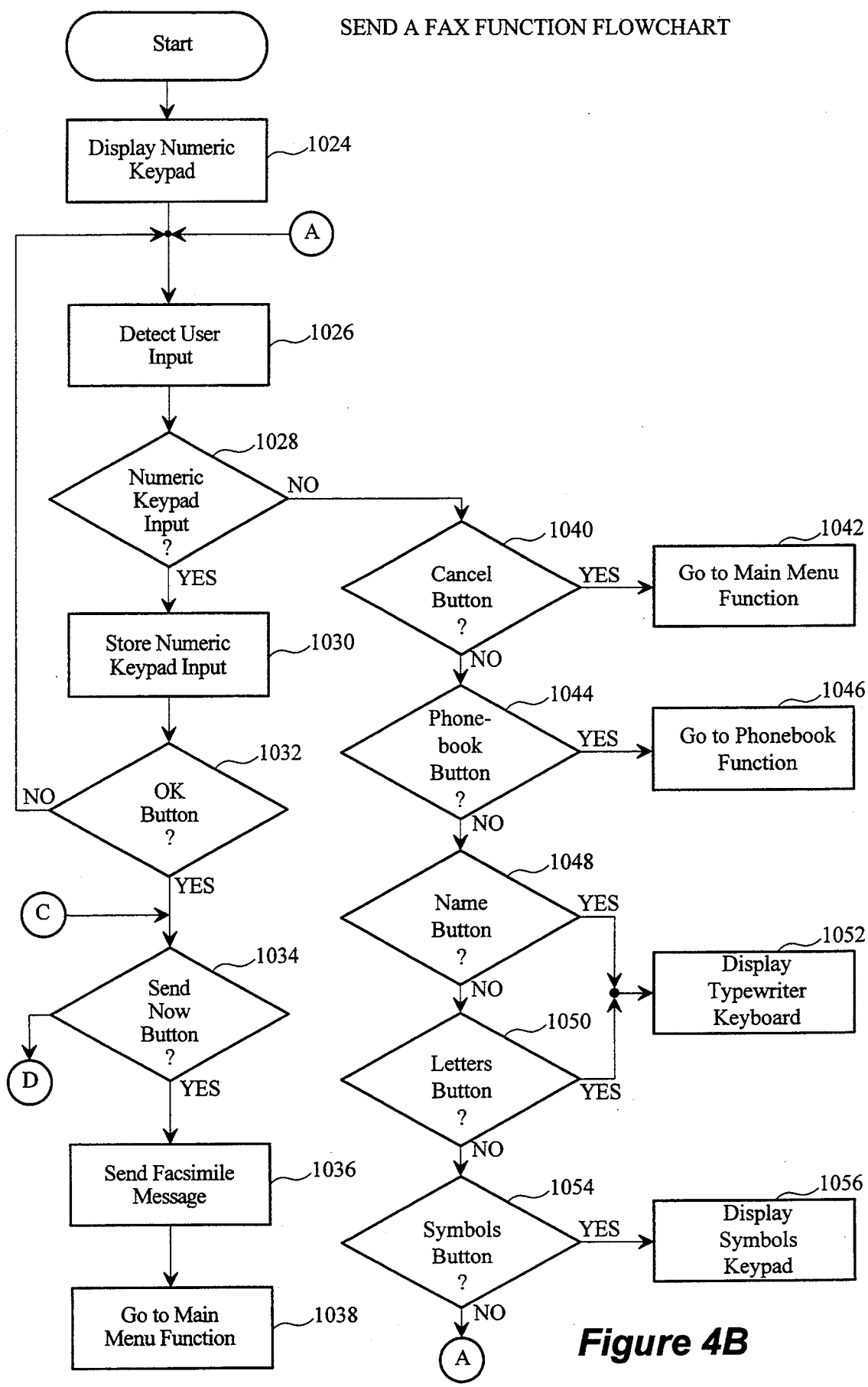
Figure 4C:
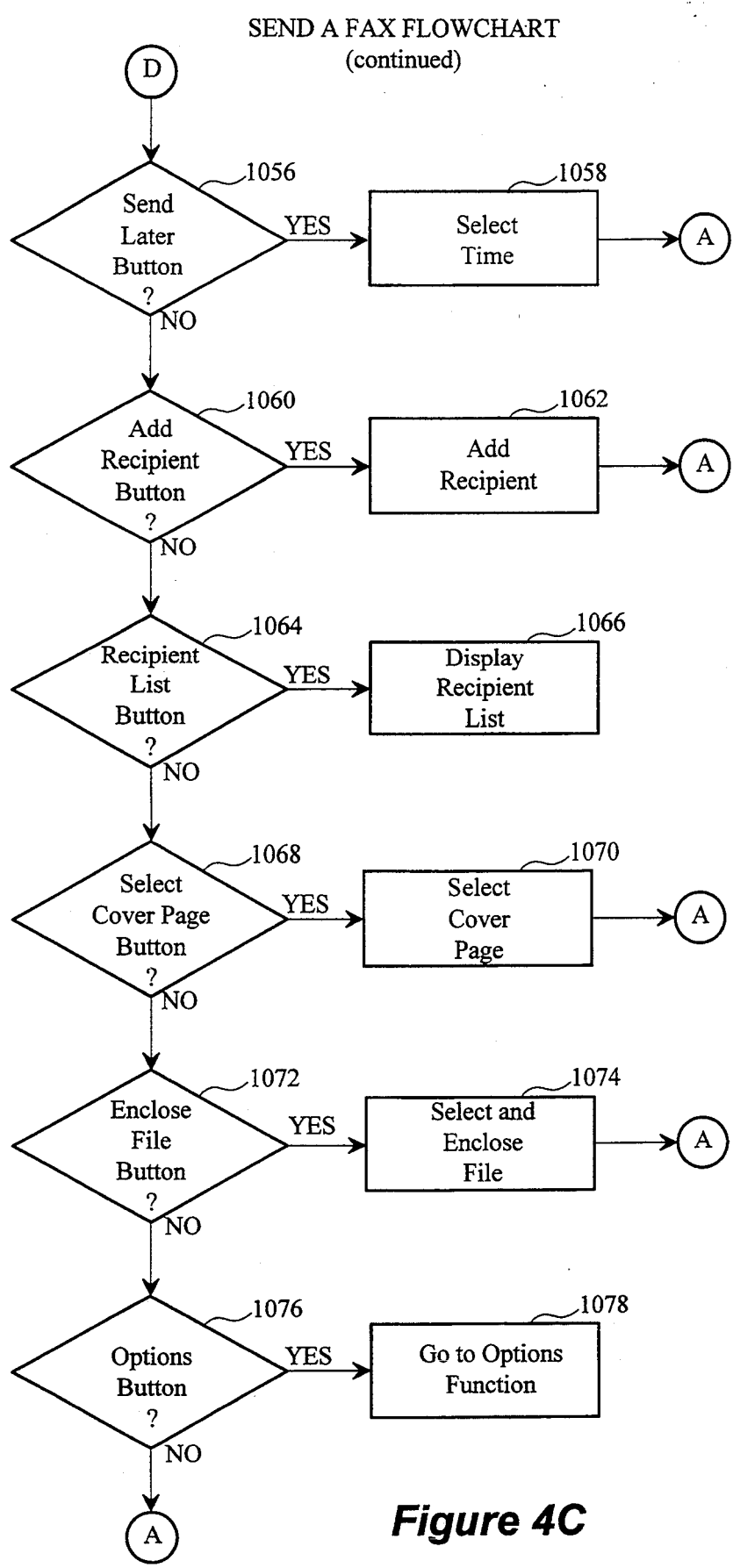
Figure 4D:
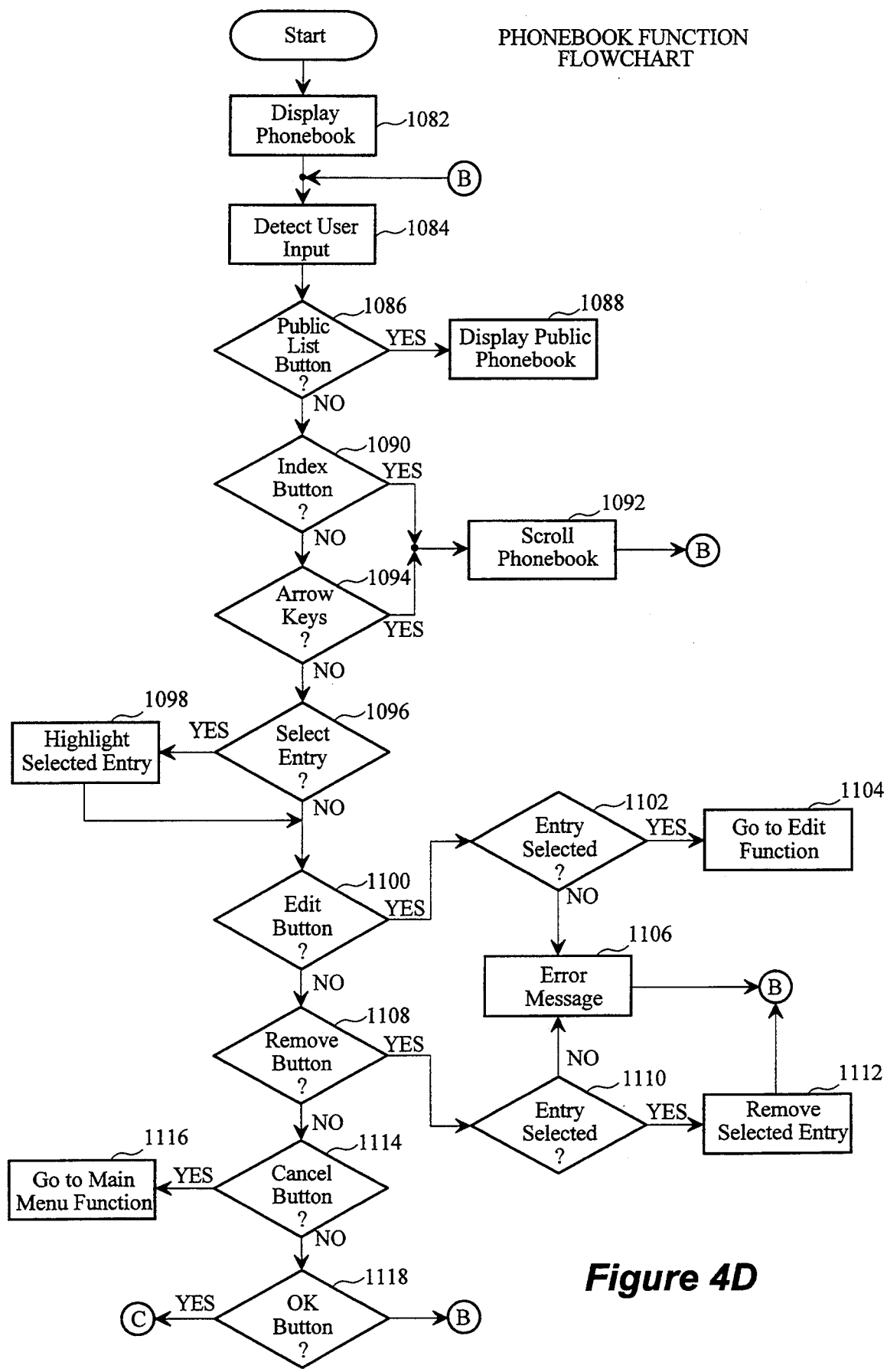

The Send A Fax function flow chart is described in FIGS. 4B-4C. As seen in FIG. 4B, the IFAX 10 displays a numeric keypad in step 1024. In step 1026, the IFAX 10 detects a user input. In decision 1028, the IFAX determines whether the detected input was from the numeric keypad. If the detected input was from the numeric keypad, the result of decision 1028 is YES, and in step 1030 the IFAX 10 stores the numeric keypad input. In decision 1032, the IFAX 10 determines whether the OK button was depressed. If the OK button was not depressed, the result of decision 1032 is NO, and the IFAX 10 returns to step 1026 to detect further user input. If the OK button was depressed, the result of decision 1032 is YES. and in decision 1034, the IFAX 10 determines whether the Send Now button was depressed. If the Send Now button was depressed, the result of decision 1034 is YES. In that event, in step 1036 the IFAX 10 sends the facsimile message. In step 1038 the IFAX 10 returns to the main menu function shown in FIG. 4A. If the Send Now button was not depressed, the result of decision 1034 is NO and the IFAX 10 moves to decision 1056 in FIG. 4C.

Returning momentarily to FIG. 4B, if the detected user input is not from the numeric keypad, the result of decision 1028 is NO. In that event, in decision 1040, the IFAX 10 determines whether the Cancel button was depressed. If the Cancel button was depressed, the result of decision 1040 is yet, and in step 1042 the IFAX 10 returns to the main menu function of FIG. 4A. If the Cancel button was not depressed, the result of decision 1040 is NO, and the IFAX 10 in decision 1044 determines whether the Phonebook button was depressed. If the Phonebook button was depressed, the result of decision 1044 is YES, and in step 1046 the IFAX 10 goes to the Phonebook function. If the Phonebook button was not depressed, the result of decision 1044 is NO, and in decision 1048 the IFAX determines whether the Name button was depressed. If the Name button was not depressed, the result of decision 1048 is NO and in decision 1050, the IFAX 10 determines whether the Letters button was depressed. If the Name button was depressed, the result of decision 1048 is YES. Similarly, if the Letters button was depressed, the result of decision 1050 is YES. If the result of decision 1048 or decision 1050 is YES, in step 1052 the IFAX 10 displays a typewriter keyboard. If the Letters button was not depressed, the result of decision 1050 is NO, and in decision 1054 the IFAX determines whether the Symbols button was depressed. If the Symbols button was depressed, the result of decision 1054 is YES, and in step 1056 the IFAX 10 displays the symbols keypad. If the Symbols button was not depressed, the result of decision 1054 is NO, and the IFAX 10 returns to step 1026 to detect further user input.

With reference to FIG. 4C, in decision 1056 the IFAX 10 determines whether the Send Later button was depressed. If the Send Later button was depressed, the result of decision 1056 is YES, and in step 1058 the IFAX 10 instructs the user to select the desired transmission time. The IFAX 10 then returns to step 1026 to detect further user input. If the send later button was not depressed, the result of decision 1056 is NO, and in decision 1060 the IFAX 10 determines whether the Add Recipient button was depressed. If the Add Recipient button was depressed, the result of decision 1060 is YES, and in step 1062 the IFAX 10 instructs the user to add a facsimile recipient. Following step 1062, the IFAX 10 returns to step 1026 in FIG. 4B, to detect further user input. If the Add Recipient button was not depressed, the result of decision 1060 is NO, and in decision 1064, the IFAX 10 determines whether the Recipient List button was depressed. If the Recipient List button was depressed, the result of decision 1064 is YES and in step 1066, the IFAX 10 displays the Recipient List. If the Recipient List button was not depressed, the result of decision 1064 is NO, and in decision 1068 the IFAX 10 determines whether the Select Cover Page button was depressed. If the Select Cover Page button was depressed, the result of decision 1068 is YES, and in step 1070 the IFAX 10 instructs the user to select the desired cover page. Following step 1070, the IFAX 10 returns to step 1026, shown in FIG. 4B, to detect further user input. If the Select Cover Page button was not depressed, the result of decision 1068 is NO and the IFAX 10, in decision 1072, determines whether the Enclose File button was depressed. If the Enclose File button was depressed, the result of decision 1072 is YES, and in step 1074 the IFAX 10 instructs the user to select and enclose a file. Following step 1074, the IFAX 10 returns to step 1026, shown in FIG. 4B, to detect further user input. If the Enclose File button was not depressed, the result of decision 1072 is NO, and in step 1076. the IFAX 10 determines whether the Options button was depressed. If the Options button was depressed, the result of decision 1076 is YES, and, in step 1078, the IFAX 10 goes to the Options function. If the Options button was not depressed, the result of decision 1076 is NO, and the IFAX 10 returns to step 1026, shown in FIG. 4B, to detect further user input.

The Phonebook function flowchart is shown in FIG. 4B. In step 1082, the IFAX 10 displays the phonebook on the touch-sensitive display 24. In step 1084, the IFAX 10 detects user input. In decision 1086, the IFAX determines whether the Public List button was depressed. If the Public List button was depressed, the result of decision 1086 is YES, and in step 1088, the IFAX 10 displays the public phonebook on the touch sensitive display 24. If the Public List button was not depressed, the result of decision 1086 is NO, and in decision 1090 the IFAX 10 determines whether the Index button was depressed. If the Index button was pressed, the result of decision 1090 is YES, and in step 1092, the IFAX 10 scrolls the phonebook to the location indicated by the Index button, and returns to step 1084 to detect further user input.

If the Index button was not pressed, the result of decision 1090 is NO, and in decision 1094 the IFAX 10 determines whether the arrow keys have been depressed. If the arrow keys have been pressed, the result of decision 1094 is YES, and in step 1092 the IFAX 10 scrolls the phonebook in the direction opposite that indicated by the selected arrow keys. If the arrow keys were not depressed, the result of decision 1094.is NO, and in decision 1096 the IFAX determines whether the user selected an entry from the list displayed on the touch-sensitive display 24.

If the user selected an entry, the result of decision 1096 is YES, and in step 1098 the IFAX 10 highlights the selected entry and moves to decision 1100. If the user has not selected an entry, the result of decision 1096 is NO, and the IF AX 10 moves to decision 1100. In decision 1100, the IF AX 10 determines whether the Edit button was depressed. If the Edit button was pressed, the result of decision 1100 is YES, and in decision 1102 the IFAX determines whether an entry. was selected by the user. If an entry. was selected by the user, the result of decision 1102 is YES, and in step 1104 the IFAX 10 goes to the Edit function. If an entry was not selected by the user, the result of decision 1102 is NO, and in step 1106 the IFAX 10 prints an error message and returns to step 1084 to detect further user input. If the Edit button was not pressed, the result of decision 1100 is NO and in decision 1108, the IFAX 10 determines whether the Remove button was pressed. If the Remove button was pressed, the result of decision 1108 is YES and in decision 1100 the IF AX 10 determines whether an entry. was selected by the user. If an entry was selected by the user, the result of decision 1100 is YES, and in step 1112 the IFAX 10 removes the selected entry and returns to step 1084 to detect further user input. If an entry was not selected by the user, the result of decision 1110 is NO, and in step 1106, the IFAX 10 prints an error message and returns to step 1084 to detect further user input.

If the Remove button was not pressed, the result of decision 1108 is NO and in step 1114, the IFAX 10 determines whether the Cancel button was pressed. If the Cancel button was pressed, the result of decision 1114 is YES and in step 1116, the IFAX 10 goes to the main menu function. If the Cancel button was not pressed, the result of decision 1114 is NO and in decision 1118, the IFAX 10 determines whether the Okay button was pressed. If the Okay button was not pressed, the result of decision 1118 is NO and the IFAX 10 returns to step 1084 to detect further user input. If the Okay button was pressed, the result of decision 1118 is YES and the IFAX 10 goes to decision 1034 in FIG. 4B to continue the process of sending a facsimile message.

Figure 4E:
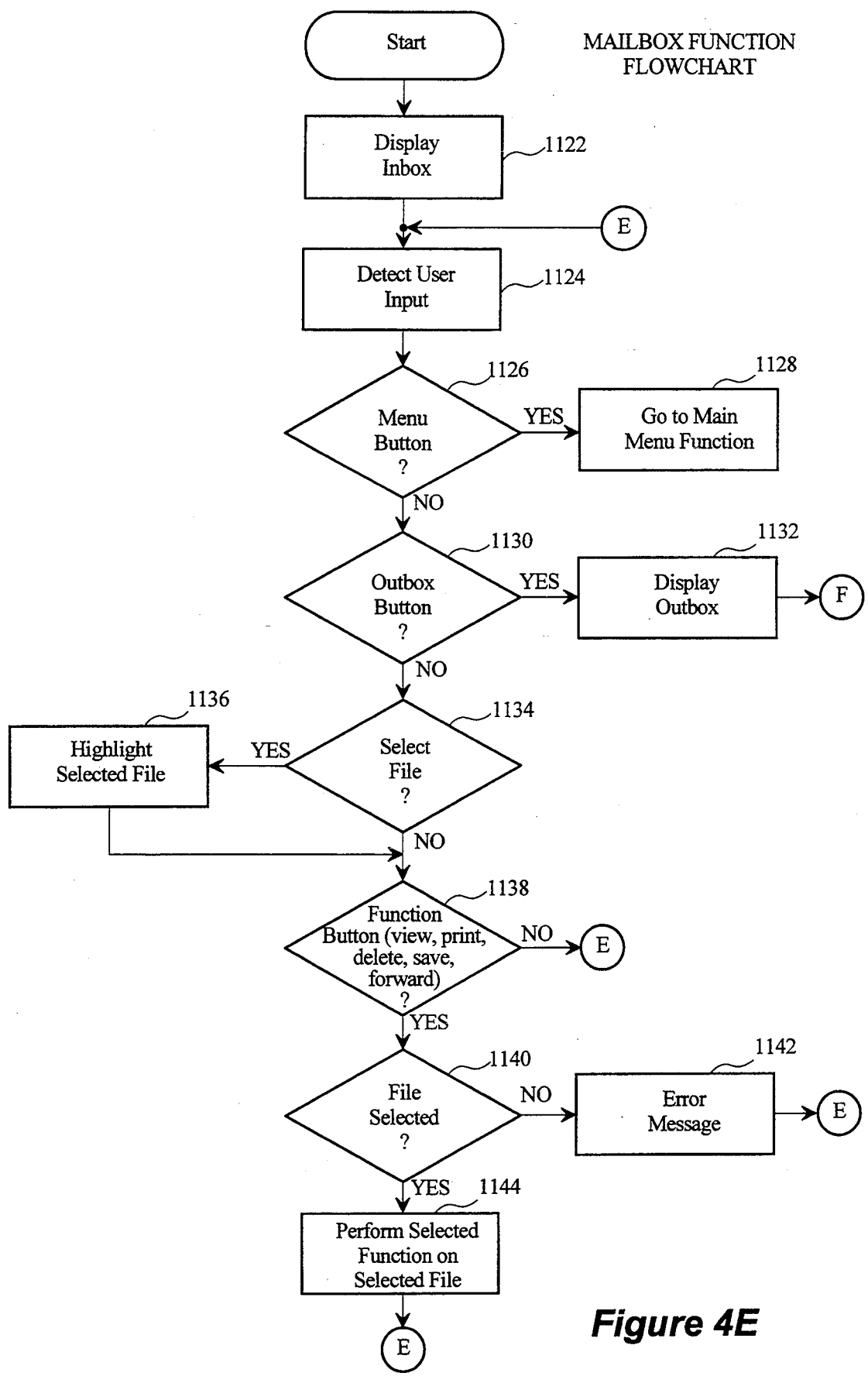
Figure 4F:
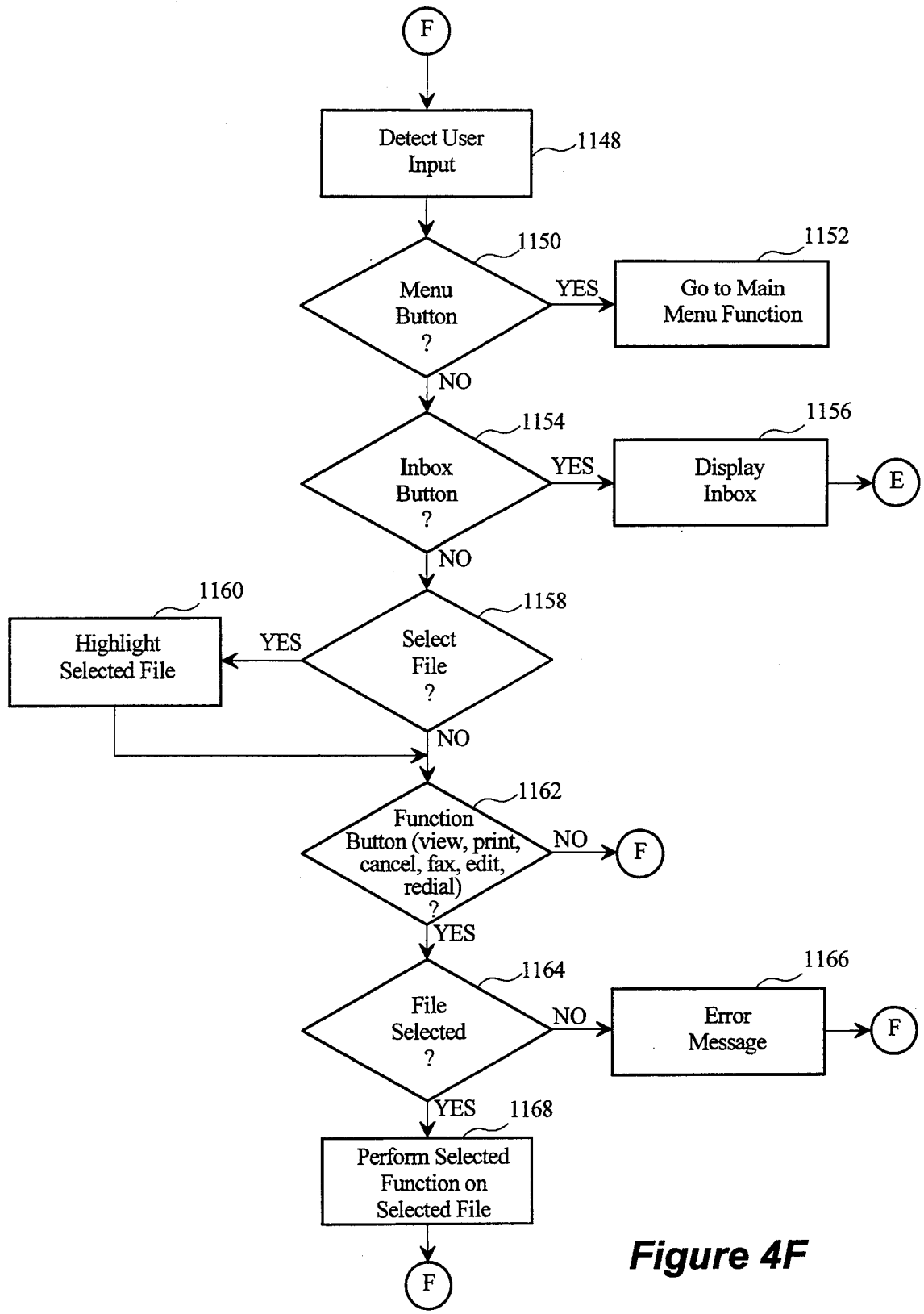

The Mailbox Function Flowchart is described in FIGS. 4E–4F. In step 1122, shown in FIG. 4E, the IFAX 10 displays the In Box on the touch sensitive display 24. In step 1124, the IFAX 10 detects user input. In decision 1126. the IFAX determines whether the Menu button was pressed. If the Menu button was pressed, the result of decision 1126 is YES and in step 1128 the IFAX 10 goes to the Main Menu function. If the Menu button was not pressed. the result of decision 1126 is NO and in decision 1130, the IFAX 10 determines whether the Out Box button was pressed. If the Out Box button was pressed, the result of decision 1130 is YES and in step 1132 the IFAX t0 displays ;the Out Box and goes to step 1148. shown in FIG. 4F, to detect user input.

If the Outbox button was not pressed, the result of decision 1130 is NO and in decision 1134, the IFAX 10 determines whether the user has selected a file from the list of files displayed on the touch sensitive display 24. If the user has selected a file, the result of decision 1134 is YES and in step 1136 the IFAX 10 highlights the selected file. If the user did not select a file, the result of decision 1134 is NO and in decision 1138, the IFAX determines whether a function button was pressed. The function buttons include functions such as View, Print, Delete. Save, and Forward. If a function button was not pressed, the result of decision 1138 is NO and the IFAX 10 returns to step 1124 to detect further use input. If a function button was pressed, the result of decision 1138 is YES and in decision 1140, the IF AX 10 determines whether a file was selected by the user. If a file was not selected by the user. the result of decision 1140 is NO and in step 1142. the IFAX 10 prints an error message and returns to step 1124 to detect further user input. If a file was selected by the user, the result of decision 1140 is YES and in step 1144, the IFAX 10 performs the selected function on the user selected file and returns to step 1124 to detect further user input.

As previously described. if the user had pressed the Outbox button, the result of decision 1130 is yes and in step 1132 the IFAX 10 displays the outbox and proceeds to step 1148, shown in FIG. 4F, to detect further user input. As seen in FIG. 4F, the IFAX 10 in decision 1150 determines whether the Menu button was pressed. If the Menu button was pressed, the result of decision 1150 is YES, and in step 1152 the IFAX 10 goes to the main menu function. If the Menu button was not pressed, the result of decision 1150 is NO, and in decision 1154 the IFAX I0 determines whether the Inbox button was pressed. If the Inbox button was pressed, the result of decision 1154 is YES, and in step 1156 the IFAX 10 displays the inbox and proceeds to step 1124, shown in FIG. 4E, to detect further user input.

If the Inbox button was not pressed, the result of decision 1154 is NO, and in decision 1158 the IFAX 10 determines whether the user has selected a file. If the user has selected a file, the result of decision 1158 is YES and in step 1160, the IFAX 10 highlights the selected file. If the user has not selected a file. the result of decision 1158 is NO, and in decision 1126, the IFAX determines whether a function button was pressed. The functions button associated with the outbox include View, Print, Cancel Fax, Edit, and Redial. If a function button was not selected, the result of decision 1162 is NO, and the IFAX 10 returns to step 1148 to detect further user input.

If a function button was selected, the result of decision 1162 is YES, and in decision 1164 the IFAX 10 determines whether a file was previously selected by the user. If a file was not selected by the user, the result of decision 1164 is NO, and in step 1166 the IFAX 10 prints an error message and returns to step 1148 to detect further user input. If a file was previously selected by the user, the result of decision 1164 is YES, and in step 1168 the IFAX 10 performs the selected function on the user selected file and returns to step 1148 to detect further user input.

Figure 4G:
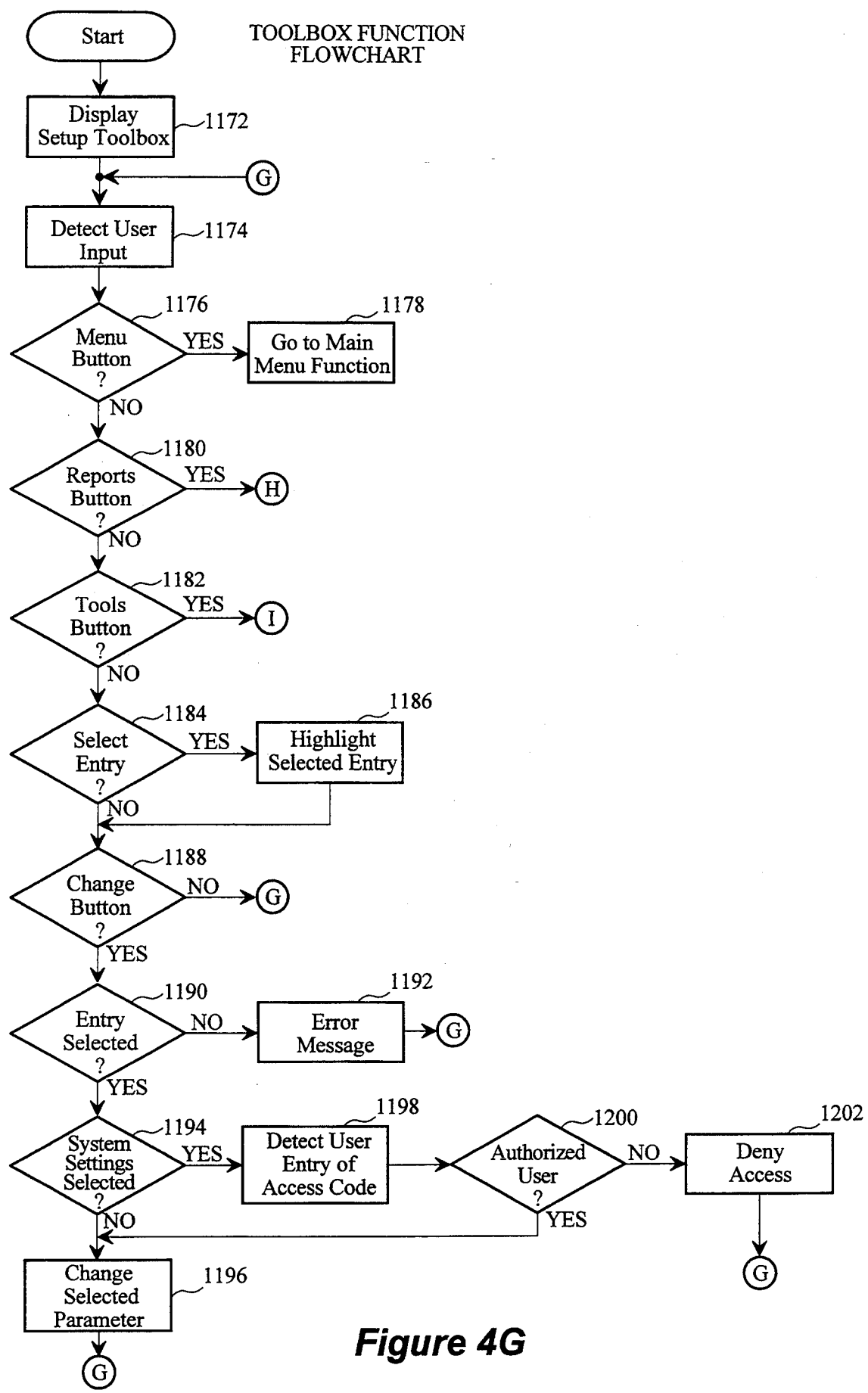
Figure 4H:
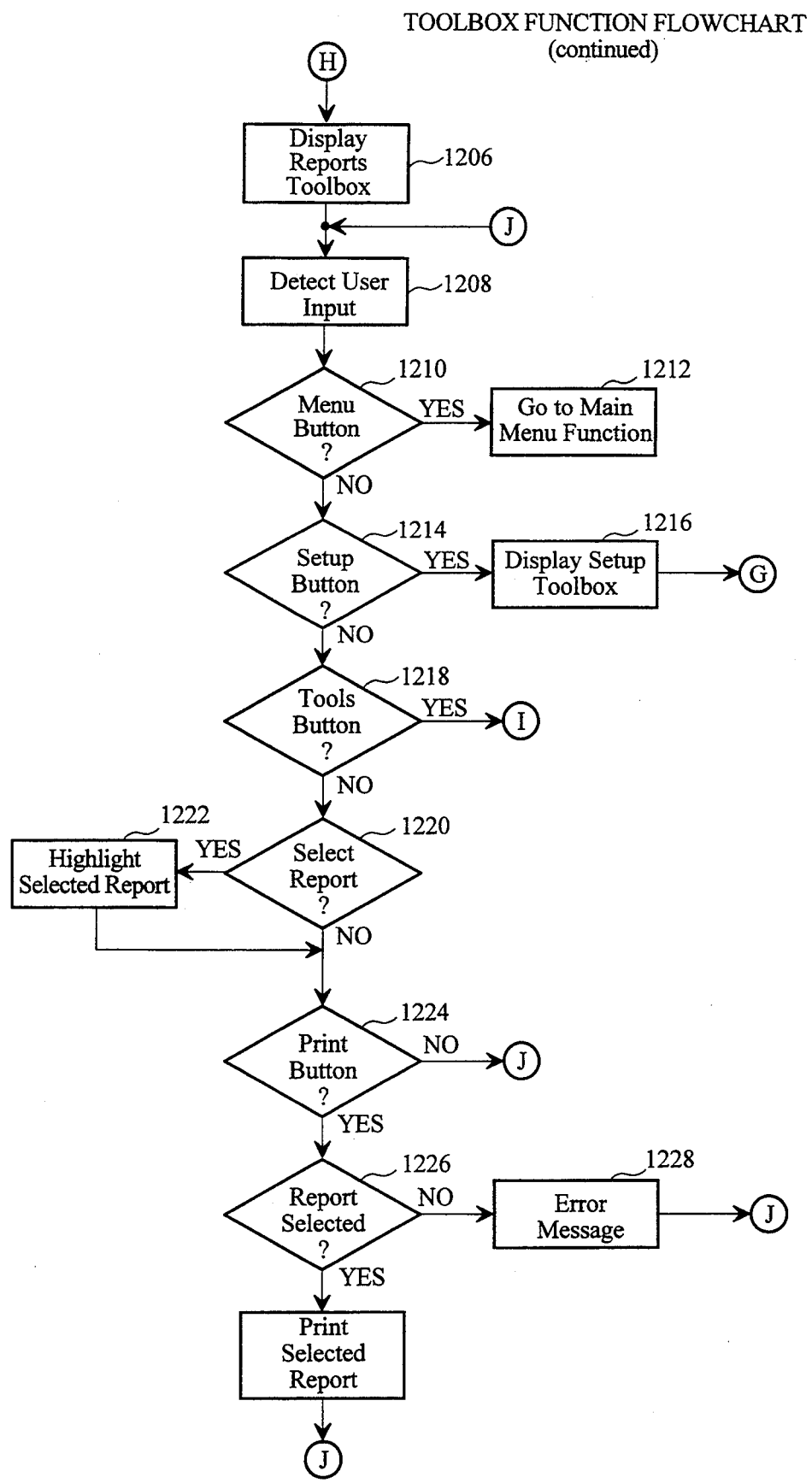
Figure 4I:
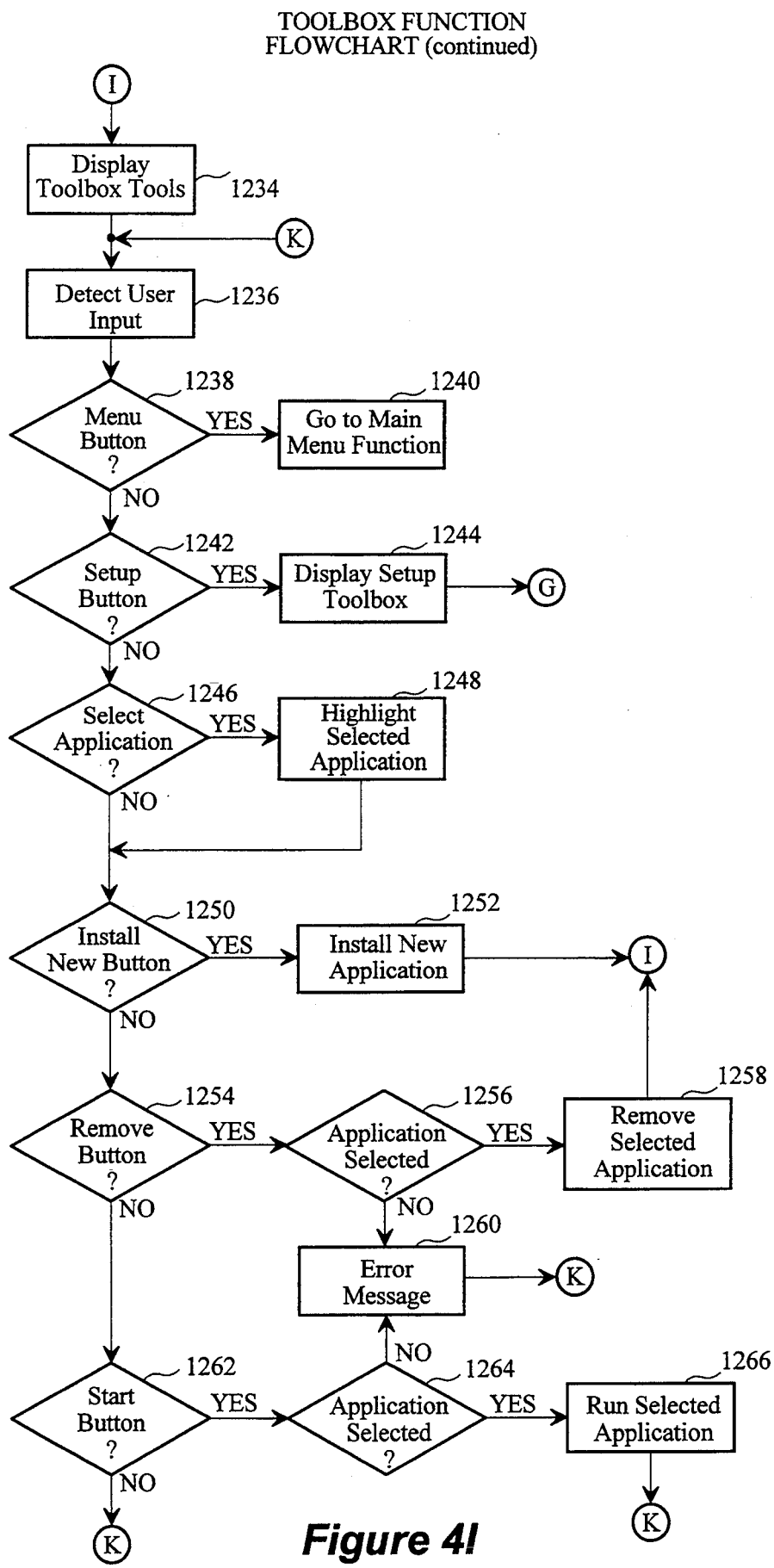

The Toolbox function flowchart is shown in FIGS. 4G–4I. In step 1172. shown in FIG. 4D, the IFAX 10 displays the setup toolbox. In step 1174. the IFAX detects user input. In decision 1176, the IFAX 10 determines whether the menu button has been pressed. If the menu button has been pressed, the result of decision 1176 is YES and in step 1178 the IFAX 10 goes to the main menu function. If the menu button was not pressed, the result of decision 1176 is NO, and in decision 1180 the IFAX 10 determines whether the Reports button was pressed. If the Reports button was pressed, the result of decision 1180 is YES, and the IFAX I0 goes to step 1206 shown in FIG. 4H. If the Reports button was not pressed, the result of decision 1180 is NO, and in decision 1182 the IFAX 10 determines whether the Tools button was pressed. If the Tools button was pressed, the result of decision 1182 is YES, and the IFAX 10 goes to Step 1234 shown in FIG. 4I.

If the Tools button was not pressed, the result of decision 1182 is NO, and in decision 1184 the IFAX 10 determines whether the user has selected an entry. If the user has selected an entry, the result of decision 1184 is YES, and in step 1186 the IFAX 10 highlights the selected entry. If the user has not selected an entry, the result of decision 1184 is NO, and in decision 1188 the IFAX 10 determines whether the Change button was pressed. If the change button was not pressed, the result of decision 1188 is NO and the IFAX 10 returns to step 1174 to detect further user input. If the Change button was pressed, the result of decision 1188 is YES, and in decision 1190 the IFAX 10 determines whether the user has previously selected an entry. If the user has not previously selected an entry, the result of decision 1190 is NO, and in step 1192 the IFAX 10 prints an error message and returns to step 1174 to detect further user input.

If an entry was previously selected by the user, the result of decision 1190 is YES, and in decision 1194 the IFAX 10 determines whether the System Settings button is selected. If the Systems Settings button was not selected, the result of decision 1194 is NO, and in step 1196 the IFAX 10 changes the selected parameter and returns to step 1174 to detect further user input. If the System Settings button was selected, the result of decision 1194 is YES, and in decision 1198 the IFAX 10 detects a user entry of an access code. In decision 1200, the IFAX 10 determines whether the access code is that of an authorized user. If the access code is that of an authorized user, the result of decision 1200 is YES, and the IFAX 10 goes to step 1196 to change the selected parameter and returns to step 1174 to detect further user input. If the access code is not that of an authorized user, the result of decision 1200 is NO, and in step 1202 the IFAX 10 denies access to system settings, and returns to step 1174 to detect further user input.

As previously described, if the Reports button was pressed, the result of decision 1180 is YES, and the IFAX I0 moves the step 1206 in Figure 4H. In step 1206, shown in FIG. 4H, the IFAX 10 displays the reports toolbox. In step 1208, the IFAX I0 detects user input. In decision 1210, the IFAX 10 determines whether the Menu button was pressed. If the Menu button was pressed, the result of decision 1210 is YES, and in step 1212 the IFAX 10 goes to the main menu function. If the Menu button was not pressed, the result of decision 1210 is NO, and in decision 1214 the IFAX 10 determines whether the Setup button was pressed. If the Setup button was pressed, the result of decision 1214 is YES and in step 1216 the IFAX 10 displays the setup toolbox and returns to step 1174, shown in FIG. 4G, to detect further user input. If the Setup button was not pressed, the result of decision 1214 is NO, and in decision 1218 the IFAX 10 determines whether the Tools button was pressed.

If the Tools button was pressed, the result of decision 1218 is YES, and the IFAX 10 moves to step 1234, shown in FIG. 4I. If the Tools button was not pressed, the result of decision. 1218 is NO, and in decision 1220 the IFAX 10 determines whether the user has selected a report. If the user has selected a report, the result of decision 1220 is YES and in step 1222 the IFAX 10 highlights the selected report. If the user has not selected a report, the result of decision 1220 is NO, and in decision 1224 the IFAX 10 determines whether the Print button has been pressed. If the Print button has not been pressed, the result of decision 1224 is NO, and the IFAX 10 returns to step 1208 to detect further user input. If the Print button was pressed, the result of decision 1224 is YES, and in decision 1226 the IFAX 10 determines whether the user has previously selected a report. If the user has not previously selected a report, the result of decision 1226 is NO, and in step 1228 the IFAX 10 prints an error message and returns to step 1208 to detect further user input. If the user has previously selected a report, the result of decision 1226 is YES, and in step 1230 the IFAX 10 prints the selected report and returns to step 1208 to detect further user input.

If the Tools button had been pressed by the user, the result of decision 1182 or decision 1218 is YES, and the IFAX 10 moves to step 1234, shown in FIG. 4I. In step 1234, the IFAX 10 displays the toolbox tools. In step 1236, the IFAX 10 detects user input. In decision 1238, the IFAX 10 determines whether the Menu button has been pressed. If the menu button has been pressed, the result of decision 1238 is YES, and in step 1230 the IFAX 10 goes to the Main Menu function. If the Menu button was not pressed, the result of decision 1238 is NO, and in decision 1242 the IFAX 10 determines whether the Setup button was pressed. If the Setup button was pressed, the result of decision 1242 is YES and in step 1244 the IFAX 10 displays the setup toolbox, and returns to step 1174, shown in FIG. 4G. to detect further user input. If the Setup button was not pressed, the result of decision 1242 is NO, and in decision 1246 the IFAX 10 determines whether the user has selected an application. If the user has selected an application, the result of decision 1246 is YES, and the IFAX 10 highlights the selected application in step 1248. If the user has not selected an application, the result of decision 1246 is NO, and in decision 1250 the IFAX 10 determines whether the Install New button has been pressed.

If the Install New button has been pressed, the result of decision 1250 is YES, and in step 1252 the IFAX 10 installs the new application and returns to step 1234 to display the toolbox with the new application. If the Install New button was not pressed, the result of decision 1250 is NO, and in decision 1254 the IFAX 10 determines whether the Remove button has been pressed. If the remove button has been pressed, the result of decision 1254 is YES, and in decision 1256 the IFAX 10 determines whether an application has previously been selected by the user. If an application has been previously selected by the user, the result of decision 1256 is YES, and in step 1258 the IFAX 10 removes the selected application and returns to step 1234 to display the toolbox with the removed application no longer shown on the touch-sensitive display 24. If an application has not been previously selected by the user, the result of decision 1256 is NO, and in step 1260 the IFAX 10 prints an error message and returns to step 1236 to detect further user input. If the Remove button was not pressed, the result of decision 1254 is NO, and in decision 1262 the IFAX 10 determines whether the Start button has been pressed. If the Start button has not been pressed, the result of decision 1262 is NO, and the IFAX 10 returns to step 1236 to detect further user input. If the Start button has been pressed, the result of decision 1262 is YES, and in decision 1264 the IFAX 10 determines whether an application has previously been selected by the user. If an application has not been previously selected by the user, the result of decision 1264 is NO, and in step 1260 the IFAX 10 prints an error message and returns to step 1236 to detect further user input. If an application has been previously selected by the user, the result of decision 1264 is YES, and in step 1266 the IFAX 10 executes the selected application, and returns to step 1236 to detect further user input.

Figure 4J:
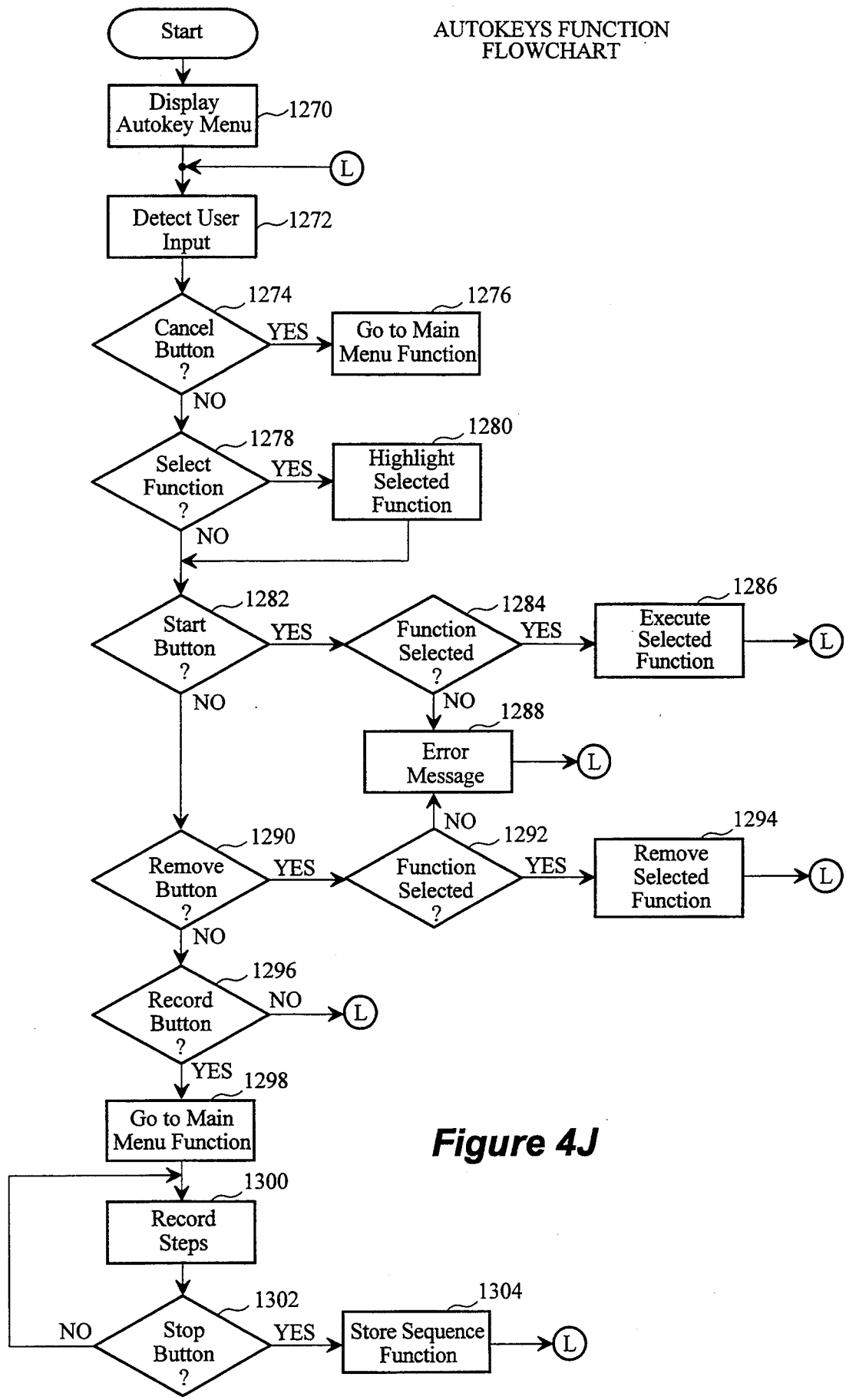

The AutoKey function flowchart is described in FIG. 4J. In step 1270, the IFAX 10 displays the AutoKey menu. In step 1272, the IFAX 10 detects user input. In decision 1274, the IFAX 10 determines whether the Cancel button was pressed. If the Cancel button was pressed, the result of decision 1274 is YES, and in step 1276 the IFAX 10 goes to the main menu function. If the Cancel button was not pressed, the result of decision 1274 is NO, and in decision 1278 the IFAX 10 determines whether the user has selected a function. If the user has selected a function, the result of decision 1278 is YES, and in step 1280 the IFAX 10 highlights the selected function. If the user has not selected a function, the result of decision 1278 is NO, and in step 1282 the IFAX 10 determines whether the Start button has been pressed. If the Start button has been pressed, the result of decision 1282 is YES, and in decision 1284 the IFAX 10 determines whether a function has previously been selected by the user. If a function has been previously selected by the user, the result of decision 1284 is YES, and in step 1286 the IFAX 10 executes the selected function and returns to step 1272 to detect further user input. If a function has not been previously selected, the result of decision 1284 is NO, and in step 1288 the IFAX 10 prints an error message and returns to step 1272 to detect further user input.

If the Start button was not pressed, the result Of decision 1282 is NO, and in decision 1290 the IFAX 10 determines whether the Remove button was pressed. If the Remove button was pressed, the result of decision 1290 is YES, and in decision 1292 the IFAX 10 determines whether a function has previously been selected by the user. If a function has been previously selected by the user, the result of decision 1292 is YES, and in step 1294 the IFAX 10 removes the selected function and returns to step 1272 to detect further user input. If a function has not been previously selected by the user, the result of decision 1292 is NO, and in step 1288 the IFAX 10 prints an error message and returns to step 1272 to detect further user input.

If the Remove button has not been pressed, the result of decision 1290 is NO, and in decision 1296 the IFAX 10 determines whether the Record button has been pressed. If the Record button has not been pressed, the result of decision 1296 is NO, and the IFAX 10 returns to step 1272 to detect further user input. If the Record button has been pressed, the result of decision 1296 is YES, and in step 1298 the IFAX 10 goes to the main menu function. In step 1300, the IF AX 10 records all subsequent steps entered by the user. In decision 1302, the IFAX 10 determines whether a Stop button has been pressed by the user. If the Stop button has not been pressed, the result of decision 1302 is NO, and the IFAX 10 returns to step 1300 to continue recording steps entered by the user. If the user has pressed the Stop button, the result of decision 1302 is YES, and in step 1304 the IFAX 10 stores the sequence as an AutoKey function and returns to step 1272 to detect further user input.

Figure 4K:
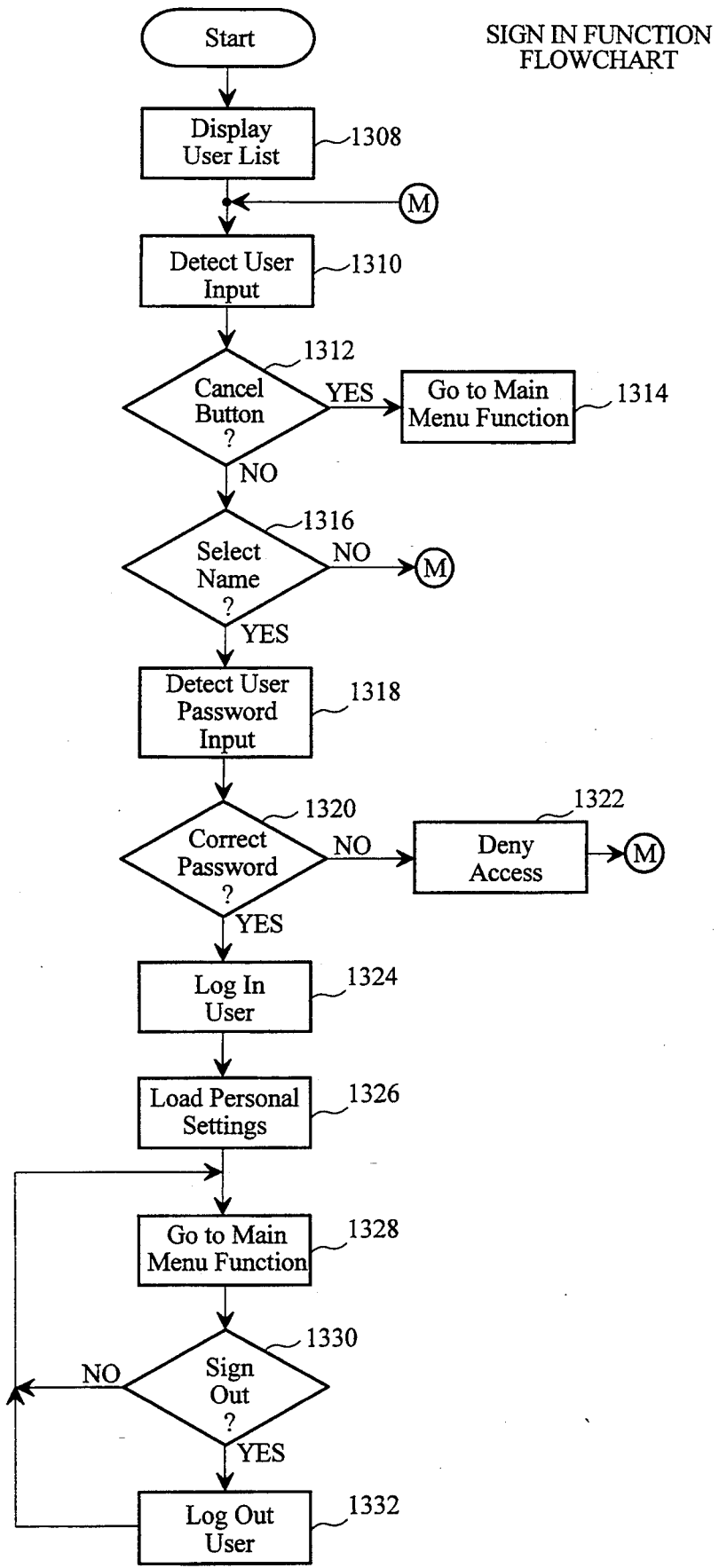

The Sign In function flowchart is described in FIG. 4K. In step 1308, the IFAX 10 displays a user list. In step 1310, the IFAX 10 detects user input. In decision 1312, the IFAX 10 determines whether the Cancel button was pressed. If the Cancel button was pressed, the result of decision 1312 is YES, and in step 1314 the IFAX 10 goes to the Main Menu function. If the Cancel button was not pressed, the result of decision 1312 is NO, and in decision 1316 the IFAX 10 determines whether the user has selected a name from the list displayed on the touch-sensitive display 24. If the user has not selected a name, the IF AX 10 returns to step 13 10 to detect further user input.

If the user has selected a name from the list displayed on the touch-sensitive display 24, the result of decision 1316 is YES, and in step 1318 the IFAX 10 detects user password input. In decision 1320, the IFAX 10 determines whether the user has entered the correct password. If the user has not entered the correct password, the result of decision 1320 is NO, and in step 1322 the IFAX 10 denies access to the functions available on the IFAX, and returns to step 1310 to detect further user input. If the user has entered the correct password, the result of decision I320 is YES, and in step I324 the IFAX 10 logs in the user. In step 1326, the IFAX 10 loads the personal settings previously selected for that particular user. Personal settings may include display of a personal phonebook, selection of a personal facsimile cover page style, selection of initial screens and settings. Following step 1326, the IFAX I0 in step 1328 goes to the Main Menu function. The Main Menu function now indicates the user who has been logged into the IFAX 10. The Main Menu function also includes a Sign Out key in place of the Sign In key previously described in FIG. 4A. In decision 1330, the IFAX 10 determines whether the Sign Out button has been pressed. If the Sip Out button has not been pressed, the result of decision 1330 is NO, and the IFAX 10 returns to step 1328 and the Main Menu function. From the Main Menu function, the user may select any of the facsimile functions available on the IFAX 10, as previously described. If the Sign Out button has been pressed, the result of decision 1330 is YES, and in step 1332 the IFAX 10 logs out the particular user and returns to step 1328 in the Main Menu function.

Figure 5:
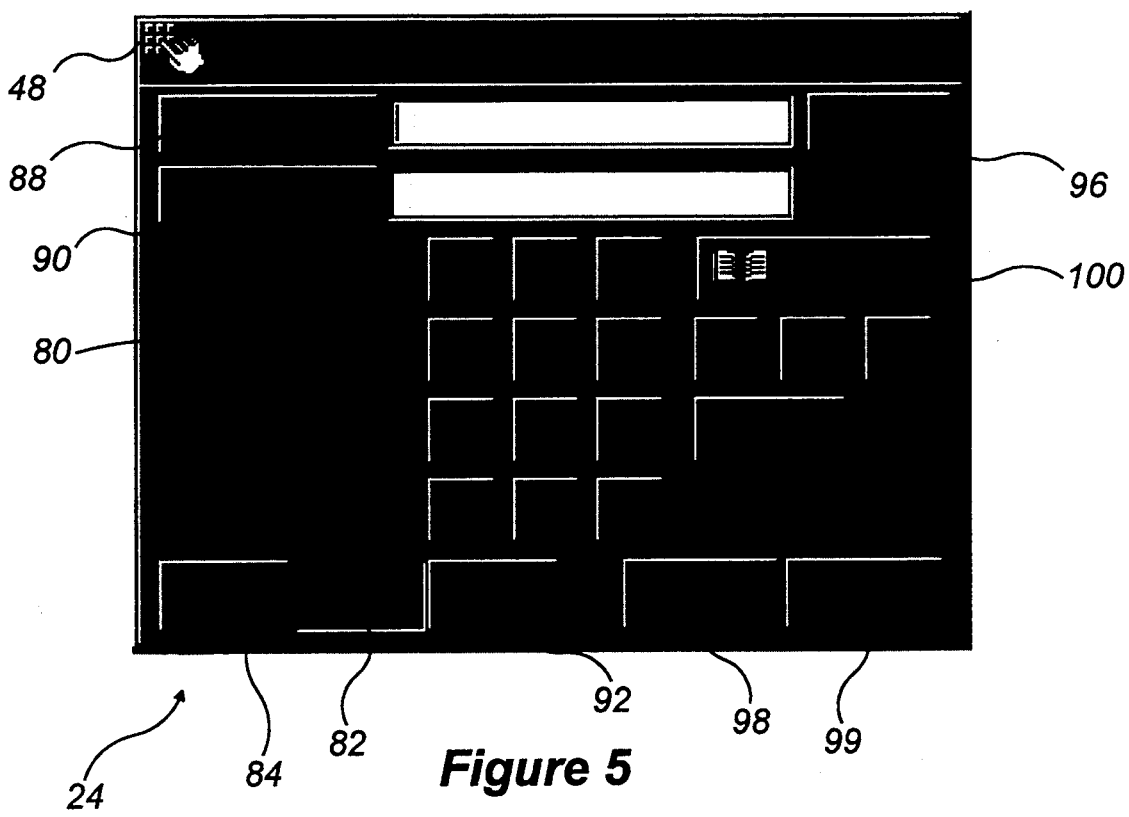
FIG. 5 is a screen display of the IFAX of FIG. 1 used to enter a facsimile telephone number.
Figure 6:
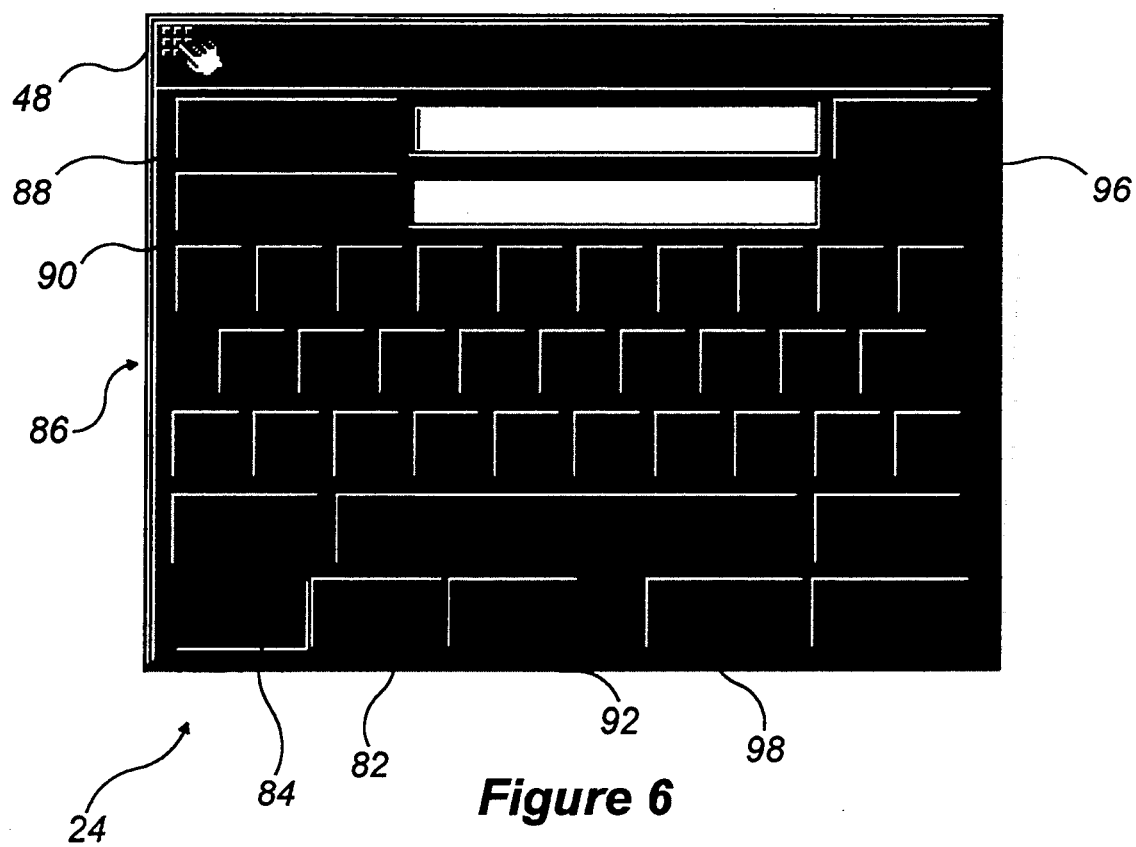
FIG. 6 is a screen display of the IFAX of FIG. 1 used to enter a name of a facsimile recipient.
Figure 7:
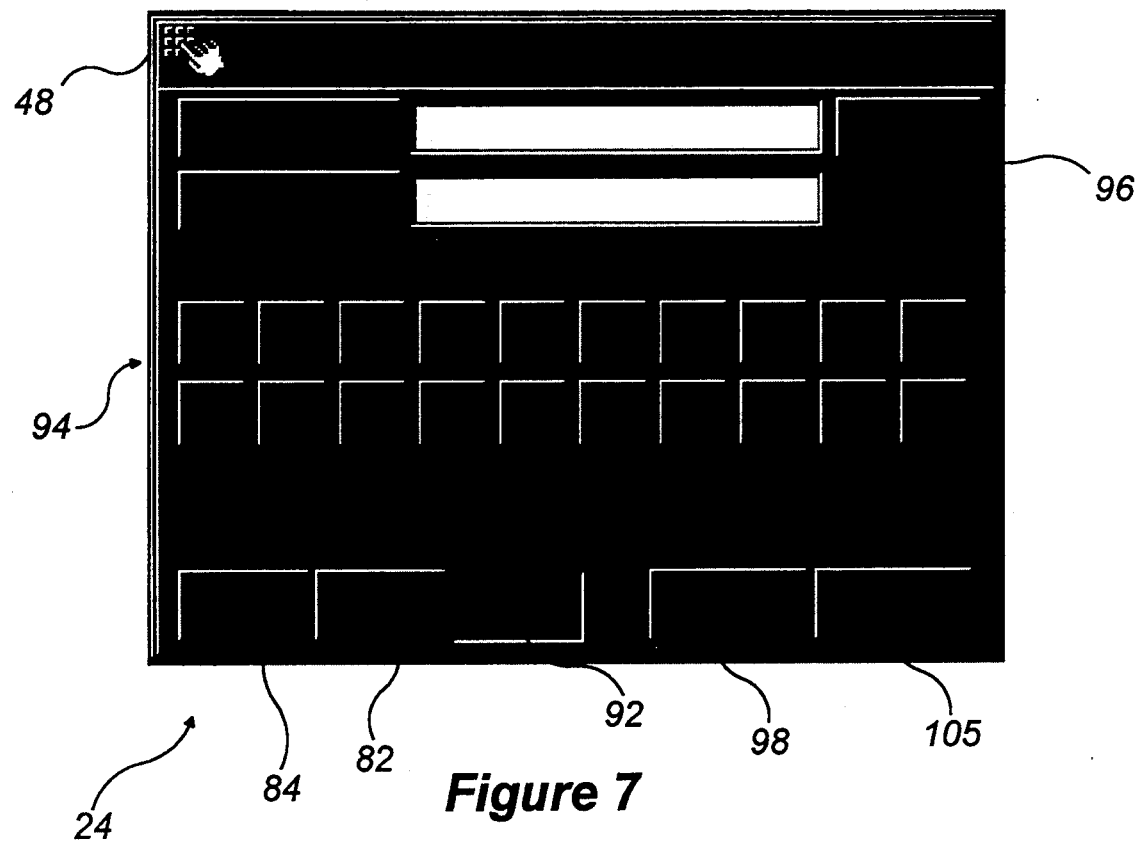
FIG. 7 is a screen display of the IFAX of FIG. 1 used to enter information to select a facsimile telephone number.

The description of the Send A Fax option is best understood in conjunction with the flowchart of FIGS. 4B–4C and the screen displays of FIGS. 5 to 7. When the user selects the Send a Fax option by touching the Send A Fax button 52. the IFAX 10 changes the touch-sensitive display 24 to the display of FIG. 5. As shown in FIG. 5. the IFAX 10 displays a numeric keypad 80 on the touch-sensitive display 24 or the optional hardware numeric keypad 26 (see FIG. 1). The optional hardware numeric keypad 26 contains a plurality of numbered buttons corresponding to the numeric keypad 80 displayed on the touch-sensitive display 24. The numeric keypad 80 operates in the same manner as the optional hardware numeric keypad 26.

A "Numbers" button 82 on the touch-sensitive display 24 is shown in a depressed position to indicate that the numeric keypad 80 is selected. The FAX 10 selects the numbers button 82 as the default display because the most common user action is to enter a facsimile telephone number of a facsimile recipient. The prompt 48 at the top of the touch-sensitive display 24 instructs the user to enter a facsimile telephone number. The user enters the telephone number of the FAX machine to which a facsimile message will be sent (i.e., a facsimile recipient) using the numeric keypad 80 on the touch-sensitive display 24 or the optional hardware numeric keypad 26 and presses an OK button 99. Alternatively, the user may enter the name of the person or company as the facsimile recipient. The user may cancel the facsimile telephone number selection at any time and return to the main menu shown in the screen display of FIG. 3 by pressing a "Cancel" button 98.

If the user elects to enter the name of the facsimile recipient, the user selects a "Letters" button 84 on the touch-sensitive display 24. The IFAX 10 displays a typewriter style keyboard 86 on the touch-sensitive display 24, as shown in FIG. 6, if the Letters button 84 is selected. Note that the Letters button 84 is now shown in the depressed position to indicate that the typewriter keyboard 86 is selected. Alternatively, the user may depress a "Fax Number" button 88 indicator or a "Name" button 90 on the touch-sensitive display 24 to select the numeric keypad 80 and the typewriter keyboard 86, respectively. The fIAX 10 recognizes either the Fax number or the Name as a valid selection of the facsimile recipient. Thus, the IFAX 10 is designed to permit the user to select options by a variety of different techniques, some of which are redundant, for the sake of simplifying operation by the user.

The user may also select a "Symbols" button to enter symbols such as parentheses. The touch-sensitive display 24 displays a symbols keypad 94, shown in FIG. 7, when the Symbols button 92 is selected. Note that the Symbol button 92 is shown in the depressed position in FIG. 7 to indicate that the symbols keypad 94 has been selected.

A "Clear" button 96 may be used as a backspace to delete the previous digit in any of the displays of FIGS. 5 to 7. The user can cancel the entire selection process by pressing the Cancel button 98. The IFAX 10 will cancel the Send a Fax option 52 and return to the main menu shown in the screen display of FIG. 3.

When preparing to send a facsimile message, the user may not recall the facsimile number or name of the facsimile recipient. The IFAX 10 uses the phonebook 62 (see FIG. 2) to store a plurality. of facsimile telephone numbers and names. The phonebook 62 is selected by depressing and releasing a "Phonebook" button 100 on the touch-sensitive display 24, shown in FIG. 5. When the phonebook 62 is selected, the IFAX 10 changes to the screen display of FIG. 8 on the touch-sensitive display 24. The operational flowchart of the phonebook 62 has been previously described in connection with FIG. 4D.

The phonebook 62 contains an index 102 that allows the user to quickly move to the desired portion of the phonebook. In the example shown in FIG. 8, the index 102 divides the phonebook 62 into five alphabetical portions, covering A-E, F-I, J-O, P-T, and U-Z, respectively. The index 102 can be divided into any desired number of portions for the convenience of the user. The user selects a portion of the phonebook 62 by selecting the corresponding portion of the index 102. Alternatively, the user may use a pair of arrow keys 104 to scroll up or down through the phonebook 62 in a well-known manner. The prompt 48 instructs the user to touch the desired names listed on the touch-sensitive display 24 and press an "OK" button 105 to indicate acceptance of the selection. The user selects the desired name and facsimile phone number from the phonebook 62 by touching the desired entry from the list displayed on the touch-sensitive display 24 in the manner described above. The user may cancel the selection process, and return to the main menu shown in the screen display of FIG. 3, by pressing the Cancel button 98, as previously described.

The user may enter new names and numbers by selecting a "New" button 108. The IFAX 10 changes the prompt 48 to instruct the user to enter the new individual name, facsimile number, company name, voice number, and street address. Alternatively, the user may edit an existing entry in the phonebook 62 by selecting the entry to be edited and selecting an "Edit" button 110. The IFAX 10 changes the prompt 48 to instruct the user to edit the selected entry in the phonebook 62. The user may also remove an entry from the phonebook 62 by selecting the entry to be removed and selecting a "Remove" button 112. The IFAX 10 displays a message for the user to confirm the deletion. If the user confirms the deletion, the IFAX 10 removes the selected entry and returns to the screen display of FIG. 8.

When the user has selected an entry from the phonebook 62 or entered a name or facsimile number, the fIAX 10 automatically switches to the next menu to complete the transmission of the facsimile message. The touch-sensitive display 24 changes to the screen display shown in FIG. 9. The IFAX 10 changes the prompt 48 to indicate to the user what facsimile telephone number has been selected by the user. The user presses a "Send Now" button 120, or a "Send Later" button 122 to select the desired time for facsimile transmission. The user may wish to send an important facsimile message immediately without regard to the cost for sending the facsimile message. Alternatively, the user may elect to delay sending the facsimile message until a later time, such as late an night when the telephone rates have decreased.

Figure 11:
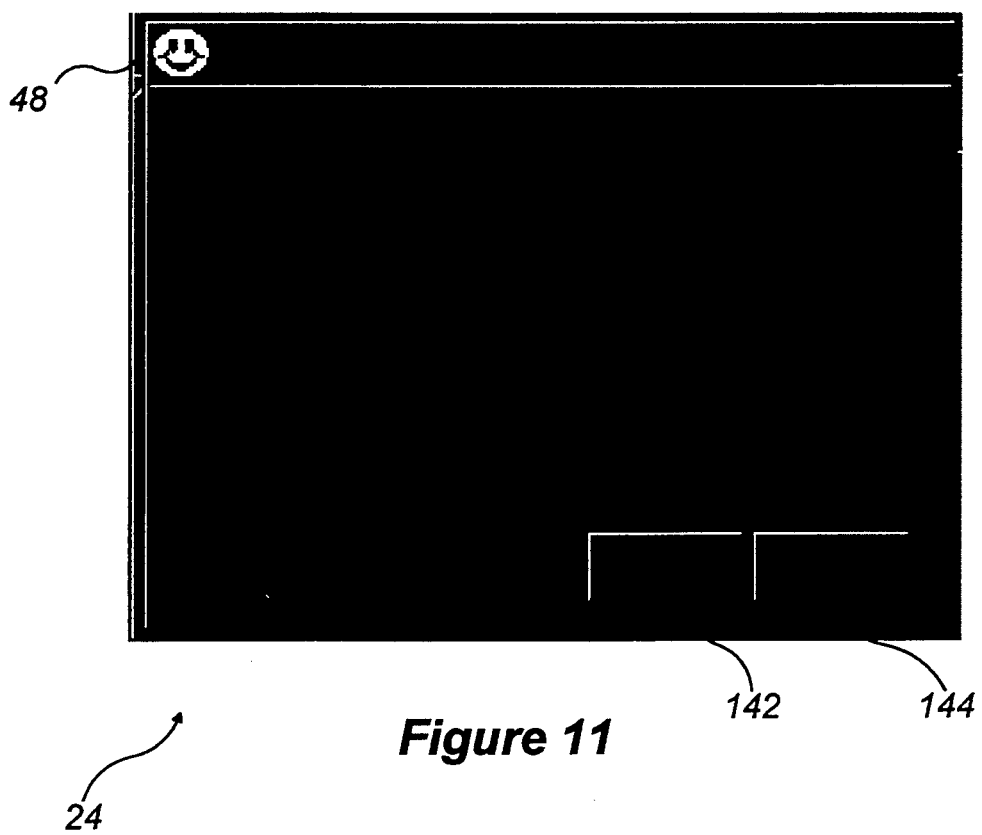
FIG. 11 is a screen display of the IFAX of FIG. 1 used to confirm the transmission of facsimile messages.

If the user selects the Send Now button 120, the fIAX 10 changes the touch-sensitive display 24 to that of FIG. 11. The user confirms that the facsimile message should be sent immediately by selecting a "Continue" button 144. Alternatively, the user may stop the facsimile transmission by selecting a "Stop" button 142. The prompt 48 in FIG. 11 uses a well-known symbol indicating that all is well with the IFAX 10.

Figure 12:
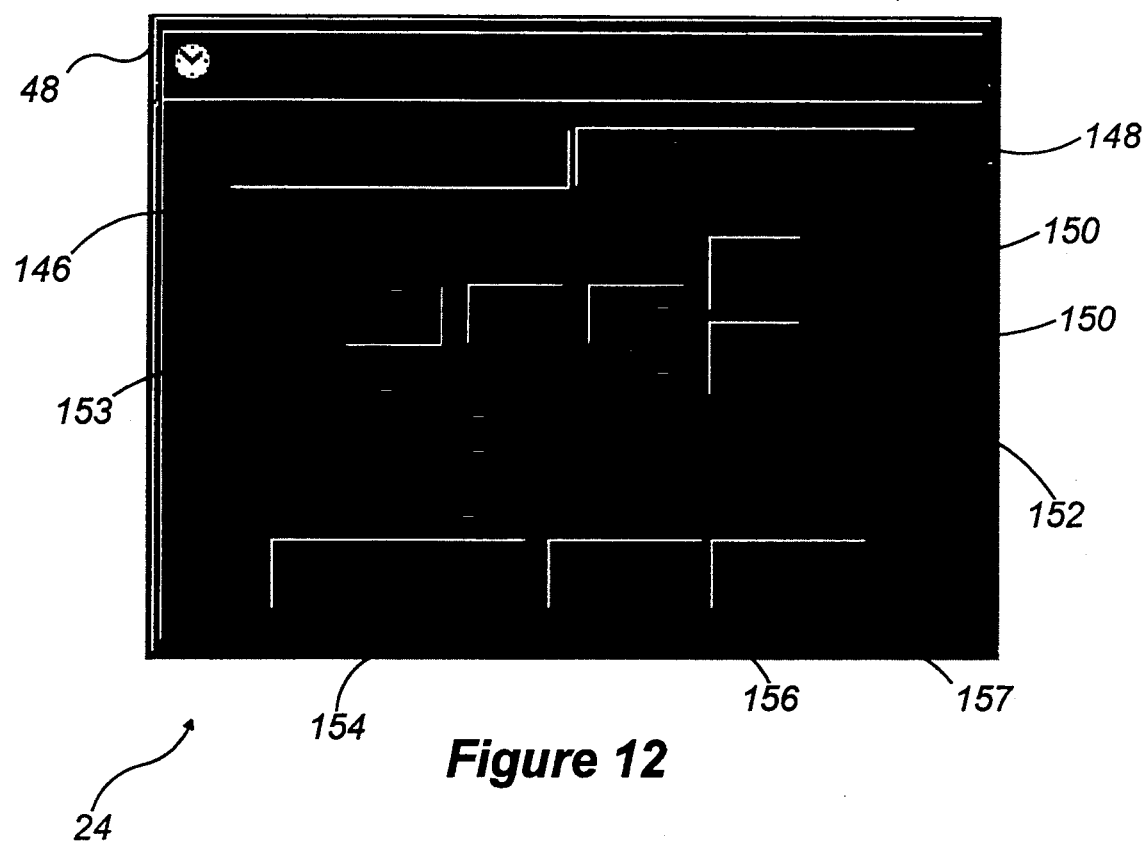
FIG. 12 is a screen display of the IFAX of FIG. 1 used to select a transmission time for facsimile messages.

If the user selects the Send Later button 122 (see FIG. 9), the IFAX 10 changes the touch-sensitive display 24 to that shown in the screen display of FIG. 12. The user presses a "choose Time" button 146 to enter the desired transmission time, or a "Use Discount Rates" button 148 to use the discount telephone rates to determine the transmission time. The user can select the transmission time by pressing one of a pair of time set arrows 150 and the time display indicators. For example, the user can change "PM" to "AM" by simply touching an AM/PM button 152. Similarly, the hour can be changed by touching an hour button 153 and the time set arrows 150. The user can save the selected time as a default time by pressing a "Save as Default" button 154. The facsimile message is stored in the IFAX 10 along with the user-specified transmission time. The user may cancel the Send Later option and return to the menu shown in FIG. 9 by pressing a "Cancel" button 156. The prompt 48 instructs the user to set the desired transmission time and touch a "Start" button 157. Thus, the prompt 48 provides simple instructions to the user that are menu dependent and allow a user with little or no training to select from the various options available on the IFAX 10. The prompt 48 is tailored to the particular options available on the IFAX 10.

The IFAX 10 can be configured to print a confirmation report when a facsimile message is transmitted. The confirmation report is printed immediately following the actual transmission of the facsimile message, whether the user presses the Send Now button 12 on the Send Later button 122.

Figure 9:
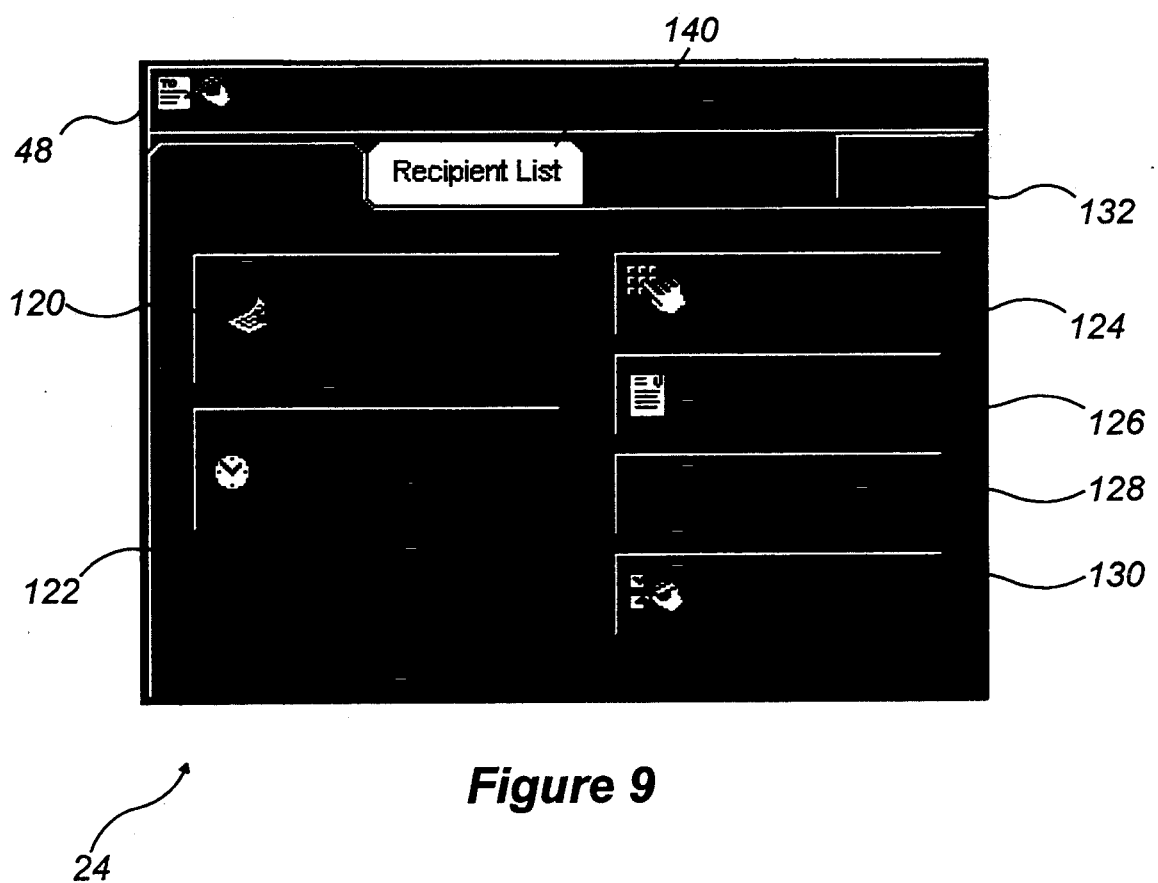
FIG. 9 is a screen display of the IFAX of FIG. 1 used to select facsimile transmission options.

The user may also add another recipient by selecting an "Add Recipient" button 124 (see FIG. 9). Selecting the Add Recipient button 124 will return the user to the menu shown in FIG. 5 and the prompt 48 instructs the user to enter the facsimile telephone number and name of the new facsimile recipient.

Figure 10:
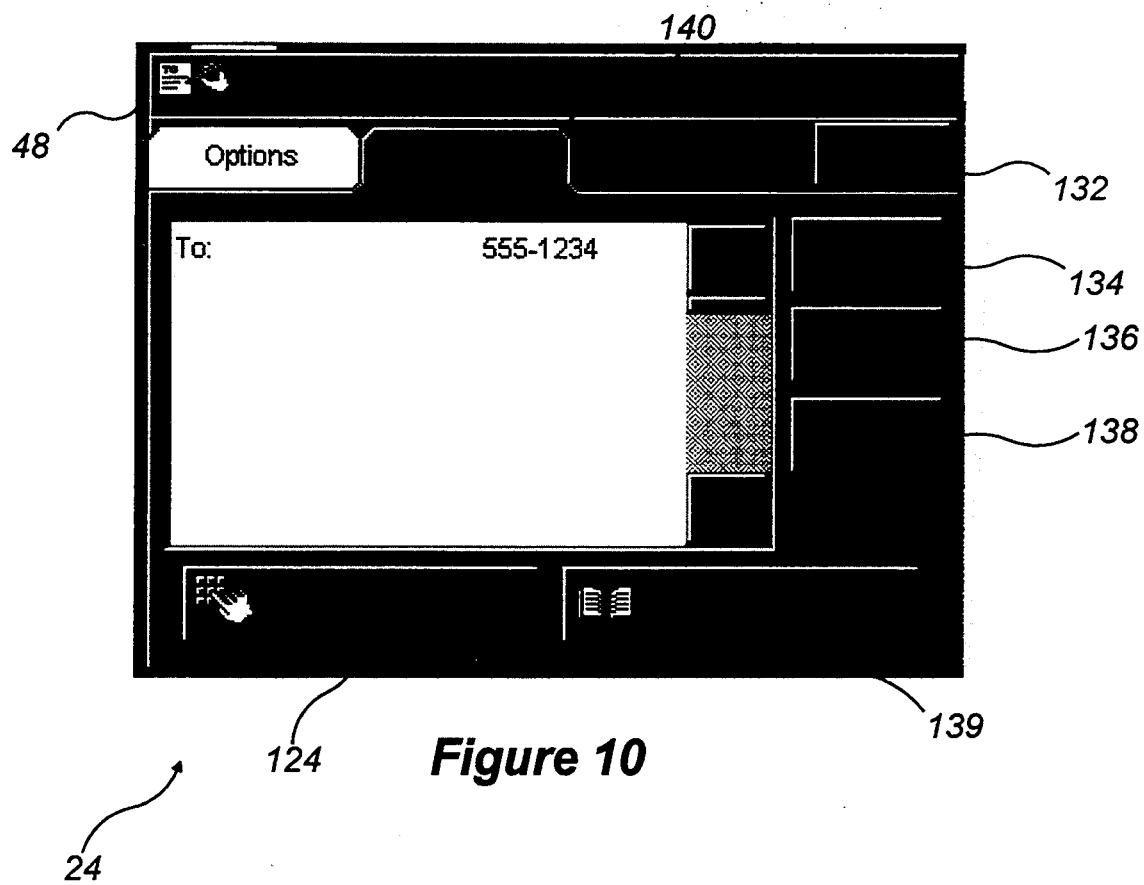
FIG. 10 is a screen display of the IFAX of FIG. 1 used to display recipients of facsimile messages.

The user can review the entire list of recipients by pressing a "Recipient List" button 140 (see FIG. 9). Selecting the Recipient List button 140 will cause the IFAX 10 to change the contents of the touch-sensitive display 24 to the screen display shown in FIG. 10. The prompt 48 changes to indicate that a facsimile recipient telephone number has been selected. The user may add recipients manually using the Add Recipient button 124, or from the phonebook 62 by the selecting an "Add From Phonebook" button 139. The user may edit any facsimile recipient information by selecting the desired facsimile recipient and selecting an "Edit" button 134. The user may also remove a facsimile recipient from the list by selecting the desired facsimile recipient and pressing a "Remove" button 136. The user may add carbon copy (Cc) recipients by selecting a "Cc" button 138.

Figure 13:
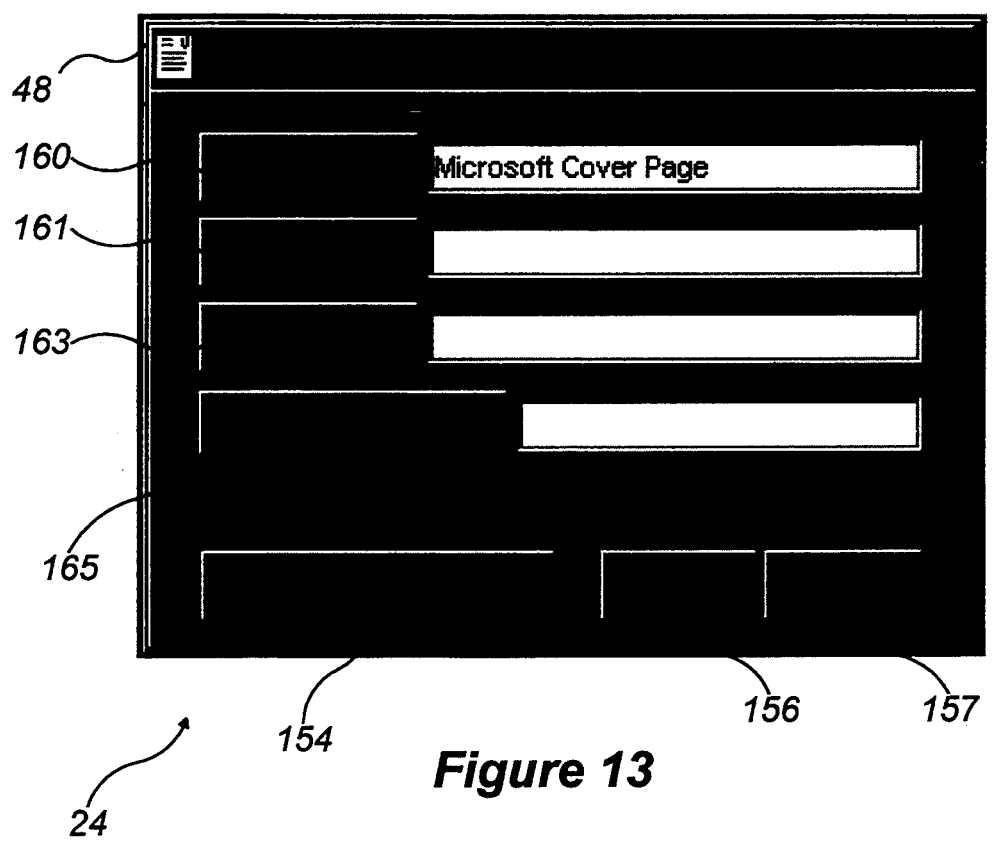
FIG. 13 is a screen display of the IFAX of FIG. 1 used to complete a cover page for facsimile messages.

Returning now to FIG. 9, the user may specify a facsimile cover page by pressing a "Select Cover Page" button 126. If the user presses the Select Cover Page button 126, the IFAX 10 changes to the screen display of FIG. 13. The prompt 48 instructs the user to fill out the cover page. The user enters data into the appropriate portions of the touch-sensitive display 24. If the user presses a "Cover Style" button 160, a "Subject" button 161, or a "Comments" button 163, the IFAX 10 displays the typewriter keyboard 86 such as shown in FIG. 6 on the touch-sensitive display 24, and the prompt 48 instructs the user to fill in the appropriate information. Similarly, if the user presses a "Number of Pages" button 165, the IFAX 10 displays the numeric keypad 80 such as shown in FIG. 5 on the touch-sensitive display 24, and the prompt 48 instructs the user to fill in the appropriate information. The user can save this information as default values by selecting the Save as Default button 154 previously described. The user may cancel the selection process at any time and return to the menu shown in the screen display of FIG. 9 by pressing the Cancel button 156. The user presses the OK button 158 to verify that the data entered is correct. The user may also select a Facsimile cover page style from a list of stored facsimile cover pages by selecting the "Cover Style" button 160. The cover pages are stored in the memory 14 or the file storage unit 28 for future use.

Figure 14:
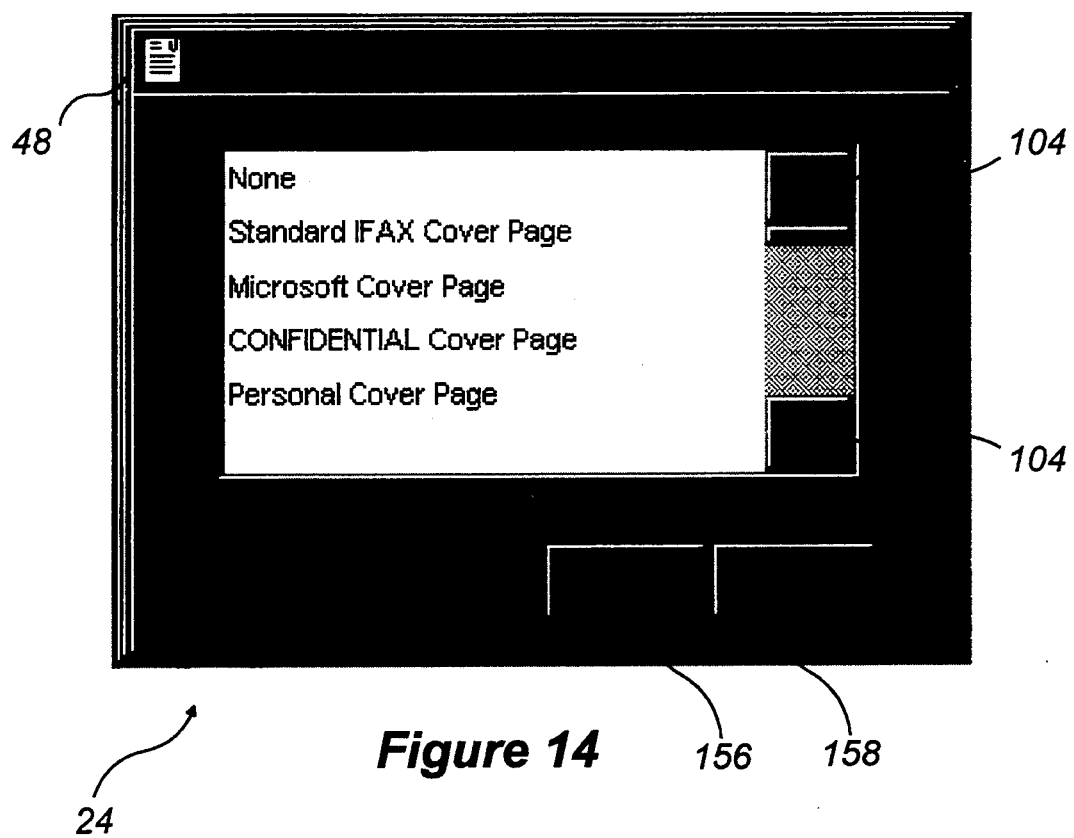
FIG. 14 is a screen display of the IFAX of FIG. 1 used to select a cover page style for facsimile messages.

In response to the selection of the Cover Style button 160, the IFAX 10 changes to the display of FIG. 14 Where a list of stored digital images of facsimile cover pages is displayed on the touch-sensitive display 24. The prompt 48 instructs the user to select the cover style. The stored facsimile cover pages are digital cover pages that can be customized for particular facsimile recipients or for particular facsimile messages. The IFAX 10 can store a plurality of digitized cover pages in the file storage unit 28 (see FIG. 1). The user may create digitized cover pages in any number of manners well known to those skilled in the art. For example, the user could use the Microsofc ® PaintBrush ™ program to create a digital cover page. The user-created cover page is stored in the memory 14 or the files storage unit 28 and is added to the list of cover page styles shown in FIG. 14. The digital cover page is stored in the form of a bit-map. The bit-map can be compressed by any number of well-known data compression routines in order to save space in memory 14 or the file storage unit 28. The user selects one of the facsimile cover pages from the list of FIG. 14 by touching the touch-sensitive display 24 at the location where the desired facsimile cover page style is listed. If the list of facsimile cover pages exceeds the number that can be displayed at one time, the user may use the arrow keys 104 to scroll the list in the desired direction. When the user selects the desired facsimile cover page by touching one of the cover pages listed on the touch-sensitive display 24, the selection is verified by pressing the OK button 158. The user may also cancel the selection process at any time and return to the menu shown in the screen display of FIG. 13 by pressing the Cancel button 156.

Figure 15:
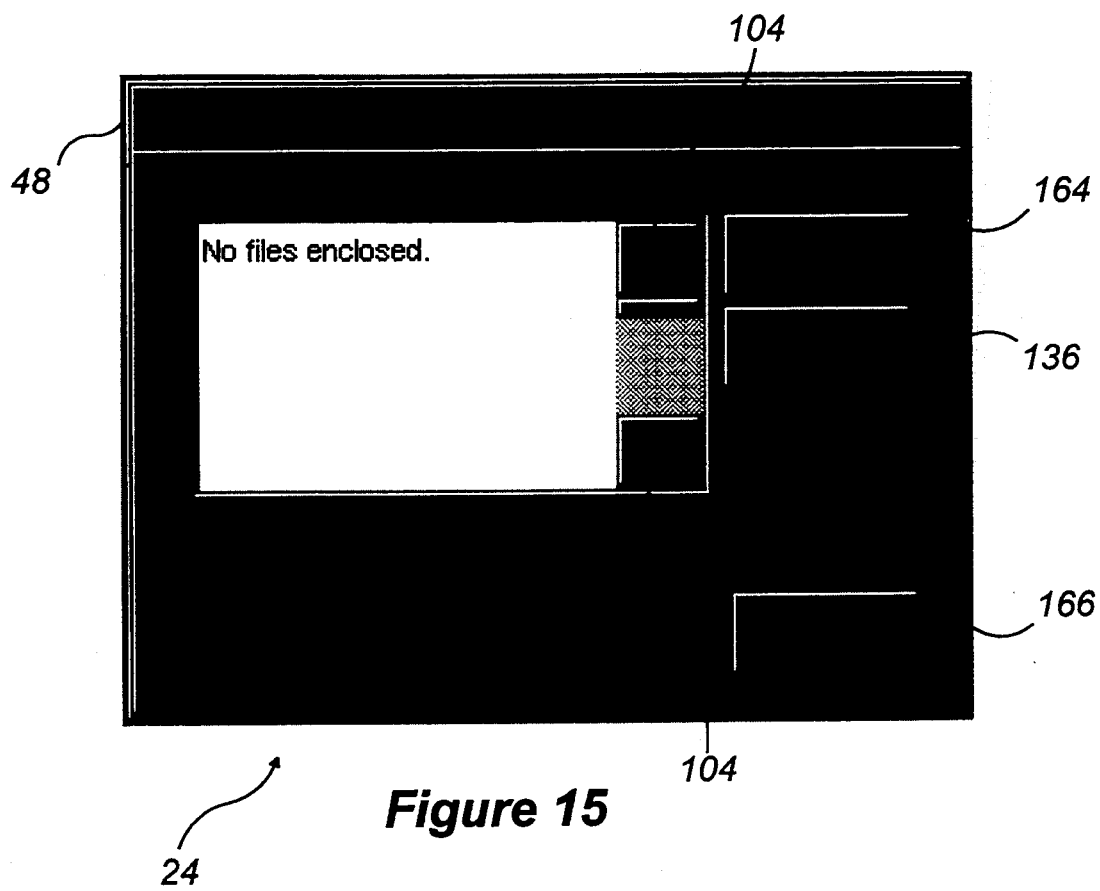
FIG. 15 is a screen display of the IFAX of FIG. 1 used to add a file to a facsimile message.

Returning again to the display of FIG. 9, the user may also enclose one or more data files with the outgoing facsimile message by pressing an "Enclose A File" button 128. The enclosed data file may be any data file such as a word processor data file or a spreadsheet data file. The data file is typically stored in the file storage unit 28. When the user selects the Select A File button 128, the IFAX 10 changes to the display of FIG. 15. The prompt 48 instructs the user to select the data file(s) to be transmitted as part of the facsimile message. In the screen display of FIG. 15 no data files are enclosed. If data files are enclosed, they would be listed on the screen display of FIG. 15. The user can remove a data file from the enclosure list, selecting the desired data file by touching the one or more files listed on the touch-sensitive display 24, then pressing the Remove button 136 as previously described in connection with FIG. 10.

Figure 16:
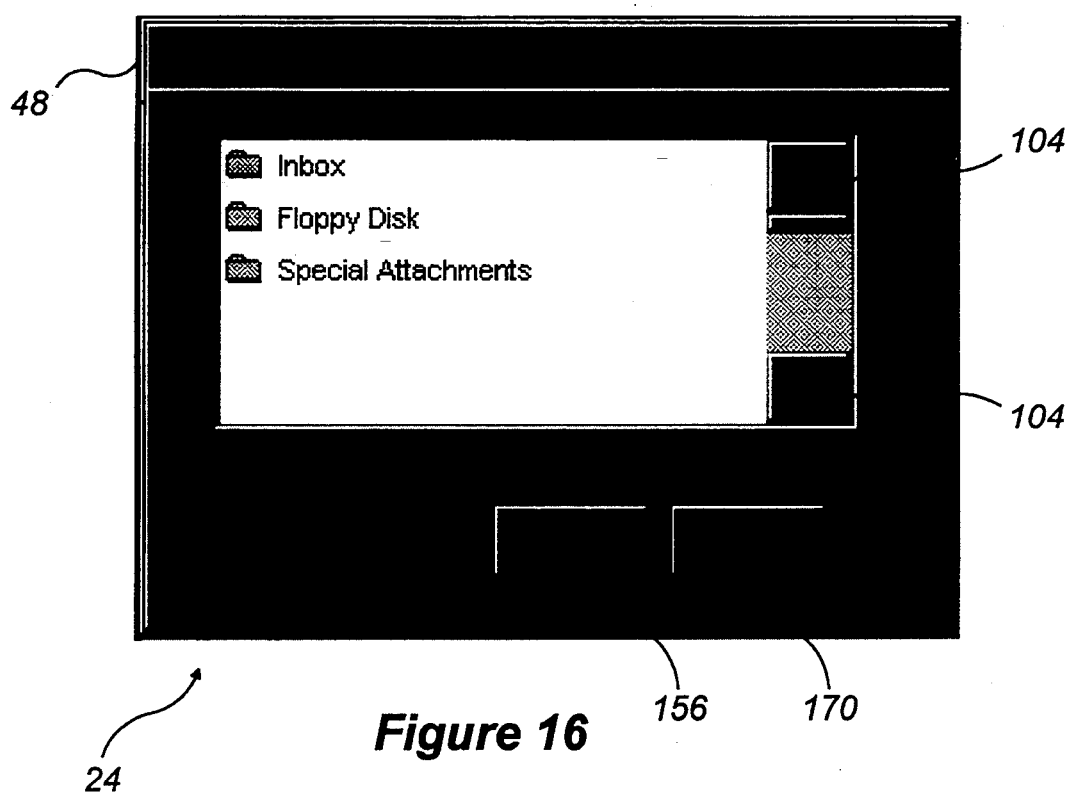
FIG. 16 is a screen display of the IFAX of FIG. 1 used to select a source location for the enclosed file of FIG. 15.

The user may select a data file to enclose by pressing a "Select Files" button 164, which causes the IFAX 10 to change to the display of FIG. 16. The prompt 48 instructs the user to select a file from one of the folders listed on the touch-sensitive display 24. The user can cancel the enclosure selection process by pressing the Cancel button 156, which causes the IFAX 10 to return to the menu shown in the screen display of FIG. 15. In FIG. 16, the folders shown are the inbox 70 (see FIG. 2), where incoming facsimiles are stored by the IFAX 10, a floppy disk or other file storage unit 28 (see FIG. 1), or special attachments. The user may touch one of the folders to open that folder and display the contents of the selected folder.

For example, the user can open the inbox 70 (see FIG. 2) and display the files enclosed in the inbox by touching the inbox folder display location on the touch-sensitive display 24. The user selects a data file from the inbox 70 and encloses the selected file by pressing an "Enclose" button 170. This causes the IFAX 10 to return to the menu shown in the screen display of FIG. 15 which shows the enclosed data file in the list displayed on the touch-sensitive display 24. The enclosed data file may be a binary data file or a scanned facsimile message stored in the well-known MH. MR. or MMR data formats used in Group 3 FAX machines. Thus, the IFAX 10 allows the user to easily attach a data file to the facsimile message. The user can close the select enclosure menu of FIG. 15 by pressing a "Close" button 166. Pressing the close button 166 causes the IFAX 10 to return to the menu shown in the screen display of FIG. 9 so that the user can complete the process of sending the facsimile message.

Figure 17:
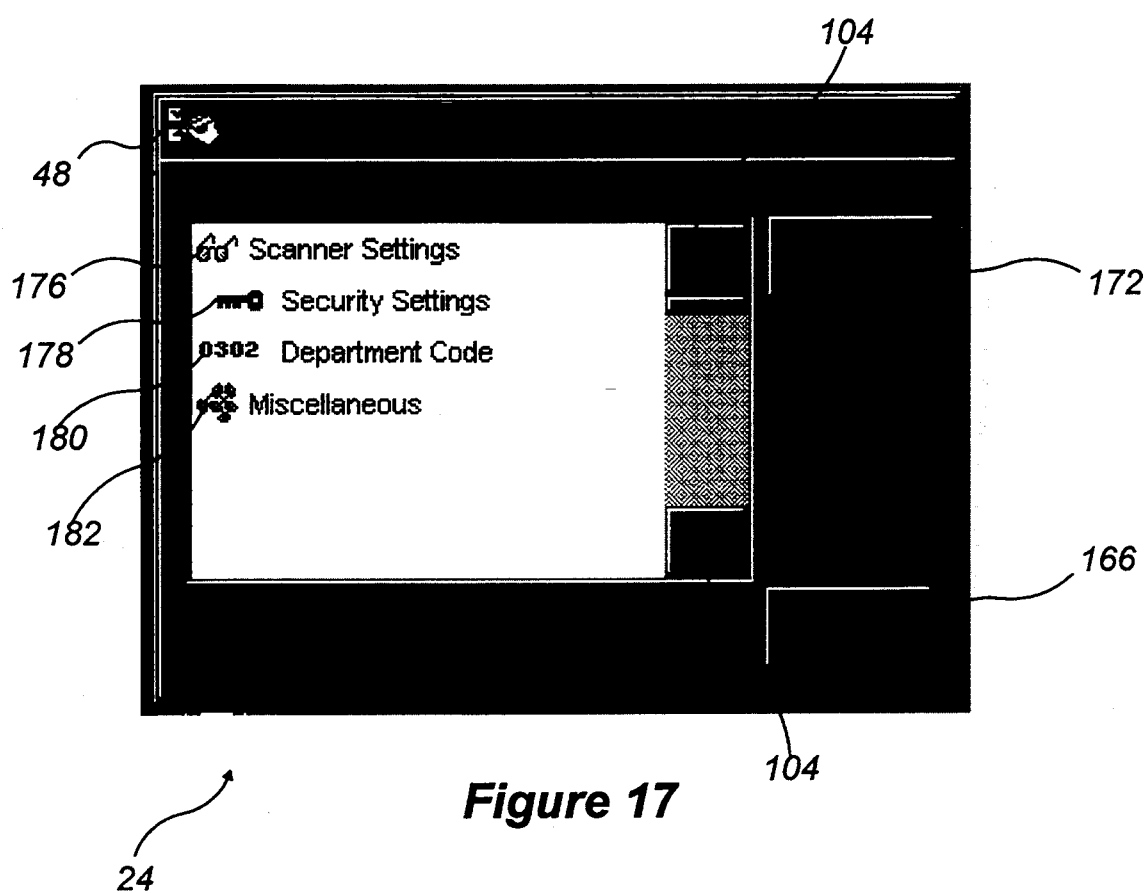
FIG. 17 is a screen display of the IFAX of FIG. 1 used to display and select options for facsimile messages.

Returning again to the display of FIG. 9, the user can also set other option parameters by selecting a "Set Other Options" button 130. In response to the selection of the Set Other Options button 130, the IFAX 10 changes to the screen display shown in FIG. 17. The prompt 48 instructs the user to select the parameters that the user wishes to change. The user selects the desired option by touching the desired option listed on the touch-sensitive display 24 and selecting a "Change" button 172. As seen in FIG. 17, the user can alter scanner settings by selecting a "Scanner Settings" display location 176, the security settings by selecting a "Security Settings" display location 178 the department code settings by selecting a "Department Code" display location 180, and the miscellaneous settings by selecting a "Miscellaneous" display location 182. It is obvious that the options presented herein are merely illustrative of the types of options that could be included in the menus. Other options could be added or revised to fit the particular needs of the user.

Figure 18:
FIG. 18 is a screen display of the IFAX of FIG. 1 used to display error messages to the user.

If the user selects the Change button 172 without first selecting a category to change, the IFAX 10 displays an error message, shown in the screen display of FIG. 18, which instructs the user to first select a category to modify, then press the Change button 172. Thus, the IFAX 10 instructs the user when in inappropriate selection has been made. These instructions allow the user to easily recover from an error. In prior art FAX machines, the user may not be aware that an error has been made. Furthermore, the user is unlikely to recover from the error in such an easy manner on a prior art FAX machine. Typically, the user would have to start the entire process over again and hope that the error is not repeated. This lack of error recovery often leads to frustration of the user and subsequent intimidation of the user by the complicated process of sending a facsimile message. In contrast, the user friendly environment created by the IFAX 10 leads the user through a complex list of options and provides instructions to the user in the proper operation of the IFAX. The IFAX 10 also permits the user to send and receive facsimile messages without the selection of the sophisticated options and capabilities that the FAX machine may possess.

Figure 19:
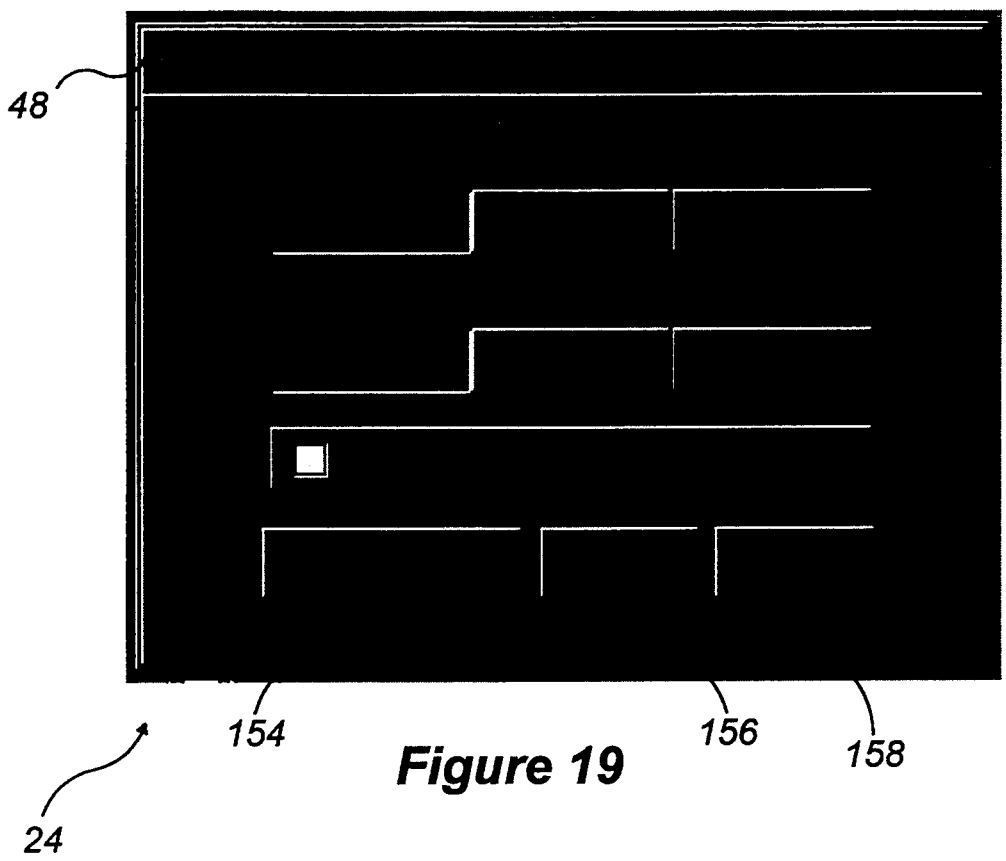
FIG. 19 is a screen display of the IFAX of FIG. 1 used to display and select scanner settings.

The Scanner Settings display location 176 shown in the screen display of FIG. 17 allows the user to select settings such as resolution and contrast. If the user selects the Scanner Setting display location 176 and presses the Change button 172 the IFAX 10 changes to the display shown in FIG. 19. The prompt 48 instructs the user to change the scanner settings and press the OK button 158. The user changes the settings by selecting any of the options shown in FIG. 19 using the corresponding buttons. The user selects the desired setting and then presses the "OK" button 158 to confirm the choices. The user may save the selected options as default values by pressing the Save As Default button 156. The user may also cancel the selection of scanner settings at any time by selecting the Cancel button 154. This cause the IFAX 10 to return to the menu shown in the screen display of FIG. 17.

Figure 20:
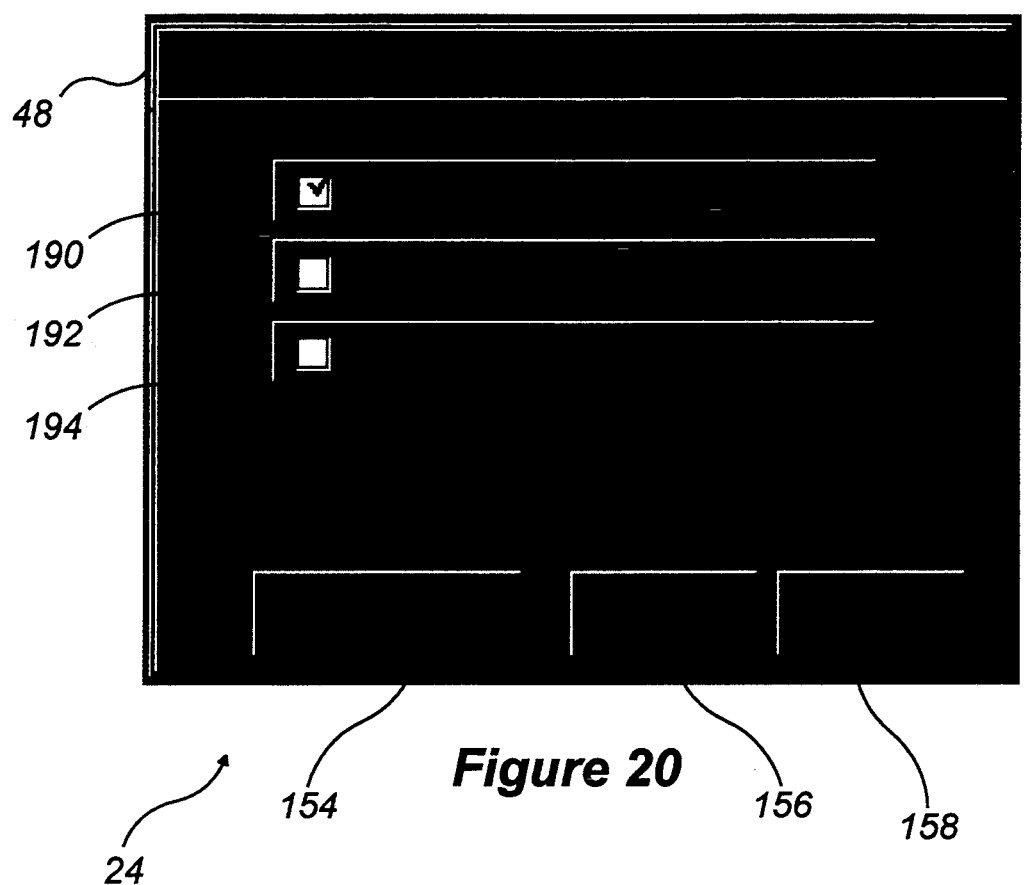
FIG. 20 is a screen display of the IFAX of FIG. 1 used to display and select security settings.

The Security Settings display location 178 shown in the screen display of FIG. 17 allows the user to select options such as data encryption or authentication. If the user selects the Securing Settings display location 178 and presses the Change button 172, the IFAX 10 changes to the screen display shown in FIG. 20. The touch-sensitive display 24 shows which options are currently selected, and the prompt 48 instructs the user to select security options and press the OK button 158. Options that have previously been selected may be deselected by touching the corresponding button and selecting the OK button 156. The IFAX 10 permits encryption of a facsimile message by selecting an "Encryption" button 190. In addition, the IFAX 10 permits the transmission of a digital signature by selecting a "Digital Signature" button 192, and an authentication option by selecting an "Authentication" button 194. The digital signature causes the IFAX 10 to transmit a checksum or other data portion in encrypted form along with the encrypted facsimile message. The digital signature allows the receiving facsimile machine to determine if the facsimile message has been tampered with during transmission. The authentication option attaches an instruction to the facsimile message requiring a password to be entered into the recipient facsimile machine for the facsimile recipient to read the facsimile message. Thus, there are varying deuces of security that may be easily selected by the user. The user may save the selected options as default values by selecting the Save As Default button 154. The user may also cancel the selection of security settings at any time by selecting the Cancel button 156. This cause the IFAX 10 to return to the menu shown in the screen display of FIG. 17.

Figure 21:
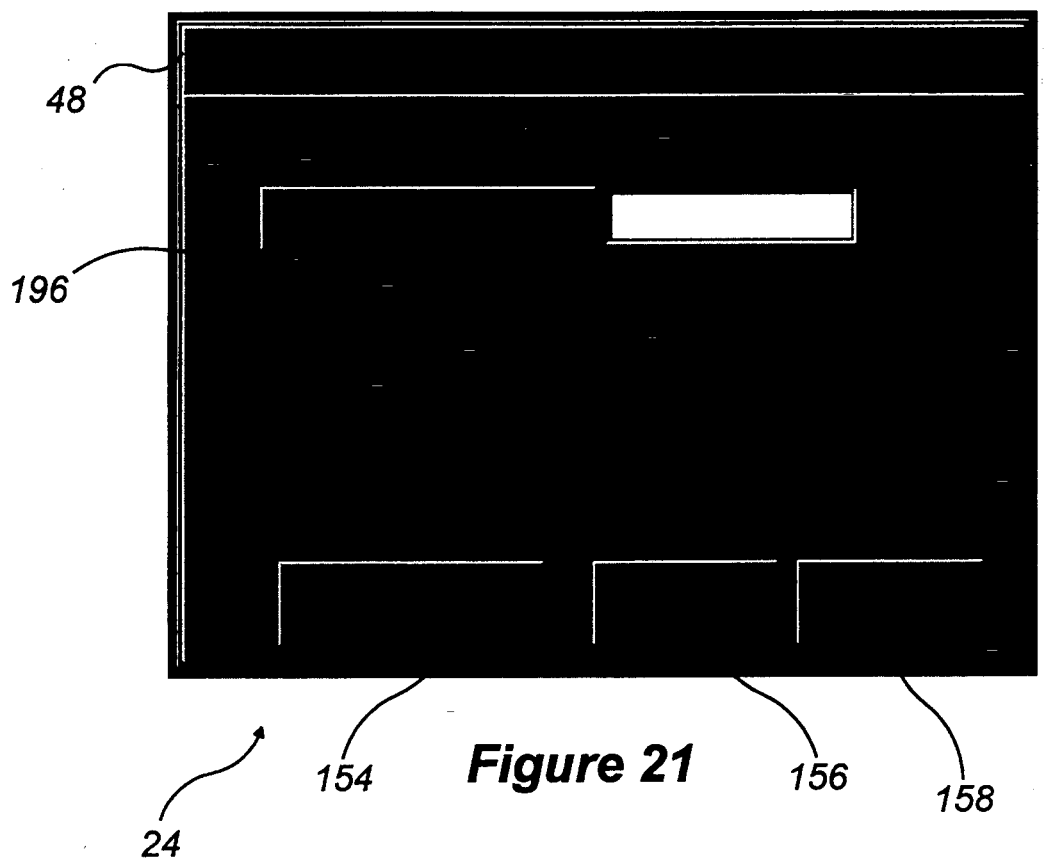
FIG. 21 is a screen display of the IFAX of FIG. 1 used to display and select department code information.

With reference to FIG. 17, the Department Code display location 180 allows the user to enter a department code. If the user selects the Department Code display location 180 and presses the Change button 172, the IFAX 10 changes to the screen display shown in FIG. 21. The prompt 48 instructs the user to press a "Department Code" button 196 to enter the department code. The user enters the appropriate information and presses the "OK" button 158 to confirm the choice. The user may save the selected choices as default values by pressing the Save As Default button 154. The user may also cancel the selection of department code settings at any time by pressing the Cancel button 156. This cause the IFAX 10 to return to the menu shown in the screen display of FIG. 17.

Figure 22:
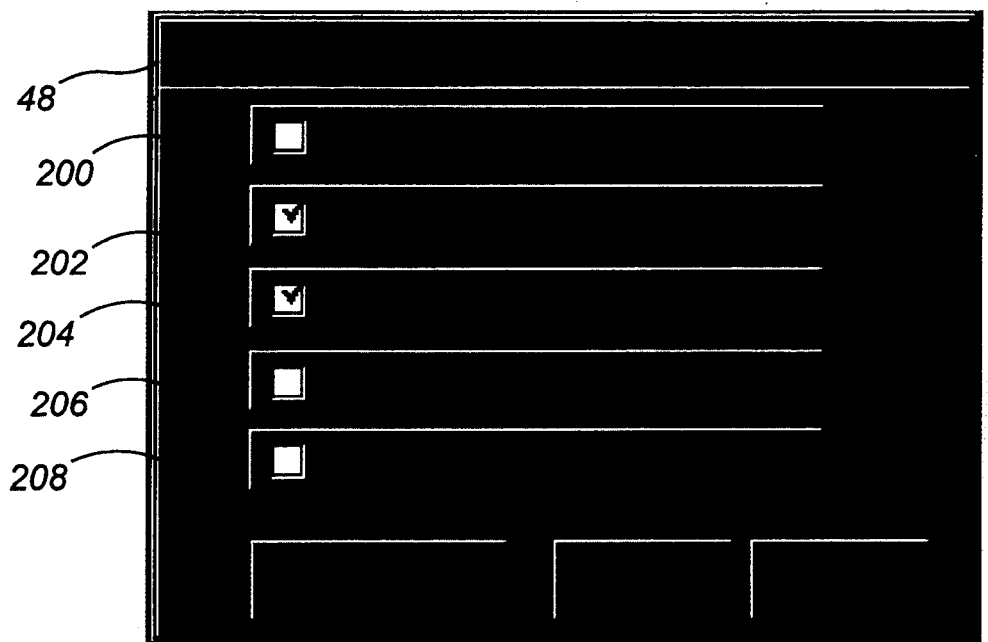
FIG. 22 is a screen display of the IFAX of FIG. 1 used to display and select other facsimile options.

With reference to the screen display of FIG. 17, the Miscellaneous display location 182 allows the user to select miscellaneous options such as sending from memory and including a fax header on the facsimile message. If the user selects the Miscellaneous display location 182 and presses the Change button 172, the IFAX 10 changes to the screen display shown in FIG. 22. The prompt 48 instructs the user to select the desired options. The user can send a facsimile message from memory by pressing a "Send From Memory" button 200. The user can also elect to include a header, number the pages, print a confirmation report on the IFAX 10, and enable turnaround polling by pressing an "Include Fax Header" button 202, a "Number Pages" button 204, a "Print Confirmation Report" button 206, and a "Turnaround Polling" button 208, respectively. The user selects the desired options and then presses the "OK" button 158 to confirm the choices. The user may save the selected options as default values by selecting the Save As Default button 154. The user may also cancel the selection of miscellaneous settings at any time by selecting the Cancel button 156. This cause the IFAX 10 to return to the menu shown in the screen display of FIG. 17.

Most of the miscellaneous options described above are selfexplanatory. The Turnaround polling option causes the IFAX 10 to send a facsimile message to the facsimile recipient FAX machine and then inquire whether there any facsimile messages that are to be sent to the IFAX 10 from the facsimile recipient FAX machine. If there are messages to be sent to the IFAX 10, the IFAX can receive these messages during the same telephone call thus minimizing both the time and cost for facsimile communication.

Thus, the IFAX 10 permits an untrained user to easily select from among the many options available on a facsimile machine to send a facsimile message. The user can select the transmission time, enclose files, add stored digital cover pages, and use a sophisticated phonebook system to select recipients for the facsimile message. The prompt 48 provides step-by-step instructions and the screen displays allow the easy selection of options.

The IFAX 10 also provides for a simple user interface to permit the user to retrieve facsimile messages received by the IFAX. and to edit stored outgoing facsimile messages that are to be sent at a later time. Returning now to the main menu shown in the screen display of FIG. 3, the Mailbox button 54 allows the user to select the mailbox options. As seen in FIG. 3, the IFAX 10 updates the touch-sensitive display 24 to show the number of messages contained in the inbox 70 and the outbox 72. Thus, the user can determine at a glance whether there are any facsimile messages without having to actually use the mailbox features.

Figure 23:
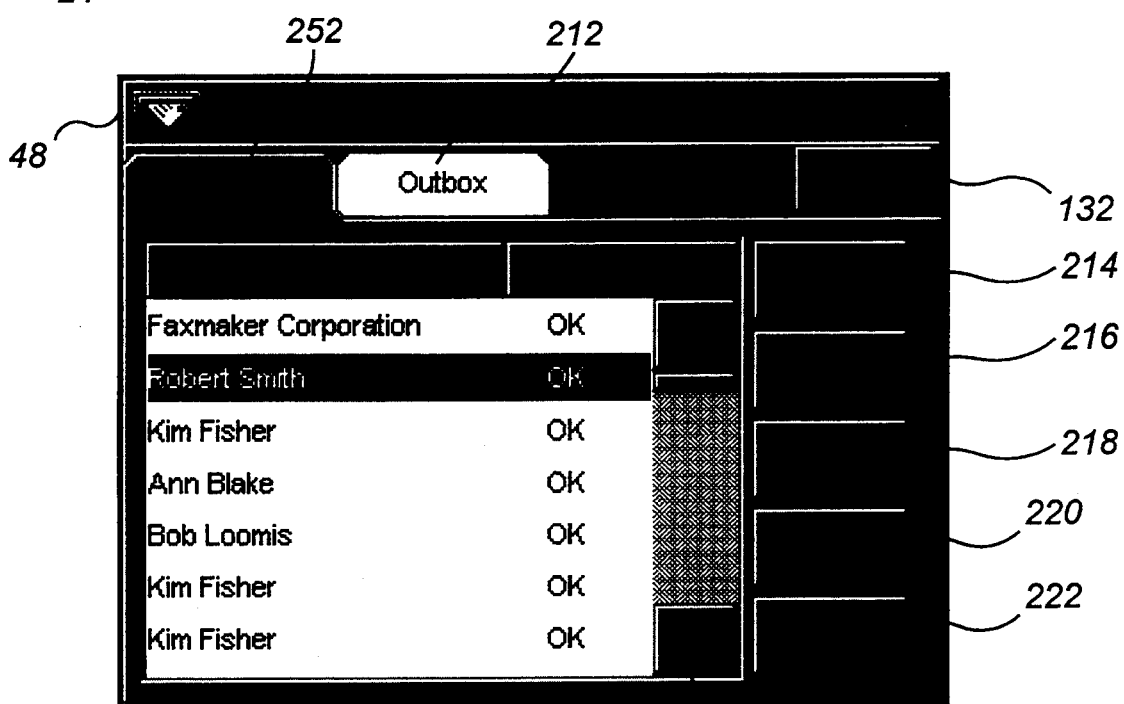
FIG. 23 is a screen display of the IFAX of FIG. 1 used to display and select options in a mailbox inbox.

When the user presses the Mailbox button 54, the IFAX 10 changes to the display of FIG. 23 which displays the features of the inbox 70. The Mailbox function has been previously described in connection with the operational flowchart of FIGS. 4E-4F. The Mailbox icon, which is part of the prompt 48, provides the user with a simple indication that the user is using the Mailbox function. The user may change to the outbox 72 by selecting an "Outbox" button 212 on the touch-sensitive display 24. The user can return to the main menu shown in the screen display of FIG. 3 by pressing a "Menu" button 132. When the IFAX 10 is in the inbox 70, it display a list of all received facsimile messages on the touch-sensitive display 24. The list includes the sender and current status of each facsimile message. If the number of received facsimile messages exceeds the capacity of the touch-sensitive display 24, the user can scroll through the list using the arrow keys 104 in the manner previously described. The prompt 48 instructs the user to select the desired Mailbox activity. The user may view any of the received facsimile messages, selecting the desired message by touching one of the facsimile messages listed on the touch-sensitive display 24 and pressing a "View" button 214. The user may print any facsimile message, selecting the desired facsimile message by touching the facsimile message listed on the touch-sensitive display 24, and selecting a "Print" button 216. A facsimile message may be deleted from the inbox 70 by selecting the desired facsimile message and pressing a "Delete" button 218. The user may save a facsimile message by selecting the desired facsimile message and pressing a "Save" button 220. The user may also forward any facsimile message by selecting the desired facsimile message and pressing a "Forward" button 222.

Figure 24:
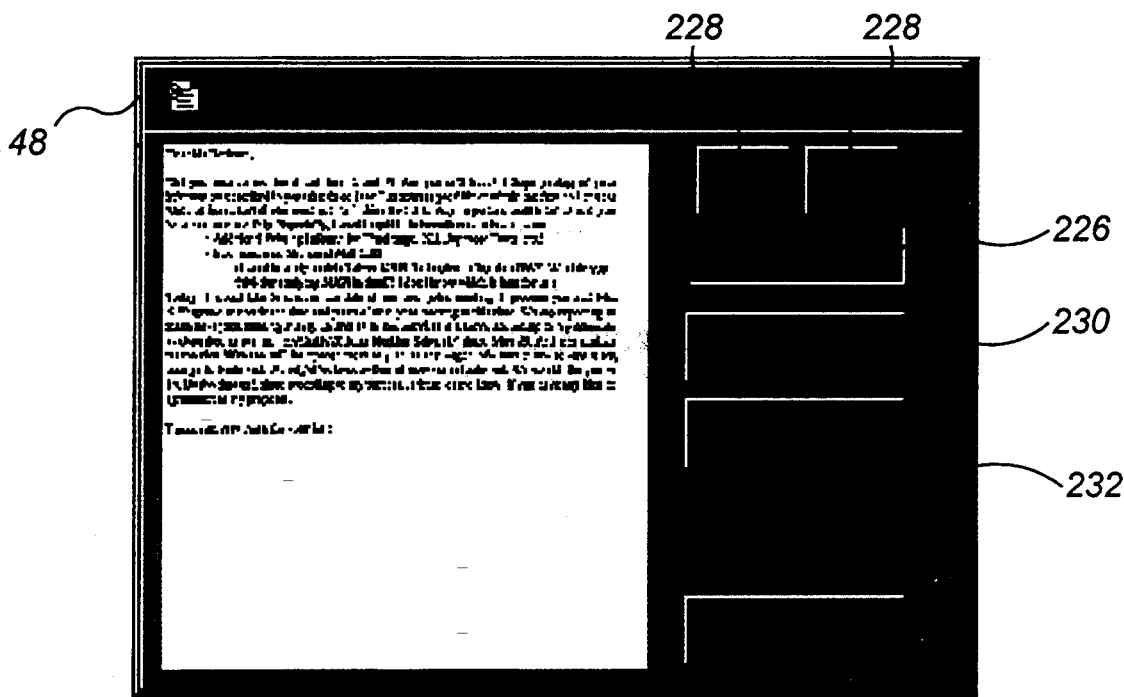
FIG. 24 is a screen display of the IFAX of FIG. 1 used to display and select options when viewing a stored facsimile message.

If the user has selected a facsimile message and pressed the View button 214, the IFAX 10 will display the contents of the selected received facsimile message on the touch-sensitive display 24. A typical display of a selected received facsimile message is shown in FIG. 24. The prompt 48 provides the user with status information such as the sender's name. The touch-sensitive display 24 includes an information box 226 showing the current page being displayed and the total number of pages in the facsimile message. The user can move back and forth through the facsimile message one page at a time by pressing one of a pair of arrow keys 228. The user can print a selected page by pressing a "Print Page" button 230, or may print the entire method by pressing a "Print Message" button 232. The user may close the viewing menu shown in FIG. 24 by pressing a "Close" button 234. This causes the IFAX 10 to return to the menu shown in the screen display of FIG. 23.

Figure 25:
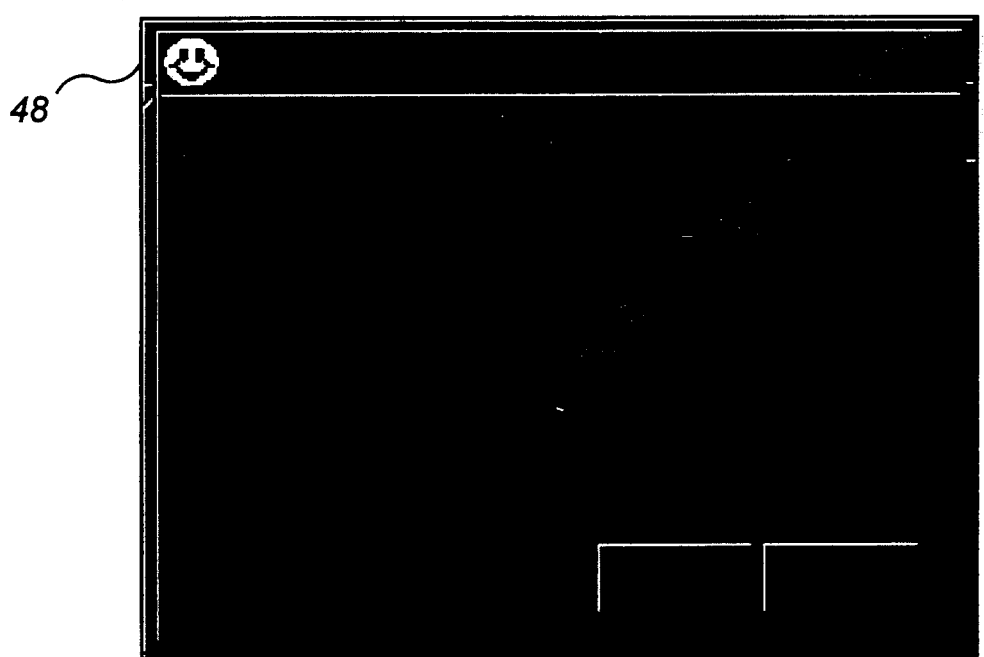
FIG. 25 is a screen display of the IFAX of FIG. 1 used to confirm the printing of a selected facsimile message.

Returning now to FIG. 23, the user may print a facsimile message by selecting the desired facsimile message in a manner previously described and pressing the Print button 216. If the user has selected a facsimile message and pressed the print button 216, the IFAX 10 changes to the menu shown in the screen display of FIG. 25. The prompt 48 indicates that the IFAX 10 is operating satisfactorily. The IFAX 10 displays a message on the touch-sensitive display 24 to indicate that a facsimile message or messages are being printed. The user may stop the printing procedure by pressing a "Stop" button 240. The user may perform other facsimile procedures by pressing a "Continue" button 242. Pressing either the "Stop" button 240 or the Continue button 242 causes the IFAX 10 to return to the menu shown in the screen display of FIG. 23.

Figure 26:
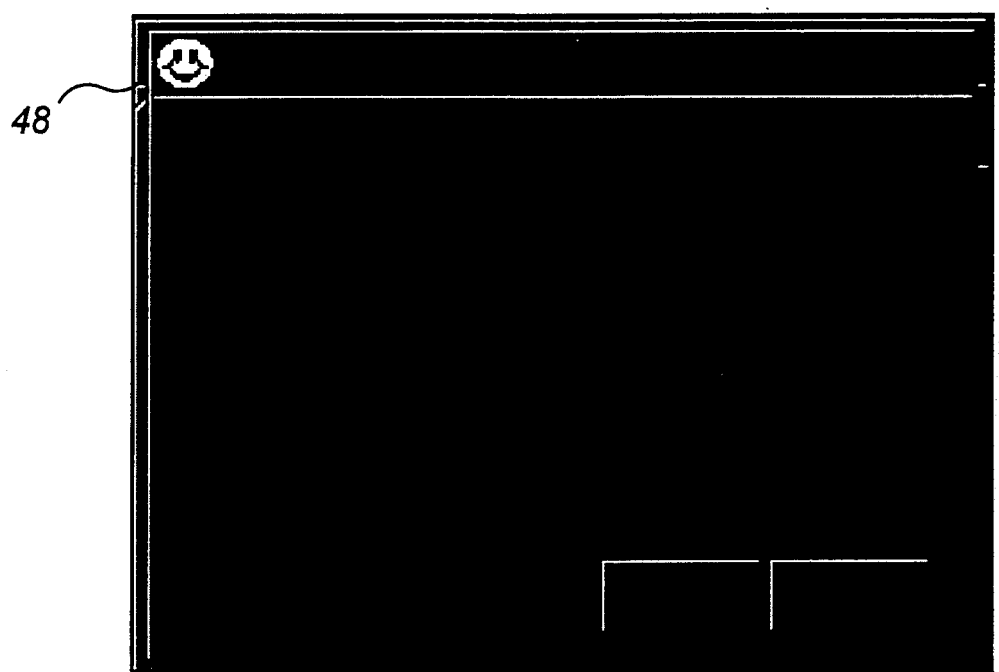
FIG. 26 is a screen display of the IFAX of FIG. 1 used to display a message confirming deletion of a selected facsimile message.

Again, returning now to FIG. 23, the user may delete a facsimile message by selecting the desired facsimile message and pressing the Delete button 218. This causes the IFAX to change to the screen display shown in FIG. 26. The IFAX 10 displays a message to the user to verify that a facsimile message should be deleted from the inbox 70. The user can confirm deletion of the facsimile message by pressing a "Yes" button 246, or may cancel the deletion process by pressing a "No" button 248. Pressing either the Yes button 246 or the No button 248 causes the IFAX 10 to return to the menu shown in the screen display of FIG. 23. The IFAX 10 updates the list displayed on the touch-sensitive display 24 so that deleted facsimile messages are no longer displayed.

Figure 27:
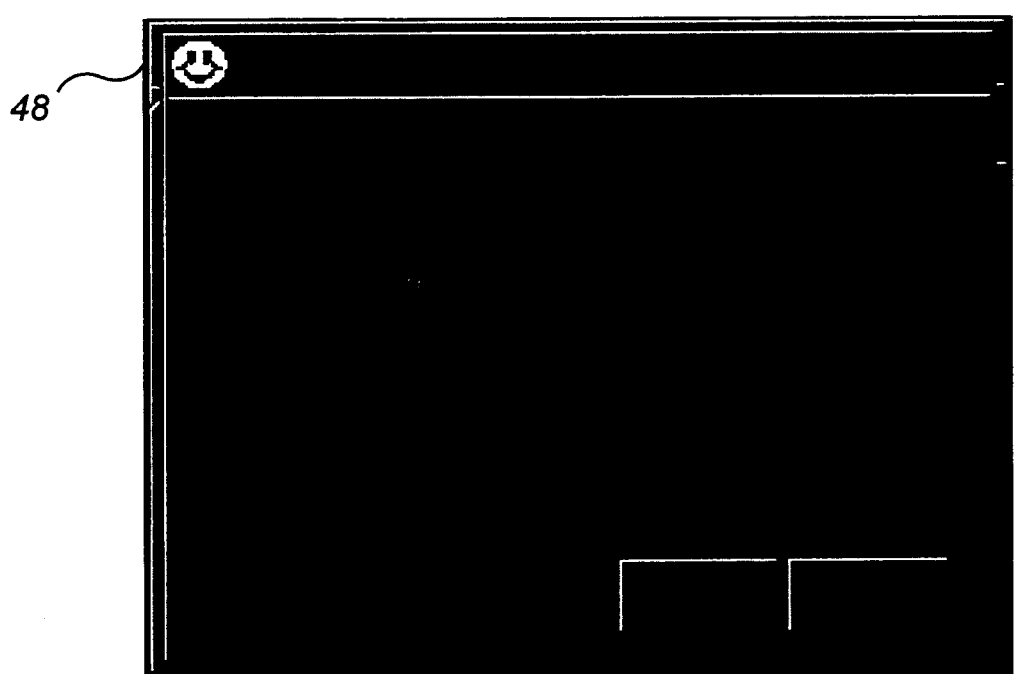
FIG. 27 is a screen display of the IFAX of FIG. 1 used to confirm the saving of a selected facsimile message to disk.

The user may save a facsimile message by selecting the desired facsimile message and pressing the Save button 220 shown in FIG. 23. This causes the IFAX 10 to change to the screen display shown in FIG. 27. As seen in FIG. 27, the IFAX 10 displays a message on the touch-sensitive display 24 indicating that the selected facsimile message is being saved to disk. The user may stop the process of saving a message to disk by pressing the Stop button 240, or may perform other facsimile operations by pressing the Continue button 242. as previously described. Pressing either the Stop button 240 or the Continue button 242 causes the IFAX to return to the menu shown in the screen display of FIG. 23.

Figure 28:
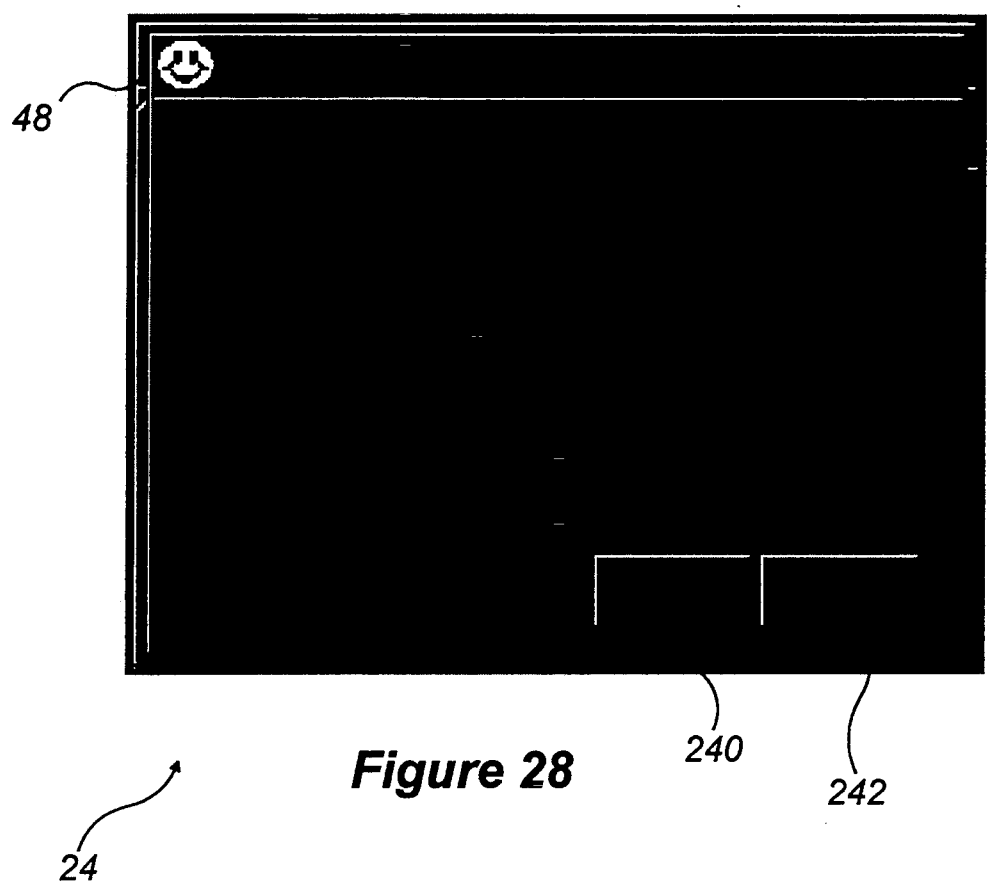
FIG. 28 is a screen display of the IFAX of FIG. 1 used to confirm the forwarding of a selected facsimile message.

The user may forward a facsimile message to another FAX machine by selecting the desired facsimile message and pressing the Forward button 222 shown in FIG. 23. This causes the IFAX 10 to switch to the screen display shown in FIG. 28. As seen in FIG. 28, the IFAX 10 displays a message on the touch-sensitive display 24 indicating that the selected facsimile message is being enclosed. The user may stop the enclosure process by pressing the Stop button 240. If the user presses the Stop button 240, the IFAX 10 returns to the menu shown in the screen display of FIG. 23. The user may press the Continue button 242 to proceed with forwarding the selected facsimile message. Pressing the Continue button 242 causes the IFAX 10 to change to the menu shown in the screen display of FIG. 5 and the prompt 48 instructs the user to enter the facsimile telephone number of the facsimile recipient to whom the facsimile message is being forwarded. As previously discussed, the user may enter a fax number or name manually, or select a facsimile recipient from the phonebook 62 by pressing the Phonebook button 100 (see FIG. 5).

Figure 29:
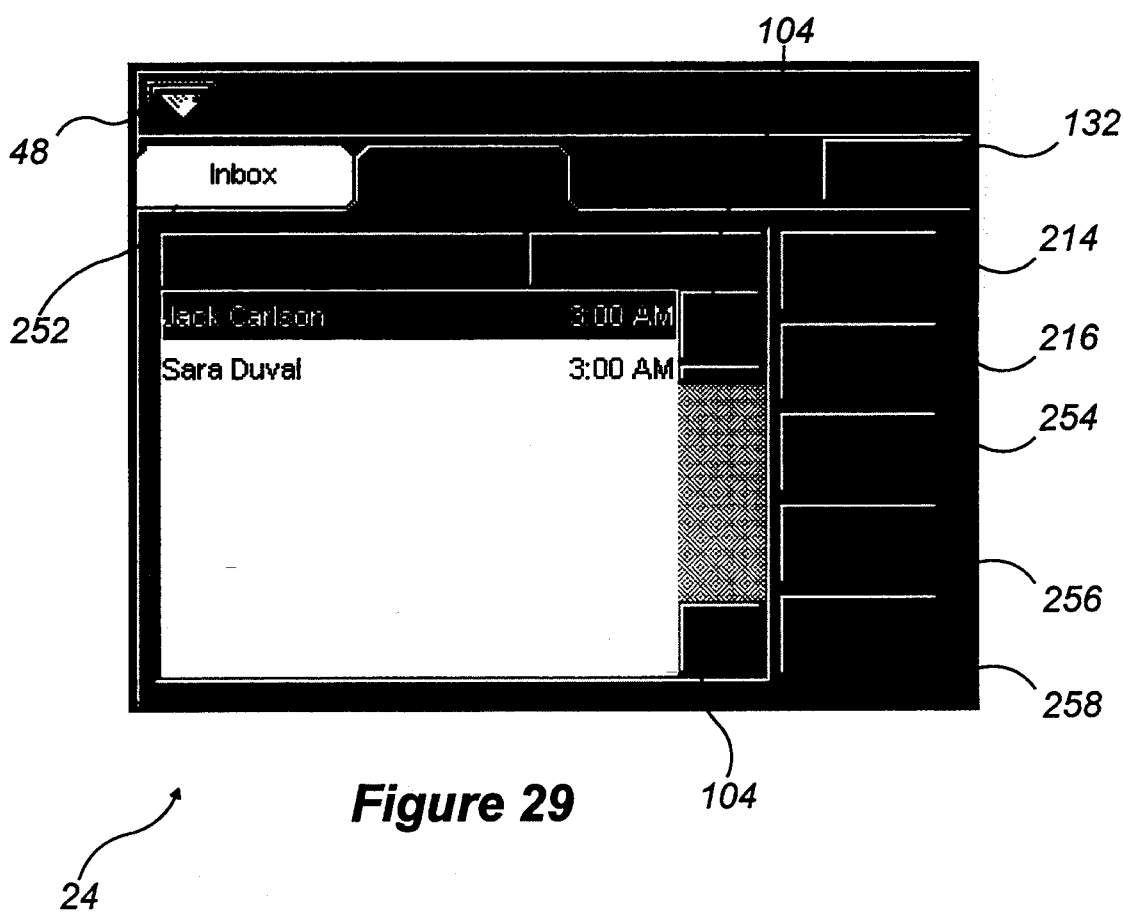
FIG. 29 is a screen display of the IFAX of FIG. 1 used to display and select options in a mailbox outbox.

The user may select the outbox 72 (see FIG. 2) by pressing the Outbox button 2 12 shown in FIG. 23. Pressing the Outbox button 212 causes the IFAX 10 to switch to the menu shown in the screen display of FIG. 29. The prompt 48 instructs the user to select a mailbox activity associated with the outbox 72. Alternatively, the user may return to the inbox 70 (see FIG. 2), and the menu of the screen display shown in FIG. 23, by pressing an "Inbox" button 252. The user may also return to the main menu shown in the screen display of FIG. 3 by pressing the menu button 132. As shown in FIG. 29, the IFAX 10 displays a list of all outgoing facsimile messages stored in the outbox 72 on the touch-sensitive display. The list includes the name of the facsimile recipient as well as the current status. If the outgoing facsimile message is to be transmitted at a later time, the status information lists the selected transmission time. If there are more outgoing facsimile messages than can be shown on the touch-sensitive display 24 at one time, the user may use the arrow keys 104 to scroll through the list in a manner previously described. The user may view an outgoing facsimile message by selecting the desired facsimile message and pressing the View button 214. The user may also print a stored facsimile message by selecting the desired facsimile message and pressing the Print button 216. The user may cancel the transmission of a stored facsimile message by selecting the desired facsimile message and pressing a "Cancel Fax" button 254. The user may also edit transmission parameters for a stored facsimile message by selecting the desired facsimile message and pressing an "Edit" button 256. The user may send a stored facsimile message immediately by selecting the desired stored facsimile message and pressing a "Redial" button 258.

Figure 30:
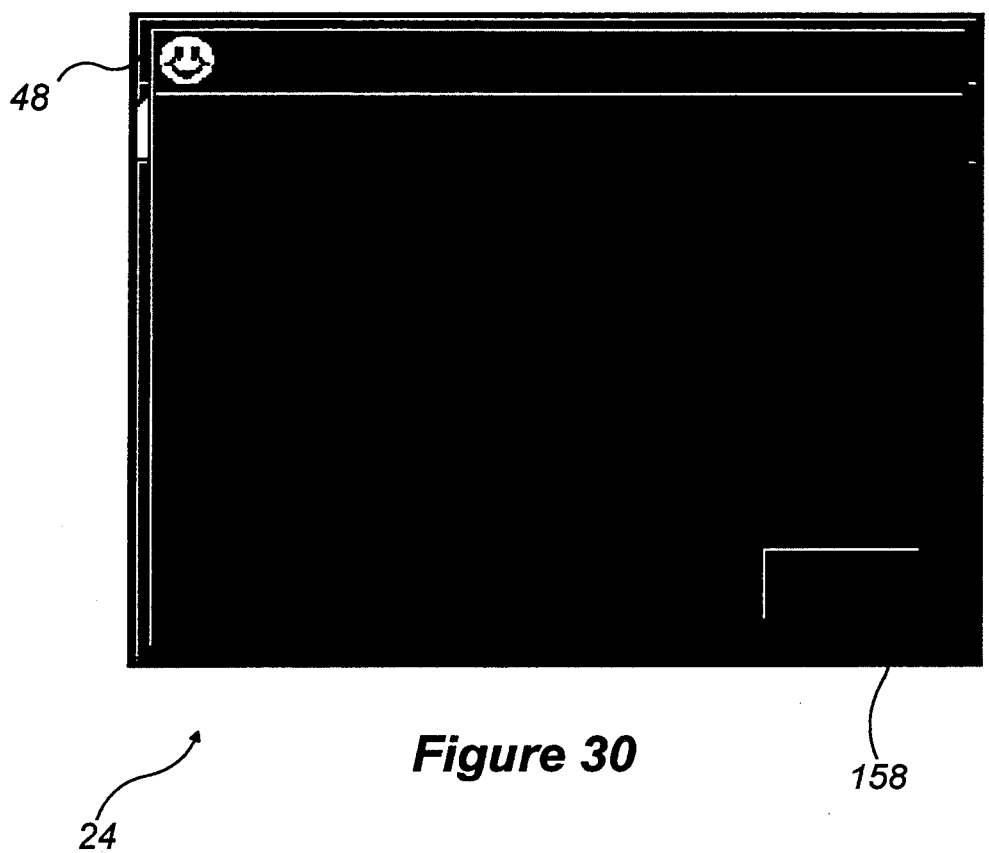
FIG. 30 is a screen display of the IFAX of FIG. 1 used to display an error message to the user.

If the user selects a mailbox activity, such as view or print, without previously selecting the desired facsimile message associated with the mailbox activity, the IFAX 10 displays an error message, shown in FIG. 30, on the touch-sensitive display 24. The message instructs the user to first select the desired facsimile message before selecting the mailbox activity. The user presses the OK button 158 as a response to the message. Pressing the OK button 158 causes the IFAX 10 to return to the menu shown in the screen display of FIG. 29.

Figure 31:
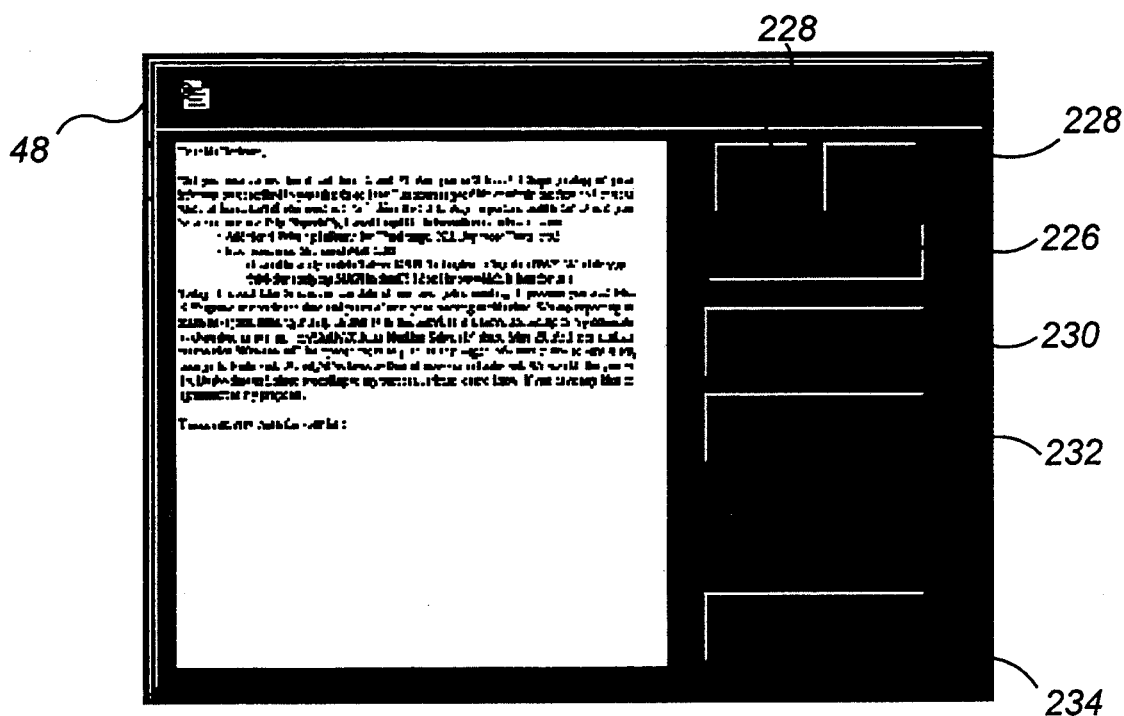
FIG. 31 is a screen display of the IFAX of FIG. 1 used to display and select options when viewing a stored facsimile message.

With reference to FIG. 29, if the user has selected a desired facsimile message and pressed the View button 214, the IFAX changes to the display shown in FIG. 31 in a format similar to the display of a facsimile message stored in the inbox 70, as shown in FIG. 24. As seen in FIG. 31, the IFAX 10 displays the selected facsimile message on the touch-sensitive display 24. The prompt 48 indicates the facsimile recipient and the current status of the selected facsimile message. As with FIG. 24 described above, the information box 226 indicates the current page being displayed on the touch-sensitive display 24, as well as the total number of pages in the facsimile message. The user may move back and forth one page at a time through the facsimile message by pressing the arrow keys 228. The user may print a desired page of the facsimile message by pressing the Print Page button 230. Alternatively, the user may print the entire message by pressing the Print Message button 232. The user may close the screen display of FIG. 1 by pressing the Close button 234. Pressing the Close button 234 causes the IFAX to return to the menu shown in the screen display of FIG. 29.

Figure 32:
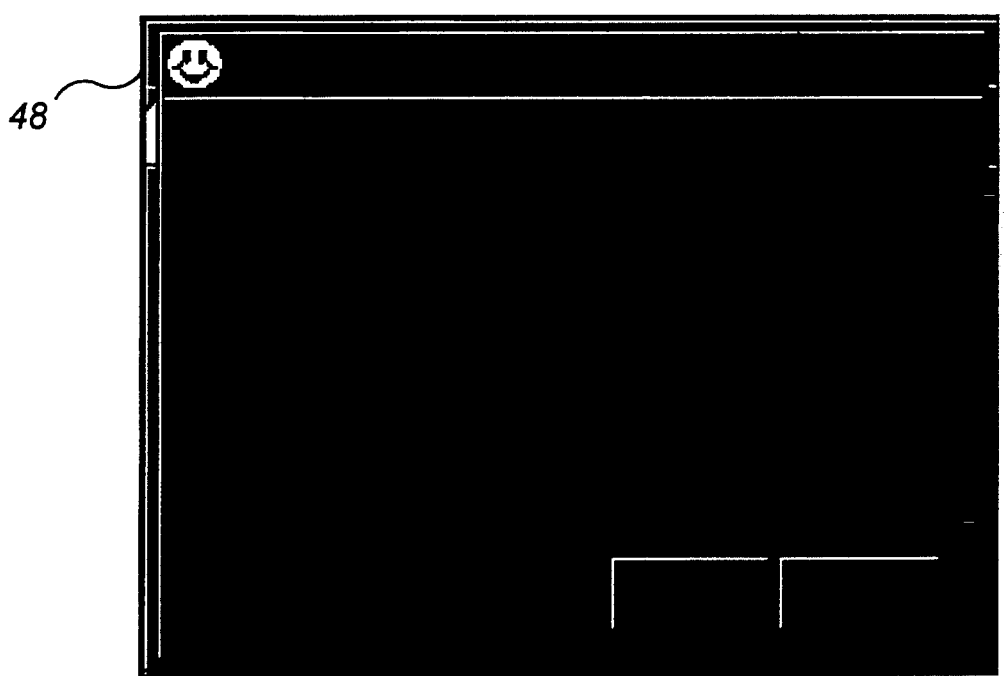
FIG. 32 is a screen display of the IFAX of FIG. 1 used to confirm printing of a selected facsimile message.

If the user has selected a facsimile message and pressed the Print button 216 of FIG. 29, the IFAX 10 switches to the screen display shown in FIG. 32. The IFAX 10 displays a message on the touch-sensitive display 24 indicating that the selected facsimile message or messages are being printed similar to the confirmation message of FIG. 25. The user may stop the printing process by pressing the Stop button 240 or may continue operation of the IFAX 10 by pressing the Continue button 242. Pressing either the Stop button 240 or the Continue button 242 causes the IFAX 10 to return to the menu shown in the screen display of FIG. 29.

Figure 33:
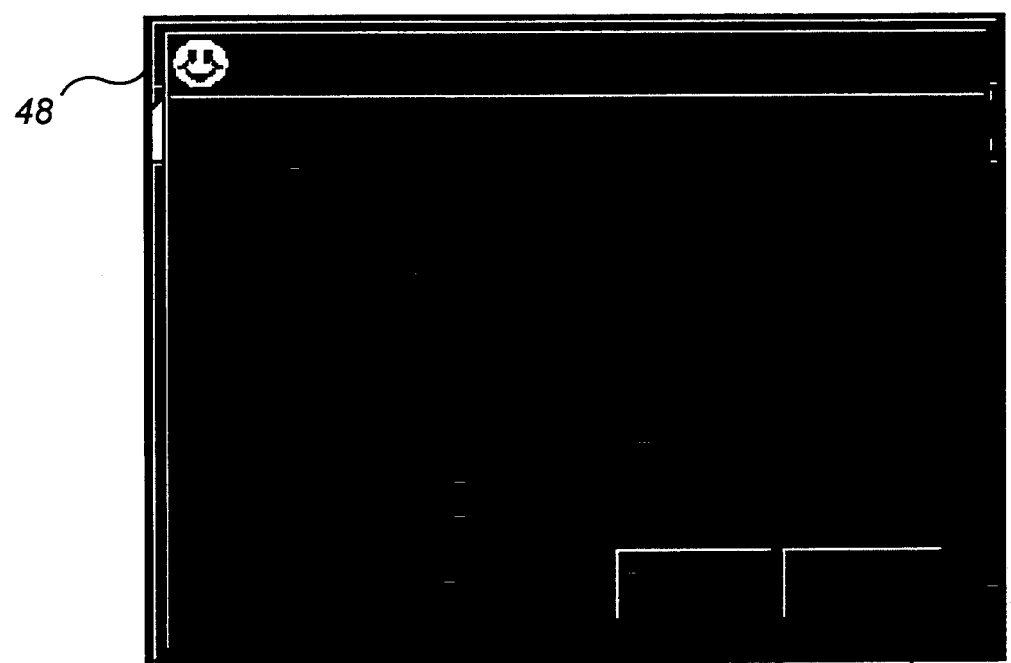
FIG. 33 is a screen display of the IFAX of FIG. 1 used to confirm the cancellation of transmission of a selected facsimile message.

Again, with reference to FIG. 29, if the user has selected a facsimile message and pressed the Cancel Fax button 254, the IFAX 10 switches to the screen display shown in FIG. 33. As seen in FIG. 33, the IFAX 10 displays a message on the touch-sensitive display 24 asking the user to confirm whether the selected facsimile message should be canceled. The user may press the Yes button 246 to confirm cancellation of the selected facsimile. The user presses the No button 248 if he does not wish to cancel the selected facsimile message. Pressing either the Yes button 246 or the No button 248 causes the IFAX 10 to return to the menu shown in the screen display of FIG. 29. The IFAX 10 updates the list displayed on the touch-sensitive display 24 so that canceled facsimile messages are no longer shown in the list.

Figure 34:
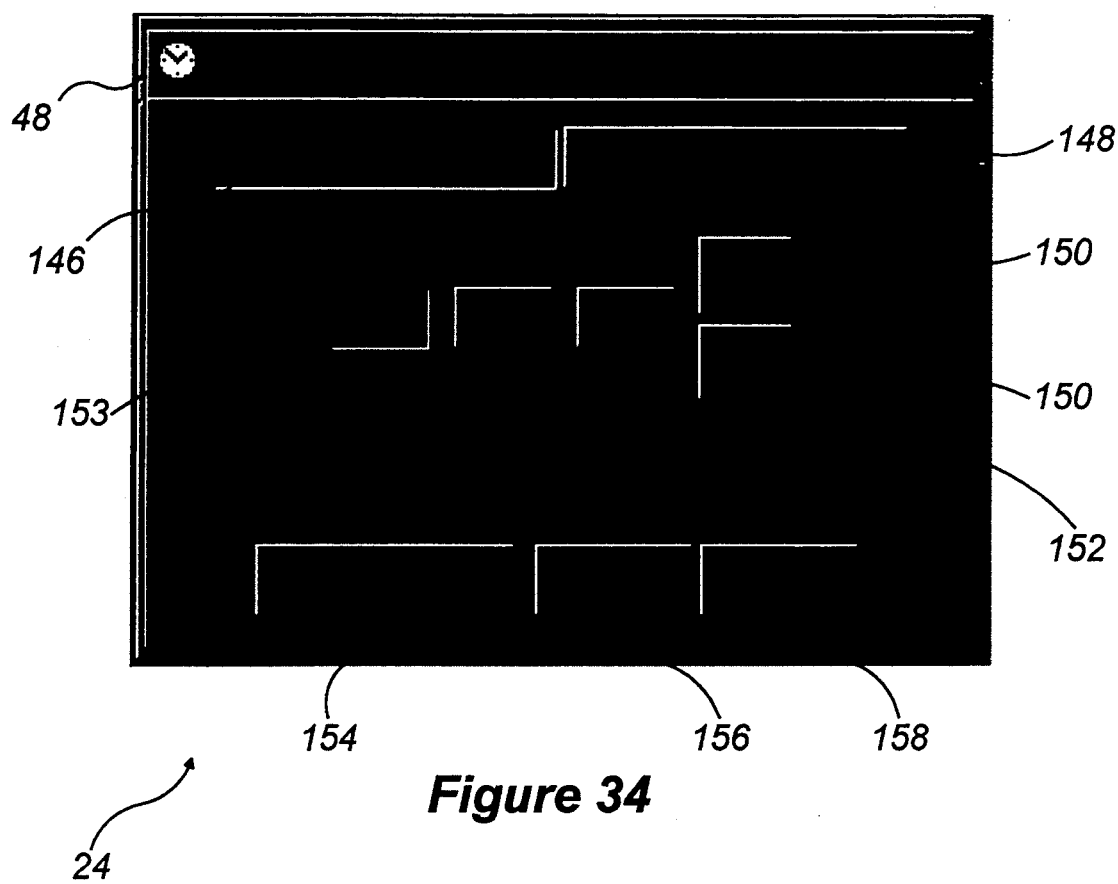
FIG. 34 is a screen display of the IFAX of FIG. 1 used to select a transmission time for a selected facsimile message.

If the user has selected a facsimile message and pressed the Edit button 256 of FIG. 29, the IFAX 10 changes to the screen display shown in FIG. 34. As seen in FIG. 34, the IFAX displays the transmission time for the selected facsimile message. The prompt 48 instructs the user to select the desired transmission time and touch the Start button 157. The process of selecting a desired transmission time has previously been described in detail in connection with FIG. 12.

The IFAX 10 thus provides a simple technique for the user to select features associated with the Mailbox function by selecting the Mailbox button 54 (see FIG. 3). The user may easily process facsimile messages in both the inbox 70 (see FIG. 2) and the outbox 72. The main menu shown in the screen display of FIG. 3 is updated whenever a facsimile message is placed in the inbox 70 or the outbox 72 so that the user may see whether any new facsimile messages have been stored by the IFAX 10. The error messages and error recovery associated with the mailbox provide the user with simple instructions. Thus, the sophisticated features associated with the Mailbox function can be easily used without extensive training.

Figure 35:
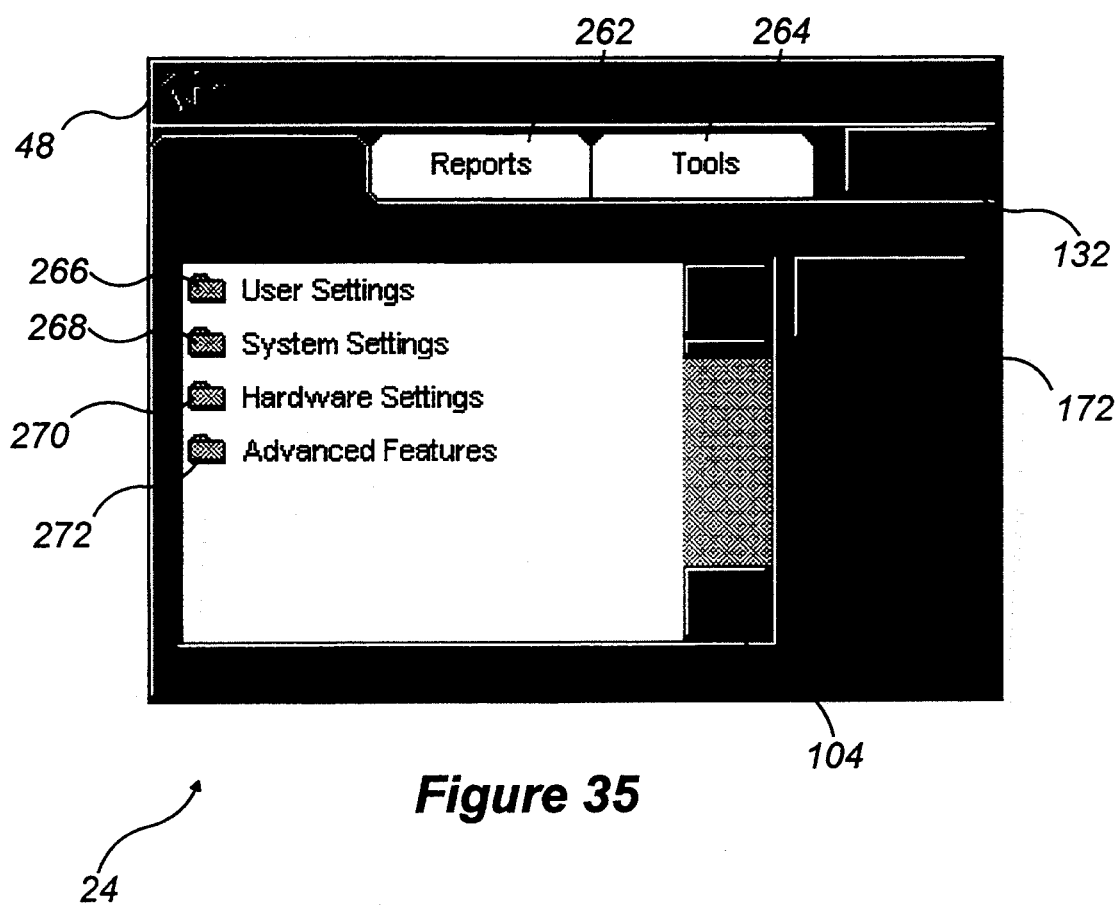
FIG. 35 is a screen display of the IFAX of FIG. 1 used to display and select set up options.

Returning now to the main menu shown in the screen display of FIG. 3, the IFAX incorporates additional options such as setup features 74 (see FIG. 2), reports 76, or IFAX Toolbox applications 78 that are available through the Toolbox function associated with the Toolbox button 56. If the user presses the Toolbox button 56, the IFAX switches to the menu shown in the screen display of FIG. 35. The Toolbox function has been previously described in connection with the operation flowchart of FIGS. 4G–4I. As seen in FIG. 35, the prompt 48 contains a toolbox icon to indicate to the user that they are in the toolbox menu. The prompt 48 instructs the user to select the desired setup topic and press the Change button 172. Alternatively, the user can select a reports menu by pressing a "Reports" button 262 or the tools menu by selecting a "Tools" button 264. The user can return to the main menu shown in the screen display of FIG. 3 by pressing the Menu button 132.

Referring now to the menu shown in the screen display of FIG. 35, the user may alter setup parameters for user settings by pressing a "User Settings" display location 266, system settings by pressing a "System Settings" display location 268, hardware settings by pressing a "Hardware Settings" display location 270, or advanced features by pressing an "Advanced Features" display location 272.

Figure 36:
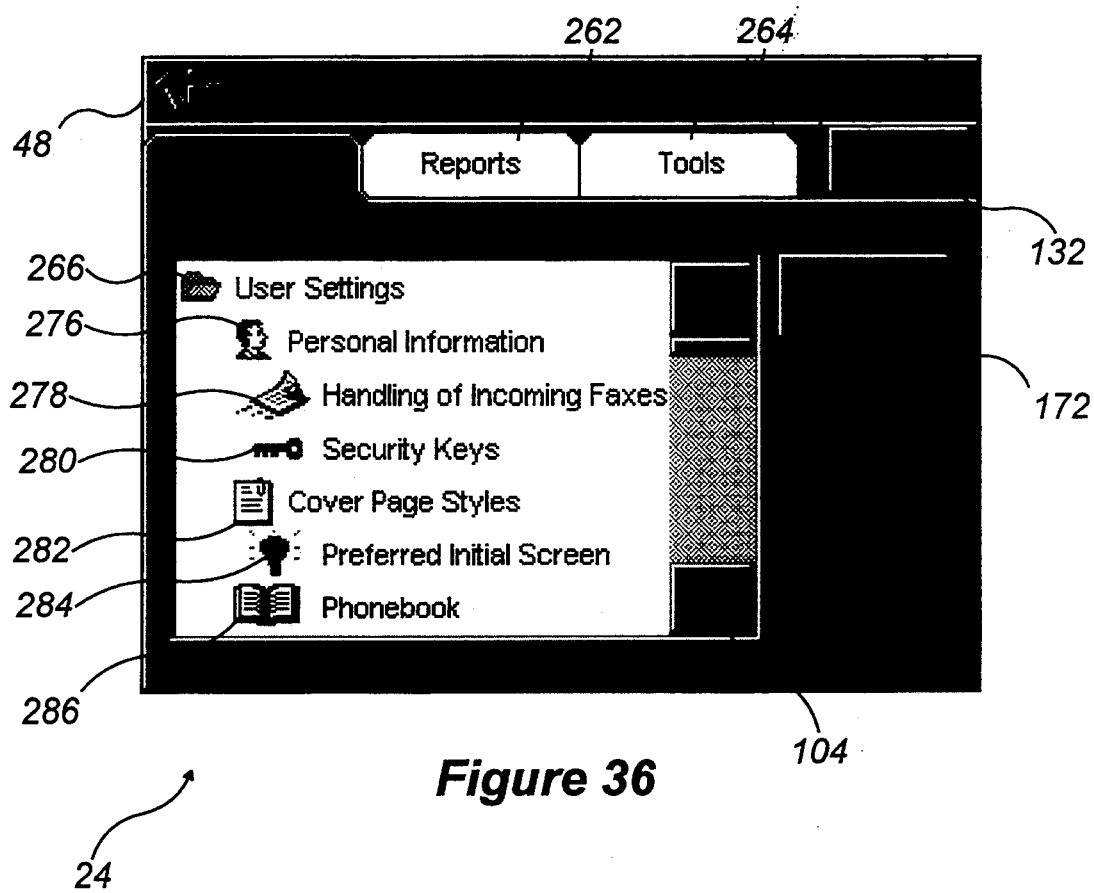
FIG. 36 is a screen display of the IFAX of FIG. 1 used to display and select user setting options.

If the user presses the User Settings display location 266 the IFAX 10 displays on the touch-sensitive display 24 the various parameters listed under User Settings, as shown in the screen display of FIG. 36. If there are more parameters than can be shown in the list, the user may use the scrolling arrow keys 104 to scroll through the list in a manner previously described. The prompt 48 instructs the user to select a setup topic and press the Change button 172. The user may return to the main menu shown in the screen display of FIG. 5 by pressing the Menu button 132.

The user may change personal information by pressing a "Personal Information" display location 276, handling of incoming faxes by pressing a "Handling of Incoming Faxes" display location 278, security keys by pressing a "Security Keys" display location 280, a cover page style by pressing a "Cover Page Styles" display location 282, a preferred initial screen by pressing a "Preferred Initial Screen" display location 284, or a phonebook by pressing a "Phonebook" display location 286.

Figure 37:
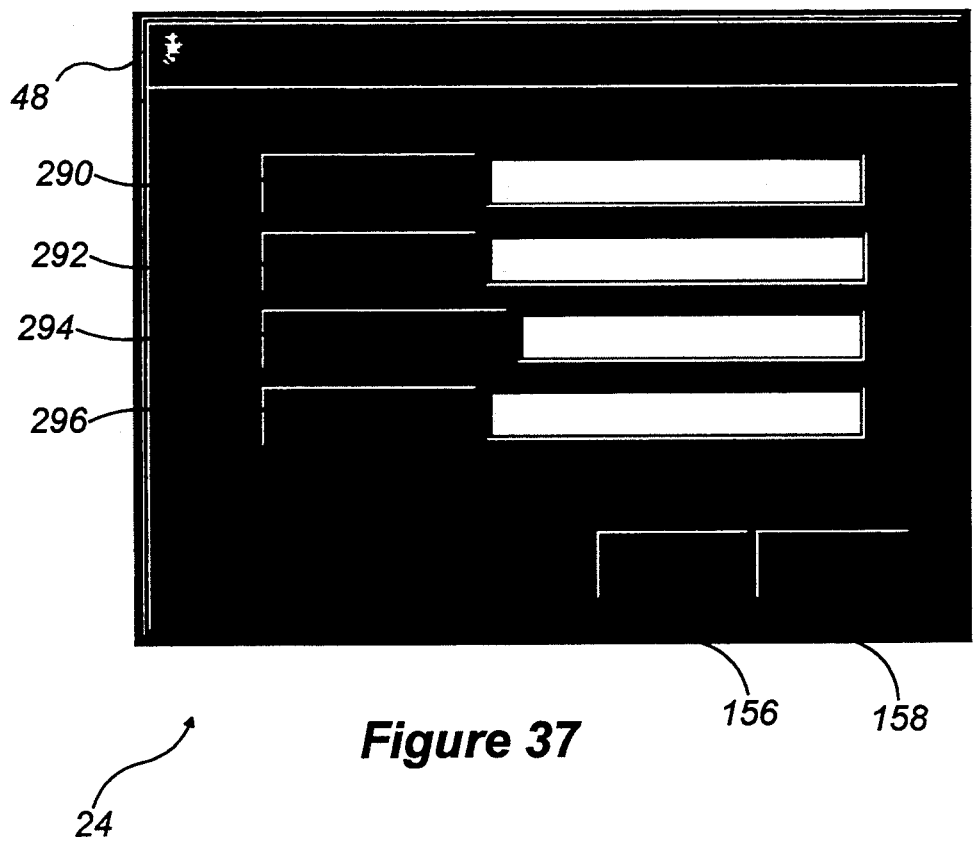
FIG. 37 is a screen display of the IFAX of FIG. 1 used to display and select personal information for editing.
Figure 38:
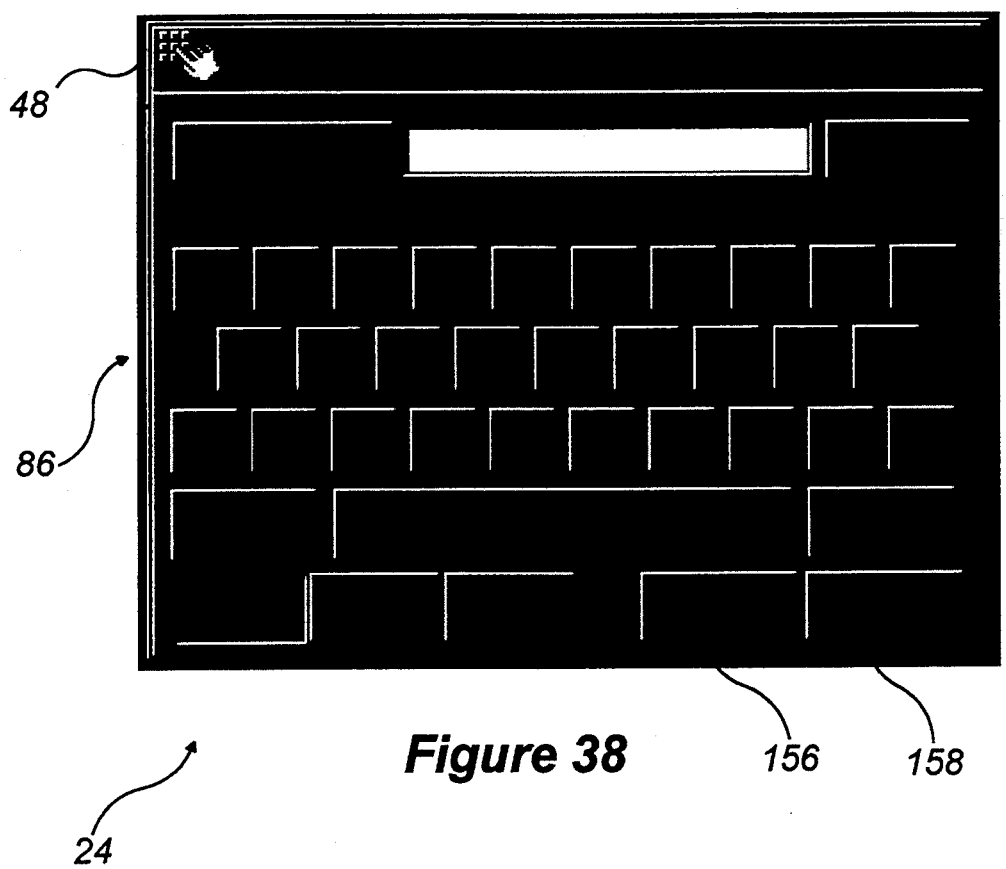
FIG. 38 is a screen display of the IFAX of FIG. 1 used to enter a new user name.

If the user presses the Change button 172 without first selecting a topic the IFAX 10 will display an error message similar to that shown in the screen display of FIG. 30 instructing the user to first select a topic and then press the Change button. If the user selects the Personal Information display location 276 and presses the Change button 172, the IFAX 10 changes to the screen display shown in FIG. 37 which displays personal information of the user. The user may modify any of the entries by touching the appropriate button. For example, the user may change his name by pressing a "Your Name" button 290. Pressing the Your Name button 290 causes the IFAX 10 to display the typewriter keyboard 86, shown in FIG. 38, so that the user may change the name as desired. The prompt 48 instructs the user to enter his new name. The user uses the typewriter keyboard 86 to enter the new name. The user presses the OK button 158 to confirm the new name and return to the menu shown in the screen display of FIG. 37. Similarly, if the user wishes to change the name of the company, the user presses a "Company" button 292. Pressing the Company button 292 causes the IFAX 10 to display the typewriter keyboard 86 as shown in FIG. 38, and the prompt 48 to instruct the user to enter a new company name.

Figure 39:
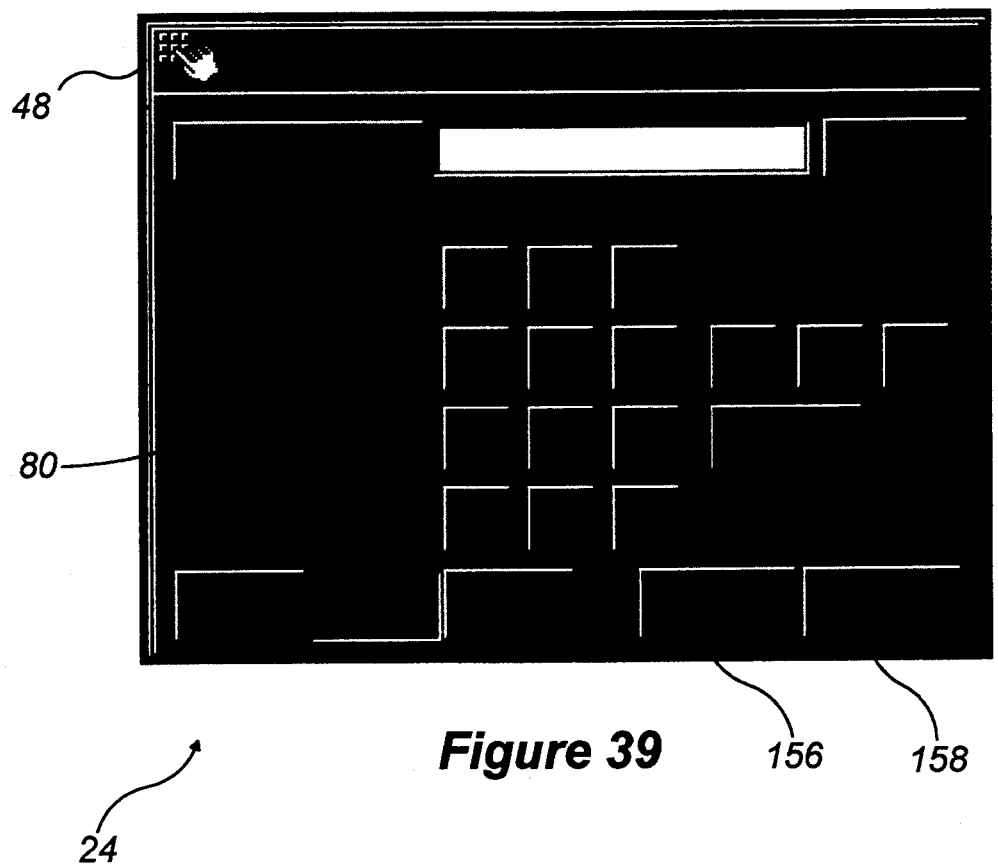
FIG. 39 is a screen display of the IFAX of FIG. 1 used to enter a new voice telephone number.

The user may change the voice number by pressing a "Voice Number" button 294. Pressing the Voice Number button 294 causes the IFAX 10 to change to the screen display shown in FIG. 39. The prompt 48 instructs the user to enter a new voice number using the numeric keypad 80. Alternatively, the user may enter the new voice number using the optional hardware numeric keypad 26 (see FIG. 1). The user presses the OK button 158 to confirm the new voice number and return to the menu shown in the screen display of FIG. 37. Similarly, the user may change the fax number by pressing a "Fax Number" button 296. Pressing the Fax Number button 296 causes the IFAX 10 to change to a screen display similar to that of FIG. 39, and the prompt 48 to instruct the user to enter a new fax number. The user may cancel the changes to personal information by pressing the Cancel button 156. The user confirms changes to the personal information by pressing the OK button 158. Pressing the Cancel button 156 or the OK button 158 causes the IFAX 10 to return to the menu shown in the screen display of FIG. 36.

Figure 40:
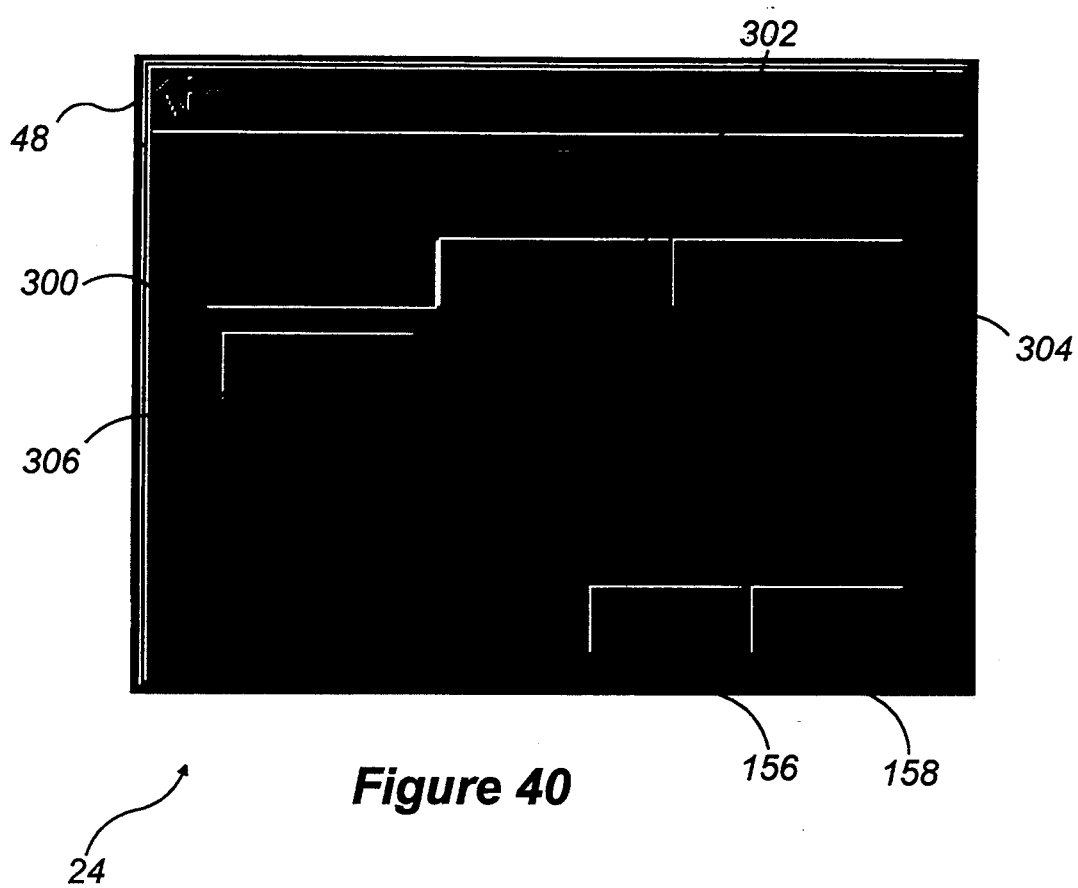
FIG. 40 is a screen display of the IFAX of FIG. 1 used to display and select routing of incoming facsimile messages.

With reference to FIG. 36, the user may specie, the handling of incoming faxes by pressing the Handling of Incoming Faxes display location 278 and the Change button 172, causing the IFAX 10 to change the screen display shown in FIG. 40 which displays the various routing options for incoming facsimile messages. The user may print messages on the IFAX 10 by pressing a "Printed by IFAX" button 300, save incoming facsimile messages in the inbox 70 (see FIG. 2) by pressing a "Saved in Inbox" button 302, or specify. that incoming facsimile messages be forwarded to a personal computer by pressing a "Forwarded to PC" button 304. The prompt 48 instructs the user to select the desired settings and press the OK button 158 to confirm the selection. The user can cancel the routing selection process at any time by pressing the Cancel button 156. Pressing the Cancel button 156 or the OK button 158 causes the IFAX 10 to return to the menu shown in the screen display of FIG. 36.

Figure 41:
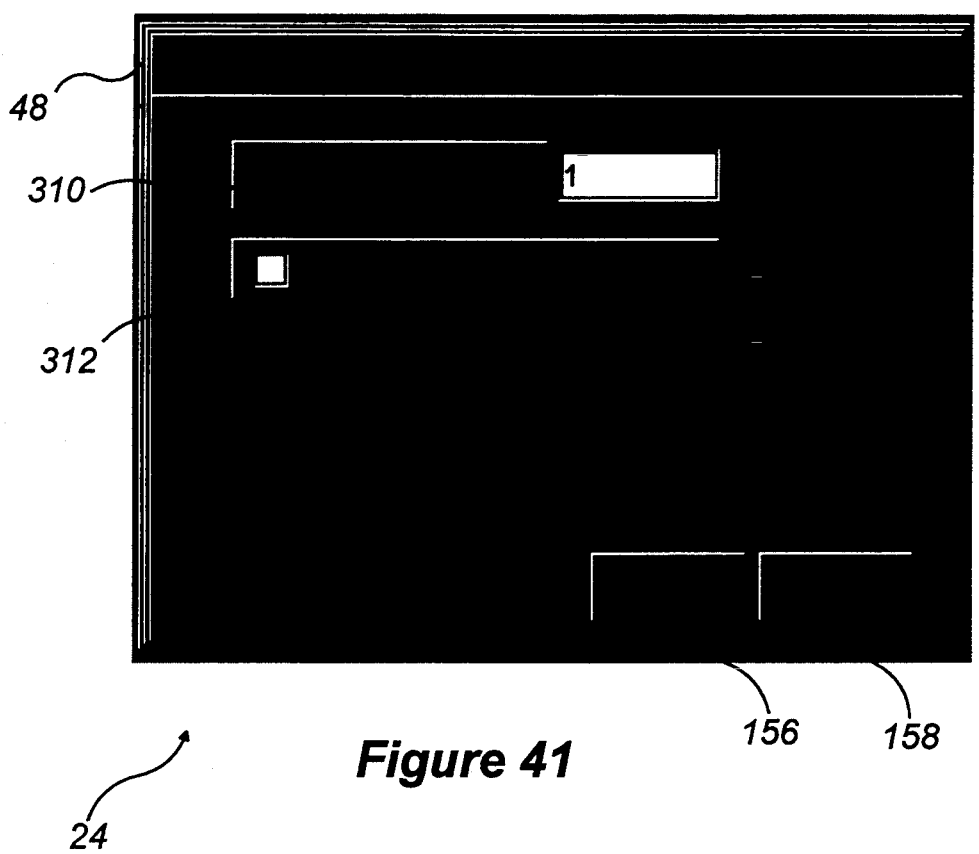
FIG. 41 is a screen display of the IFAX of FIG. 1 used to display and select parameters for printing of incoming facsimile messages.

If the user has elected to print incoming facsimile messages on the IFAX 10 by pressing the Printed by IFAX button 300, the IFAX 10 changes to the screen display of FIG. 40 and the setup for the print engine 30 (see FIG. 1) may be specified by pressing a "Printer Setup" button 306. Pressing the Printer Setup button 306 causes the IFAX 10 to change to the screen display of FIG. 41. As shown in FIG. 41, the IFAX 10 displays number of copies currently selected as well as a reverse printing order option. The user may select any number of copies to be printed by the IFAX 10 by pressing a "Number of Copies" 310. Pressing the Number of Copies button 310 causes the IFAX 10 to display the alphanumeric keypad 80, and the prompt 48 instructs the user to select the desired number of copies and press the OK button 158. As shown in FIG. 41, the user may also specify, reverse order of printing by pressing a "Reverse Order Printing" button 312. A reverse order of printing will cause the IFAX to print the first page of a facsimile message last so that the pages of the facsimile message are in numerical order with the first page on top. The prompt 48 instructs the user to select the desired options and touch the OK button 158 to confirm the selection. The user may cancel the printer setup procedures at any time by pressing the Cancel button 156. Pressing the Cancel button 156 or the OK button 158 causes the IFAX 10 to return to the screen display of FIG. 40.

Figure 42:
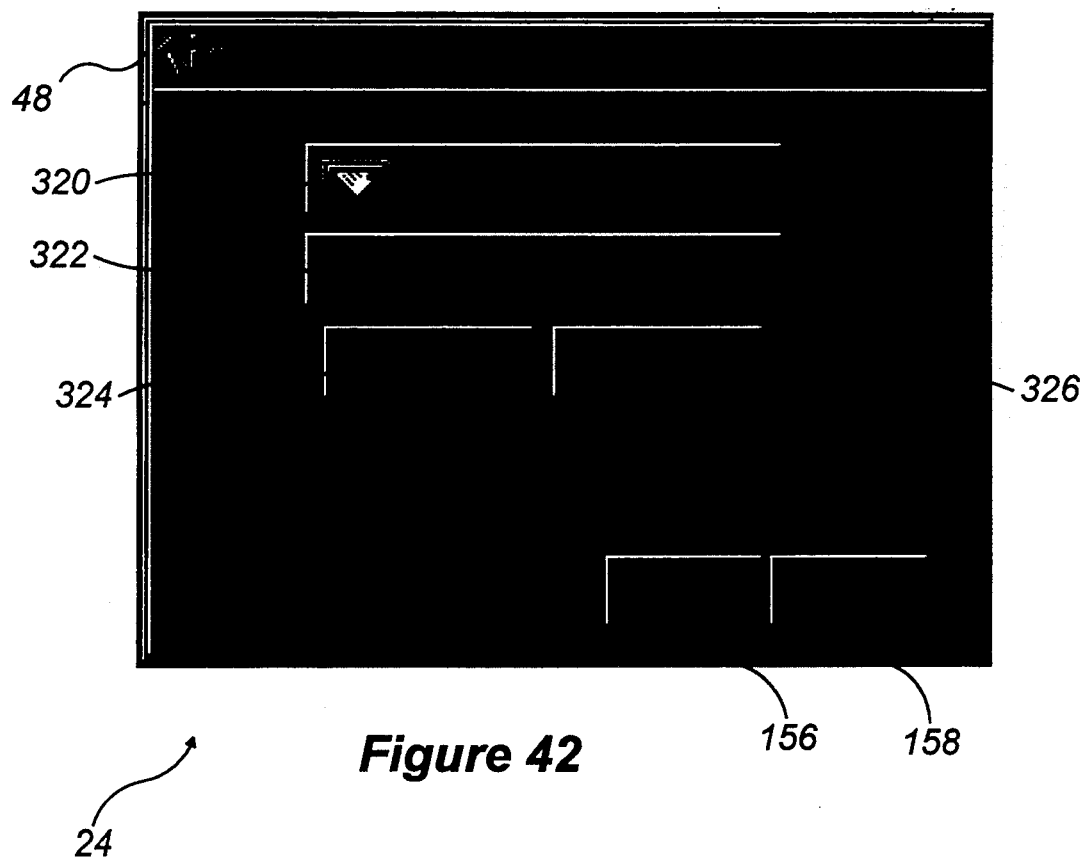
FIG. 42 is a screen display of the IFAX of FIG. 1 used to display and select security options.

Returning now to the menu shown in the screen display of FIG. 36, the user can specify security keys by pressing the Security Key display location 280 and the Change button 172 causing the IFAX 10 to change to the screen display of FIG. 42. The user may change the mailbox password by pressing a "Change Mailbox Password" button 320. Pressing the Change Mailbox Password button 320 causes the IFAX to change to the screen display shown in FIG. 43. The prompt 48 instructs the user to change settings and press the OK button 158 to confirm changes to the security keys. The user may cancel changes to the security keys at any time by pressing the Cancel button 156. Pressing the Cancel button 156 or the OK button 158 causes the IFAX 10 to return to the menu shown in the screen display of FIG. 36.

Figure 43:
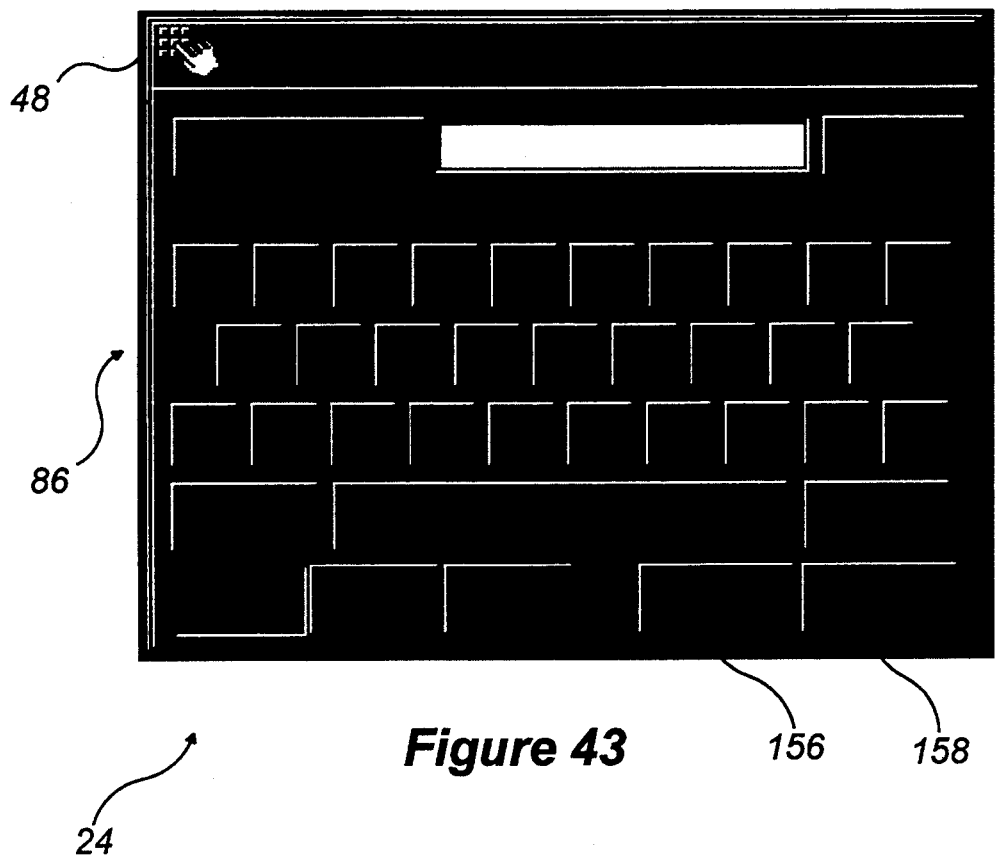
FIG. 43 is a screen display of the IFAX of FIG. 1 used to enter an old password.
Figure 44:
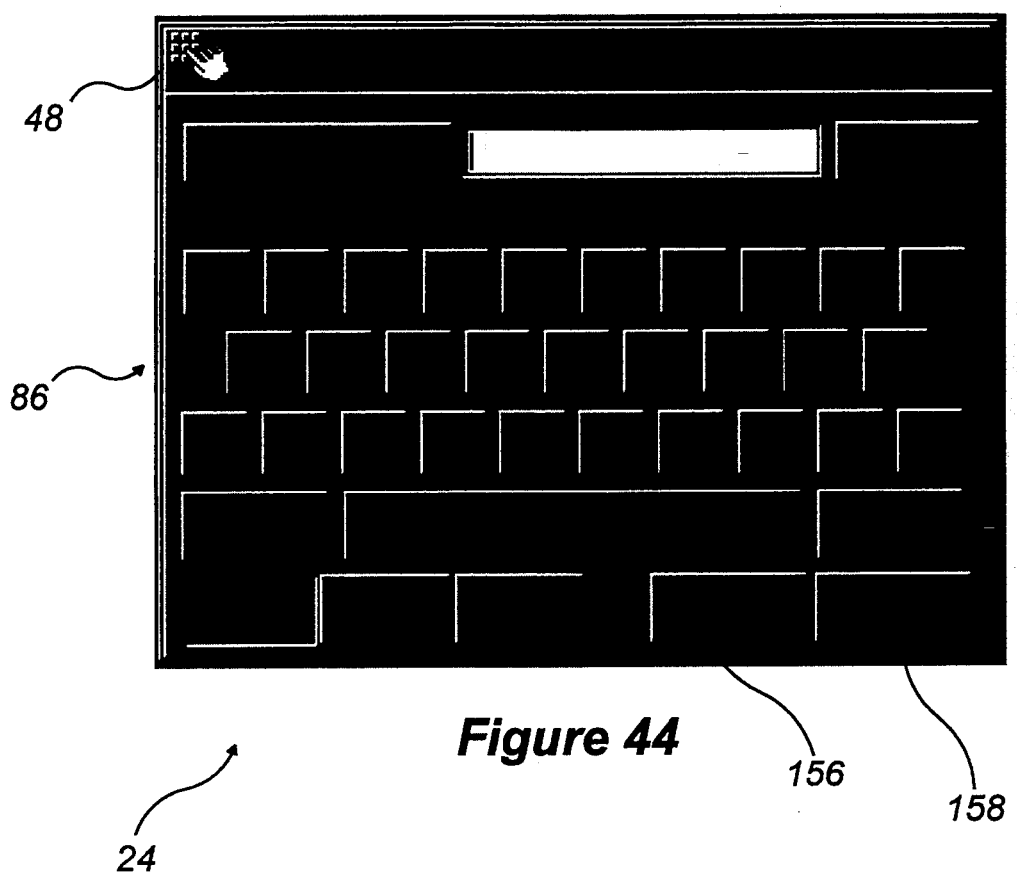
FIG. 44 is a screen display of the IFAX of FIG. 1 used to enter a new password.
Figure 45:
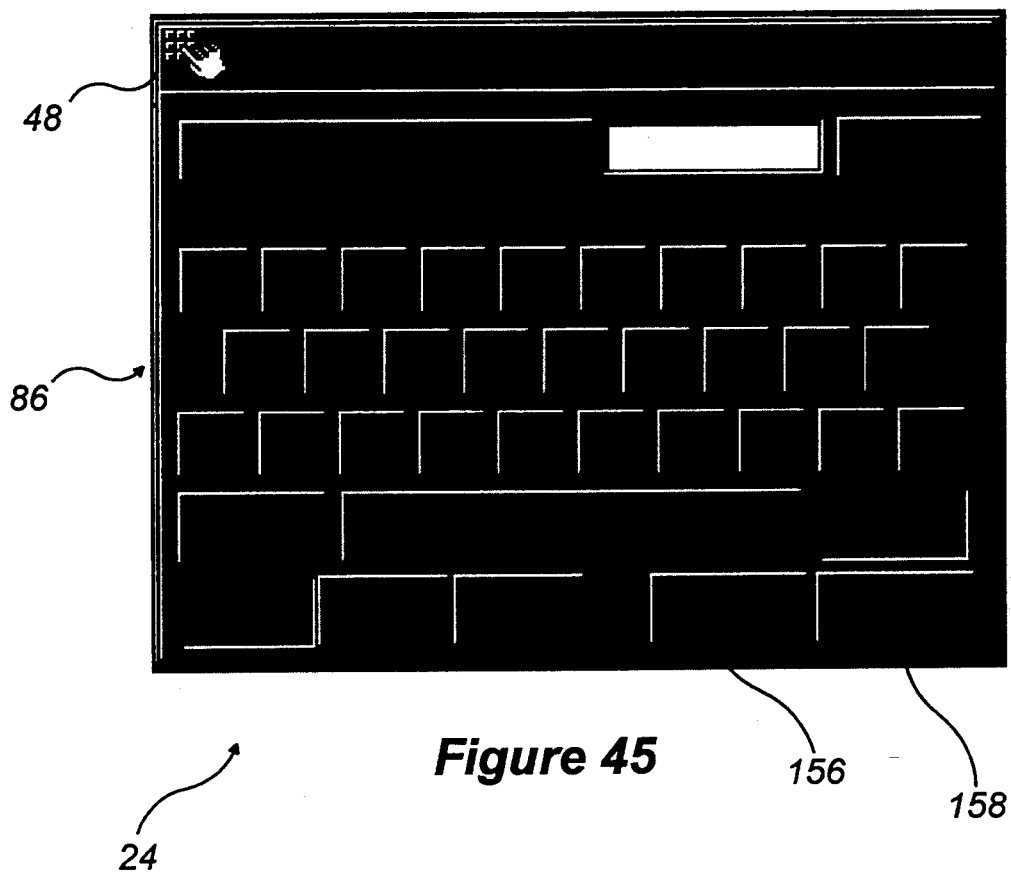
FIG. 45 is a screen display of the IFAX of FIG. 1 used to confirm entry, of the new password.
Figure 46:
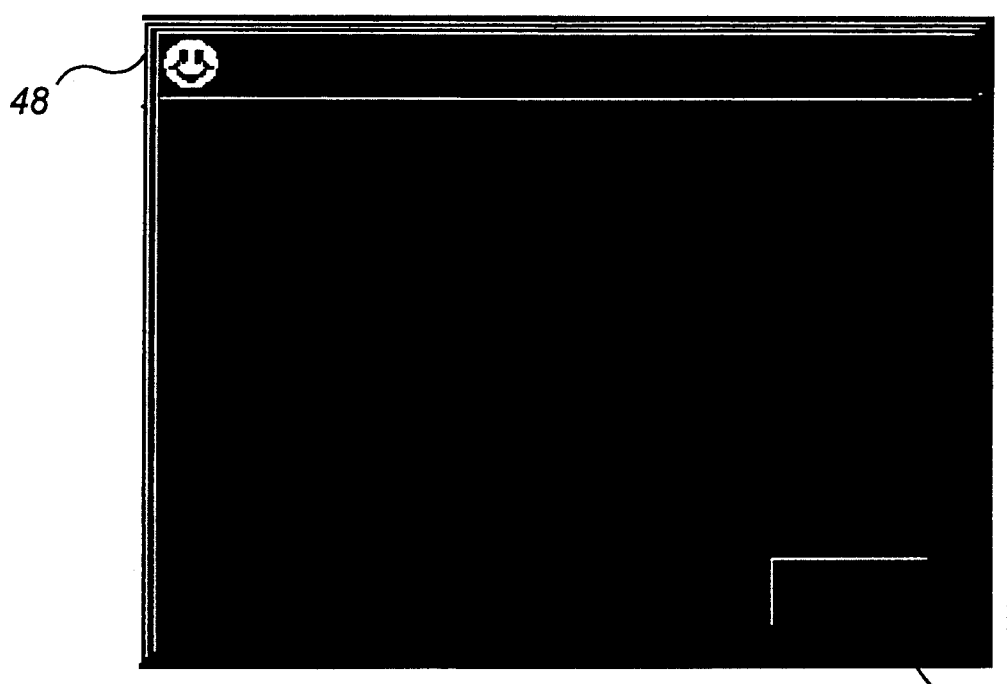
FIG. 46 is a screen display of the IFAX of FIG. 1 used to confirm changing of a password.
Figure 47:
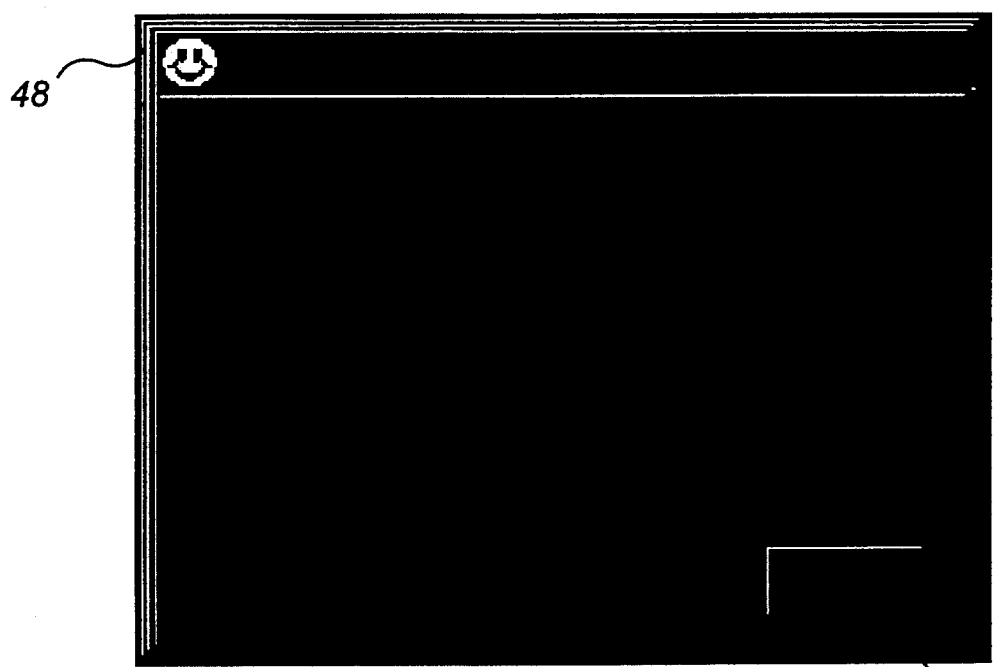
FIG. 47 is a screen display of the IFAX of FIG. 1 used to confirm that a password has not been changed.

As seen in FIG. 43, the prompt 48 instructs the user to use the typewriter keyboard 86 to enter the old password. When the user has entered the old password and pressed the OK button 158, the IFAX 10 changes to the screen display shown in FIG. 44, and the prompt 48 instructs the user to use the typewriter keyboard 86 to enter the new password. If the user enters a new password and presses the OK button 158, the IFAX 10 changes to the screen display shown in FIG. 45. As seen in FIG. 45, the prompt 48 instructs the user to use the typewriter keyboard 86 to confirm the new password. The user may confirm the new password by pressing the OK button 158, which causes the IFAX 10 to change to the screen display shown in FIG. 46 and display a message indicating that the password has been changed. In response, the user presses the OK button 158, which causes the IFAX 10 to return to the screen display shown in FIG. 42. The user may cancel the password changes at any time by pressing the Cancel button 156. Pressing the Cancel button 156 causes the IFAX 10 to change to the screen display shown in FIG. 47 and display a message indicating that the mailbox password has not been changed. In response, the user presses the OK button 158, which causes the IFAX 10 to return to the screen display shown in FIG. 42.

Figure 48:
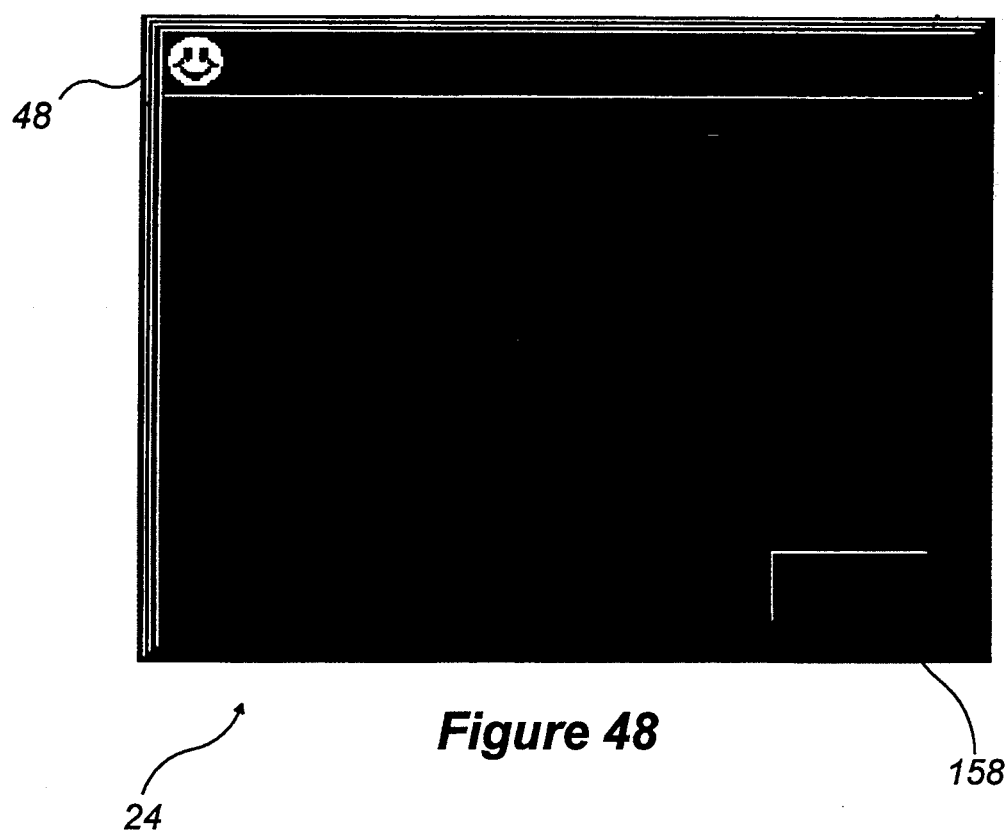
FIG. 48 is a screen display of the IFAX of FIG. 1 used to confirm selection of a new encryption key.

Again with reference to FIG. 42, the user may change the public key by pressing a "Change Public Key" button 322. Pressing the Change Public Key button 322 causes the IFAX 10 to change to the screen display shown in FIG. 48. As shown in FIG. 48, the IFAX 10 calls up the key center to apply for a new key. The user confirms this message by pressing the OK button 158, which causes the IFAX 10 to return to the screen display shown in FIG. 42.

Figure 49:
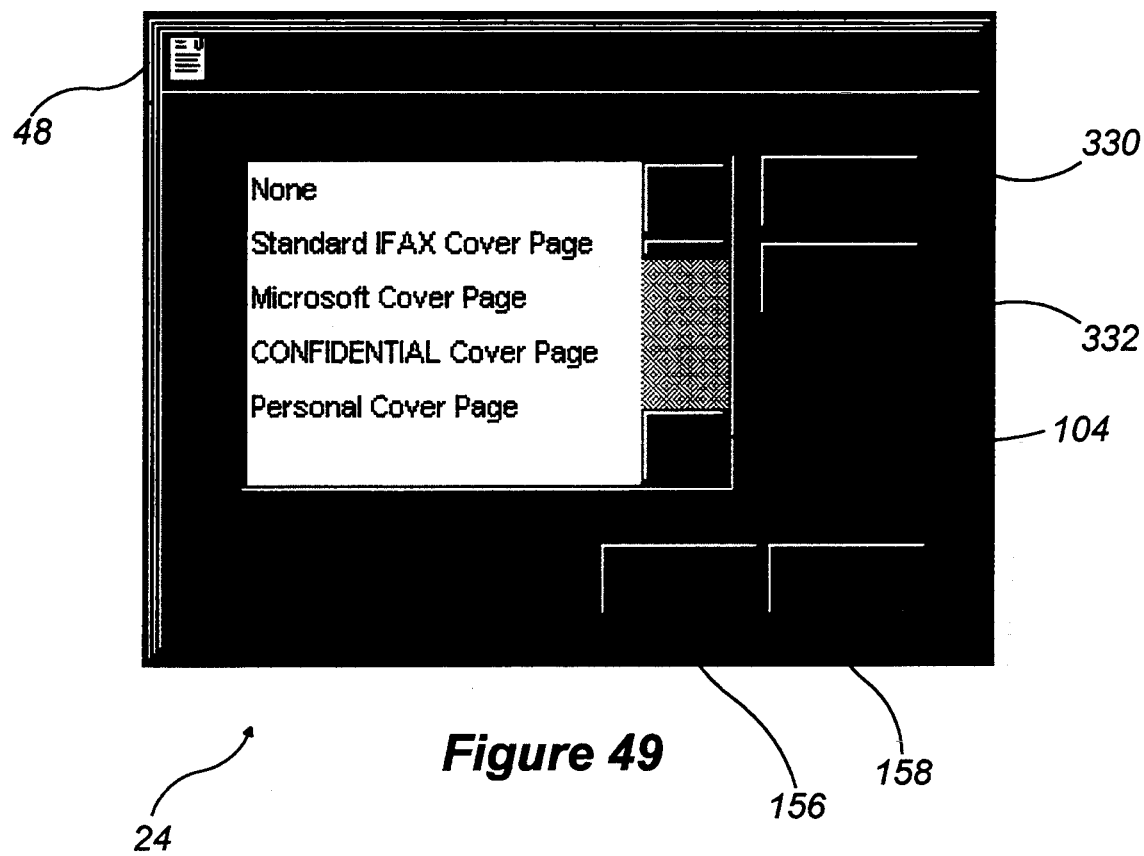
FIG. 49 is a screen display of the IFAX of FIG. 1 used to display and select personal cover page styles.

Returning now to FIG. 36, the user may specify a desired cover page style by pressing the Cover Page Styles display location 282. Pressing the Cover Page Styles display location 282 and the Change button 172 causes the IFAX 10 to change to the menu shown in the screen display of FIG. 49. The IFAX 10 displays a list of stored cover page styles on the touch-sensitive display 24. If the number of cover page styles exceeds the display capacity of the touch-sensitive display 24, the user can use the arrow keys 104 to scroll through the list. The user may install a new cover page style by pressing an "Install" button 330. Alternatively, the user may remove a cover page style from the list shown on the touch-sensitive display 24 by selecting a cover page style and pressing a "Remove" button 332. The user selects a cover page style to send with the facsimile message by touching one of the cover page styles shown in the list displayed on the touch-sensitive display 24 of FIG. 49, and pressing the 0K button 158. Selecting a cover page style and pressing the OK button 158 causes the IFAX 10 to change to the screen display shown in FIG. 36. The prompt 48 instructs the user to select the desired cover page style and press the OK button 158 to confirm the selection. The user may cancel the cover page style selection process at any time by pressing the Cancel button 156. Pressing the Cancel button 156 causes the IFAX 10 to return to the menu shown in the screen display of FIG. 36.

Figure 50:
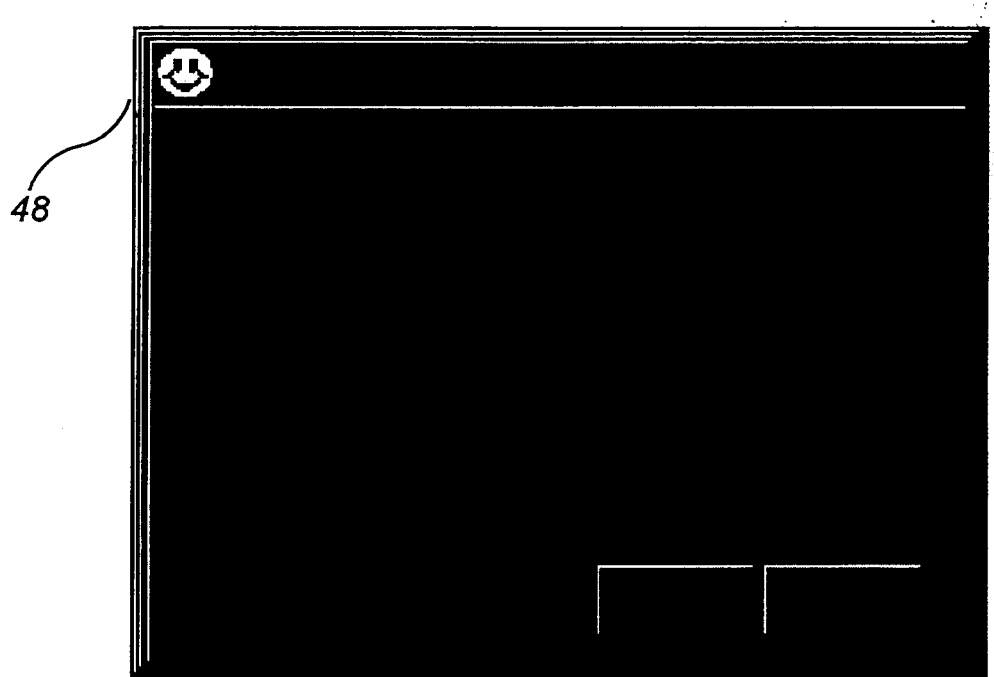
FIG. 50 is a screen display of the IFAX of FIG. 1 used to confirm selection of a personal cover page style.
Figure 51:
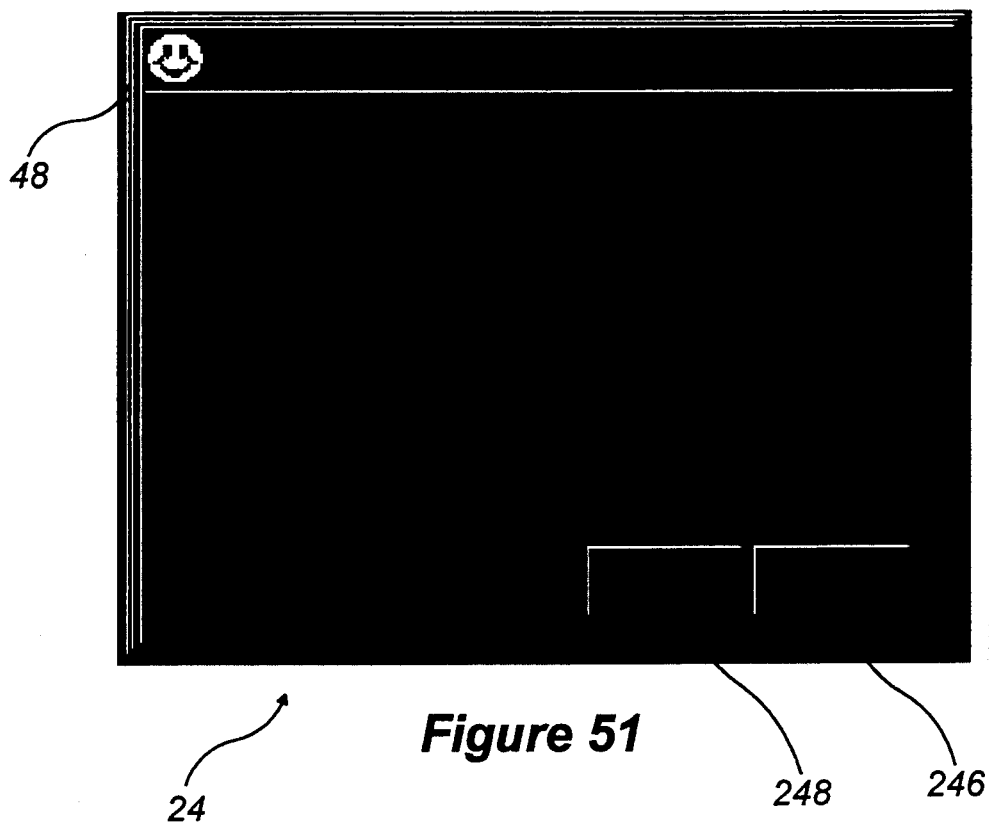
FIG. 51 is a screen display of the IFAX of FIG. 1 displaying a message concerning public access of the selected cover page style of FIG. 50.
Figure 52:
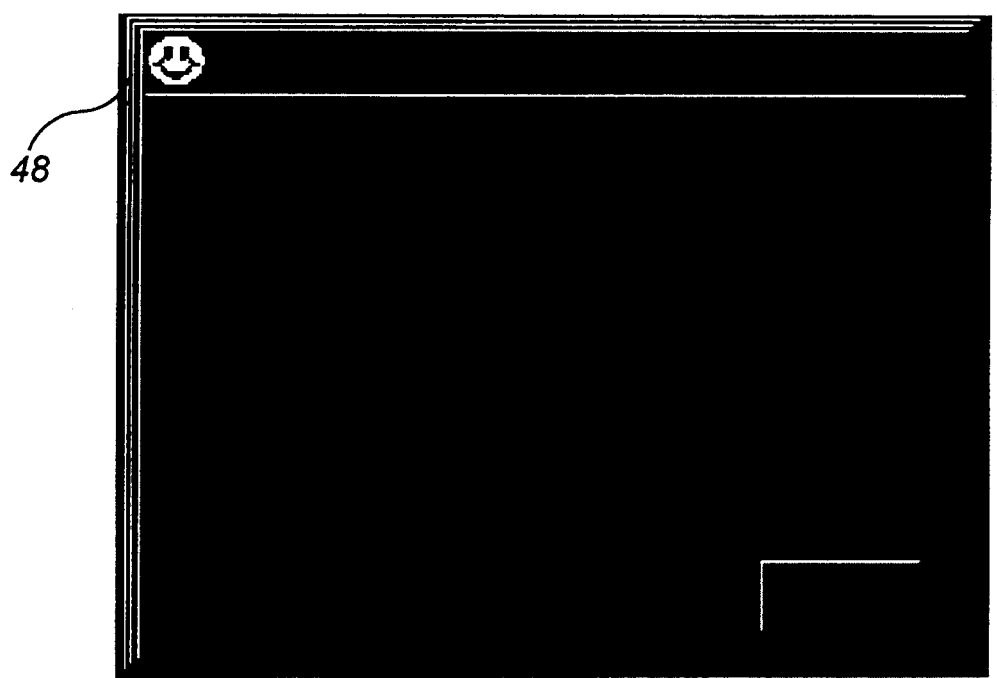
FIG. 52 is a screen display of the IFAX of FIG. 1 confirming installation of the personalized cover page style of FIG. 50.

The user presses the Install button 330 to install a new cover page style, causing the IFAX 10 to search the file storage unit 28 (see FIG. 1) for the new cover page style. The IFAX 10 then switches to the screen display shown in FIG. 50 and displays a message on the touch-sensitive display 24 asking the user to confirm installation of the selected cover page style. The user may cancel the selection by pressing the No button 248, or confirm installation of the selected cover page style by pressing the Yes button 246. Pressing the No button 248 causes the IFAX 10 to return to the menu shown in the screen display of FIG. 49. Pressing the Yes button 246 causes the IFAX 10 to go to the screen display shown in FIG. 51. As seen in FIG. 51, the IFAX 10 displays a message on the touch-sensitive display 24 inquiring whether there should be public access of the selected cover page style. The user may deny public access of the cover page style by pressing the No button 248, or allow public access of the cover page style by pressing the Yes button 246. Pressing the No button 248 or the Yes button 246 causes the IFAX 10 to change to the screen display shown in FIG. 52. As seen in FIG. 52, the IFAX 10 displays a message on the touch-sensitive display 24 indicating to the user that a selected cover page style has been installed. The user confirms this message by pressing the OK button 158, which causes the IFAX 10 to return to the menu shown in the screen display of FIG. 36. Thus, the user may select a cover page style for his personal use from a list of stored cover page styles. The selected cover page style may be used as the default cover page style for that particular user. The user may also add new cover page styles to the list and may reserve the new cover page style for personal use or allow public access to the new cover page style.

Figure 53:
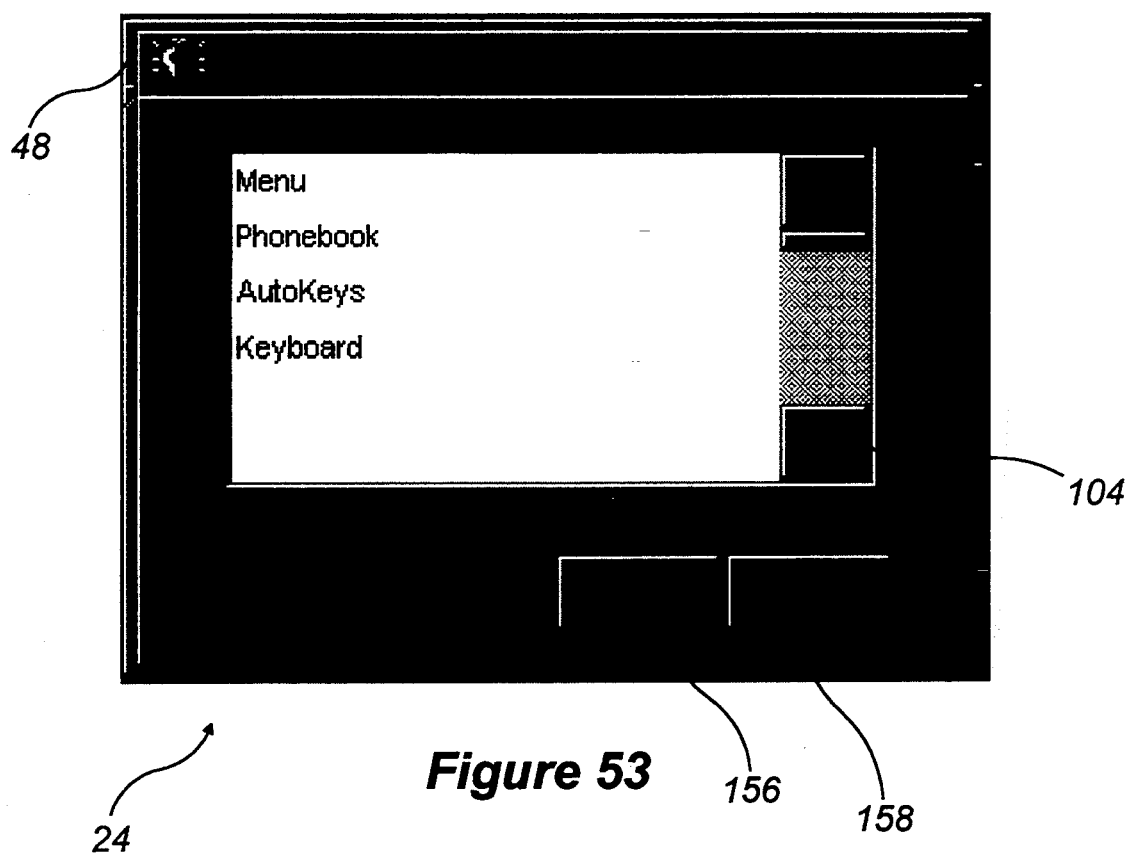
FIG. 53 is a screen display of the IFAX of FIG. 1 used to display and select initial screen options.

Again with reference to FIG. 36, the user may specify a preferred initial screen by pressing the Preferred Initial Screen display location 284. Pressing the Preferred Initial Screen display location 284 and the Change button 172 causes the IFAX 10 to change to the screen display shown in FIG. 53. The prompt 48 instructs the user to select the desired initial screen from the list shown on the touch-sensitive display 24. The user may cancel the initial screen selection by pressing the Cancel button 156. The user may select one of the initial screen entries in the list displayed on the touch-sensitive display 24 and press the OK button 158 to confirm the selection. Pressing the OK button 158 will cause the IFAX 10 to display the selected initial screen whenever that particular user logs on to the IFAX. The logon procedures used by the IFAX 10 will be discussed in detail below. Pressing the Cancel button 156 or the 0K button 158 causes the IFAX 10 to return to the menu shown in the screen display of FIG. 36.

Figure 8:
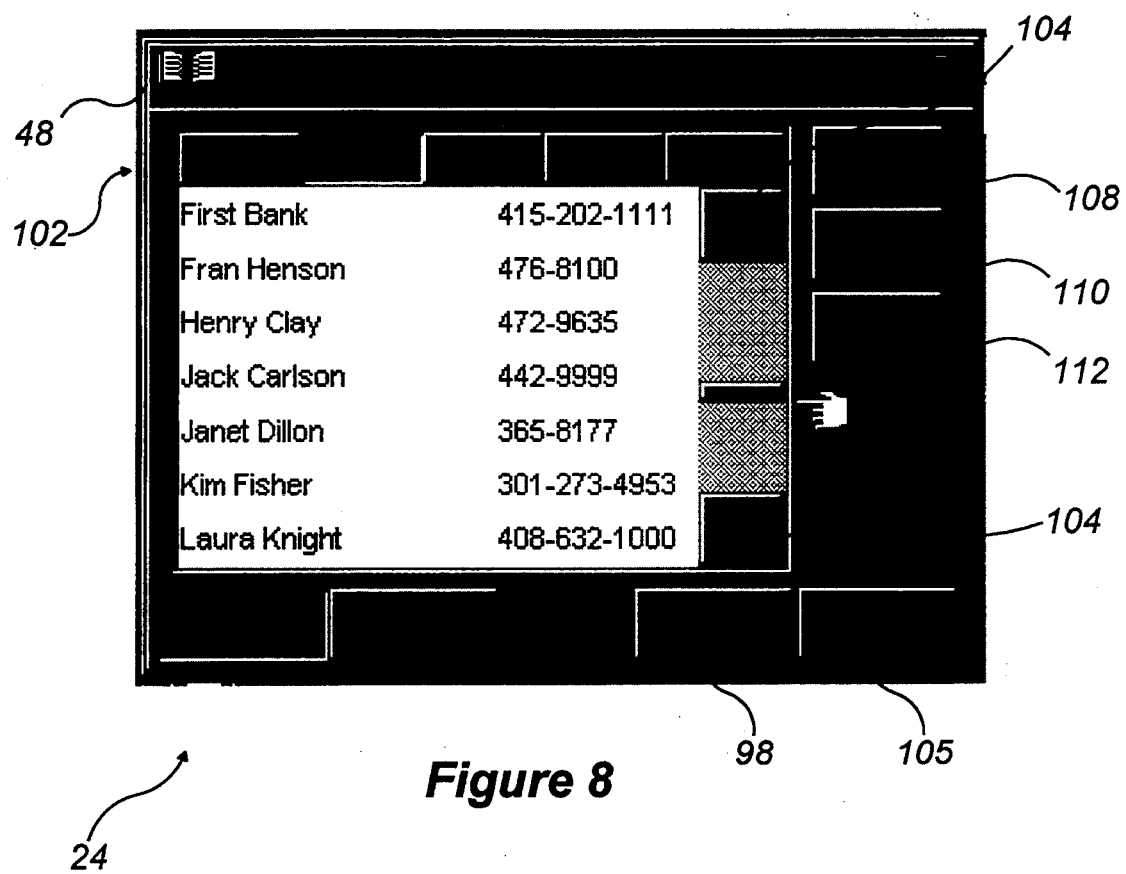
FIG. 8 is a screen display of the IFAX of FIG. 1 used to select a facsimile telephone number from a facsimile phonebook.

With reference to FIG. 36, the user may set up a phonebook entry by pressing the Phonebook display location 286, and the Change button 172, causing the IFAX 10 to change to the screen display shown in FIG. 8. As previously described, the user may enter new entries into the phonebook, edit entries in the phonebook, or remove entries from the phonebook. The user may change any of personal settings to suit his particular needs, and the IFAX 10 will store the selected settings. Each time a user logs on to the IFAX 10, the IFAX will use the personal settings selected by that particular user.

Figure 54:
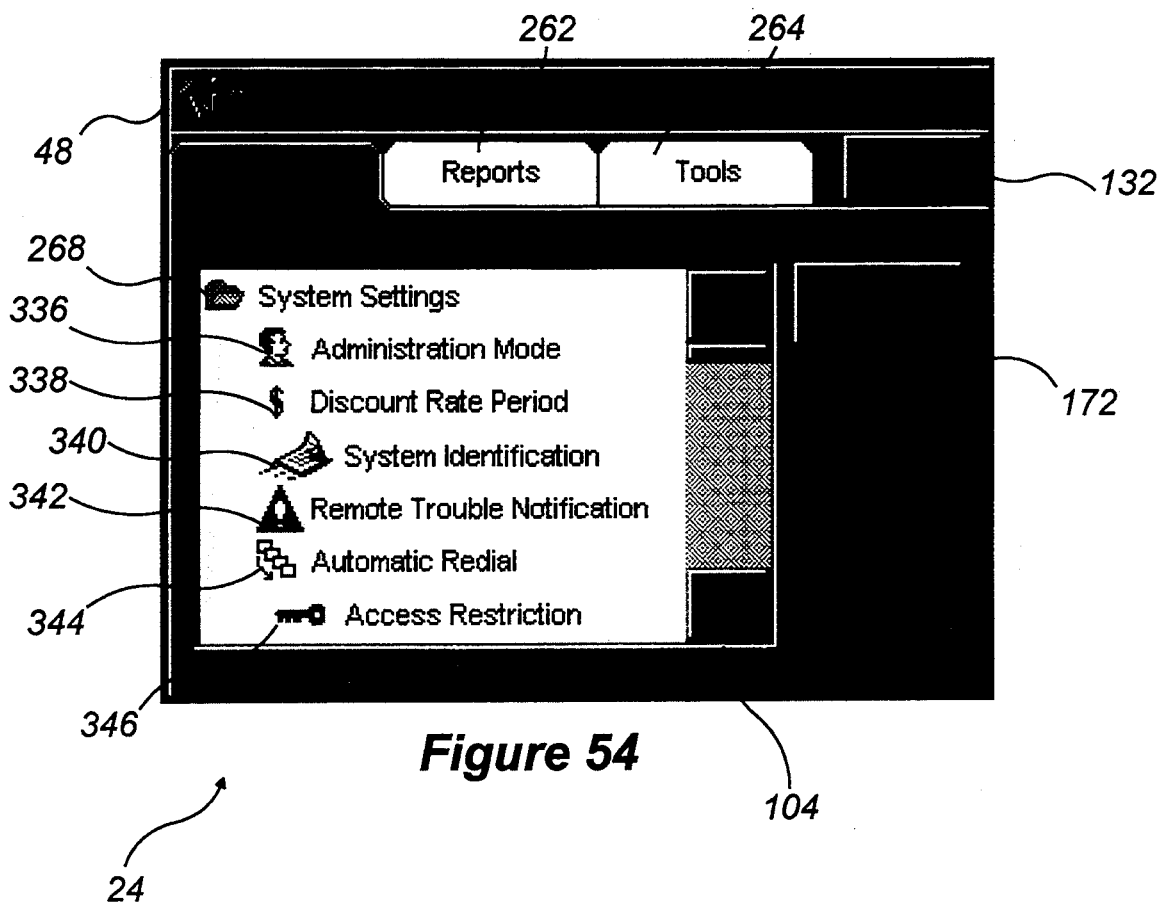
FIG. 54 is a screen display of the IFAX of FIG. 1 used to display and select system setting parameters.
Figure 55:
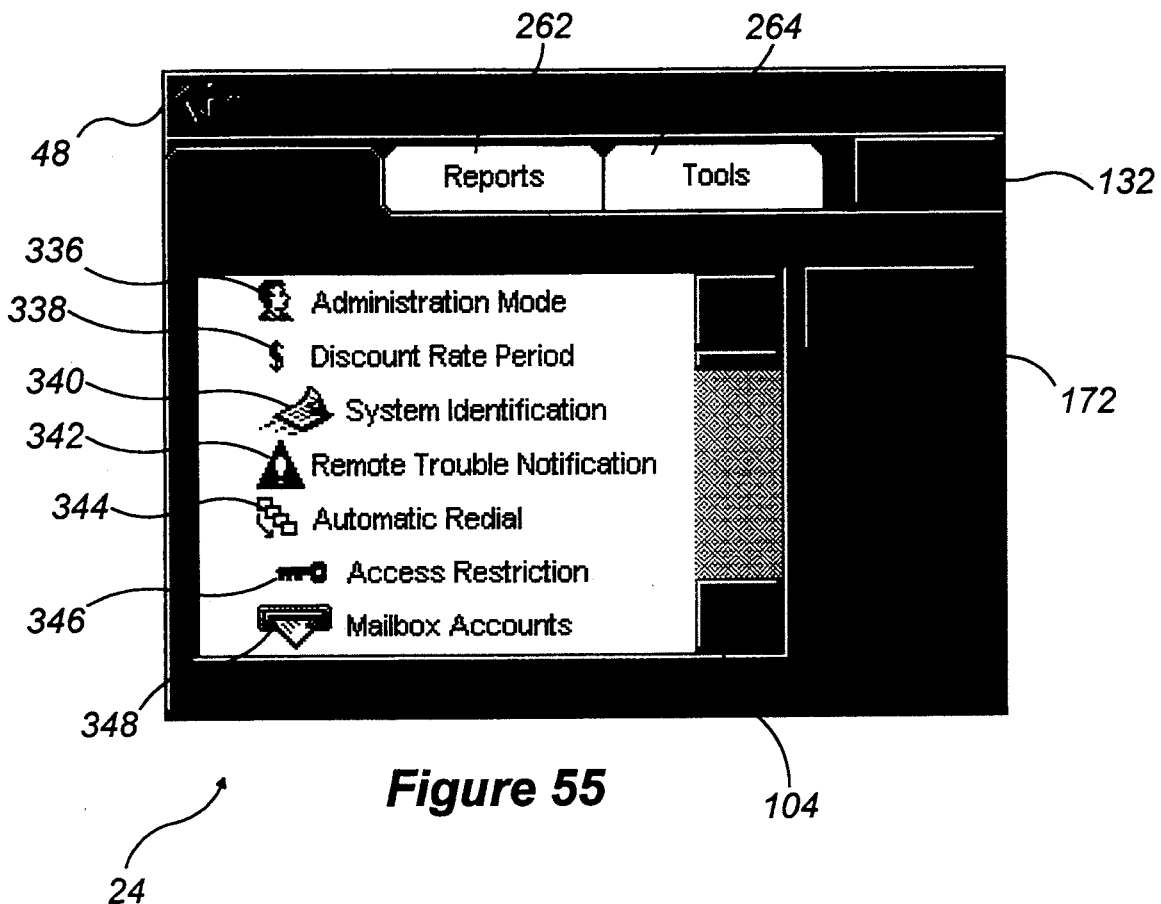
FIG. 55 is a screen display of the IFAX of FIG. 1 used to select addition system setting parameters.

As previously described with reference to FIG. 35, the user may alter system settings by pressing the System Settings display location 268 and the Change button 172, causing the IFAX to change to the menu shown in the screen display of FIG. 54 which displays a list of system settings options on the touch-sensitive display 24. If the number of system settings exceeds the size of the list shown on the touch-sensitive display 24, the user may use the arrow keys 104 to scroll through the list. The prompt 48 instructs the user to touch the desired setup topic and press the Change button 172. The user may change settings in the administrative mode by pressing an "Administrative Mode"0 display location 336, the discount rate period by pressing a "Discount Rate Period" display location 338, a system identification by pressing a "System Identification" display location 340, remote trouble notification by pressing a "Remote Trouble Notification" display location 342, automatic redial parameters by pressing an "Automatic Redial" display location 344, or alter access restriction by pressing an "Access Restriction" display location 346. Pressing the down arrow key 104 causes the IFAX 10 to scroll in a downward direction through the list, thus displaying additional system setting options, as shown in FIG. 55. As seen in FIG. 55, the user may also alter mailbox accounts by pressing a "Mailbox Accounts" display location 348.

Figure 56:
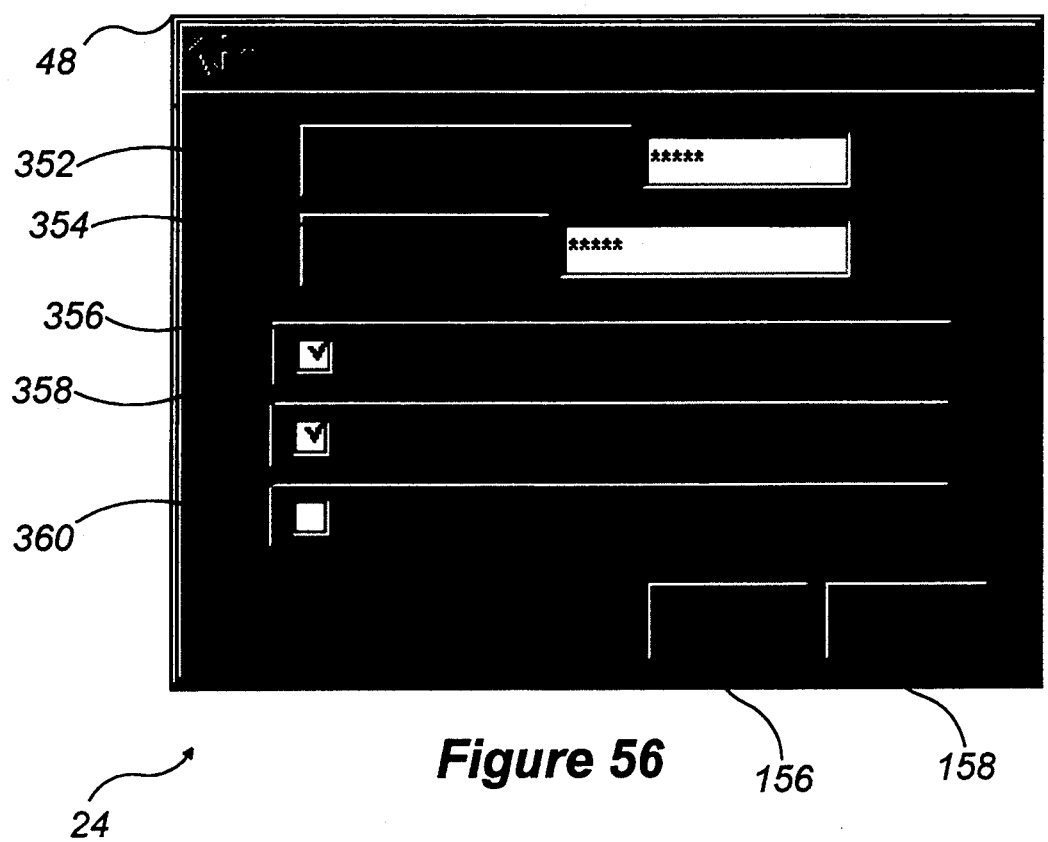
FIG. 56 is a screen display of the IFAX of FIG. 1 used to enter administrator password and access code.

The user may change administration mode parameters by pressing the Administration Mode display location 336 and the Change button 172, causing the IFAX 10 to change to the screen display shown in FIG. 56. Settings in the administration mode are accessible only to an administrator with the appropriate access code. The administrator presses a "System Password" button 352 and enters the appropriate system password. The administrator also enters an access code by pressing an "Access Code" button 354 and entering the appropriate access code. Once the appropriate system password and access code have been entered, the administrator may allow all users on the IFAX 10 by pressing an "Allow Public Users" button 356, allow all users to change default settings on the IFAX by pressing an "Allow Public to Change Defaults"0 button 358, or allow all users to change system settings by pressing an "Allow Users to Change System Settings" button 360. The administrator enables any of these features by pressing the desired button, or may disable a previously enabled feature by touching the desired button a second time. The prompt 48 instructs the user to change the desired parameters and press the OK button 158 to confirm the selection. The user may cancel the changes to the system settings at any time by pressing the Cancel button 156. Pressing the Cancel button 156 or the OK button 158 which then causes the IFAX 10 to return to the menu shown in the screen display of FIG. 55.

Figure 57:
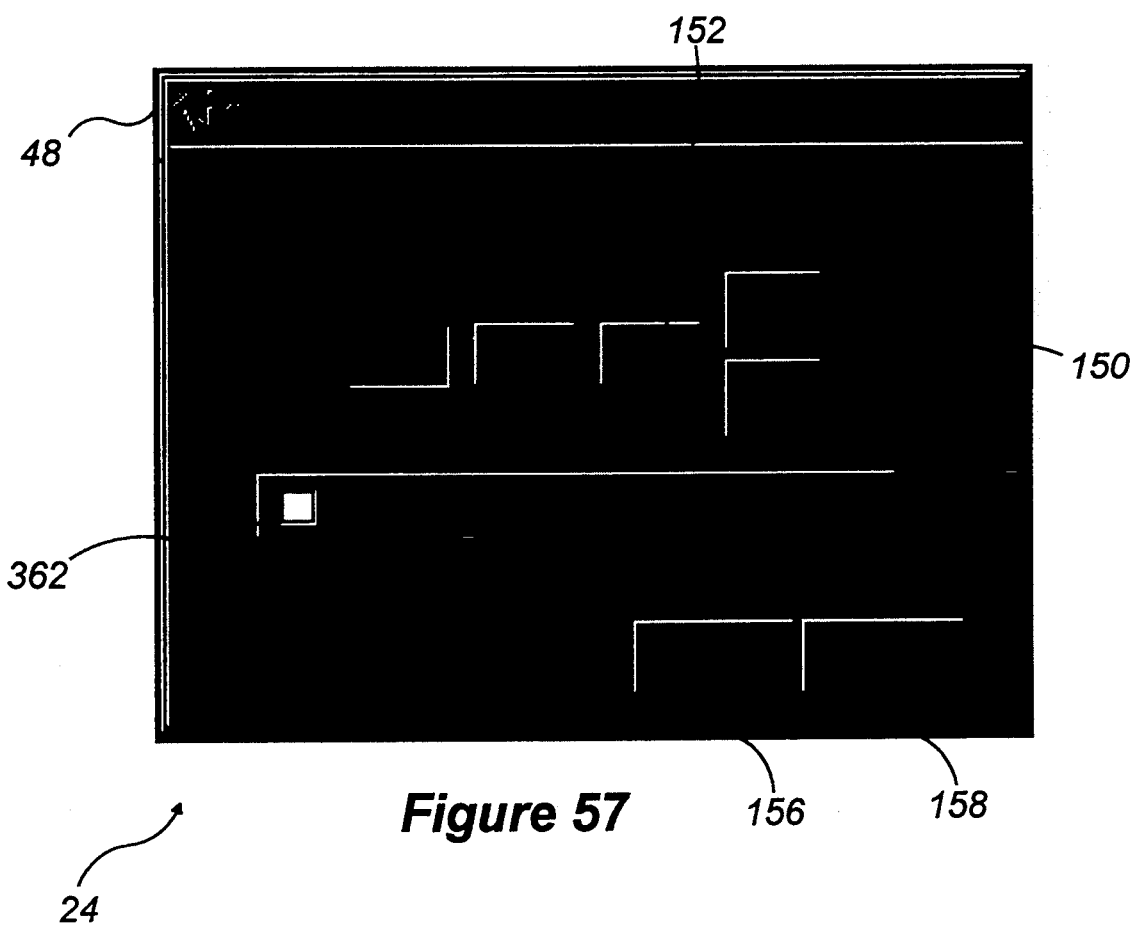
FIG. 57 is a screen display of the IFAX of FIG. 1 used to select discount phone rate periods.

With reference to FIG. 55, the user may select the discount phone rate period by selecting the Discount Rate display location 338 and the Change button 172, causing the IFAX 10 to change to the screen display shown in FIG. 57. As seen in FIG. 57, the currently selected discount rate time is displayed on the touch-sensitive display 24. The user may manually change the discount phone period by selecting the desired time indicator 152 and pressing the time set arrows 150 to manually set the desired time. Alternatively, the user may set discount rates automatically by pressing a "Set Discount Rates Automatically" button 362. The prompt 48 instructs the user to change settings and touch the OK button 158 to confirm the changes. The user may cancel the discount phone rate setting procedure at any time by pressing the Cancel button 156. Pressing the Cancel button 156 or the OK button 158 causes the IFAX 10 to return to the menu shown in the screen display of FIG. 55.

Figure 58:
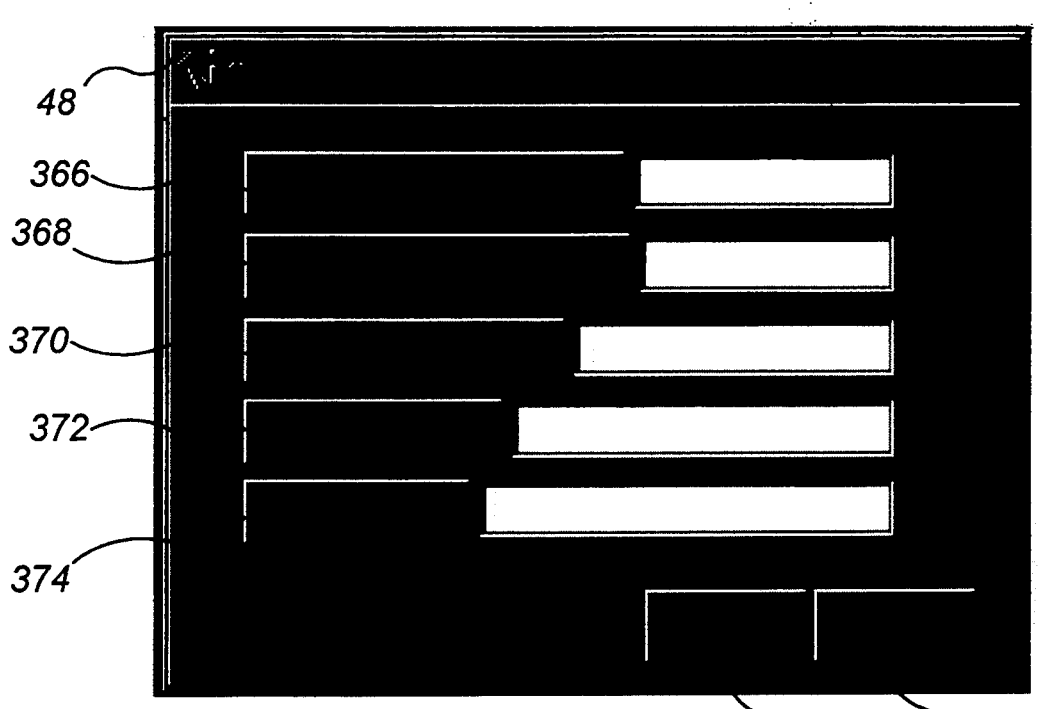
FIG. 58 is a screen display of the IFAX of FIG. 1 used to display and select system identification information.

Returning now to the menu shown in the screen display of FIG. 55, the user may modify the system identification by pressing the System Identification display location 340 and the Change button 172, causing the IFAX 10 to change to the screen display shown in FIG. 58. The user may change the company name transmitted on facsimile messages by pressing a "Company Name (TTI)" button 366, change the company name transmitted to other FAX machines sending a facsimile message to the IFAX 10 by pressing a "Company Name (RTI)" button 368, change the facsimile telephone number by pressing a "Fax Number (CSI)" button 370, change the voice telephone number by pressing a "Voice Number" button 372 or change the Contact individual by pressing a "Contact" button 374. If the user presses the Company Name (TTI) button 366 or the Company Name (RTI) button, the IFAX 10 displays the typewriter keyboard 86 on the touch-sensitive display 24, and the prompt 48 instructs the user to enter the new company name. Similarly, if the user presses the Fax Number (CSI) button 370 or the Voice Number button 372, the IFAX 10 displays the numeric keypad 80 on the touch-sensitive display 24, and the prompt 48 instructs the user to enter a new phone number. If the user presses the Contact button 374, the IFAX changes to the typewriter keyboard 86, and the prompt 48 instructs the user to enter the name of the contact person. As seen in FIG. 58, the prompt 48 instructs the user to change the system identification settings then touch the OK button 158 to confirm the changes. The user may cancel the changes to the system identification settings at any time by pressing the Cancel button 156. Pressing the Cancel button 156 or the OK button 158 causes the IFAX 10 to return to the menu shown in the screen display of FIG. 55.

Figure 59:
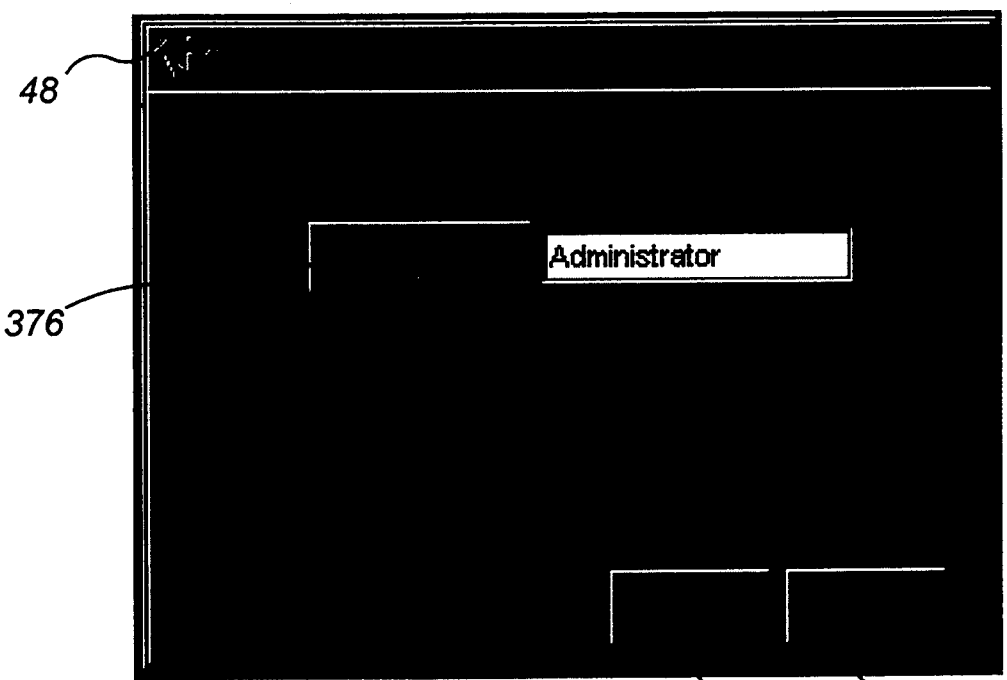
FIG. 59 is a screen display of the IFAX of FIG. 1 used to identify an individual to receive remote trouble notification messages.

Returning now to FIG. 55, the user may select an individual to receive remote trouble notification by pressing the Remote Trouble Notification display location 342 and the Change button 172, causing the IFAX 10 to change to the screen display shown in FIG. 59. The user changes the name of the individual receiving remote trouble notification by pressing a "Notify User" button 376. Pressing the Notify User button 376 causes the IFAX 10 to display the typewriter keyboard 86, and the prompt 48 instructs the user to enter the name of the person receiving remote trouble notification messages. The prompt 48 instructs the user to change the settings and touch the OK button 158 to confirm changes. The user may cancel changes to the remote trouble notification at any time by pressing the Cancel button 156. Pressing the Cancel button 156 or the OK button 158 causes the IFAX 10 to return to the menu shown in the screen display of FIG. 55.

Figure 60:
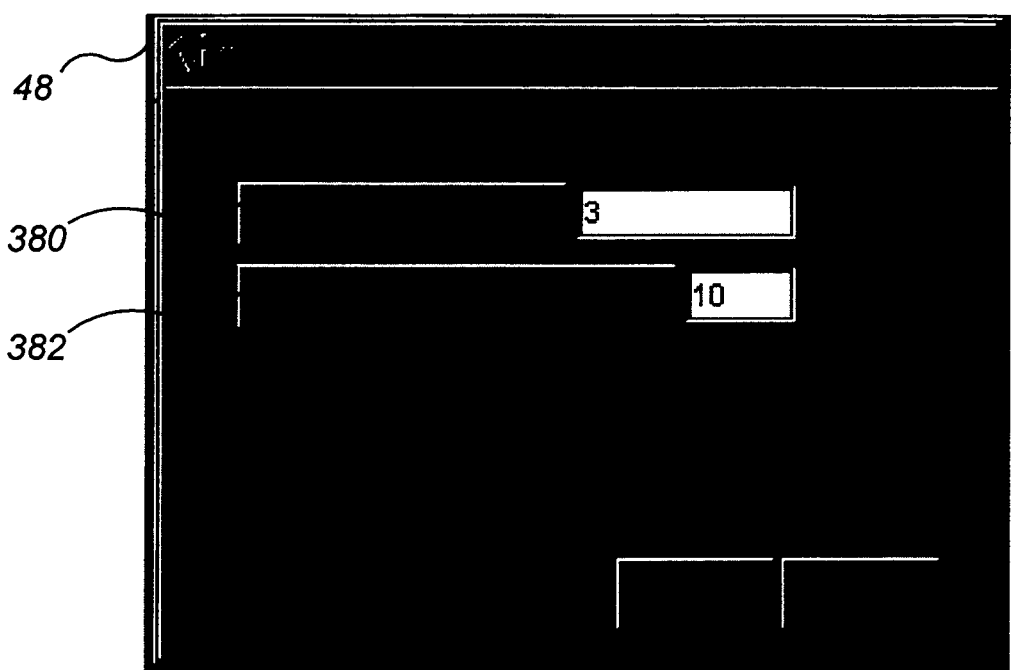
FIG. 60 is a screen display of the IFAX of FIG. 1 used to select automatic redial parameters.

Returning now to FIG. 55, the user may select automatic redial parameters by pressing the Automatic Redial display location 344 and the Change button 172, causing the IFAX to change to the screen display shown in FIG. 60. The user may change the number of automatic redial retries by pressing a "Number of Retries" button 380. The user may also change the redial interval by pressing a "Redial Interval" button 382. Pressing the Number of Retries button 380 or the Redial Interval button 382 causes the IFAX 10 to display the numeric keypad 80 on the touch-sensitive display 24, and the prompt 48 instructs the user to enter the desired number of retries or redial interval. Alternatively, the user can enter the desired number using the optional hardware numeric keypad 26. As seen in FIG. 60, the prompt 48 instructs the user to change automatic redial settings then touch the OK button 158 to confirm changes to the settings. The user may cancel automatic redial changes at any time by pressing the Cancel button 156. Pressing the cancel button 156 or the OK button 158 causes the IFAX 10 to return to the menu shown in the screen display of FIG. 55.

Figure 61:
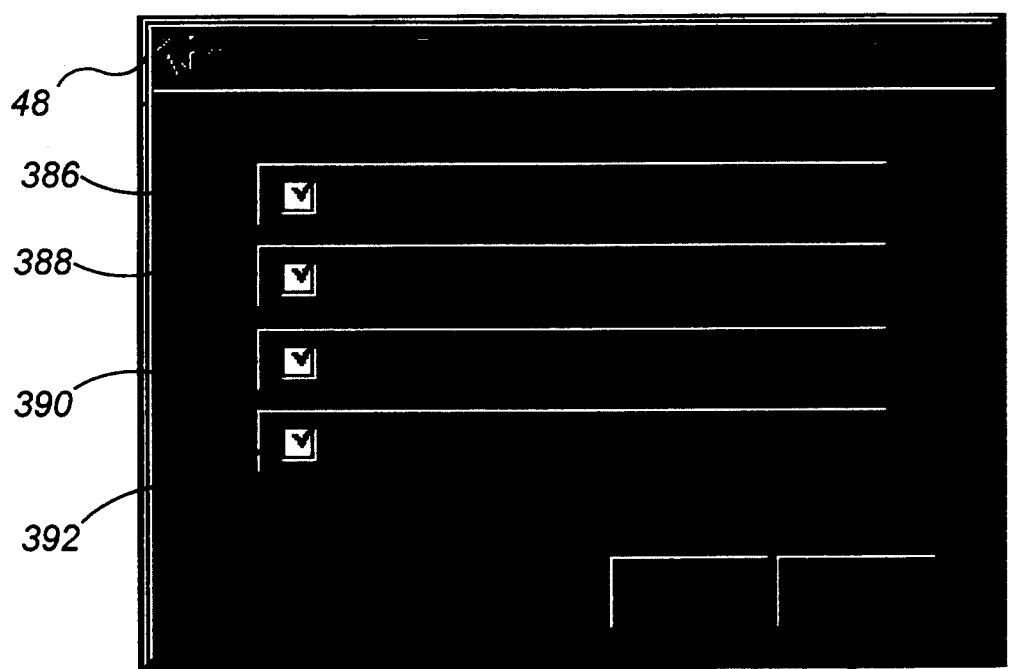
FIG. 61 is a screen display of the IFAX of FIG. 1 used to select facsimile access restriction parameters.

Returning again to FIG. 55, the user may restrict access to the IFAX 10 by pressing the Access Restriction display location 346 and the Change button 172, causing the IFAX to change to the screen display of FIG. 61. The user may restrict transmission of facsimile messages to facsimile machines listed in the phonebook 62 (see FIG. 2) by using a "Restrict Transmission to Phonebook List" button 386. If this option is selected, outgoing facsimile messages can only be transmitted to FAX machines contained within the phonebook 62.

Similarly, the user may restrict reception of incoming facsimile messages to FAX machines listed in the phonebook 62 (see FIG. 2) by pressing a "Restrict Reception by Phonebook List" button 388. In this manner, the user may eliminate "junk" facsimile messages that may be received from unwanted sources. The IFAX 10 checks the identification of the FAX machine sending a facsimile message against the authorized FAX machine list in the phonebook 62. The IFAX 10 will not accept a facsimile message from a FAX machine that is not contained in the phonebook 62. Similarly, the user may restrict reception of incoming facsimile messages to facsimile machines transmitting a system password by pressing a "Restrict Reception by System Password" button 390. If this option is selected, the IFAX 10 will only receive messages from facsimile machines transmitting the appropriate system password.

The user may permit remote access to the IFAX 10 by pressing a "Remote Procedure Calls Allowed" button 392. Enabling this feature allows a person to remotely access the IFAX 10 to perform such procedures as checking an individual mailbox and forwarding facsimile messages stored in the inbox 70 (see FIG. 2) for that person. The prompt 48 instructs the user to change access restriction settings then touch the OK button 158 to confirm the changes. The user may cancel changes to access restriction settings at any time by pressing the Cancel button 156. Pressing the cancel button 156 or the OK button 158 causes the IFAX 10 to return to the menu shown in the screen display of FIG. 55.

Figure 62:
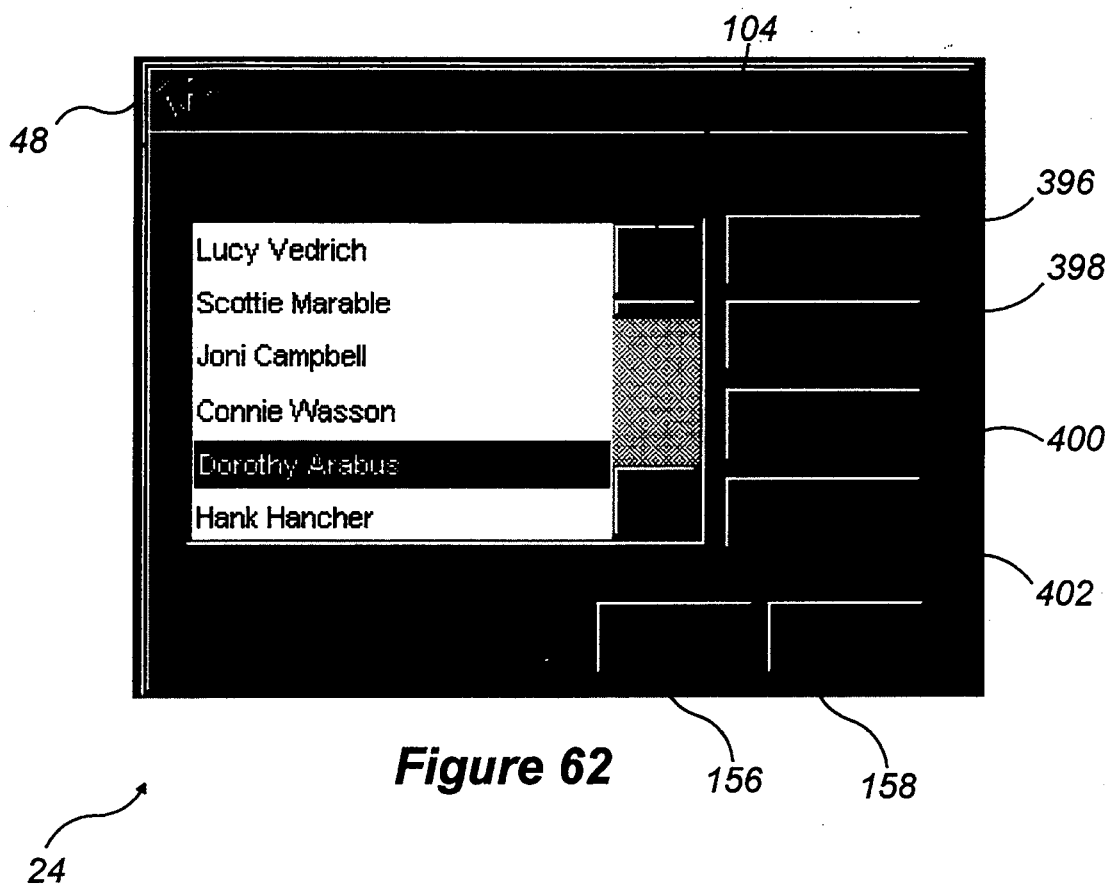
FIG. 62 is a screen display of the IFAX of FIG. 1 used to display and select individual mailbox accounts.

Returning again to FIG. 55, the user may alter individual mailbox accounts by pressing the Mailbox Account display location 348 and the Change button 172, causing the IFAX 10 to change to the screen display shown in FIG. 62. The IFAX 10 displays a list of all individual mailbox accounts on the touch-sensitive display 24. If more individual accounts exist than can be displayed on the touch-sensitive display 24, the arrow keys 104 can be used to scroll trough the list of mailbox accounts. The user may enter a new mailbox account by pressing a "New" button 396, edit existing mailbox accounts by selecting the desired mailbox account and pressing an "Edit" button 398, remove existing mailbox accounts by selecting the desired mailbox account and pressing a "Remove" button 400, or perform other administrative functions by pressing a "User Administrator" button 402. The prompt 48 instructs the user to change settings then touch the OK button 158 to confirm changes to the mailbox accounts. The user may cancel changes to mailbox accounts at any time by pressing the Cancel button 156. Pressing the Cancel button 156 or the OK button 158 causes the IFAX 10 to return to the menu shown in the screen display of FIG. 55.

Figure 63:
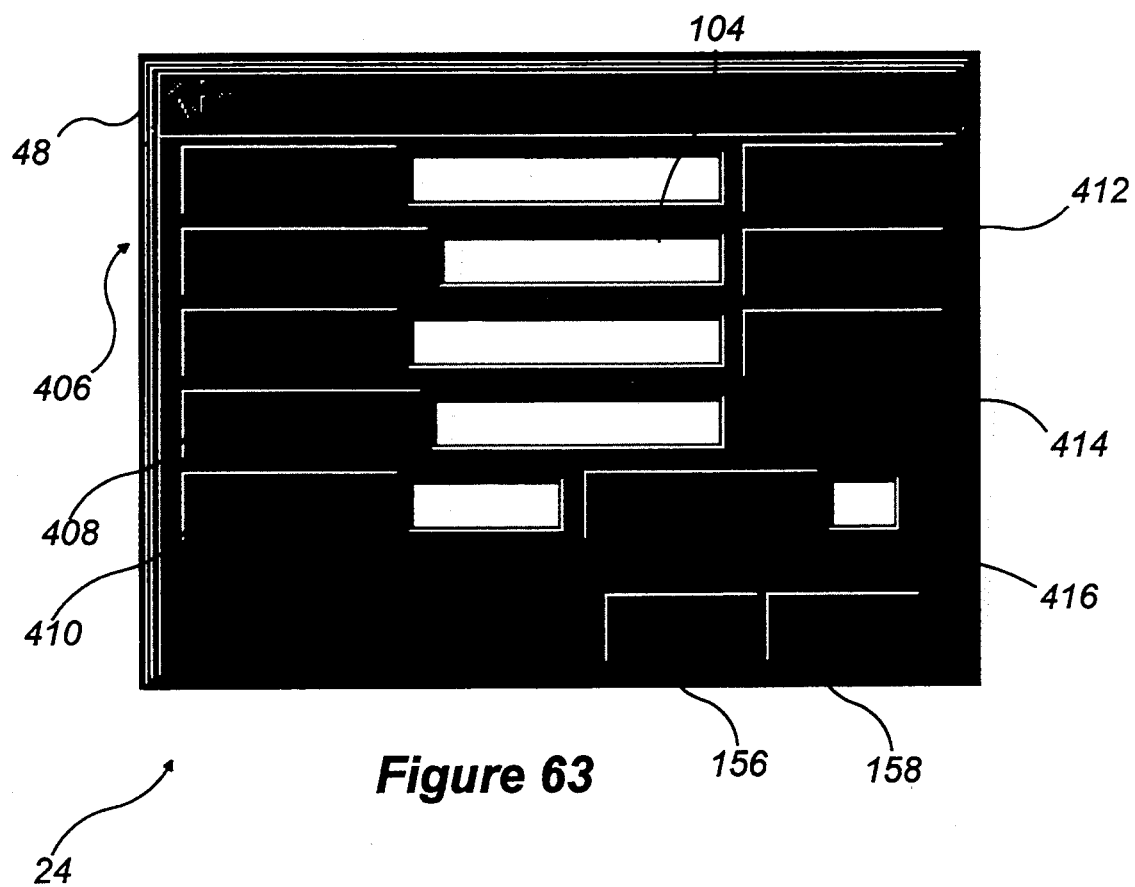
FIG. 63 is a screen display of the IFAX of FIG. 1 used to enter information related to a new mailbox account.

With reference to FIG. 62, if the user presses the New button 396, the IFAX 10 changes to the screen display shown in FIG. 63 where the prompt 48 instructs the user to change settings then touch the OK button 158 to confirm the changes. The user may cancel entry of a new mailbox account at any time by pressing the Cancel button 156. Pressing the Cancel button 156 or the OK button 158 causes the IFAX 10 to return to the mailbox account listing shown in FIG. 62. As seen in FIG. 63, the user enters information relating to the individual such as name, address, telephone number, and company name by pressing an associated one of several buttons 406. The user may specify a local area network (LAN) address by pressing a "LAN Address" button 408. The user also enters the password for the new mailbox account by pressing a "Password" button 410. The user may also specify individual parameters such as the initial screen by pressing a "Set Initial Screen" button 412, set the desired routing for incoming facsimile messages by pressing a "Set Routing" button 414, and limit the mailbox size for the new mailbox account by pressing a "Mailbox Size" button 416. The procedures for setting the initial screen have previously been described. The procedures for setting the mailbox routing will be described in detail below.

With reference to FIG. 35, the user may alter hardware settings by pressing the Hardware Settings display location 270. Pressing the Hardware Settings display location 270 causes the IFAX 10 to expand the hardware settings list to that shown in the menu of the screen display of FIG. 64. The IFAX 10 displays the list of hardware setting options on the touch-sensitive display 24, and the prompt 48 instructs the user to select a desired set up topic and press the Change button 172.

Figure 64:
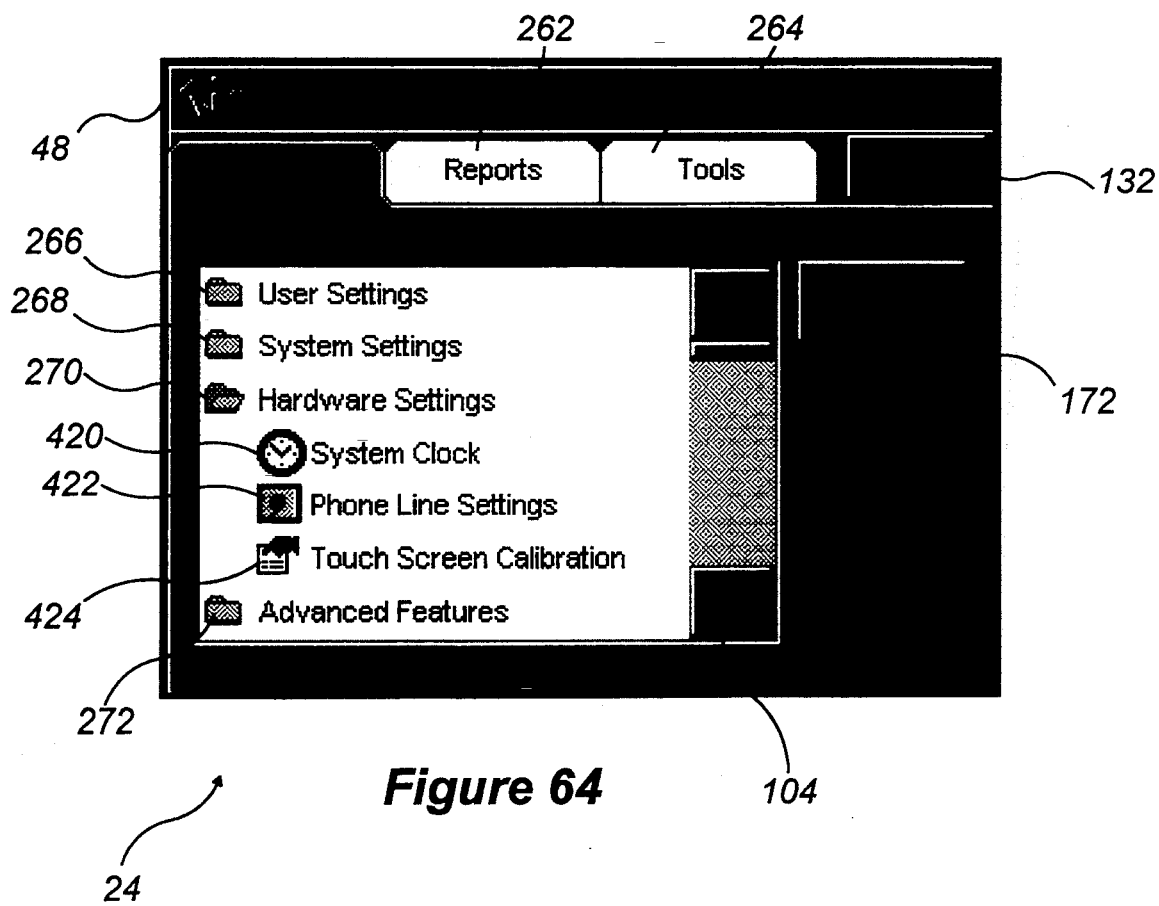
FIG. 64 is a screen display of the IFAX of FIG. 1 used to display and select options for hardware settings.
Figure 65:
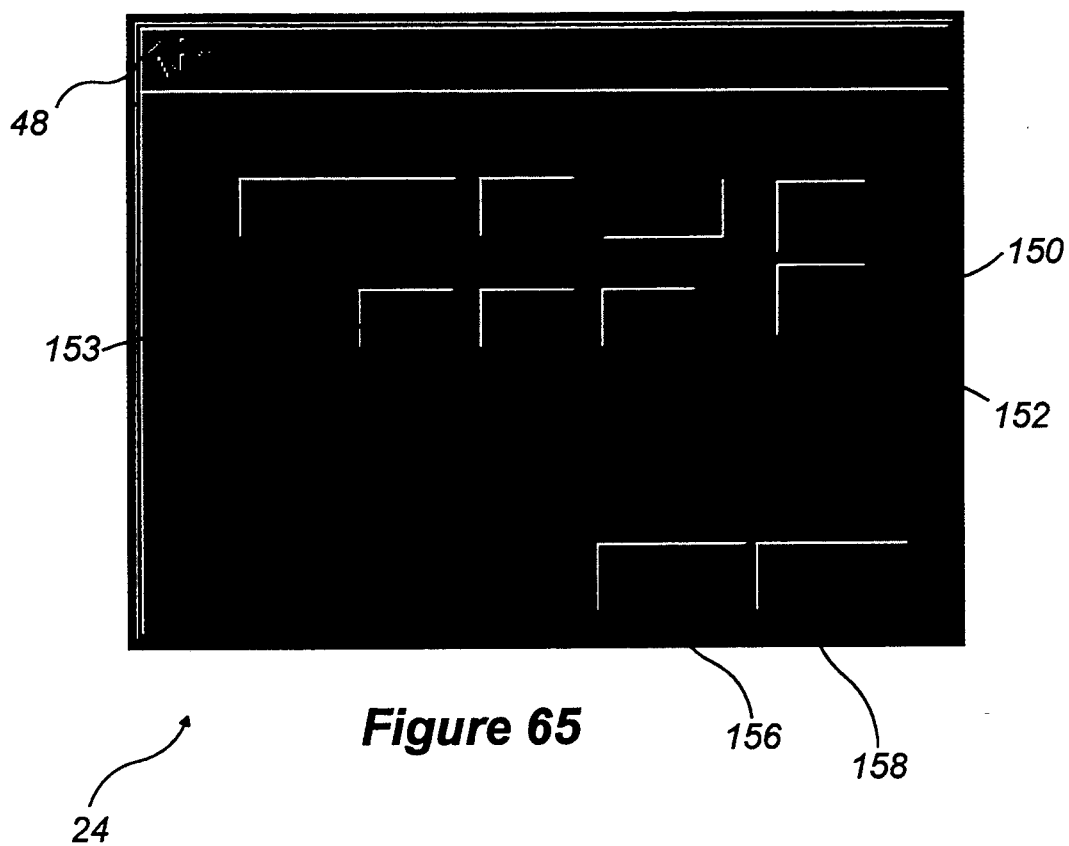
FIG. 65 is a screen display of the IFAX of FIG. 1 used to display and select time and date information.

The user may change the system clock parameters by pressing a "System Clock" display location 470 and the Change button 172, causing the IFAX to change to the screen display shown in FIG. 65. The user may change the date or time by selecting the appropriate parameter, such as the hour button 153, and using the time set arrows 150 to change the selected parameter. The prompt 48 instructs the user to change the desired settings and press the OK button 158. The user may cancel changes to the system clock setting at any time by pressing the Cancel button 156. Pressing the Cancel button 156 or the OK button 158 causes the IFAX 10 to return to the menu shown in the screen display of FIG. 64.

Figure 66:
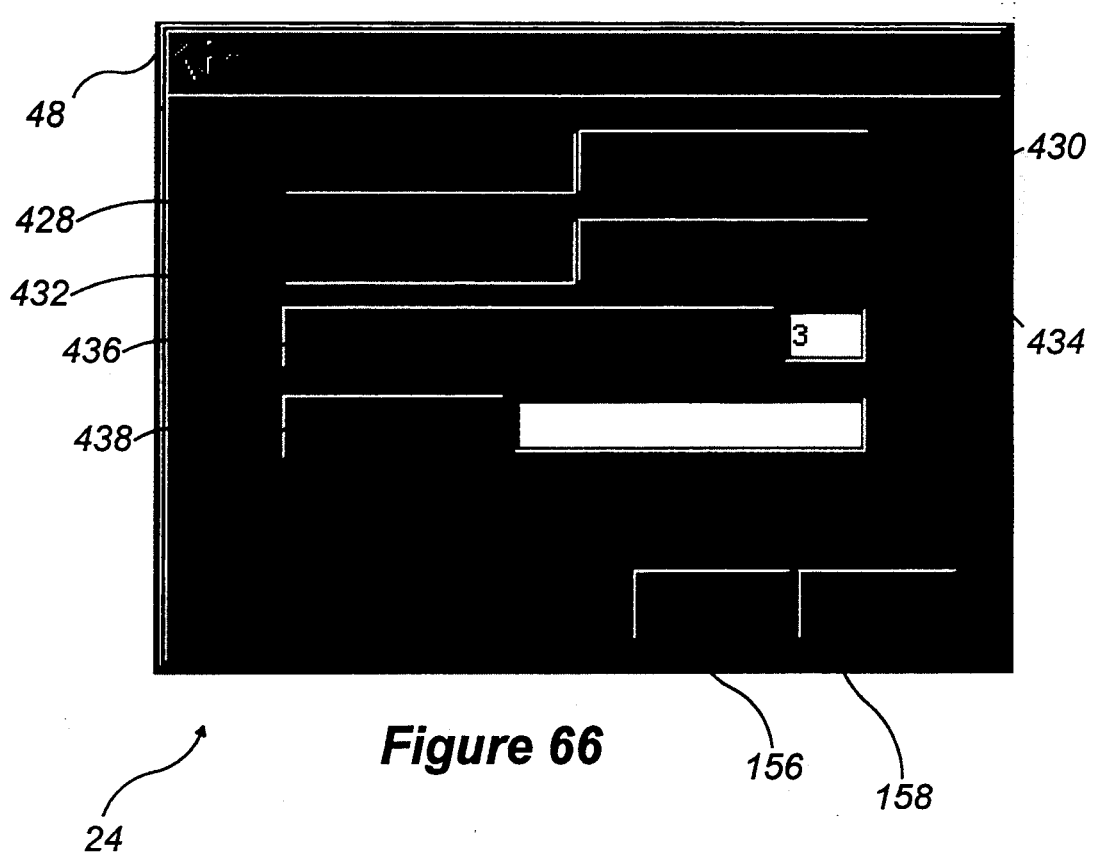
FIG. 66 is a screen display of the IFAX of FIG. 1 used to display and select phone line parameters.

With reference to FIG. 64, the user may change phone line settings by pressing a "Phone Line Settings" display location 422 and the Change button 172, causing the IFAX 10 to change to the screen display shown in FIG. 66. The prompt 48 instructs the user to change settings then press the OK button 158 to confirm the changes. The user may cancel changes to the phone line settings at any time by pressing the Cancel button 156. Pressing the cancel button 156 or the OK button 158 causes the IFAX 10 to return to the menu shown in the screen display of FIG. 64. As seen in FIG. 66, the user may specify whether the IFAX 10 will automatically or manually receive incoming facsimile messages by pressing an "Auto Receive" button 428 or a "Manual Receive" button 430. The user may also specify whether the IFAX 10 would use tone dialing or pulse dialing by press a "Tone Dial" button 432, or a "Pulse Dial" button 434. The user may specify the number of rings on the telephone line before the IFAX 10 answers an incoming call by pressing a "Number of Rings to Answer" button 436. Pressing the number of rings to answer button 436 causes the IFAX 10 to display the numeric keypad 80, and the prompt 48 instructs the user to select the desired number of rings. The user may also specify the dial prefix by pressing a "Dial Prefix" button 438. This feature may be used if the IFAX 10 must first dial a number such as the digit 9 to get an outside telephone line.

Figure 67:
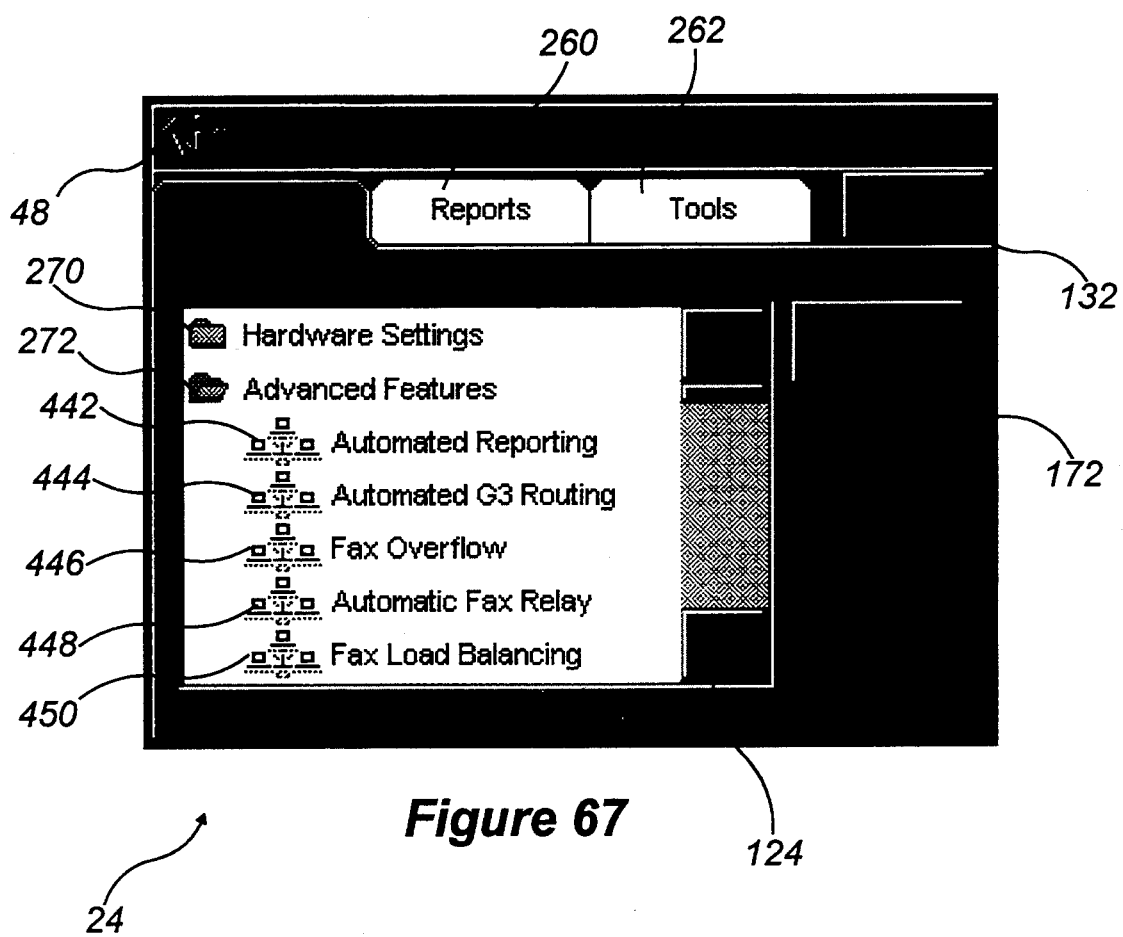
FIG. 67 is a screen display of the IFAX of FIG. 1 used to display and select options for advanced facsimile features.

Returning now to FIG. 35, the user can specify parameters associated with advanced facsimile features by pressing the Advanced Features display location 272. Pressing the Advanced Features display location 272 causes the IFAX 10 to display the list of parameters associated with the Advanced Features display location, as shown in FIG. 67. The IFAX 10 displays a list of advanced features on the touch-sensitive display 24. If the list of advanced features exceeds the display capacity of the touch-sensitive display 24, the user may use the arrow keys 104 to scroll through the list. The prompt 48 instructs the user to select the desired topic and press the Change button 172. The user may return to the main menu, shown in the screen display of FIG. 3, by pressing the Menu button 132.

Figure 68:
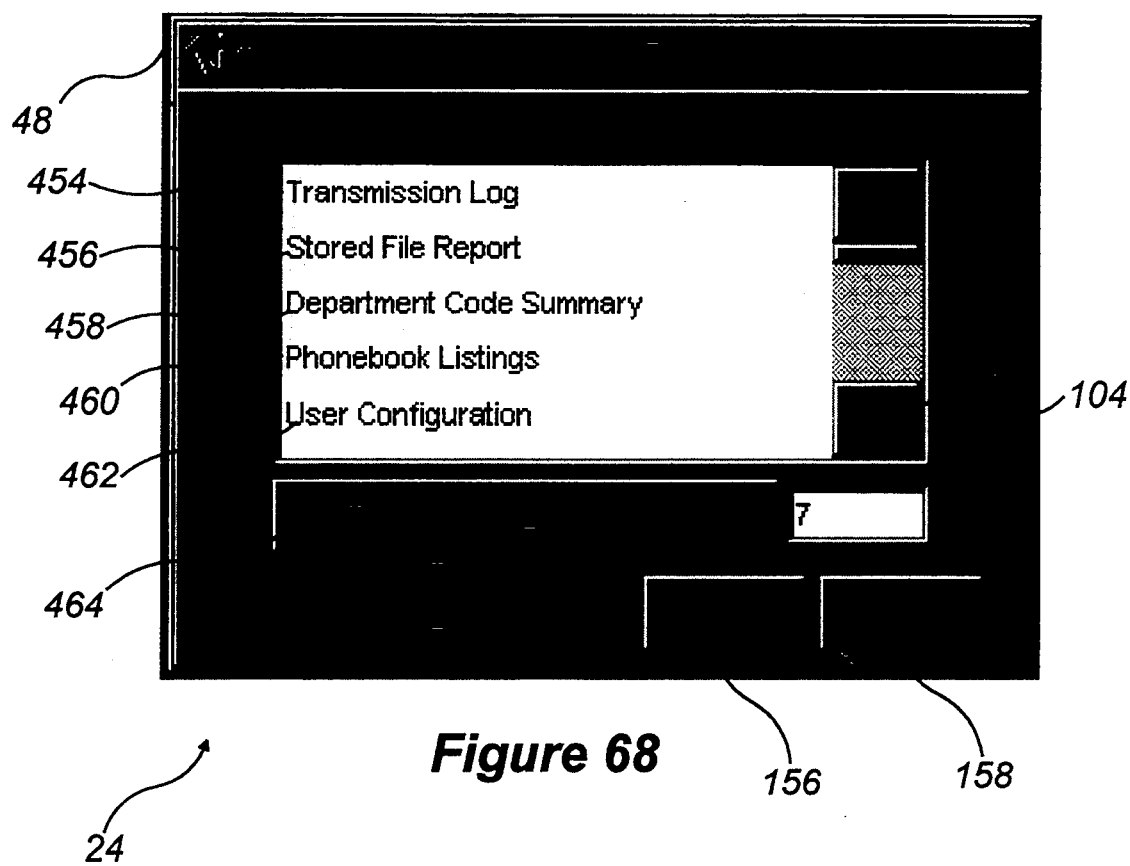
FIG. 68 is a screen display of the IFAX of FIG. 1 used to select automated reporting parameters.

The user may select automated reporting parameters by pressing an "Automated Reporting" display location 442 and the Change button 172, causing the IFAX 10 to change to the screen display shown in FIG. 68. The IFAX 10 displays a list of possible reports and allows the user to select the time interval at which reports will be generated. If the list of possible reports exceeds the display capacity of the touch-sensitive display 24, the user may use the arrow keys 104 to scroll through the list. The user may select reports relating to transmitted outgoing facsimiles by pressing a "Transmission Log" display location 454. The user may also obtain information about stored facsimile messages by pressing a "Stored File Report" display location 456. Information relating to a particular department's usage of the IFAX 10 may be obtained by pressing a "Department Code Summary" display location 458. The user may also print the phonebook listings by pressing a "Phonebook Listings" display location 460 or obtain user configuration information by pressing a "User Configuration" display location 462. The user may specify the frequency with which any of these reports are generated by pressing a "Send Reports Every X Days" button 464. The prompt 48 instructs the user to change automated report settings and press the OK button 158 to confirm changes. The user may cancel changes to the automated reporting parameters at any time by pressing the Cancel button 156. Pressing the Cancel button 156 or the OK button 158 causes the IFAX 10 to return to the menu shown in the screen display of FIG. 67. In the example shown in FIG. 68, reports are generated every seven days. However, the user may wish to have certain reports, such as the transmission log, generated on a daily basis. This option may be selected by pressing the Transmission Log display location 454, and the Send Reports Every X Days button 464. Pressing the Send Reports Every X Days button 464 causes the IFAX 10 to display the numeric keypad 80, and the prompt 48 instructs the user to select the desired period for transmission log reports to be generated.

Figure 69:
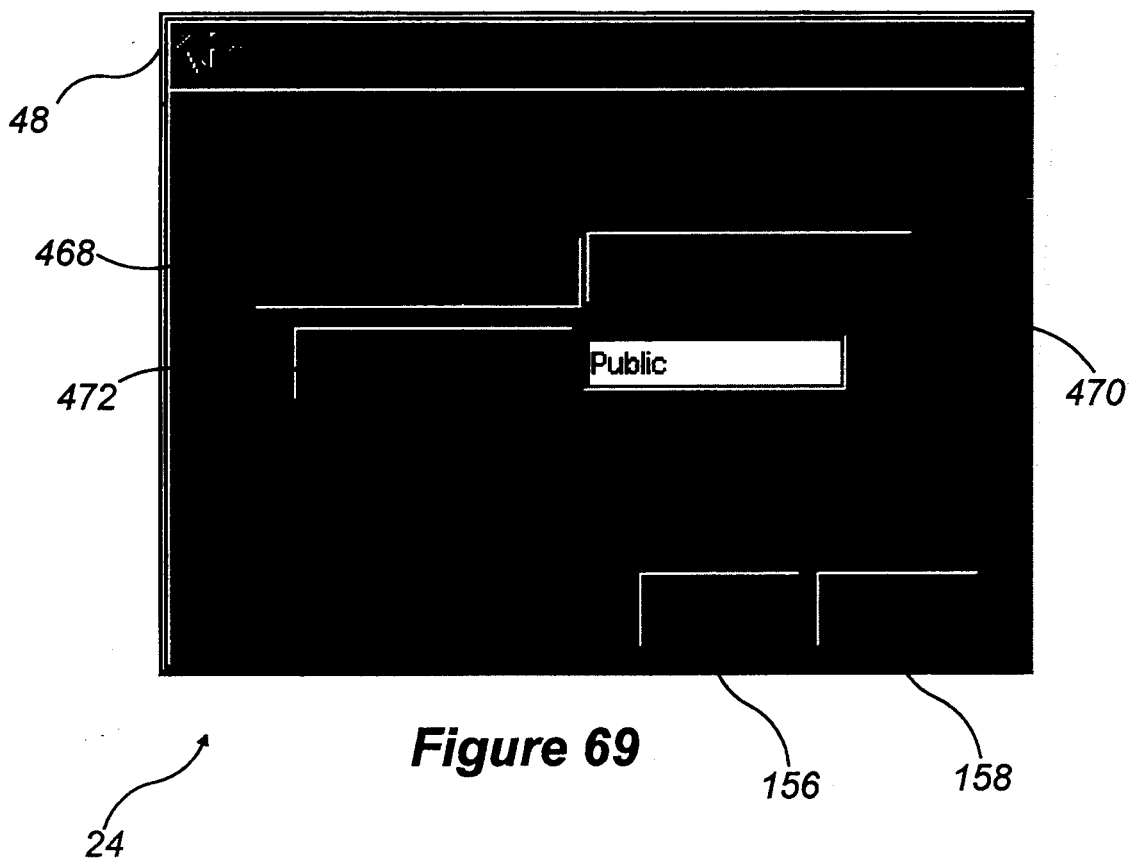
FIG. 69 is a screen display of the IFAX of FIG. 1 used to display and select automated G3 facsimile message routing.

Returning now to the menu shown in the screen display of FIG. 67, the user may select parameters associated with automated facsimile routing by pressing an "Automated G3 Routing" display location 444 and the Change button 172 causing the IFAX 10 to change to the screen display shown in FIG. 69. The user may specify that incoming G3 facsimile messages be routed to the user mailbox or the tool box application by pressing a "User's Mailbox" button 468 or a "Tool Box Application" button 470. The user may specify the mailbox owner by pressing a "Mailbox Owner" button 472. Pressing the Mailbox Owner button 472 causes the IFAX 10 to display the typewriter keyboard 86, and the prompt 48 instructs the user to enter the name of the mailbox owner. The prompt 48 instructs the user to change settings and touch the OK button 158 to confirm changes to the facsimile routing. The user may cancel changes to the facsimile routing at any time by pressing the Cancel button 156. Pressing the Cancel button 156 or the OK button 158 causes the IFAX 10 to return to the menu shown in the screen display of FIG. 67.

Figure 70:
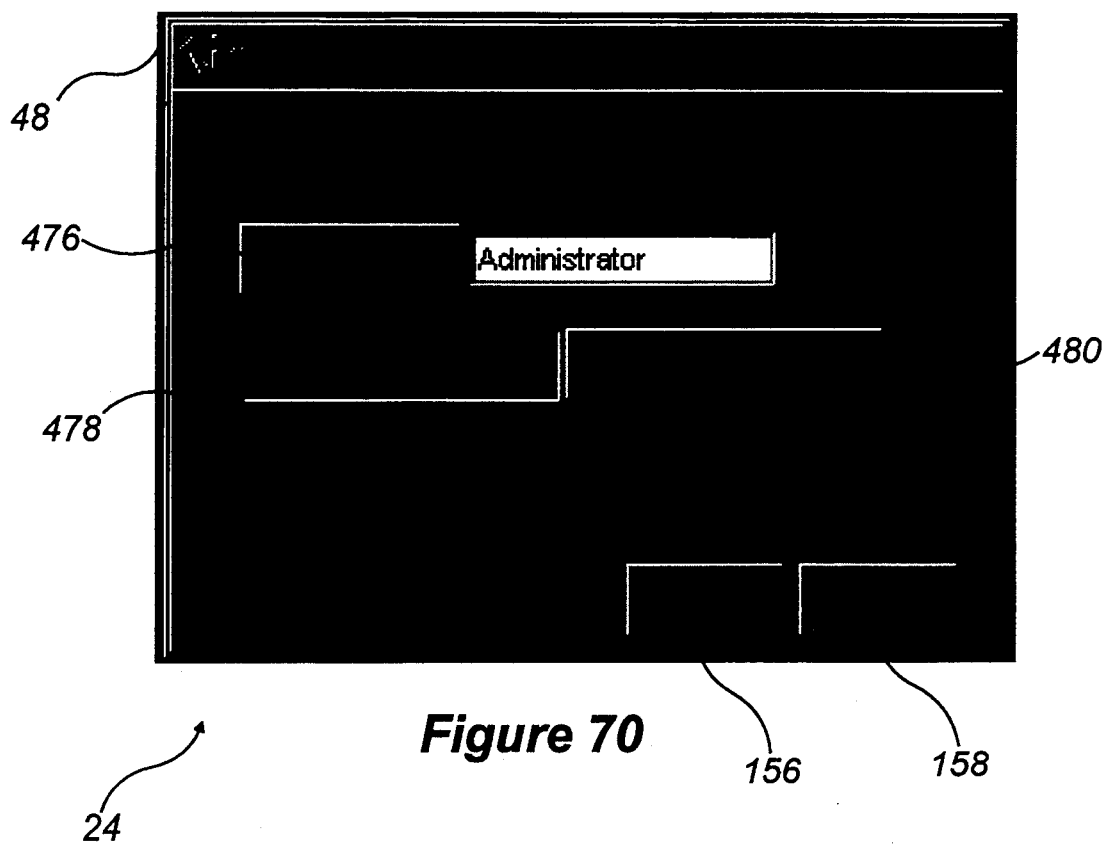
FIG. 70 is a screen display of the IFAX of FIG. 1 used to display and select parameters related to facsimile message overflow.

With reference to FIG. 67, the user may specify procedures for handling facsimile overflows by pressing a "Fax Overflow" display location 446 and the Change button 172 causing the IFAX 10 to change to the screen display shown in FIG. 70. The prompt 48 instructs the user to change settings and touch the OK button 158 to confirm changes to the fax overflow handling procedure. The user may cancel changes to the fax overflow handling procedures at any time by pressing the Cancel button 156. Pressing the Cancel button 156 or the OK button 158 causes the IFAX 10 to return to the menu shown in the screen display of FIG. 67. If the IFAX 10 has incoming facsimile messages that exceed the storage capacity of the inbox 70 (see FIG. 2), an overflow situation exists. The IFAX 10 can be programmed to notify a selected individual in the event of overflow by pressing a "Notify User" button 476 shown in FIG. 70. Pressing the Notify User button 476 causes the IFAX 10 to display the typewriter keyboard 86, and the prompt 48 instructs the user to enter the name of the person to receive overflow notification. The user may also specify overflow handling procedures by pressing a "Do Not Answer" button 478 or a "Route Faxes to PC" button 480. If the IFAX 10 is coupled to a personal computer (PC) (not shown) or other computer through a commercial line or a local area network interface 30 (see FIG. 1), overflow messages may be routed directly to the PC. If the IFAX 10 is not coupled to a PC, or the user does not wish to have overflow messages routed to the PC, the user may press the Do Not Answer button 478. If the Do Not Answer button 478 is selected, the IFAX 10 will not answer the telephone for an incoming facsimile message until the overload in the inbox 70 has been eliminated by deleting, printing, forwarding, or saving facsimile messages stored in the Inbox. In the example of FIG. 70, the Do Not Answer button 478 is shown in the depressed position, indicating the selection of this fax overflow handling procedure.

Figure 71:
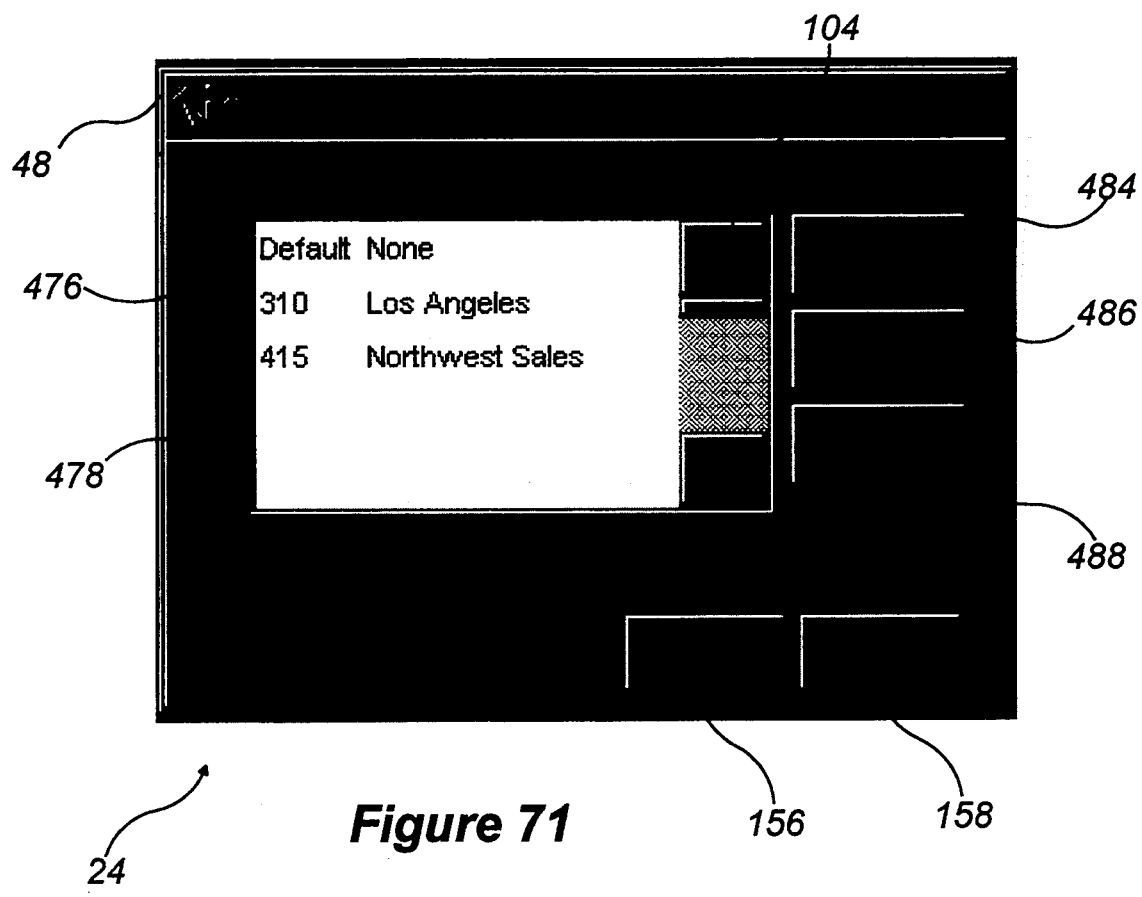
FIG. 71 is a screen display of the IFAX of FIG. 1 used to display and select automatic facsimile message relay parameters.

With reference to FIG. 67, the user may specify automated fax relay parameters by pressing an "Automatic Fax Relay" display location 448 and the Change button 172 causing the IFAX 10 to change the display shown in FIG. 71. The IFAX 10 displays a list of automatic fax relay options on the touch-sensitive display 24. If the number of automatic fax relay options exceeds the display capacity of the touch-sensitive display 24, the user may use the arrow keys 104 to scroll through the list. The prompt 48 instructs the user to change the desired settings and touch the OK button 158 to confirm changes in the automatic fax relay parameters. The user may cancel changes to the automated fax relay parameters at any time by pressing the Cancel button 156. Pressing the Cancel button 156 or the OK button 158 causes the IFAX 10 to return to the menu shown in the screen display of FIG. 67. As seen in FIG. 71, the user may add additional fax relay locations by pressing an "Add" button 484, edit existing fax relay locations by selecting the desired fax relay location and pressing an "Edit" button 486, or remove automatic fax relay locations by selecting the desired location and pressing a "Remove" button 488. The automatic fax relay option permits the IFAX 10 to automatically forward facsimile messages to a predetermined location.

Figure 72:
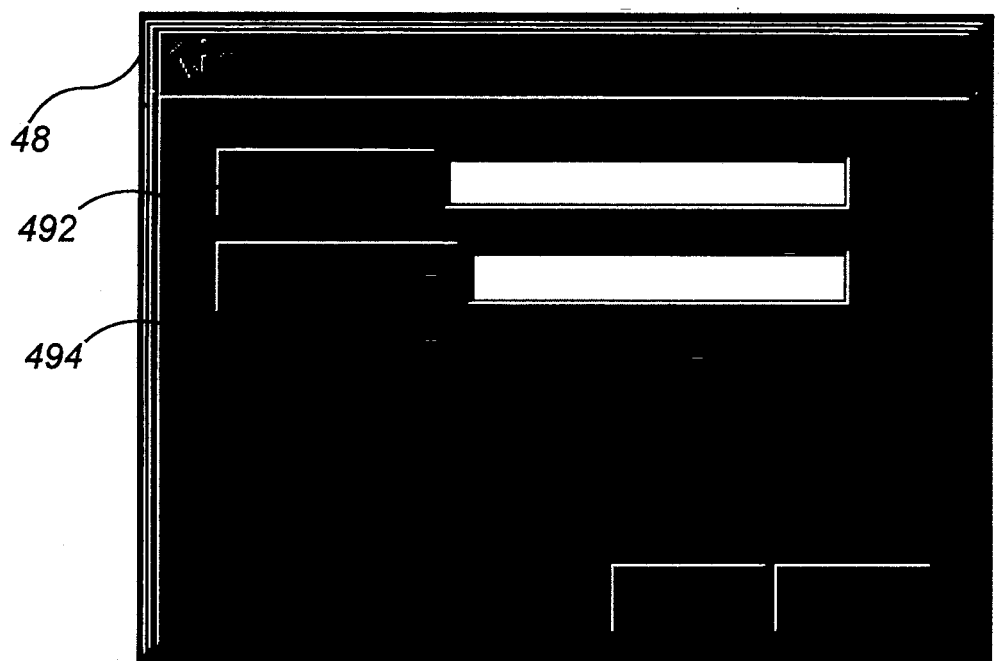
FIG. 72 is a screen display of the IFAX of FIG. 1 used to add additional facsimile relay information to the list of FIG. 71.

If the user presses the Add button 484, the IFAX 10 changes to the display shown in FIG. 72. Still referring to FIG. 72, the user may specify the dial prefix of the automatic relay location by pressing a "Dial Prefix" button 492. Pressing the Dial Prefix button 492 causes the IFAX 10 to display the numeric keypad 80, and the prompt 48 instructs the user to enter the desired dial prefix. The user enters the name of the automatic relay location by pressing a "Relay Station" button 494. Pressing the Relay Station button 494 causes the IFAX 10 to display the typewriter keyboard 86, and the prompt 48 instructs the user to enter the name of the automatic relay location. The prompt 48 instructs the user to change the settings and touch the OK button 158 to confirm changes in the automatic relay location. The user may cancel the addition of a new relay location at any time by pressing the cancel button 156. Pressing the cancel button 156 or the OK button 158 causes the IFAX 10 to return to the screen display of FIG. 71.

Figure 73:
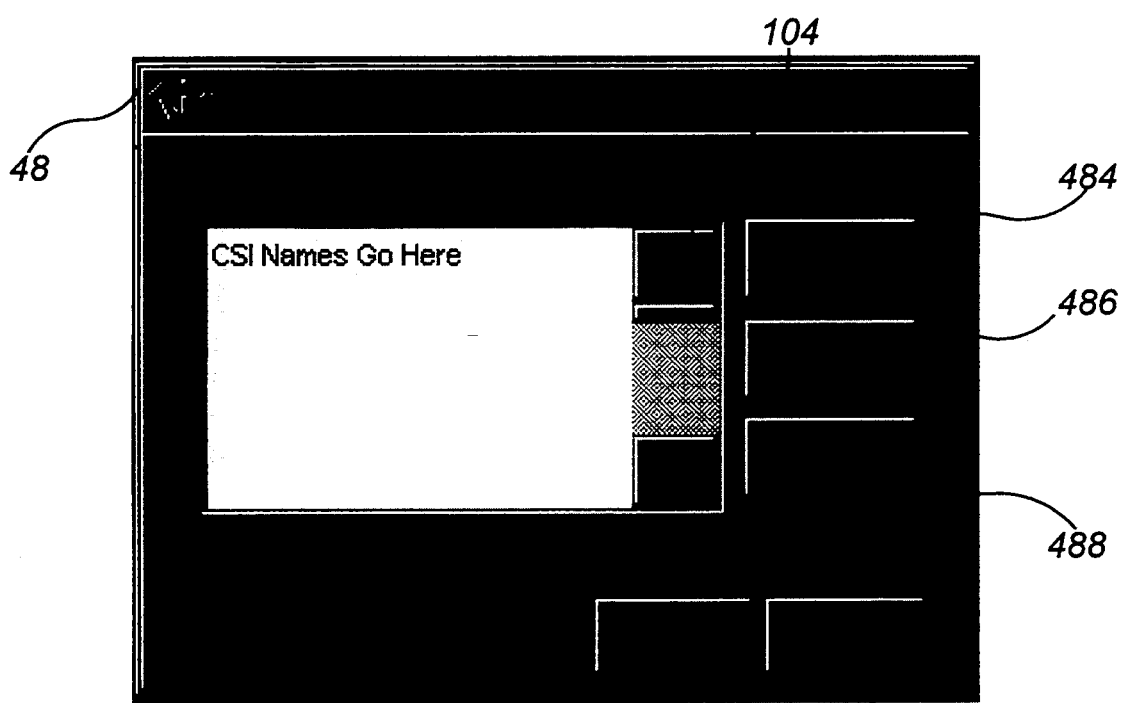
FIG. 73 is a screen display of the IFAX of FIG. 1 used to display and select facsimile load balancing parameters.

With reference to FIG. 67, the user may specify facsimile load balancing by pressing a "Fax Load Balancing" display location 450 and the Change button 172, causing the IFAX 10 to change to the screen display shown in FIG. 73. Facsimile load balancing permits two or more IFAXs 10 coupled together to share the work load for more efficient facsimile message processing. The IFAXs 10 may be coupled together on a local area network through the LAN interface 30 (see FIG. 1), or other suitable interface connection. If the IFAX 10 has a large number of outgoing facsimiles stored in the outbox 72 (see FIG. 2), the IFAX may transfer one or more outgoing facsimile messages to a second IFAX to more effectively balance the work load. Similarly, if the IFAX 10 has a number of facsimile messages stored in the outbox 72 (see FIG. 2), and the IFAX 10 receives an incoming facsimile message, the IFAX may again transfer one or more of the outgoing facsimile messages to a second IFAX to more effectively balance the work load. The prompt 48 instructs the user to change settings and press the OK button 158 to confirm changes in the facsimile load balancing. The user may cancel changes in the facsimile load balancing at any time by pressing the Cancel button 156. Pressing the Cancel button 156 or the OK button 158 causes the IFAX 10 to return to the menu shown in the screen display of FIG. 67.

As seen in FIG. 73, the user may add the name of another IFAX 10 by pressing the Add button 484. The user may edit information about an existing IFAX by selecting the desired IFAX and pressing the Edit button 486. User may also remove an IFAX from the list shown in FIG. 73 by selecting the desired IFAX and pressing the Remove button 488.

Figure 74:
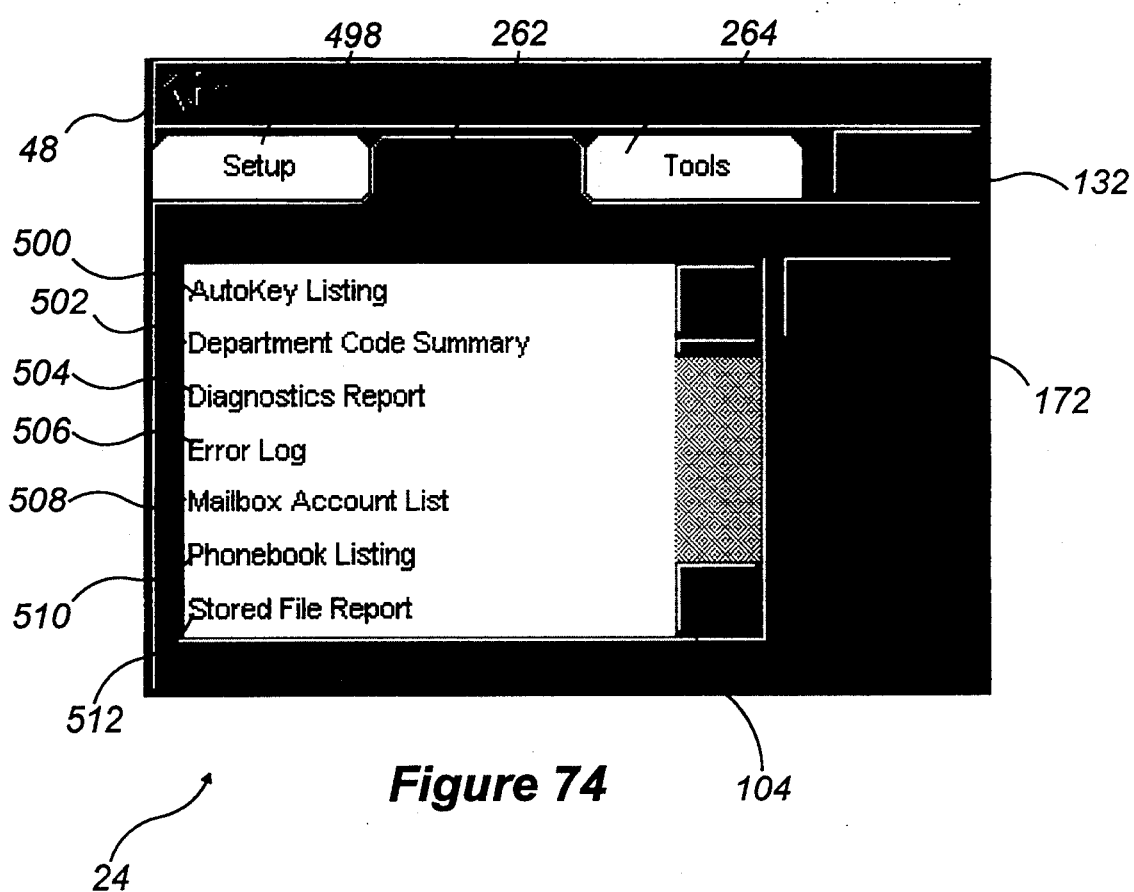
FIG. 74 is a screen display of the IFAX of FIG. 1 used to display and select options for IFAX reports.

Returning now to FIG. 35, the user may select the reports menu from the Toolbox 56 (see FIG. 2) by pressing the Reports button 262, causing the IFAX 10 to display the menu shown in the screen display of FIG. 74. The IFAX 10 displays a list of report options on the touch-sensitive display 24. If the number of report options exceeds the display capacity, of the touch-sensitive display 24, the user can use the arrow keys 104 to scroll through the list. The prompt 48 instructs the user to touch the desired report names and press the Print button 172. The user may return to the main menu, shown in FIG. 3, by pressing the Menu button 132. The user may print a list of all autokey functions by pressing an "Autokey listing" display location 500. A department code summary listing may be printed by pressing a "Department Code Summary" display location 502. A diagnostic report may be printed by pressing a "Diagnostics Report" display location 504. The error log may be printed by pressing an "Error Log" display location 506. A list of all mailbox accounts may be printed by pressing a "Mailbox Account List" display location 508. The contents of a phonebook listing may be printed by pressing a "Phonebook Listing" display location 510. A report on stored facsimile message files may be printed by pressing a "Stored File Report" display location 512.

Figure 75:
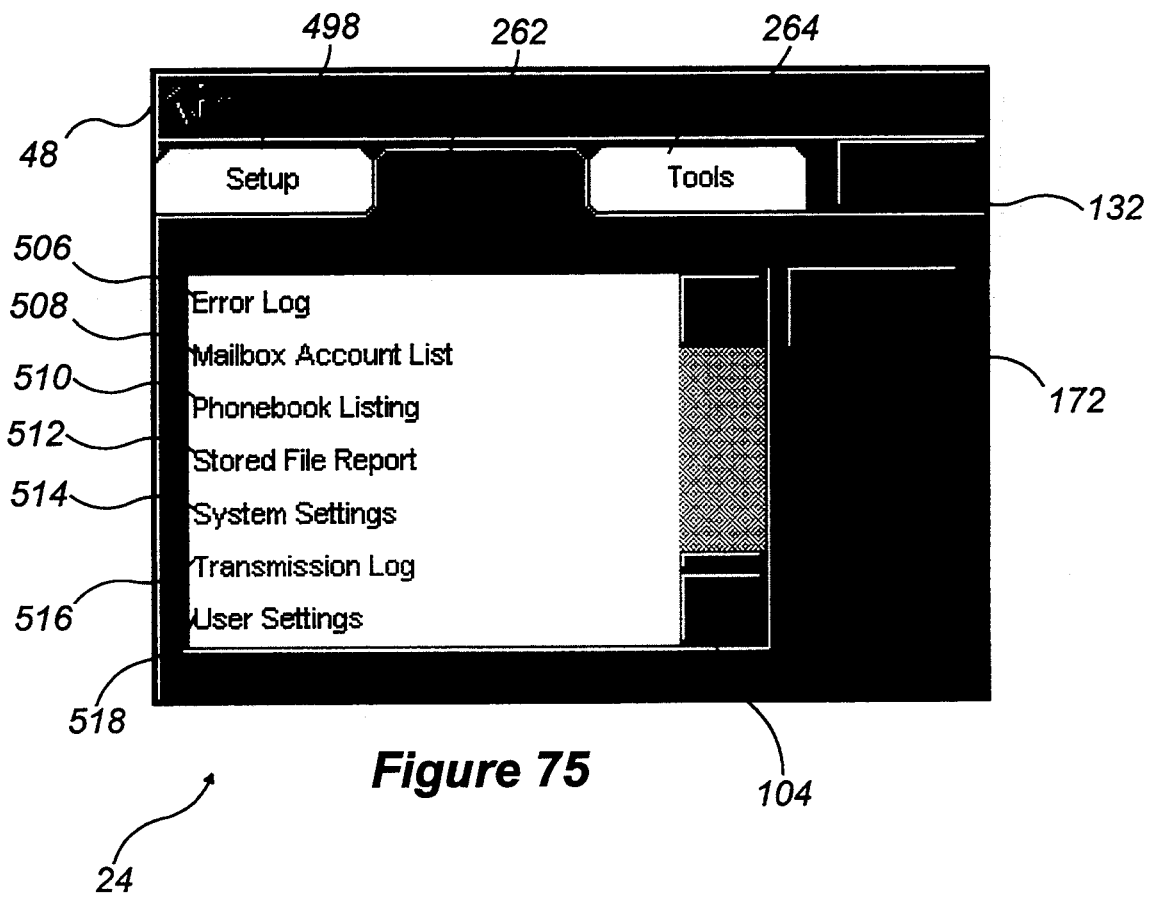
FIG. 75 is a screen display of the IFAX of FIG. 1 used to display and select additional IFAX reports.

The user can press the down arrow key to show additional report options, as shown in FIG. 75. The user may print the system settings by pressing a "System Settings" display location 514. The user may print a copy of the transmission log by pressing a "Transmission Log" display location 516. The user may also print a copy of the user settings by pressing a "User Settings" display location 518.

Figure 76:
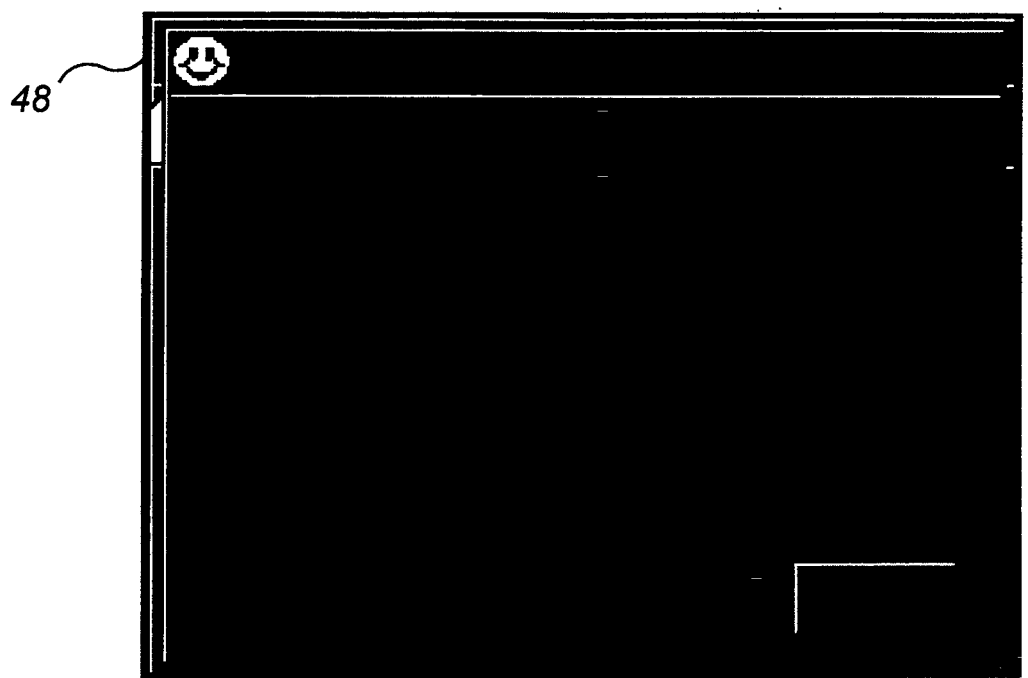
FIG. 76 is a screen display of the IFAX of FIG. 1 used to display an error message to the user.

If the user presses the Print button 172 without selecting any reports from the list displayed on the touch-sensitive display 24, the IFAX 10 generates an error message, shown in FIG. 76, instructing the user to first select a report in the list, then press the Print button 172. The user presses the OK button 158 to confirm the error message and return to the previous menu shown in the screen display of FIG. 74 or FIG. 75.

Figure 77:
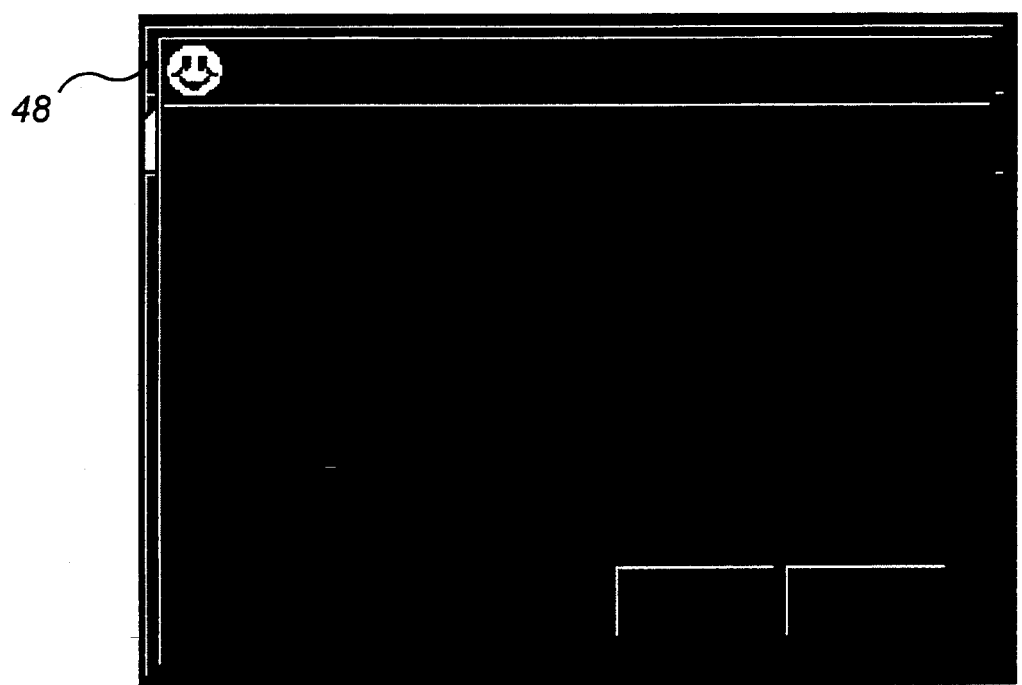
FIG. 77 is a screen display of the IFAX of FIG. 1 used to confirm printing of a selected IFAX report.

The user selects a desired report listing, such as by pressing the Error Log display location 506, and pressing the Print button 172, causing the IFAX 10 to display the printing confirmation message shown in FIG. 77. The prompt 48 indicates that the IFAX 10 is operating satisfactorily. The user may stop the printing by pressing the Stop button 240, or may press the Continue button 242 to perform other operations on the IFAX 10.

Figure 78:
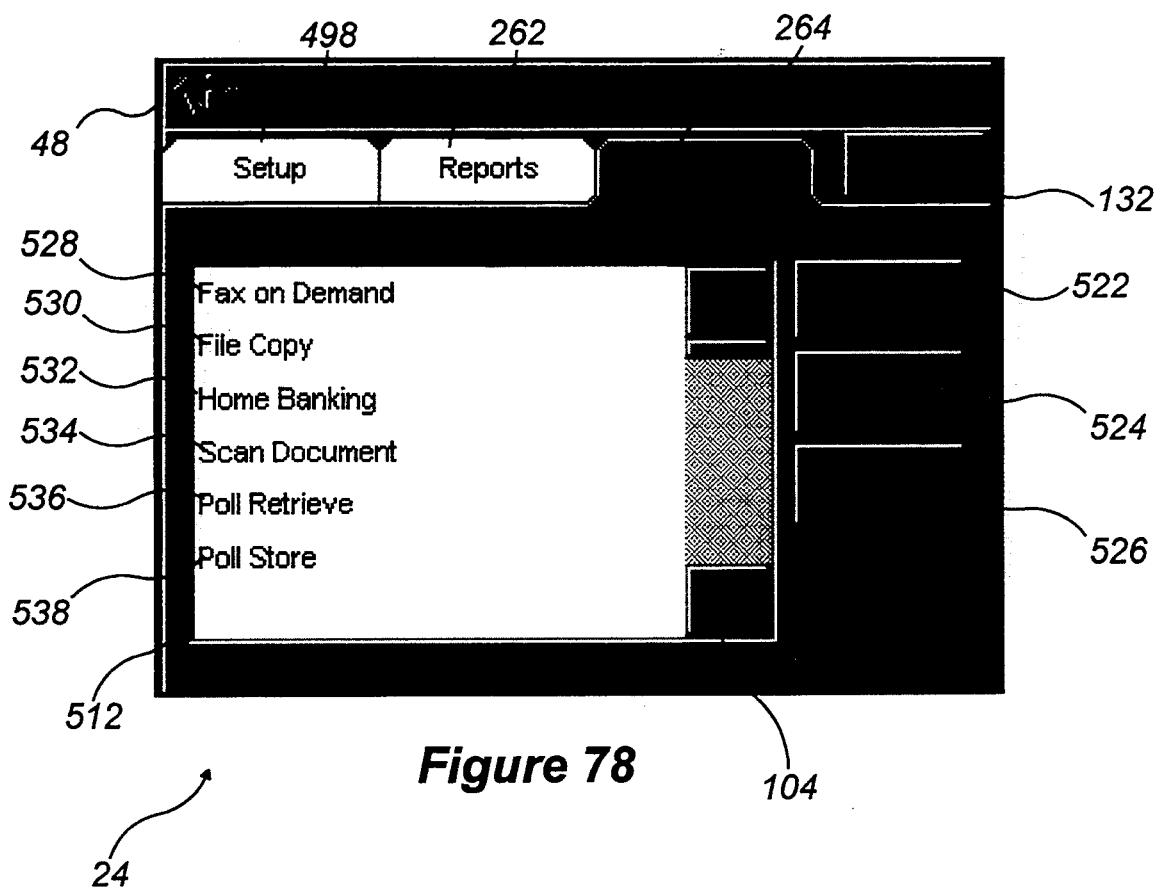
FIG. 78 is a screen display of the IFAX of FIG. 1 used to display and select options for IFAX tools.

Returning now to FIG. 35, the user may select a tools menu by pressing the Tools button 264, causing the IFAX 10 to display the tools menu shown in the screen display of FIG. 78. The IFAX 10 displays a list of the IFAX tool applications on the touch-sensitive display 24. If the number of IFAX tool applications exceeds the display capacity of the touch-sensitive display 24, the user may use the arrow keys 104 to scroll through the list. The prompt 48 instructs the user to touch the desired application and press a "Start" button 522 to run the selected application. The user may return to the main menu shown in FIG. 3, by pressing the Menu button 132. Alternatively, the user may switch to the reports menu of FIG. 74 by pressing the Reports button 262, or the set-up menu of FIG. 54 by pressing the Set-up button 498.

The user install a new tools application by pressing a "Install New" button 524 causing the IFAX to search for a new tools application. The user may remove an existing IFAX tools application by selecting the desired application and pressing a "Remove" button 526.

Figure 79:
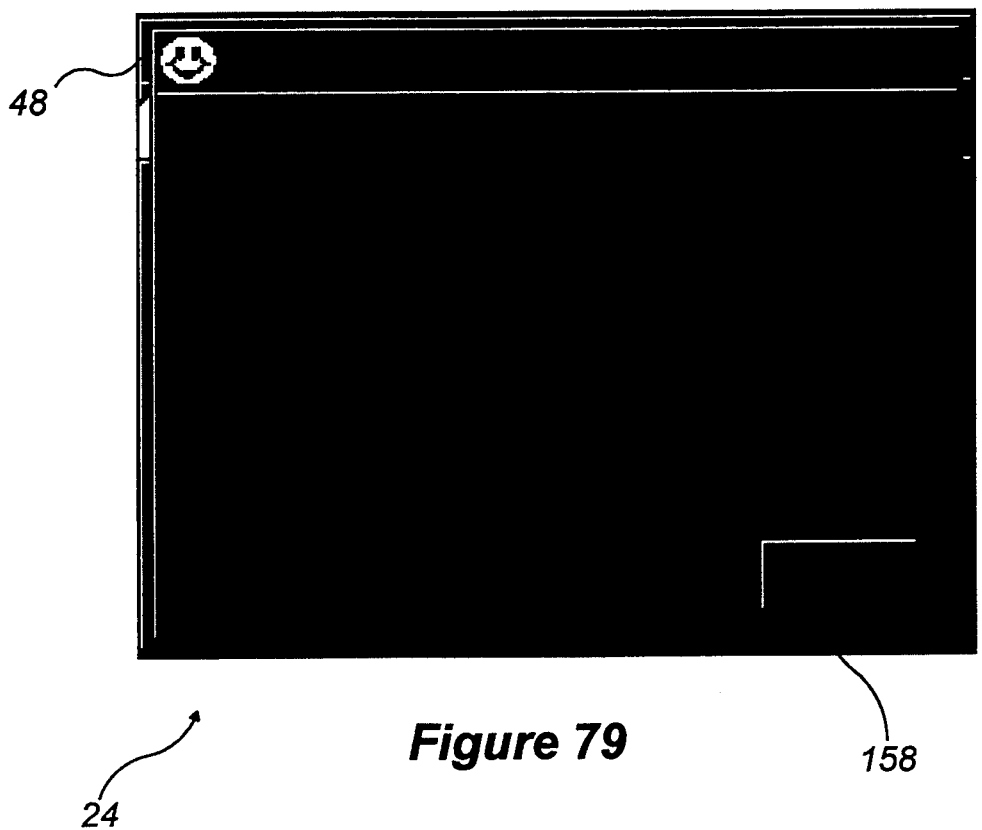
FIG. 79 is a screen display of the IFAX of FIG. 1 used to display an error message to the user.

If the user presses the Start button 522 without previously selecting a desired IFAX tool application, the IFAX 10 displays the error message of FIG. 79 instructing the user to first select a tool application and the press the start button 522. The user presses the OK button 158 to confirm the error message and to return to the menu shown in the screen display of FIG. 78. The user may execute a fax on demand application by pressing a "Fax on Demand" display location 528.

Figure 80:
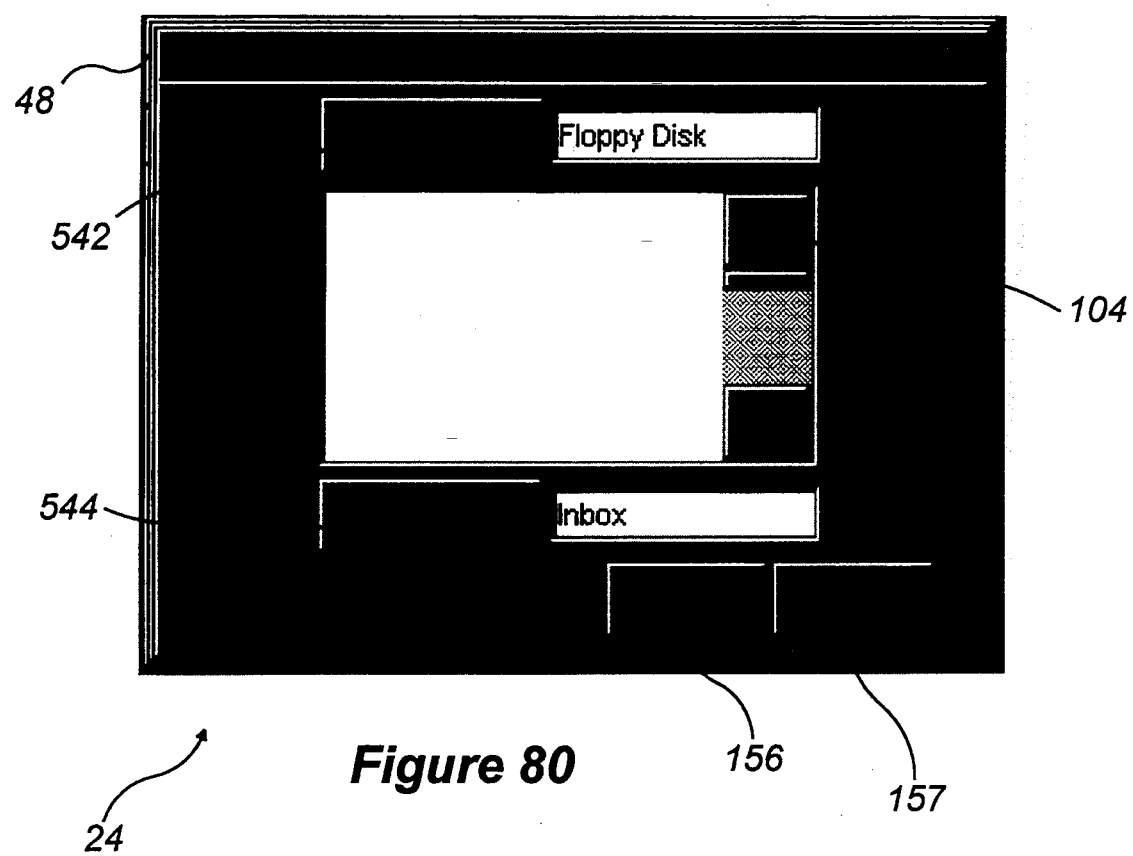
FIG. 80 is a screen display of the IFAX of FIG. 1 used to display and select options for copying a facsimile message.
Figure 81:
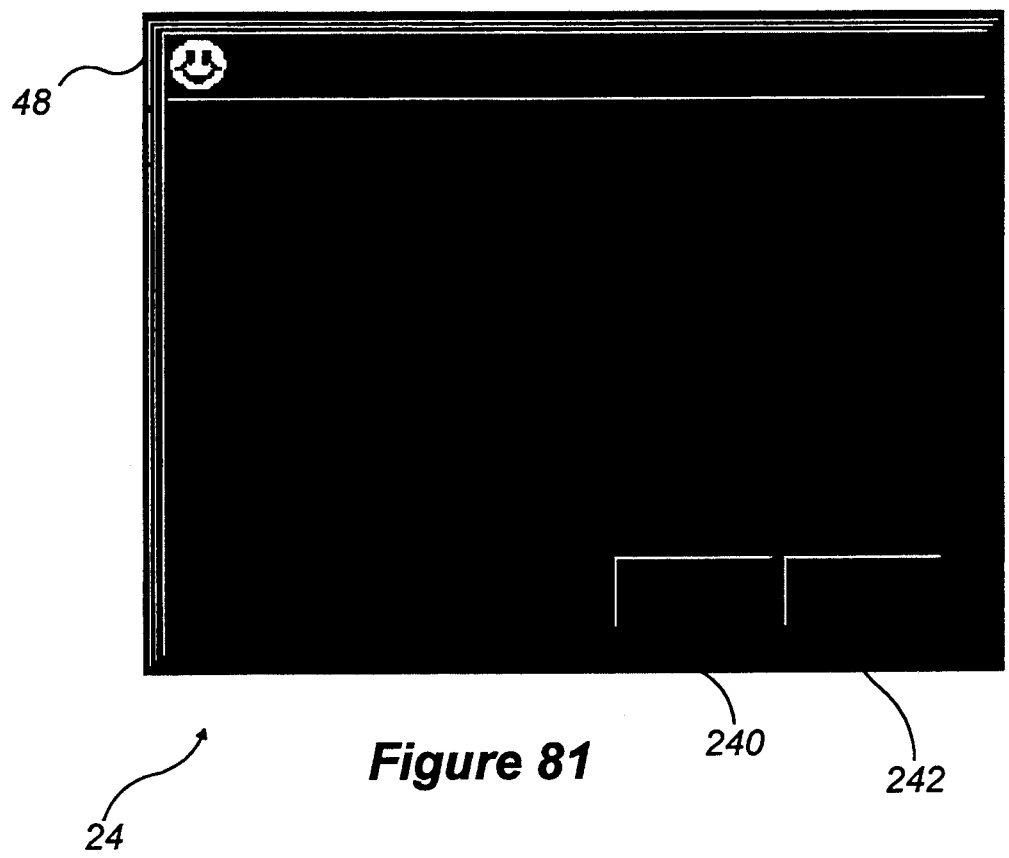
FIG. 81 is a screen display of the IFAX of FIG. 1 used to confirm copying of a selected facsimile message.

Still referring to FIG. 78, the user may use the IFAX 10 to copy files from a user-specified source to a user-specified destination by pressing a "File Copy" display location 530. If the user selects the File Copy display location 530 and presses Start button 522, the IFAX 10 changes to the screen display of FIG. 80. The prompt 48 instructs the user to select a source, a file name and a destination, and to touch the Start button 157. The user can cancel the copy in process at any time and return to the menu shown in the screen display of FIG. 78 by pressing the Cancel button 156. The user may specify, a file source by pressing a "Copy From" button 542 and specify a copy destination by pressing a "Copy To" button 544. Pressing either the Copy From button 542 or the Copy To button 544 causes the IFAX 10 to display the typewriter keyboard 86, and the prompt 48 instructs the user to enter the appropriate information. In the example of FIG. 80, the file to be copied is stored on a floppy disk or other file storage unit 28 (see FIG. 1), which is a part of the IFAX 10. The IFAX 10 displays a list of the files contained within the selected source on the touch-sensitive display 24. If the number of files contained in the selected source exceeds the display capacity of the touch-sensitive display 24, the user may use the arrow keys 104 to scroll through the list. When the user has selected a source, file and destination and touched the start button 157, the IFAX 10 displays the confirmation message shown in FIG. 81 indicating that the files are being copied. The user may stop the copying process by pressing the Stop button 240, or may press the Continue button 242 to perform other operations on the IFAX 10.

Returning to the menu shown in the screen display of FIG. 78, the user may select other IFAX tool applications such as home banking by pressing a "Home Banking" display location 533, and the Start button 522. The user may also scan a document by pressing a "Scan Document" display location 534 and the Start button 522, causing the IFAX 10 to change to the screen display shown in FIG. 82. The prompt 48 instructs the user to select a source file and a destination and to touch the Start button 157. The user may stop the scanning process and return to the menu shown in the screen display of FIG. 78 by pressing the Cancel button 156. The user specifies a destination for the scanned document by pressing a "Scan To" button 548. The user can specify the name of the document by pressing a "Document Name" button 550.

Figure 82:
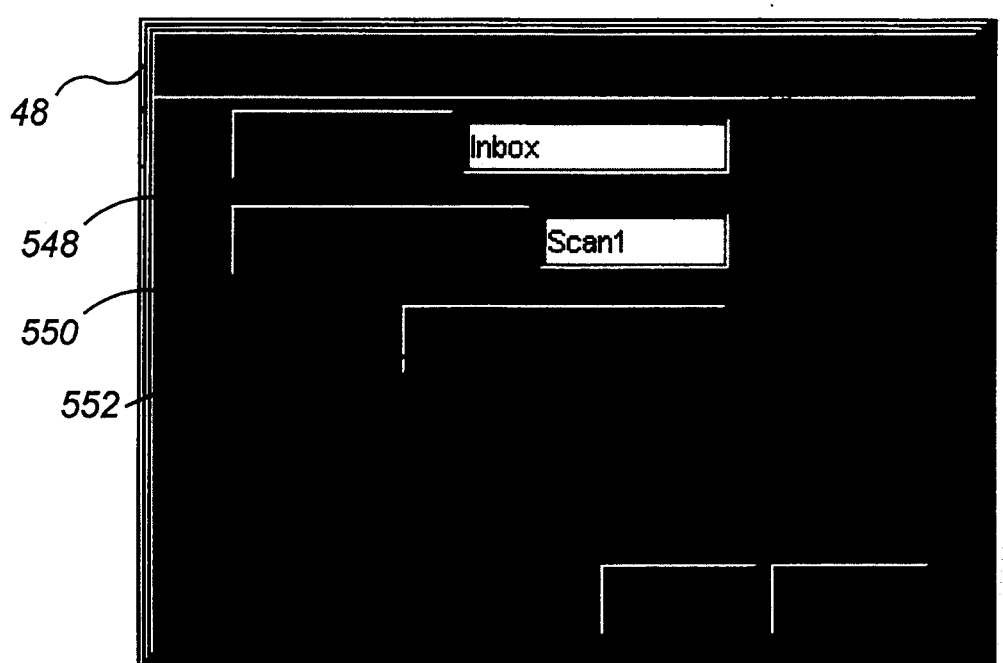
FIG. 82 is a screen display of the IFAX of FIG. 1 used to display and select options for scanning a document.
Figure 83:
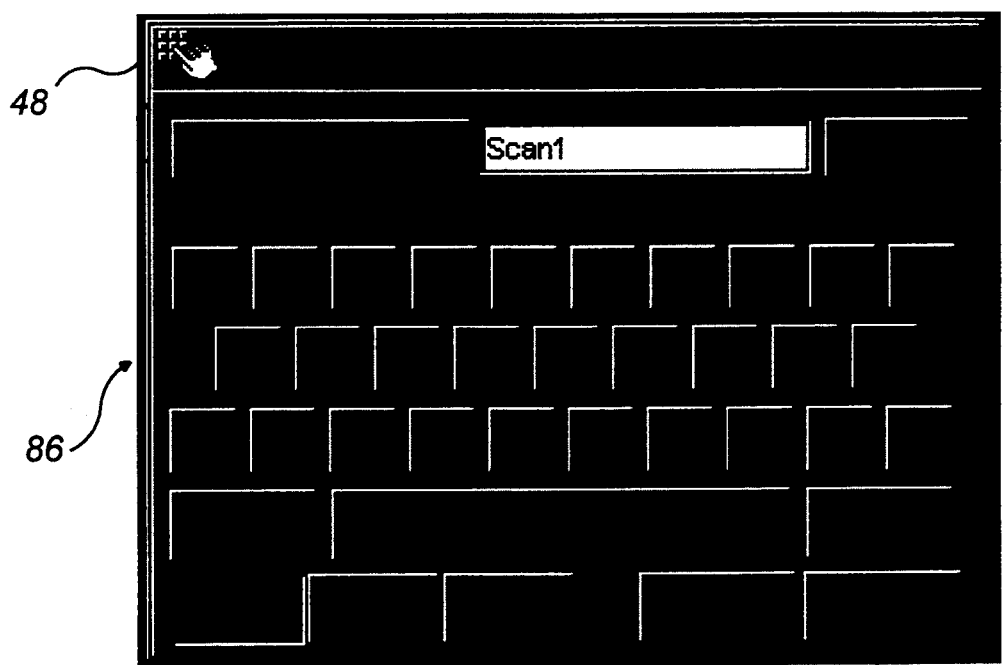
FIG. 83 is a screen display of the FAX of FIG. 1 used to enter the name of the document scanned in the screen display of Fibre 82.
Figure 84:
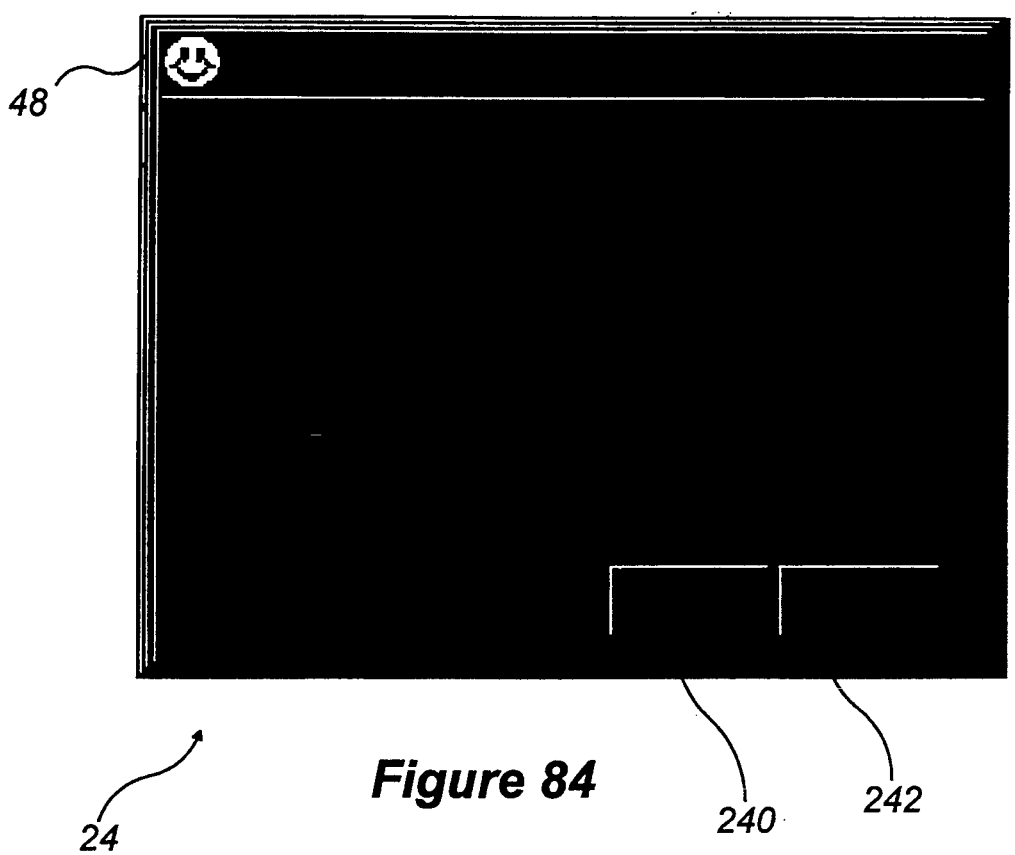
FIG. 84 is a screen display of the IFAX of FIG. 1 confirming scanning of a selected facsimile message.

The user may also adjust the settings of the scanner by pressing a "Set Scanner Settings" button 552. Pressing the Set Scanner Settings button 552 causes the IFAX 10 to change to the previously discussed screen display shown in FIG. 19, and the prompt 48 and instructs the user to select the desired scanner settings. With reference to FIG. 82, if the user presses the Document Name button 550, the IFAX 10 displays the typewriter keyboard 86 shown in FIG. 83. The prompt 48 instructs the user to use the typewriter keyboard 86 to enter the document name and to press the OK button 158 to confirm the document name. The user may cancel naming a scanned document and return to the menu shown in the screen display of FIG. 82 by pressing the Cancel button 156. If the user has selected a destination and document name and pressed the Start button 157, the IFAX 10 displays the confirmation message shown in FIG. 84 indicating that the document is being scanned. The user may stop the scanning process and return to the menu shown in the screen display of FIG. 78 by pressing the Stop button 240, or may press the Continue button 242 to perform other operations on the IFAX 10.

With reference to the menu shown in the screen display of FIG. 78, the user may select a poll retrieve IFAX tool application by pressing a "Poll Retrieve" display location 536 or a poll store IFAX tool application by pressing a "Poll Store" display location 538, and the start button 522.

Figure 85:
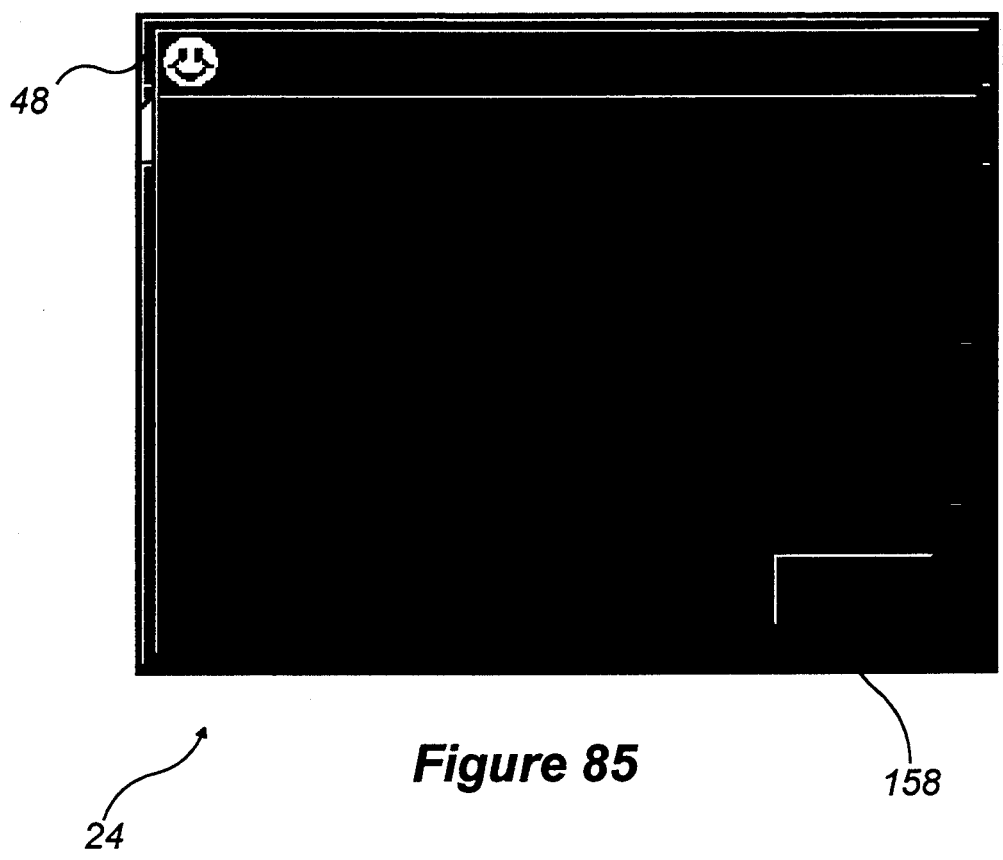
FIG. 85 is a screen display of the IFAX of FIG. 1 displayed when installing a new IFAX tool in FIG. 78.
Figure 86:
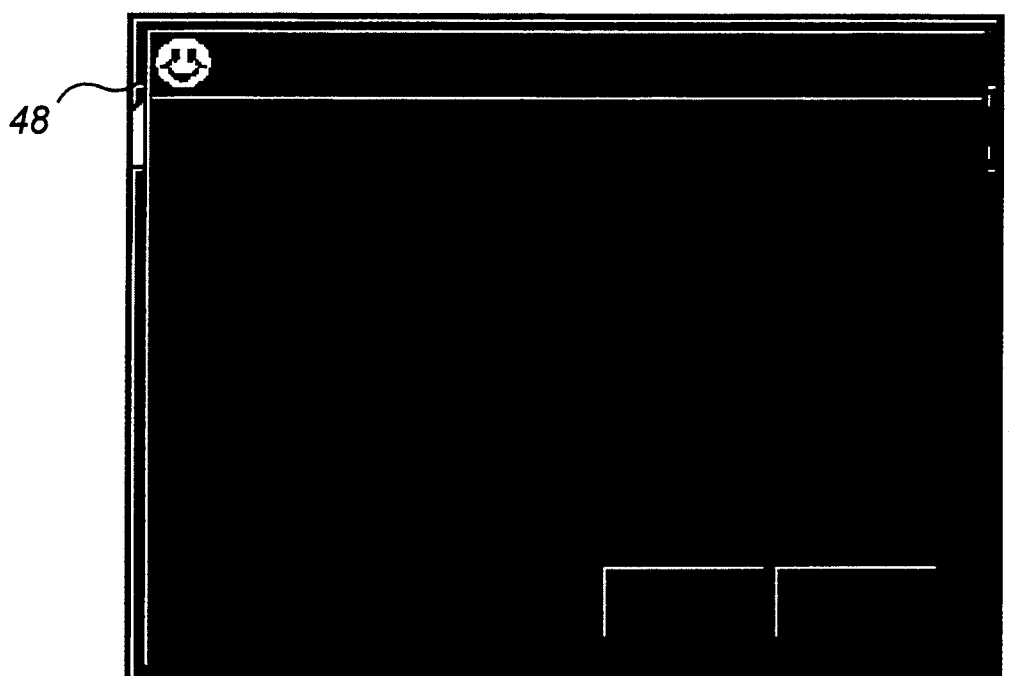
FIG. 86 is a screen display of the IFAX of FIG. 1 confirming installation of a selected new tool.
Figure 87:
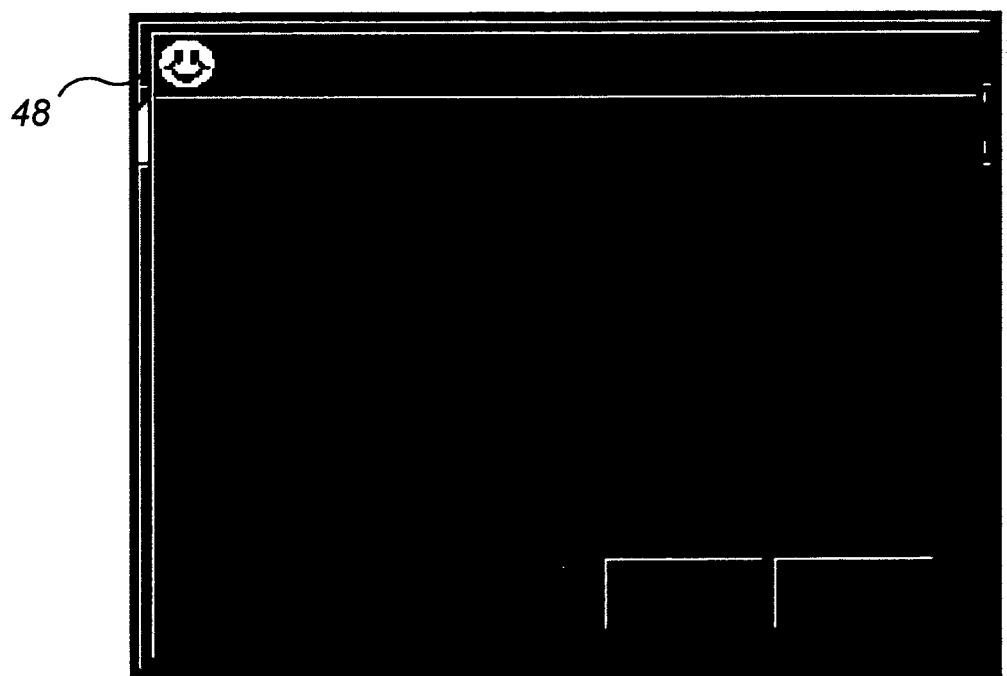
FIG. 87 is a screen display of the IFAX of FIG. 1 requesting information concerning public access of the newly installed tool.
Figure 88:
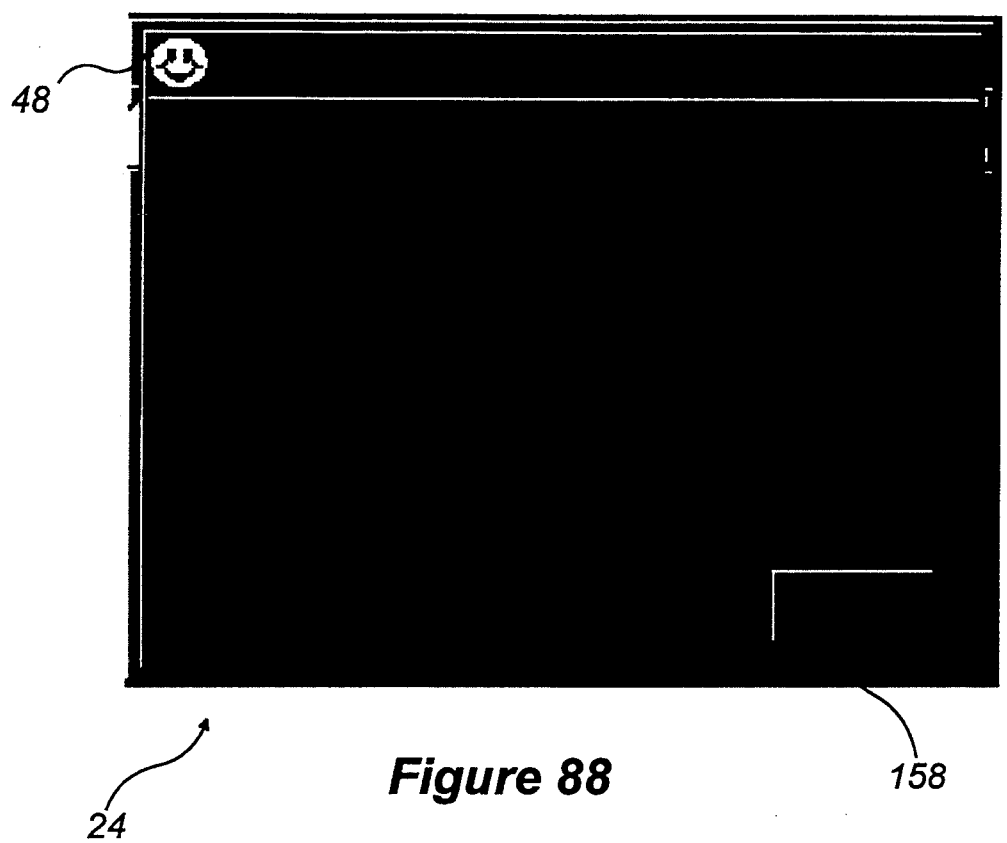
FIG. 88 is a screen display of the IFAX of FIG. 1 confirming installation of a new IFAX tool.

The user may install a new IFAX tool application by pressing an "Install New" button 524 causing the IFAX 10 to display the message shown in FIG. 85 indicating that the IFAX is searching for IFAX tool applications. The user presses the OK button 158 to confirm the message. When the IFAX 10 has identified a new IFAX tool application, the IFAX displays the message shown in FIG. 86 requesting that the user confirm installation of the selected IFAX tool application. The user can cancel installation of the IFAX tool application by pressing the No button 248, or may confirm installation of the selected IFAX tool application by pressing the Yes button 246. Pressing the Yes button 246 causes the IFAX 10 to display the message shown on the screen display of FIG. 87 requesting whether there should be public access to the selected IFAX tool application. The user may restrict public access to the selected IFAX tool application by pressing the No button 248, or may permit public access by pressing the Yes button 246. Pressing the Yes button 246 or the No button 248 causes the IFAX 10 to display the confirmation message shown in FIG. 88 confirming that the selected IFAX tool application has been installed. The user presses the OK button 158 to confirm the message and to return to the menu shown in the screen display of FIG. 78. The IFAX 10 then updates the list of IFAX tool applications displayed on the touch-sensitive display 24.

Figure 89:
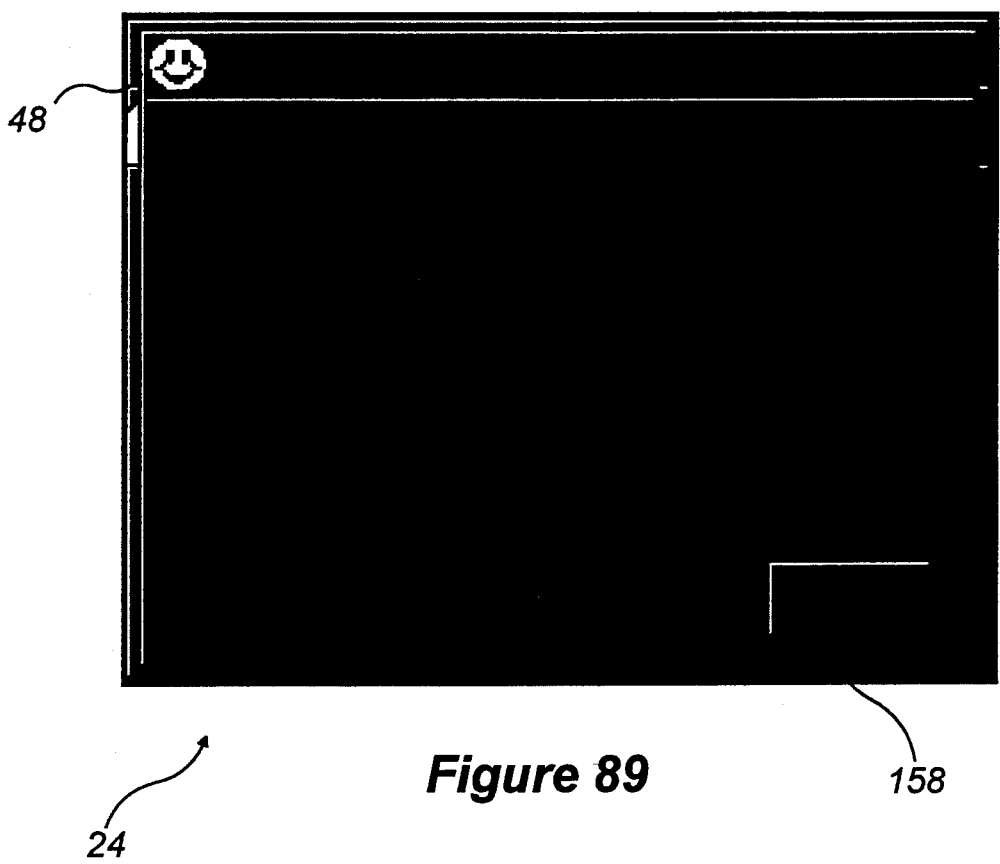
FIG. 89 is a screen display of the IFAX of FIG. 1 displayed when a user selects a feature not yet implemented.

If the user selects an IFAX tool application, or any other function not yet implemented on the IFAX 10, the IFAX displays the message shown in the screen display of FIG. 89 indicating that the selected feature has not yet been implemented. The user presses the OK button 158 to confirm the message and to return to the previous screen display.

As can readily be seen, the IFAX 10 provides numerous sophisticated features associated with the Toolbox button 56 (see FIG. 3). The numerous menus, screen displays and error messages guide the user in the selection and operation of these sophisticated procedures.

Figure 90:
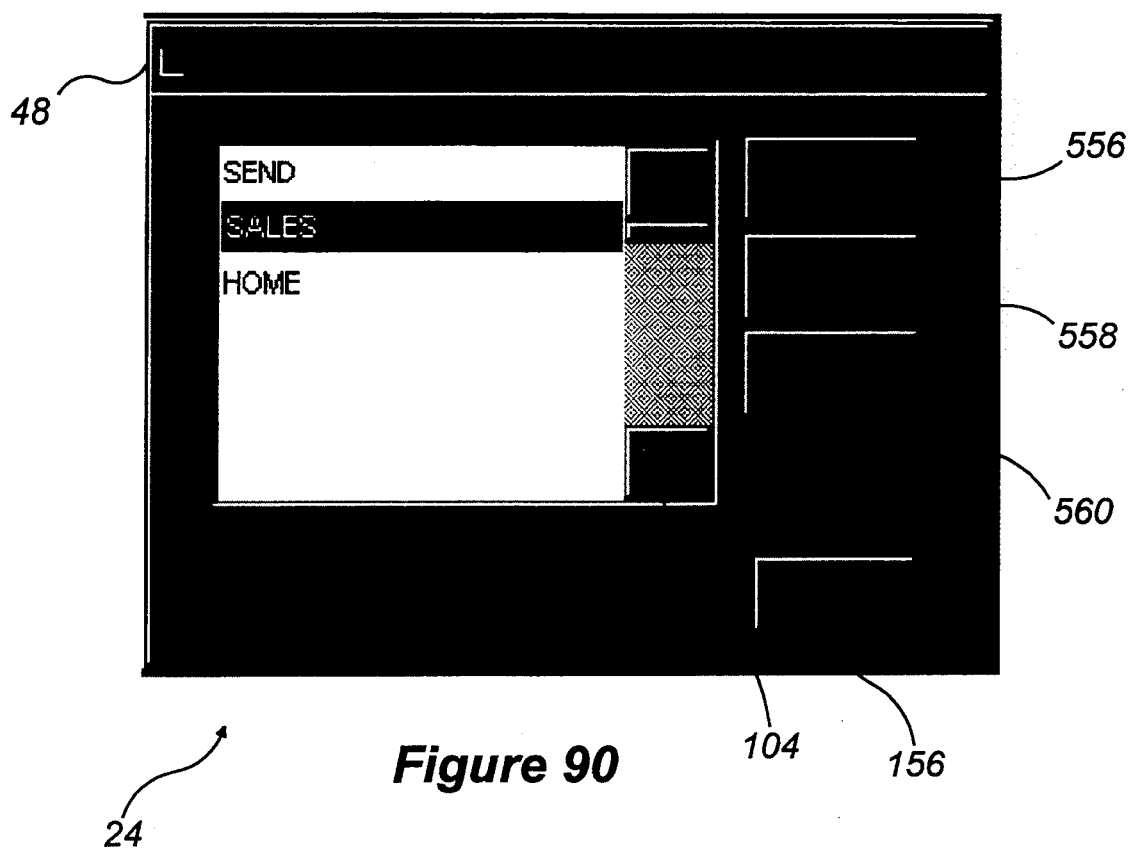
FIG. 90 is a screen display of the IFAX of FIG. 1 used to display and select Autokey options when selecting the Autokey function of FIG. 3.

With reference to FIG. 3, the user may press the Autokeys button 58 to define a macro instruction comprising a series of user selected steps that are given a user selected name. For example, if a particular user frequently sends a report, such as a sales report, to a number of different sales offices througoun the world, the user may define a sequence of steps with a given name such as "SALES." The IFAX 10 stores the predefined sequence of steps and allows the user to later easily initiate the predefined sequence of steps. The user presses the Autokeys button 58 to define a sequence of steps, initiate use of the predefined sequence, or remove an undesired sequence of steps. When the user presses the Autokeys button 58, the IFAX 10 changes to the menu shown in the screen display of FIG. 90. The autokeys function has been previously described in connection with the operational flowchart of FIG. 4J. The Autokeys icon shown as part of the prompt 48, indicates that the user is in the Autokeys portion of the main menu. The prompt 48 instructs the user to touch the name of the desired Autokey function and press a "Start" button 556. The IFAX 10 displays a list of all previously defined Autokeys on the touch-sensitive display? 24. If the number of Autokey entries exceeds the display capacity of the touch-sensitive display 24, the user can use the arrow buttons 104 to scroll through the list. The user may execute any of the Autokey functions by selecting the desired Autokey function and pressing the Start button 556. The user may create a new Autokey function by pressing a "Record" button 558. Pressing the Record button 558 causes the IFAX 10 display the typewriter keyboard 86, and the prompt 48 instructs the user to enter the name of the new Autokey function. When the user has entered an Autokey function name, the IFAX 10 changes to the main menu shown in the screen display of FIG. 3. From this point the user may select any sequence of steps to be executed by the IFAX 10. The user may press a stop button in any of the screen displays to end recording of the Autokey function. The user may remove any undesired Autokey function by selecting the function and pressing a "Remove" button 560. The user may cancel Autokey operation at any time by pressing the "Cancel" button 156, which causes the IFAX 10 to return to the main menu shown in the screen display of FIG. 3.

Figure 91:
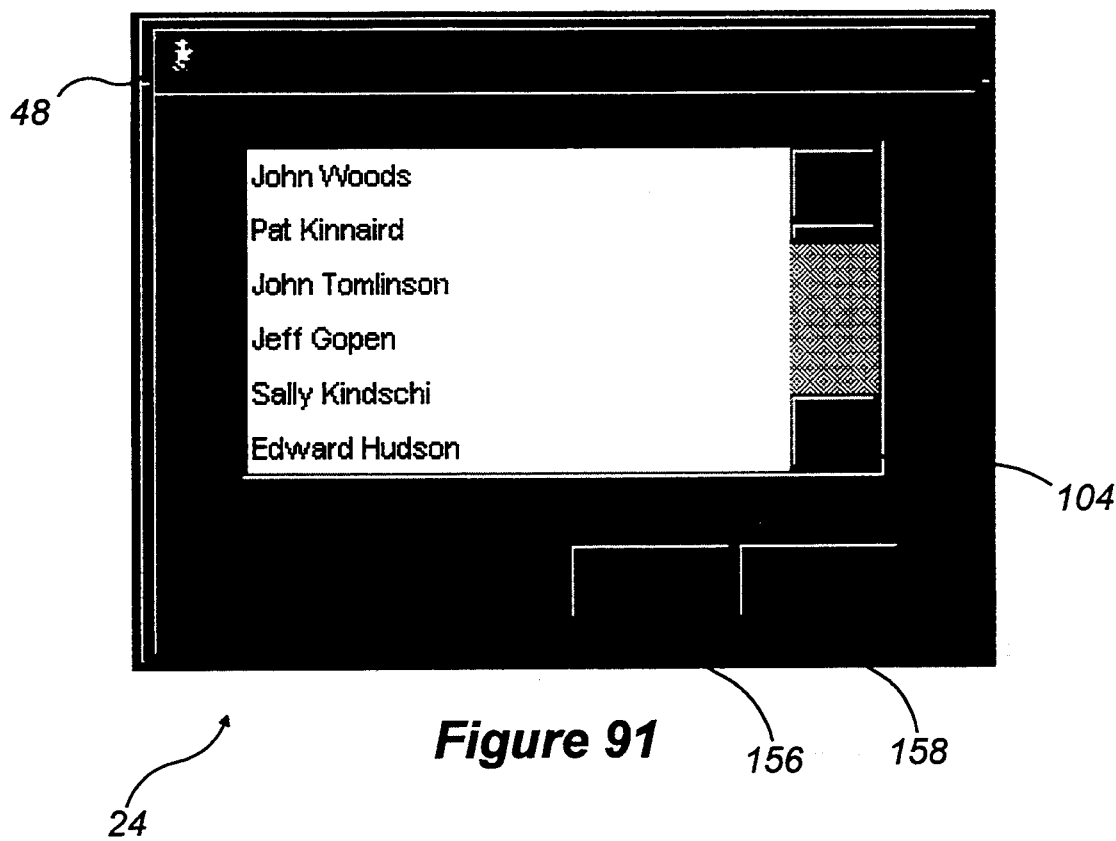
FIG. 91 is a screen display of the IFAX of FIG. 2 used to display and select individual mailbox accounts when selecting the Sign in button of FIG. 3.

With reference to FIG. 3, the user performs a logon operation on the IFAX 10 by pressing the Sign In button 60, causing the IFAX to change to the screen display shown in FIG. 91. The Sign In function has been previously described in connection with the operational flowchart of FIG. 4K. The IFAX 10 displays a list of all IFAX users on the touch-sensitive display 24. If the number of users exceeds the display capacity, of the touch-sensitive display 24, the user may use the arrow keys 104 to scroll through the list. The prompt 48 instructs the user to select his name and press the OK button 158. The user may cancel the logon procedure and return to the main menu of FIG. 3 at any time by pressing the "Cancel" button 156.

Figure 92:
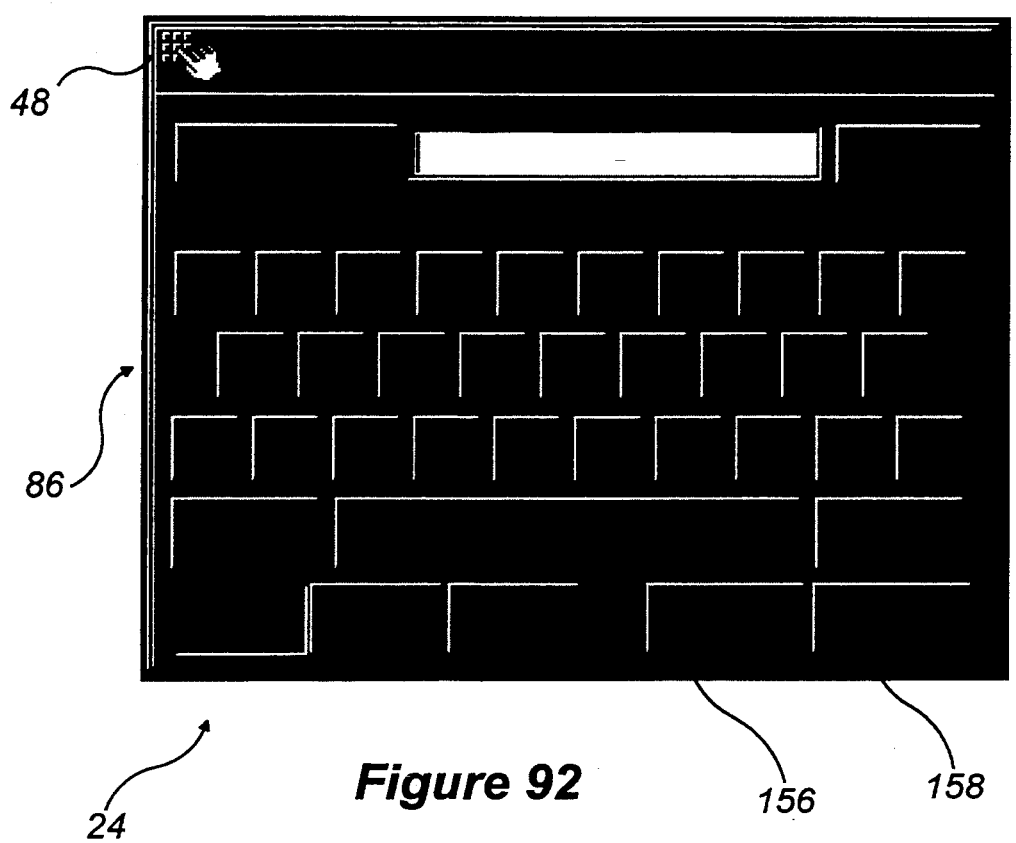
FIG. 92 is a screen display of the IFAX of FIG. 1 used to enter a password for the individual account selected in FIG. 91.
Figure 93:
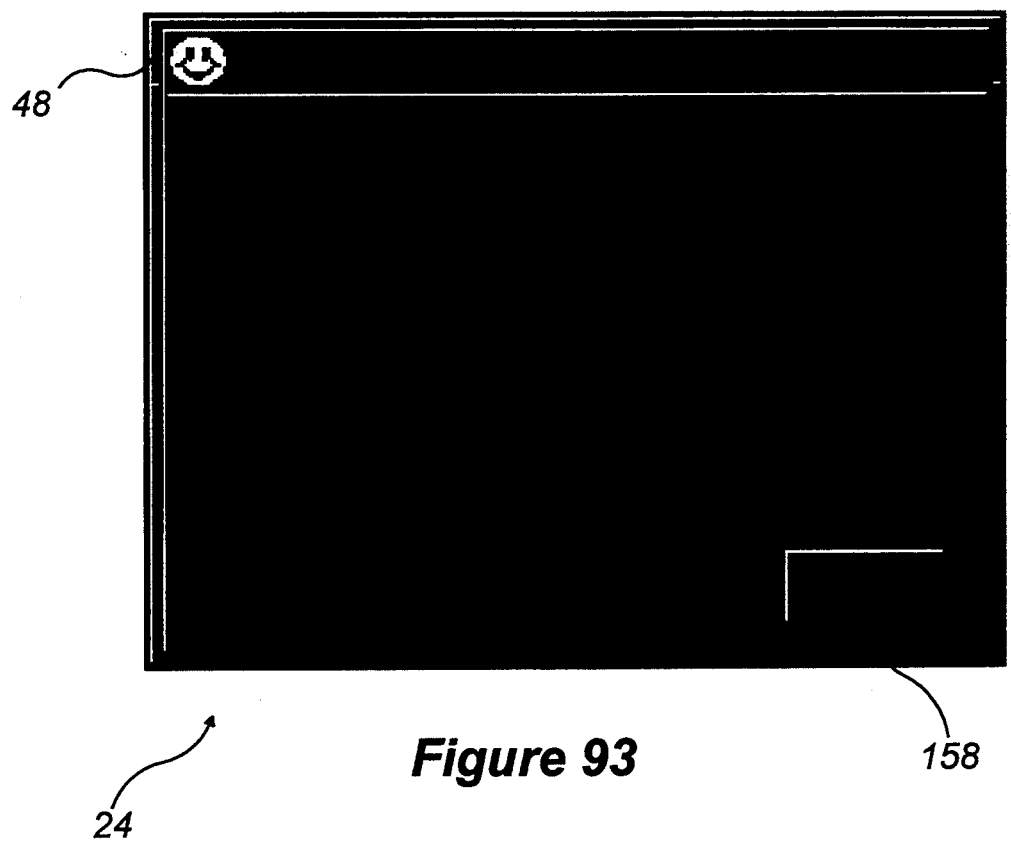
FIG. 93 is a screen display of the IFAX of FIG. 1 continuing the Sign in of an individual account.
Figure 94:
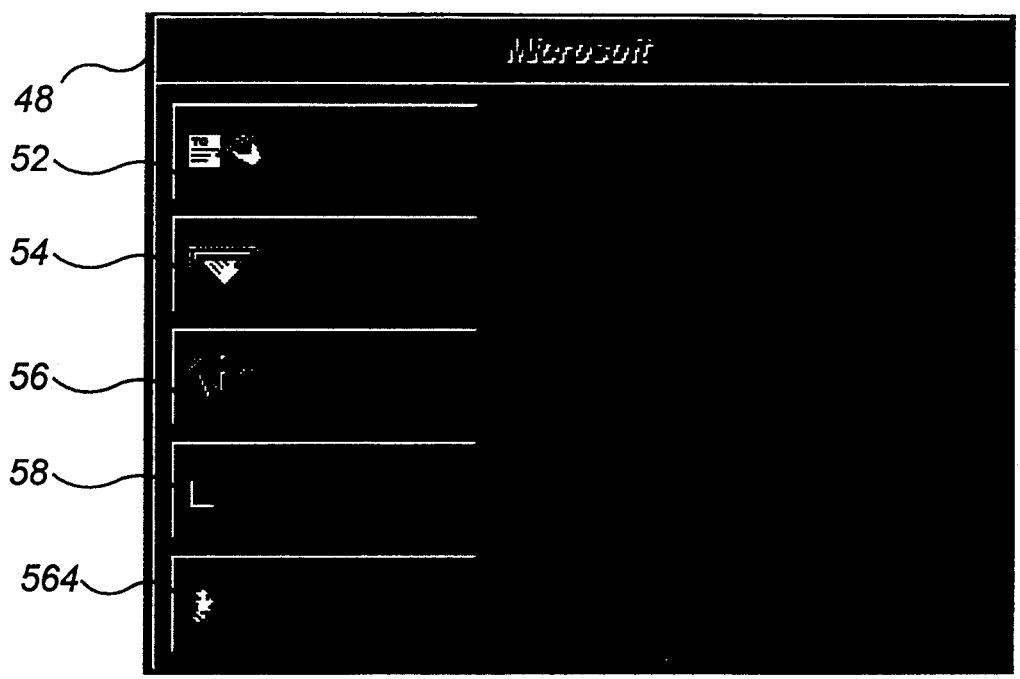
FIG. 94 is a screen display of the IFAX of FIG. 1 used by an individual following the Sign in procedure.
Figure 95:
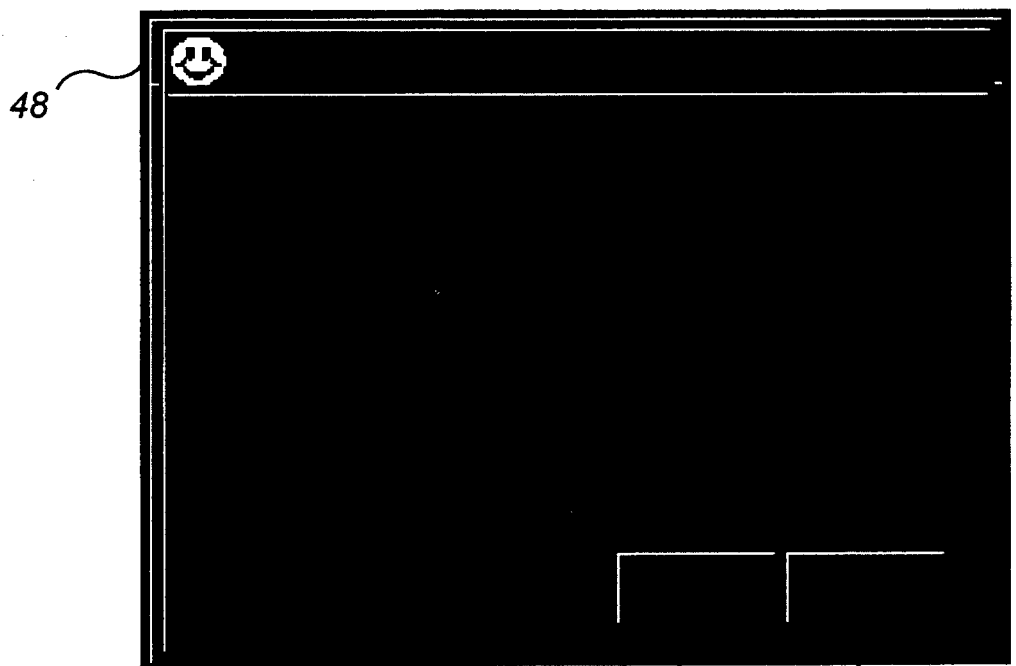
FIG. 95 is a screen display of the IFAX of FIG. 1 used to confirm the selection of the sign-out button of FIG. 94.
Figure 96:
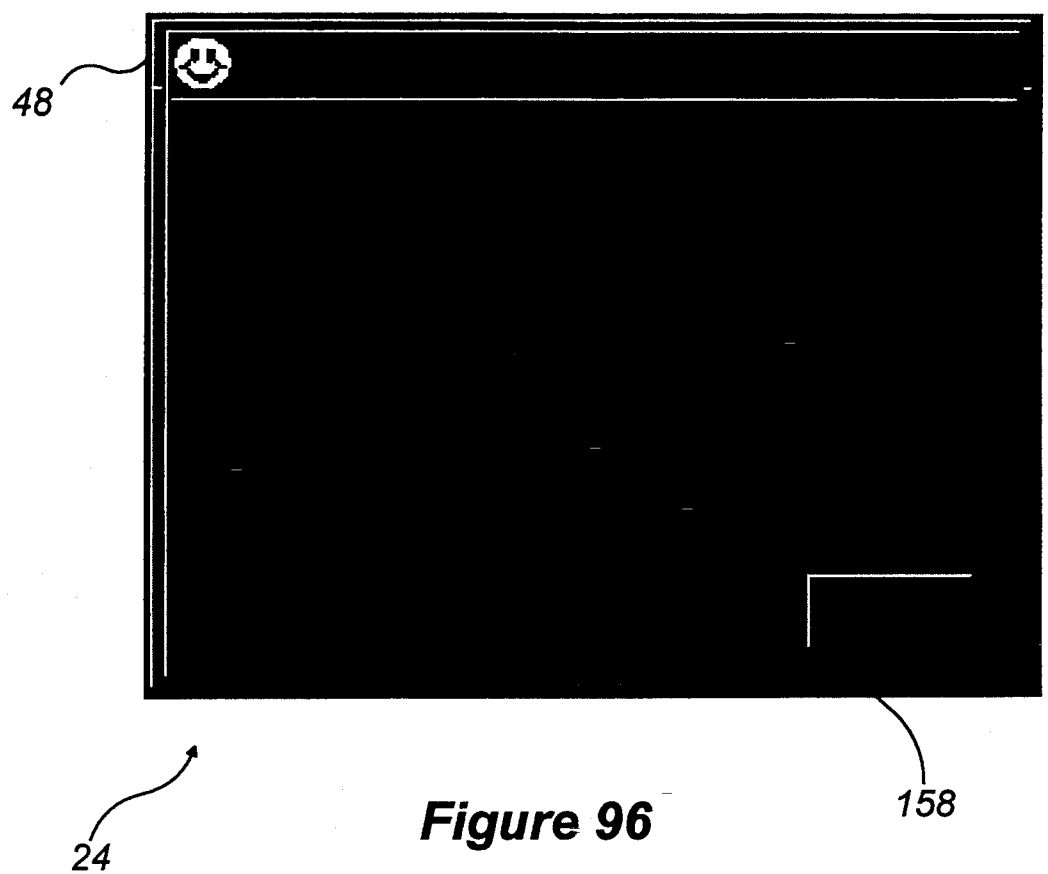
FIG. 96 is a screen display of the IFAX of FIG. 1 used to confirm sign-out.

When the user has selected his name from the list displayed on the touch-sensitive display 24, and pressed the OK button 158, the IFAX 10 changes to the screen display shown in FIG. 92. The IFAX displays the typewriter keyboard 86 on the touch-sensitive display 24, and the prompt 48 instructs the user to enter his password. The user may cancel the login procedure at any time and return to the main menu of FIG. 3 by pressing the cancel button 156. The IFAX 10 cannot be used by any individual entering an incorrect password. If the user correctly enters his password and presses the OK button 158, the IFAX 10 changes to the screen display shown in FIG. 93, confirming the user identity and indicating the number of unread facsimile messages currently in the particular user's mailbox. The user presses the OK button 158 to confirm the message, and the IFAX 10 displays the main menu, with the current user identity, as shown in FIG. 94. The main menu shown in FIG. 94 is identical to that of FIG. 3 with the exception of an indication of the current user. The IFAX 10 installs any personal user settings and the initial screen previously selected by that particular user. Thus, the IFAX 10 is customized for each user when the user has logged on using the Sign In button 60. The main menu shown in FIG. 3 contains a "Sign Out" button 564 instead of the Sign In button 60. The current user uses any of the procedures previously discussed in connection with the IFAX 10. When the user has completed operations on the IFAX 10 he presses the Sign Out button 564 to end his session on the IFAX 10. When the user presses the Sign Out button 564, the IFAX 10 changes to the screen display shown in FIG. 95 to confirm whether the current user wishes to sign-out. The current user may cancel the sign out procedure by pressing the "No" button 248. The user confirms the desire to sign out by pressing the "Yes" button 246, which causes the IFAX 10 to display the confirmation message shown in FIG. 96, The user presses the OK button 158, shown in FIG. 96, to complete the sign out procedures and cause the IFAX 10 to return to the main menu shown in the screen display of FIG. 3.

As is apparent from the above detailed description, the IFAX 10 provides numerous sophisticated features that are not available on facsimile machines of the prior art. In addition, the IFAX 10 provides a series of menus, display screens, and error messages to assist the user through all phases of operation of the IFAX. The user may easily utilize any of the sophisticated features of the IFAX 10 by simply following instructions displayed on the touch-sensitive display 24. Alternatively, the IFAX 10 may be part of a computer system in which a computer display screen and a pointing device replace the touch-sensitive display 24. The sophisticated and context sensitive error messages assist the user in making the proper selections.

The above description describes the user interface and serves as an introduction to the functional description of the IFAX 10 provided below.

Send a Facsimile Message

> The user can send a fax from the IFAX User Interface using a standard numeric keypad, a phonebook address, or Autokeys. As an alternative, the user can dial manually using a handset or the keypad (if an on-hook dial button is provided). The ability, to specify multiple destinations is described in greater detail in the Broadcast Send feature description.

Options:

Send Now specifies that the fax should be sent immediately.

Send Later specifies that the fax should be sent later or when rates are cheaper.

Include A Digital Cover Page lets users transmit a custom cover style that automatically fills in the proper header information.

Enclose A File lets users transmit binary files, other fax messages, phonebook listings, cover page styles, Toolbox Applications and even setup configurations.

Resolution lets users control the image quality, time and cost of transmission.

Contrast controls lighten or darken the image.

Half toning improves the quality, of most images but increases the time and cost of the transmission.

Security offers Encryption, Authentication and Digital Signature for sending of secure fax documents.

Turnaround Poll checks receiving machine for stored documents addresses to the caller.

Department Code tracks fax usage for different corporate accounts. This assists in billing and tracking of machine usage.

Include Fax Header displays a fax header with the name, company and fax number of the machine owner at the top of each page.

Number Outgoing Pages displays the page number in the lower right hand corner of each page. When the user specifies the number of pages, the page count appears ¼, 2/4, ¾ and 4/4. Without the number of pages, the page count appears 1, 2, 3, 4.

Print Confirmation Report returns a message when the transmission is completed.

Send From Memory scans the document into the Outbox before dialing the destination.

Figure 97:
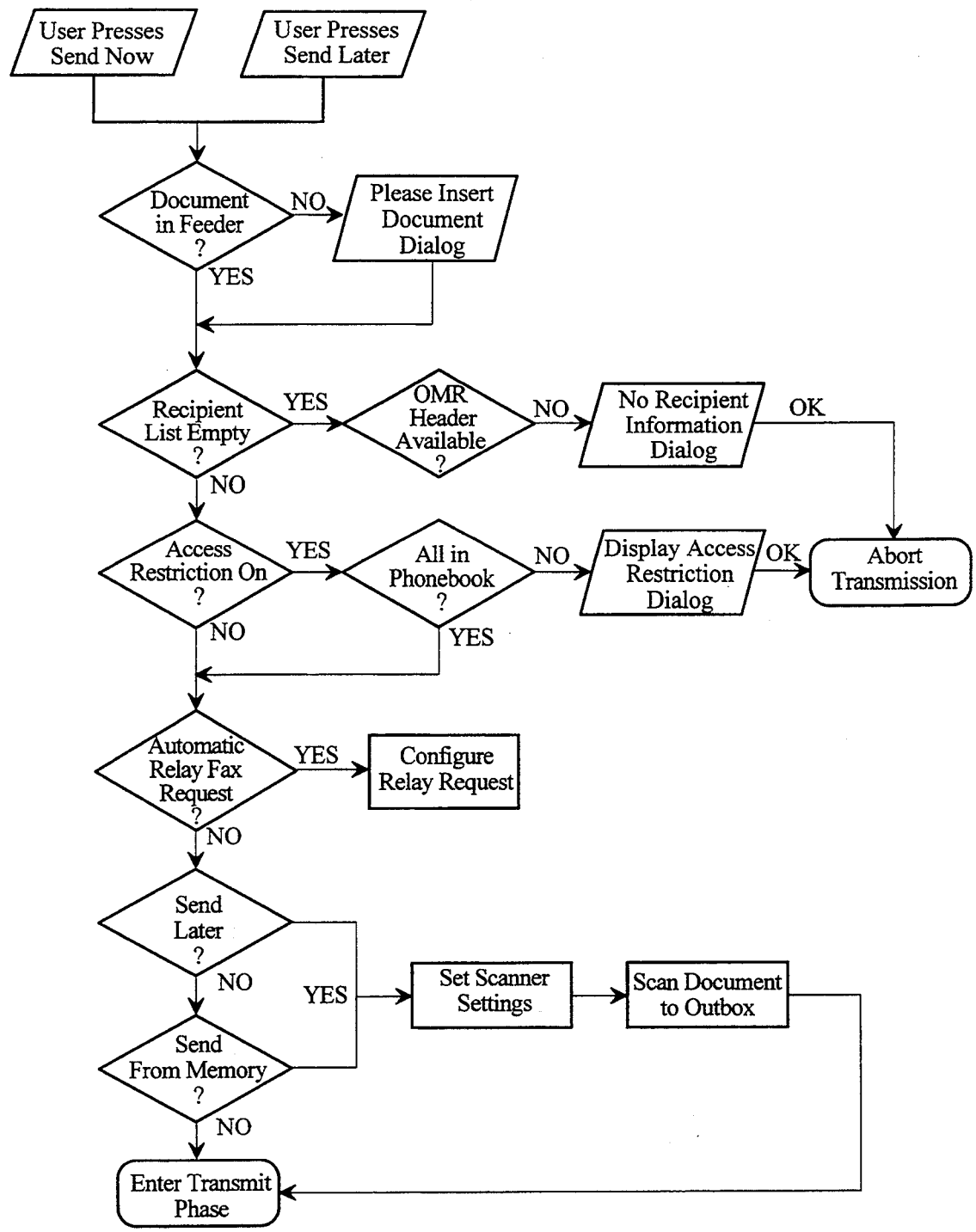
FIG. 97 is a flowchart of the setup phase for sending the facsimile.
Figure 98:
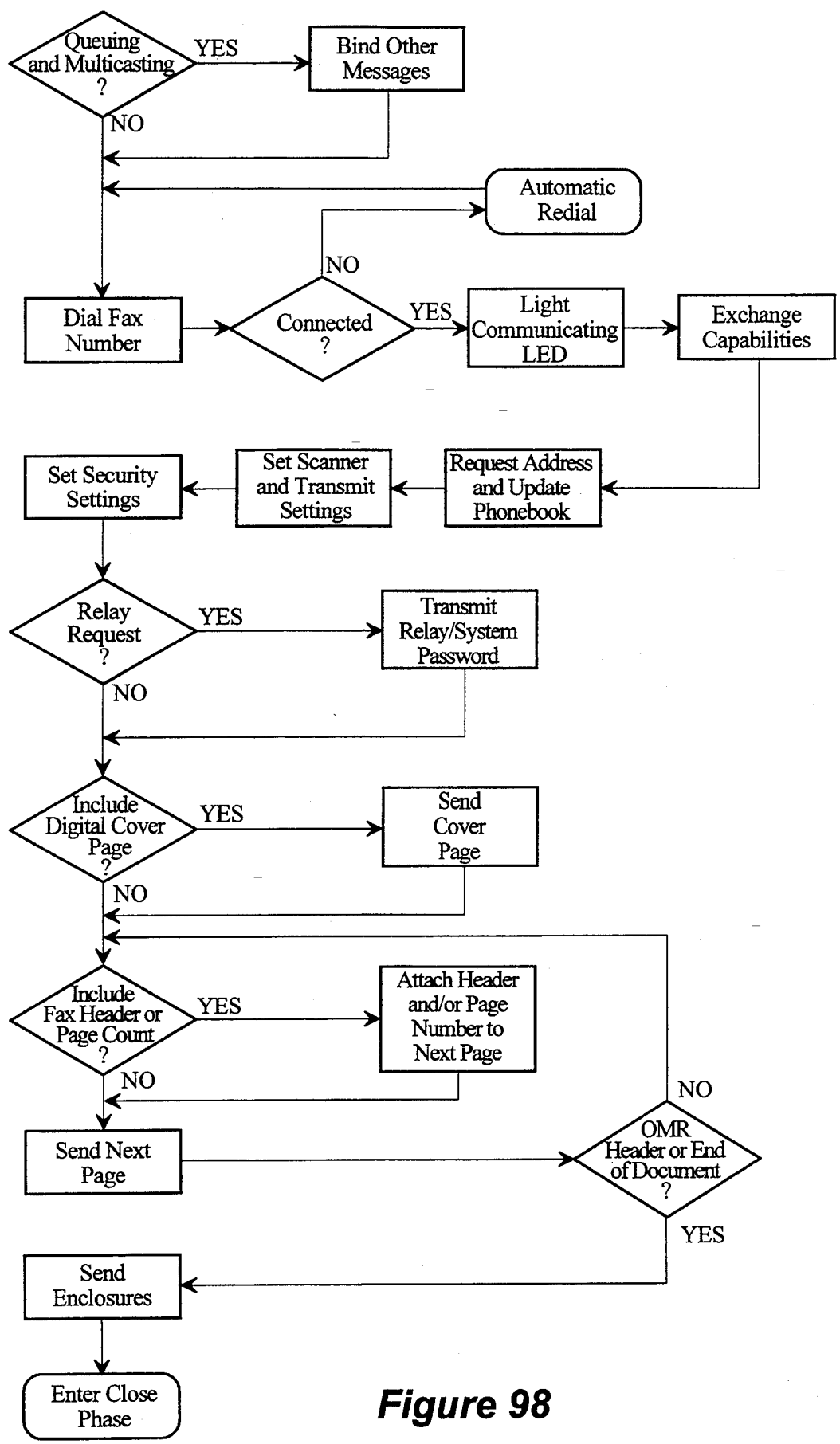
FIG. 98 is a flowchart of the transmit phase for sending the facsimile.
Figure 99:
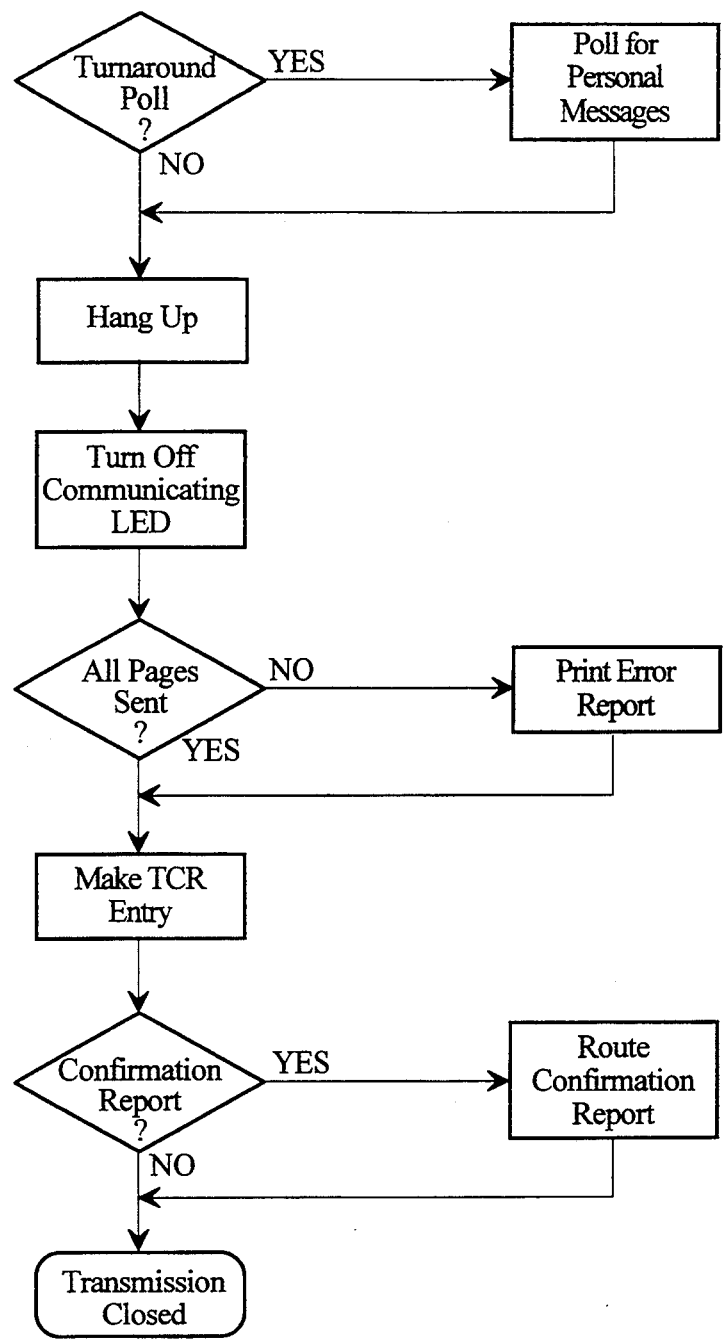
FIG. 99 is a flowchart of the close phase for sending the facsimile.

Procedure:

Send Fax allows the user to send an IFAX Message to a single recipient. The send facsimile procedure is shown in the flowchart of FIGS. 97–99. Begin the procedure when the User presses Send Now or Start as shown in FIG. 97. If there is no document or binary file, display the "Please Insert Document" dialog box. Continue when the user inserts a document.

If the recipient list is empty, scan the top of the first page for OMR Cover Page information. If it is not an OMR Cover Page, display the "Recipient list is empty, (no OMR information either)." dialog box. If there is OMR Cover Page information, scan it in and configure the message accordingly.

If Access Restriction is on and the recipients are not members of the phonebook, abort the call and print an error report "Access restriction is currently limited to members of the phonebook. This destination is not in the phonebook."

If the Automatic Relay Fax Request is configured, setup the Send operation through the proper relay station (usually by recipient area or country code). The relay station becomes the recipient. See the Automatic Relay Fax Request section for more information.

If Send Later is requested, scan the entire document into the Sender's outbox. Proceed with the Send operation in the background at the time specified. If Send From Memory is requested, scan the entire document into the Sender's outbox. Proceed with the Send operation in the background when possible.

When scanning the document, observe the user's settings for resolution, contrast, and halftoning. For more information, see the High Resolution Scan, Print, Send & Receive, Gray Scale, and Automatic and Manual Contrast Control sections.

Before beginning the transmission, check to see if other outgoing faxes are headed to the same destination fax number as seen in FIG. 98. See the Intelligent Fax Queuing and Multicasting section for more details. Also, determine if the current outgoing load factor requires. network redistribution. See the Fax Load Balancing section for more information.

Dial the recipient to begin the transmission. Use the dial mode (Pulse/Tone) specified in the Phone Line Settings dialog. Wait n seconds for a carrier, where n is specified as the time to carrier in the Phone Line Settings dialog. If a carrier is detected, light the Communicating LED. Otherwise, try the recipient's alternative fax number (if available). If there is still no connection, increment the redial count and try again after the redial interval.

If the facsimile message is a Relay Fax Request, verify the relay password or the system password. If the sender does not have relay access, abort the call and issue an Error Report "You do not have relay access at this destination."

Request then update (in the Phonebook) the recipient's address entry. This obtains the entire address entry for a particular user including his public key.

Determine the transmitting resolution most appropriate for this recipient's fax machine.

If Include Digital Cover Page has been selected, generate it as the first page of the transmission. If the recipient fax machine is Intelligent, just send the cover page as a binary header. Otherwise, render the cover page for transmission. The default cover page style is described in the Digital Cover Page Section.

If Include Personal Header is on, include the following header at the top of each transmitted page (after the cover page). The header should contain the Sender's Name, Fax Number, Company Name and Date (as shown below).

| Mr. James Smith | Microsoft Corporation | September 15, 1992 |
|---|---|---|
| (206) 555-5555 | | |

If Number Outgoing Pages is on, transmit the page count at the bottom fight comer of each page. If the Number of Pages has been specified in the Cover Page dialog, use the page numbering style ¼, 2/4, ¾, 4/4 otherwise number them sequentially 1, 2, 3, 4.

Scan each page checking for OMR Fax Stacking headers. If there is no header, transmit each page and continue. If an OMR header appears, complete the transmission without transmitting any subsequent pages. See the High Resolution, Scan, Print, Send & Receive section for details on transmitting resolutions and paper size.

Send any binary attachments. If Send Renderable is selected, render any attachments of supported file types. See the High Quality Renderable Document Transmission section for details. If sending to a G3 Machine, render a "This Intelligent Fax Message contains a binary file which your fax machine does not support." message.

If Encryption is selected, encrypt all transmission data using the recipient's public key.

If Digital Signature is selected, compute a hash code on all transmitted data. Encrypt and transmit the hash code at the end of the call with the recipient's public key.

If Authentication is selected, transmit the sender's Digital Certificate.

As seen in FIG. 99, if Turnaround Polling is selected, poll the recipient's IFAX Machine for Personal Messages. Issue a Poll Retrieve Results report and route it with any retrieved messages according to the Sender's Receive Fax settings. See the Poll Retrieve section for more information.

When the transmission is complete, hang up the line. Turn off the Communicating LED.

Check that the number of pages transmitted matched the number specified by the user (if available). If the number of pages does not match, issue an error report. Log any other transmission errors that occurred.

Enter the results into the Activity Report (TCR) with the name of the currently signed in user (or Public) and the Department Code (if specified).

If Print Confirmation Report is on, issue a Confirmation Report. See the Basic Activity Reporting section for more information.

| Exceptions: | |
|---|---|
| Connection Lost | If the carrier is found but the line is interrupted during the send, abort the operation and issue a "Connection was lost" Error Report. |
| Document Cover Open | Display a dialog to give the user 15 seconds to close the Document Cover. If it is not closed, abort the operation and issue an Error Report. |
| Memory Full | If a Memory Full condition occurs on a Send From Memory, begin the transmission. Send the part that has been stored in memory and scan and transmit the rest on-the-fly. |
| | If a Memory Full condition occurs on a Send At Discount Rates or Send At Scheduled Time, display the "Out of memory. Holding fax in feeder until Time xx:xx" dialog box. Complete the Send at the specified time. |
| No Connection | If the line is busy or no carrier is found, the Alternative Fax Number should be tried (if available). If this too fails, the number of retries should be incremented. If it is equal to the standard number of retries, issue an "No Connection" Error Report. Otherwise, re-initiate the send after the retry interval. |
| OMR Cover Page Invalid | Abort the call. Issue an "OMR Cover Page Invalid" Error Report. |
| Paper Jam | Abort the Send operation and issue an Error Report. Display the "Paper Jam" dialog box. |
| Power Off | Issue an Error Report after the next Power On indicating that the interruption occurred. |
| Public Key Missing | If the public key cannot be obtained, abort the call and issue a "Can't obtain public key" Error Report. |
| Stop | Abort the operation. Issue an Error Report and indicate the page in which the interruption occurred. |
| | If the send is in the background, check if the user has authority to stop the current send process. If so, display a "Interrupt transmission" dialog box. Otherwise, display a "You do not have access to this transmission." |
| Transmission Error | If the Number of Pages scanned and transmitted does not correspond to the number specified by the user, issue a "Did not transmit page x of y" Error Report. |

Receive Fax

Description

The IFAX 10 can receive faxes from both Intelligent and G3 fax machines. Received messages can be printed, stored in mailboxes, forwarded to PC's connected via LAN or Serial or routed to a Tool Application for special handling or OCR.

Intelligent messages are typically routed directly to their recipient, either to their mailbox or their PC.

G3 messages are typically printed or routed to a special mailbox. However, when a special OMR cover sheet is included in the G3 fax, IFAX machines can interpret them and route them as an intelligent fax message. IFAX machines can also route G3 faxes to special Tool Applications that will properly route them using OCR or other methods.

IFAX machines also support on-screen preview of received faxes from the Mailbox.

Options:

Print Received Faxes is the standard default. Each incoming fax is printed as it arrives.

Store In Mailbox lets the user retrieve their messages at their convenience while adding an extra level of security.

Forward To PC actually routes the faxes directly to the users PC via LAN or Serial.

Forward To Tool Application routes the fax to a specific Tool Application for special handling. OCR Tools will probably be the most frequently used.

Multi-Document Sort prints multiple copies of each incoming fax.

Reverse Order Printing prints received faxes backwards so that the pages will be in the proper order.

Automatic Paper Selection prints incoming messages on paper that most closely fits the size of the document being received (on systems with multiple paper sources). If desired, the user can manually select the paper source instead.

Automatic Reduction can adjust slightly oversized received messages to fit the available paper supplies. If the difference is extreme, page breaks will be used.

Procedure

Figure 100:
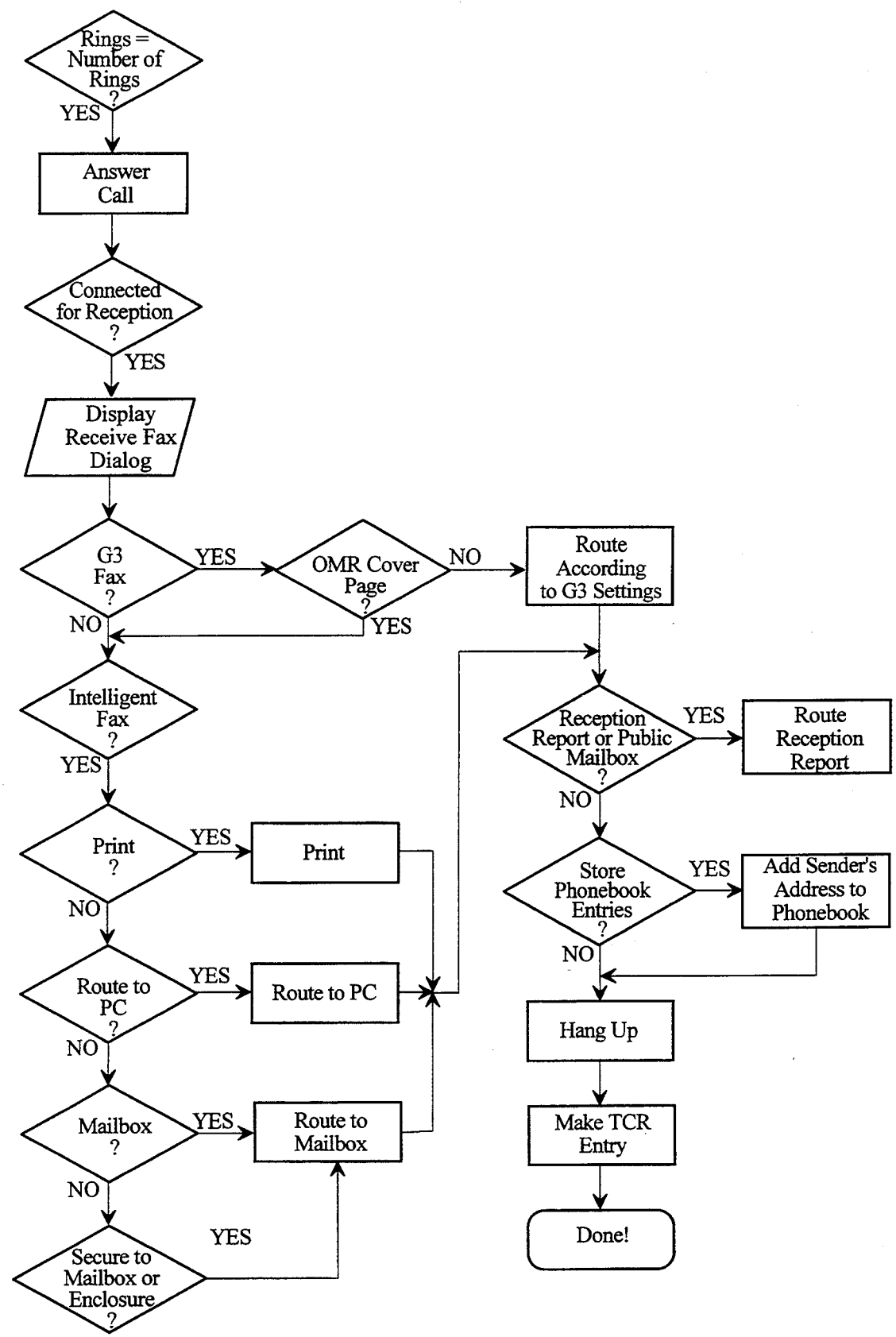
FIG. 100 is a flowchart used by the present invention for receiving a facsimile message.

As seen in FIG. 100, after detecting the Number of Rings specified by the Administrator, answer the incoming call. If a carrier is detected, light the Communicating LED.

Display a Receiving Fax dialog box. This notifies the user that a fax is coming in. If a user is present, he can simply touch Continue to regain control of the User Interface. If no one presses Continue, remove the dialog when the Receive is completed.

Determine if the incoming message is G3 or EFAX.

If the incoming message is an EFAX Message, handle it according to the user's Routing Setup:

Print on the IFAX

Route to the user's mailbox

Route to user via LAN/Serial

Secure Faxes routed to user's Mailbox/Others Printed

Faxes to unknown users are routed to the G3 Operator destination (see below).

If the message contains a binary Attachment, always route it to the User (not printed) or his Mailbox.

Note: All automated activity, reports should be routed according to the Sender's receive set-tings.

If the incoming message is Encrypted, decrypt it using the recipient's private key. If the private key is not available or if the user is unknown, store the document as an encrypted message.

If the incoming message is Digitally Signed, compute a hash code on all incoming data. Decrypt the incoming hash code and compare the two. If they are not equal, issue an Error Report "Document has been tampered with." and enter it into the Error Log.

If the incoming message requests Authentication, decrypt the sender's Digital Certificate and use it to decrypt the message.

If the incoming message is a G3 Message, check to see if it has an IFAX OMR cover page. If so, obtain the addressing information; see the Automatic G3 OMR Cover Sheet Recognition section for more information. Route the message as an EFAX Message (see above).

If there is no IFAX OMR cover page, the G3 fax should be routed according to the following settings:

Route to Automated G3 Inbound Routing Support Feature

Route to PC Based G3 Routing Application via LAN/Serial

Route to specific G3 Operator via LAN/Serial

Route to specific G3 Operator Mailbox

Printed by the IFAX

If the Automated G3 Inbound Routing Feature is used, route the fax according to the resulting Recipient's EFAX Routing SetUp (once this information has been obtained).

Use the G3 TTI to indicate the sender of G3 faxes in the users Inbox listing.

Enter the reception results in the Activity Report (TCR). If the Print Reception Reports option is on, issue a Reception Report as described in the Basic Activity Reporting section.

If the Public Mailbox is specified as the G3/unknown fax destination, always print the Reception Report.

If the Store Received Phonebook Entries option is on, cache the Sender's Address Information and public key in the Recipient's Phonebook.

| Exceptions: | |
|---|---|
| Connection Lost | If a Phone Line Interruption occurs during the receive, issue a "Connection Lost" Error Report. |
| Document Cover Open | Display the Document Cover Open dialog. If it is not closed within 15 seconds, abort the receive operation. Issue an Error Report once the Paper Feed is closed. |
| Mailbox Full | If the Recipient's Mailbox is Full, print the message. If the message is Secure or contains a binary Attachment, abort the operation, issue a "Mailbox Full" Error Report and instruct the calling machine to try again later. |
| Memory Full | Display the Memory Full dialog box. If the IFAX runs Out of Storage (disk space/memory), the message should be treated as above in Mailbox Full. |
| Paper Jam | Display the Paper Jam dialog box. Route the remainder of the message to the user's mailbox (if possible). Otherwise, or if the mailbox becomes full, abort the operation and issue an error report. If the error report is to be printed, store it until the paper jam is fixed. |
| Paper Out | Display the Paper Out dialog box. Route the message to the User's Mailbox (Public Mailbox if G3). If no Mailbox storage is available, abort the Receive operation and issue an Error Report. If the error report is to be printed, store it until there is paper. |
| Power Off | Issue an Error Report and route it with the partially received message at the next Power On. |
| Stop | Abort the operation. Disconnected the line and clear the paper feed on the printer. If the receive is in the background, check if the user has authority to stop the current process. If so, display a "Interrupt reception?" dialog box. Otherwise, display a "You do not have access to this reception." |
| Transmission Error | If the Number of Pages received does not correspond to the number specified by the message header, notify the Sending machine and issue an Error Report. |

High Resolution Scan. Print. Send & Receive
Description

IFAX platforms can scan, print, send and receive at a variety of resolutions. We presently support the following bitmap resolutions:

Options:

203×98 (Vertical by Horizontal) is the low quality, economy transmission resolution.

203×196 is the Standard G3 transmission resolution.

203×392 is the high quality, fine transmission resolution.

406×392 is currently the optimal transmission resolution.

The IFAX software also supports the 200×200, 300×300 and 400×400 English scanning resolutions.

The IFAX 10 software can also be easily extended to support even higher resolutions. As processor and peripheral speeds increase with technology advancements, it is expected that the resolutions supported by both the EFAX and G3 protocols will also increase.

Procedure

The Send Fax, Receive Fax, Broadcast Fax, Poll Retrieve, and Poll Store contain instructions for choosing optimal scanning and printing resolutions as well as paper size information.

When scanning for a remote destination via Serial/LAN Interface (see FIG. 1), operate the scanner at the resolution specified by the remote configuration. See the Remote Scan Over Serial Connection feature description.

When printing from a remote destination via LAN or Serial Interface, operate the printer at the resolution specified by the remote configuration.

There are four counters on each fax machine: Scanned Pages, Printed Pages, Transmitted Pages and Received Pages. Increment the appropriate counter after each page has been scanned, printed, transmitted or received.

High Speed Send and Receive
Description

The IFAX 10 will support transmission speeds up to 14,400 bps. It will step down to lower speeds when connected to slower machines.

While transmission speeds are approaching the current limitations of the PSTN transport media, these limitations will inevitably be extended with time. The proposed V.fast fax transmission standard is one example of this, allowing transmission at 28 kbps on connections where the subscriber loop is the only analog portion of the communications channel. The IFAX machine architecture will be designed so that higher transport speeds will not be unnecessarily precluded. These higher speeds, may, however, require the use of faster CPU's or special modem access methods.

Procedure

The IFAX Machine should always use the maximum possible communication speed, 14.4K Baud, stepping down when connected to slower machines. The user should be isolated from selecting modem transmission speeds.

Poll Store
Description

Poll Store retains document(s) until requested by a calling fax machine. IFAX platforms support extended G3 Polling: File Number+Password, EFAX Polling: File Name+optional Password, and free access retrieval (public).

If sufficient memory exists in the IFAX to store the document or the IFAX is equipped with a disk, the document will be scanned and stored awaiting the polling request. Otherwise, the document will remain in the document feeder until the poll request is received. In this case, the document will only be available to the first polling machine.

Users will also be able to access a list of documents currently stored for polling in order to delete particular documents or change access information. Retrieval Reports are generated whenever a file is deleted.

Options

In addition to all of the standard Send Fax options, Poll Store supports:

Group Store lets the user store the document for any number of recipients to retrieve. Once all of the specified recipients have retrieved the fax it is deleted from the store.

Unrestricted Access allows any caller to retrieve the document(s).

Days To Store specifies the number of days until the file should be deleted regardless of the number of retrievals.

Title specifies a filename for the given document. A file number can be specified instead.

Password restricts document access to callers that can provide this password.

Procedure

Figure 101:
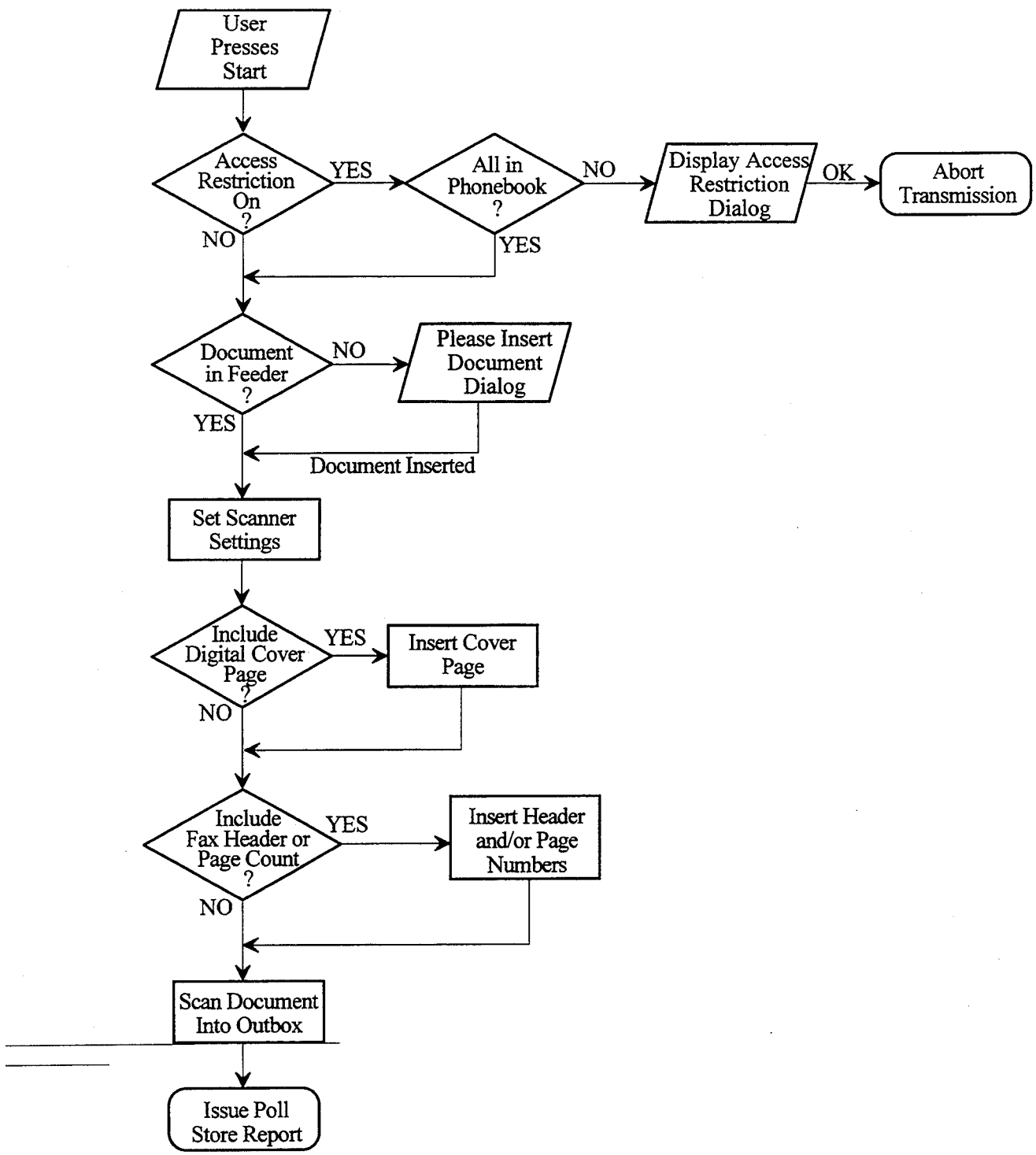
FIG. 101 is a flowchart used by the present invention for a poll store operation.

Allows user to store document(s) and binary Attachments to be retrieved by other callers. Begin the poll store operation, shown in FIG. 101, when the user presses Start.

If Access Restriction is on and the recipients are not members of the phonebook, abort the store operation and print an error report "Access restriction is currently limited to members of the phonebook. This recipient is not in the phonebook."

If there is no document or binary file, display the "Please Insert Document" dialog box. Continue when the user inserts a document.

Scan the document according to user's settings for resolution, contrast, and gray scale settings chosen in the Poll Store Options dialog of the User Interface. See the High Resolution Scan, Print, Send & Receive, Automatic and Manual Contrast Control, and Gray Scale sections for more details.

As you place the document in the Outbox, prepare it for transmission as in Send Fax, i.e. with Digital Cover Page, Fax Header, Page Numbering, etc.

If the message is placed in the outbox 72 (see FIG. 2) without errors and the Poll Store File Report option is on, issue a Poll Store File Report. If there are errors, issue an Error Report and enter it into the Error Log. In the case of any error, the Poll Store configuration of the User Interface should be maintained, including all recipient and document information, to allow the user to easily retry the task.

Note: All reports should be routed according to the Sender's receive settings.

Remove the message from the Outbox after the number of days specified by the Days To Store option.

When the IFAX Machine is Polled for documents:

The calling machine will make a request for certain document title(s) and password(s). It may also request all publicly available documents, all documents addressed to the caller, and a list of available documents.

If it is a G3 machine, it will specify a file number plus optional password. This supports the proposed convention for handling multiple stored messages in the 1992 G3 extensions.

Check for each available document. If the document is stored for public access, transmit it to the calling machine. If the document is addressed to specific users, verify the caller's name before transmitting.

Determine the transmitting resolution most appropriate for this recipient's fax machine.

If Encryption is selected, encrypt all transmission data using the caller's public key.

If Digital Signature is selected, compute a hash code on all transmitted data. Encrypt and transmit the hash code at the end of the call with the caller's public key.

If Authentication is specified, verify the caller's identity using the Digital Certificate before transmitting.

If no documents are available, issue a Poll Results report stating that the query failed.

Once documents have been retrieved by all of the designated recipient(s), they should be removed from the outbox 72.

| Exceptions: | |
|---|---|
| Document Cover Open | Display a dialog prompting the user to close it within 15 seconds. If it is not closed, abort the Poll Store. Issue an Error Report. If it is to be printed, hold it until the cover is closed. |
| Mailbox Full | If the Recipient's Mailbox is too full to Poll Store the message, display a "Mailbox Full, Cancel Poll Store or leave document in feeder?" dialog. If other users remove the document to do their own faxing, issue an error report to the original sender. |
| Memory Full | If the IFAX runs Out of Storage (disk space/memory), the message should be treated as above in Mailbox Full. |
| No Attachment Support | Poll Store documents may also contain binary attachments not supported by G3 callers. Render a "This is an Intelligent Fax Message Attachment which is not supported on your fax machine." on the calling machine. |
| Paper Jam | If a Paper Jam occurs, abort the operation. Give the user the option of clearing the Poll Store user interface setup or retrying once the Jam is fixed. |
| Power Off | If the IFAX is Powered Off while scanning or placing the message in the Outbox, issue an Error Report at the next Power On. |
| Stop | If Stop is pressed during scanning, the operation should be aborted. Display a dialog, prompting, the user to clear the Poll Store User Interface configuration. If the user does not respond within 60 seconds, the Poll Store User Interface configuration should be cleared and the User Interface reset. |

Polled Fax Retrieve

Description

Polled Fax Retrieve allows users to retrieve documents from remote fax machines or document servers (see the Poll Store feature description). The user can specify retrieval of multiple titles from multiple poll stations.

Options:

Poll Now performs the poll operation immediately.

Poll Later performs the poll operation at a user specified time or when rates are cheaper.

Persistent Poll performs the poll operation at a user specified time and again at regular intervals (e.g. each day at 4 p.m.)

Retrieve Personal Documents specifies retrieval of documents addressed specifically to the user.

Retrieve By File Name/Number specifies retrieval of particular document(s) with optional password.

Retrieve All Public Documents specifies retrieval of any documents available for public access.

Request List of Available Documents specifies retrieval of a list of any documents that are available to this caller (including public access documents and password protected documents).

Remote Destination specifies that the retrieved documents should be forwarded to mother destination.

Poll Results Report specifies that a summary report should be printed at the end of the poll retrieve operation.

Request Activity Reports requests current activity reports be routed back to the user. The user must include the system password to receive these reports.

Check Relay Status requests a status report from the destination machine for a previous fax relay request. The user must include the system password to receive this report.

Procedure

Figure 102:
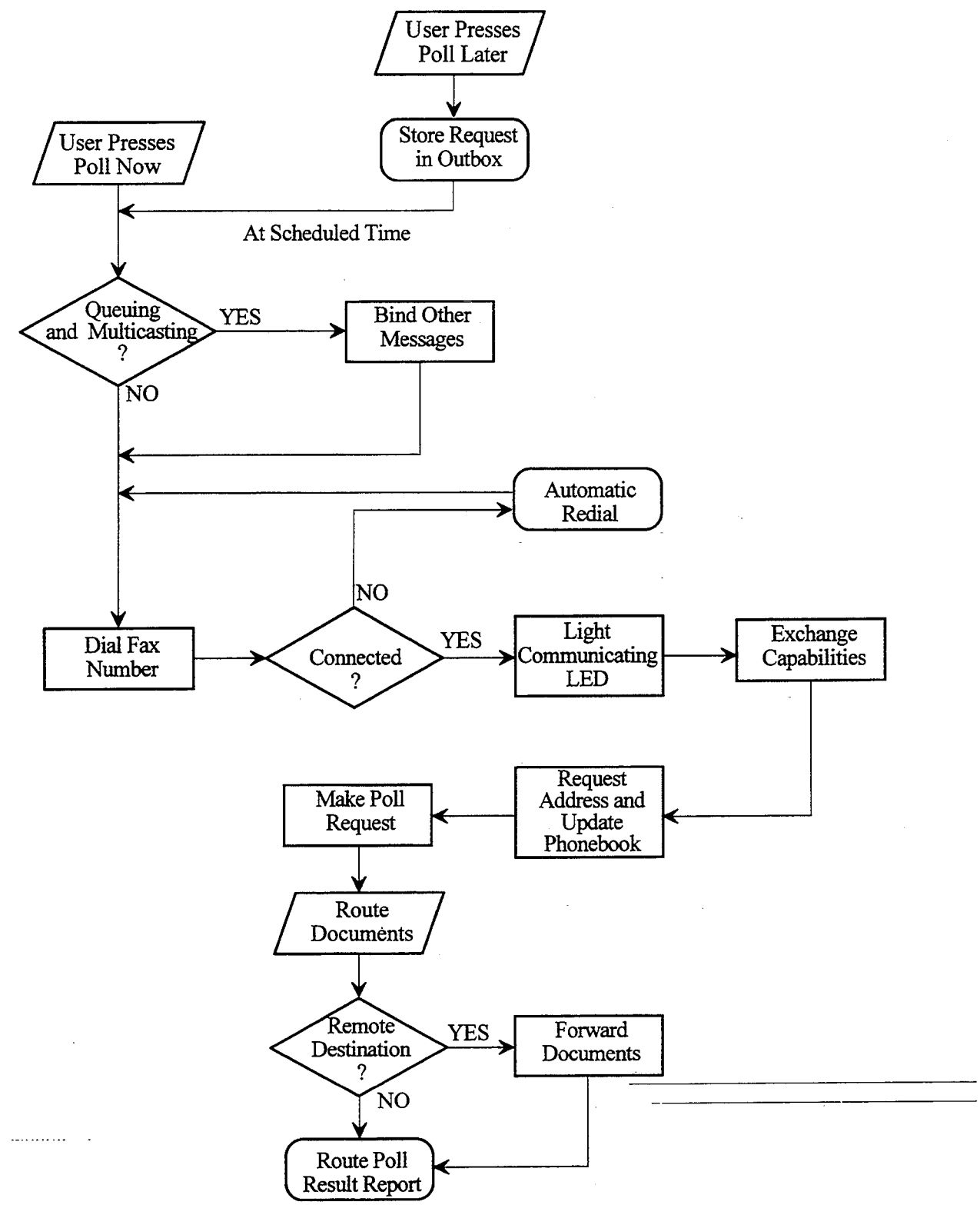
FIG. 102 is a flowchart used by the present invention for a poll retrieve operation.

Polled Fax Retrieve allows user to retrieve document(s) and binary Attachments stored on remote fax machines or servers. Begin the Poll Retrieve operation when the user presses Poll Now or Start as shown in FIG. 102.

If Poll Later is specified, store the request in the user's outbox until the appropriate time.

Before beginning the retrieve request, the IFAX should check to see if other outgoing faxes are headed to the same destination fax number. See the Intelligent Fax Queuing and Multicasting section for more details. It should also determine if its load factor requires network redistribution. See the Fax Load Balancing section for more information.

Dial the recipient to begin the Poll Retrieve. If a carrier is detected, light the Communicating LED. Otherwise, try, the recipient's alternative fax number (if available). If there is still no connection, increment the redial count and try again after the redial interval.

If the Retrieve All Public Documents option is on, request all public documents from the Poll Station and route them according to the user's Receive settings.

If the Retrieve All Personal Documents option is on, request all personal documents and route them according to the user's Receive settings.

If the Request Activity Reports option is on, request the Activity Reports and route them according to the user's receive settings.

If Request List of Available Documents option is on, request a list of all documents (public and personal) and route them according to the user's receive settings.

If a Poll Result Report has been requested, route it with the retrieved documents (if any) to show the results of each document query.

If the Check Relay Status option is on, query the Recipient machine for Relay Fax Requests from the caller. Once this information is retrieved, the status of all the relays from this user should be routed in a Relay Status Report according to the user's receive settings.

End the call. If a Remote Destination for the documents has been specified, forward all retrieved items to the remote destination as a Send Fax operation.

If the Persistent Poll option, is specified, maintain a scheduled copy of this operation in the user's Outbox. This will implement the re-occurring poll operation on a regular basis. When the user wants to end this operation, they will delete the poll operation from their Outbox.

| Exceptions: | |
| --- | --- |
| Connection Lost | If a Phone Line Interruption occurs during the Poll Retrieve, issue an Error Report and enter it in the Error Log. Route the incomplete Poll Retrieve document(s) with the Error Report. |
| Document Cover Open | If the Paper Feed is opened during a Poll Retrieve, display a "Close Paper Feed" dialog |

| Exceptions: | -continued |
| --- | --- |
| | for 15 seconds. If it is not closed, abort the operation. Issue an Error Report once the Paper Feed is closed. |
| Memory Full | If the User's Mailbox is too full to retrieve the document(s), the abort the operation. Display a "Clear Poll Retrieve Settings?" dialog. Pressing No from the Clear dialog would allow the user to switch to the Mailbox, clear up space, and retry the Poll Retrieve operation. |
| No Connection | If the line was busy or no carrier is found, try the Alternative Fax Number (if available). If this too fails, increment the number of retries. If it is equal to the standard number of retries, issue a "No Connection" Error Report. Otherwise, re-initiate the Poll Request after the retry interval. |
| Paper Jam | Abort the operation and display a "Paper Jam" dialog box. |
| Paper Out | Route the rest of the document to the User's mailbox. If mailbox storage becomes full, abort the operation. Display an "Out of Paper" Dialog Box. |
| Power Off | Print an Error Report at the next Power On and route the partially received Poll Retrieve document(s) to the user. |
| Stop | If Stop is pressed during the Poll Retrieve, abort the operation. Display a "Clear Poll Retrieve settings?" dialog. If the user does not respond within 60 seconds, clear the Poll Retrieve settings. |
| Transmission Error | If the Number of Pages received does not match the number specified by the message header, issue an Error Report. |

Broadcast Send

Description

Broadcast send allows users to send a document to multiple destinations. It is not a separate user command, but rather an enhancement on the basic message addressing process described in the Send Fax feature description.

When two fax recipients are located on the same destination IFAX machine, the fax message will be sent only once, as discussed in the Intelligent Fax Queuing and Multicasting feature description.

Options:

Sending to multiple destinations allows the user to enter multiple fax recipients for a given message.

Group lists allow users to pre-program common broadcast lists into the Phonebook for easy access. Group lists can also be nested for enhanced distribution.

Relay Lists allow users to pre-program relay requests into the Phonebook. (See Relay Fax Request feature description). Relay requests may be entered when the recipient's information is added to the address book (as described in the Address Book Maintenance feature), or may be entered by the user when the recipient is added to the broadcast send list. Relay lists can also be nested.

Procedure

The Broadcast procedure is the same as the Send Fax procedure except for:

Once the recipient list exceeds one user, the Send From Memory option should be used automatically.

Recipient fax numbers in the recipient list should be consolidated so that duplicate calls aren't made to the same destination. Intelligent Fax Queuing checks should also be performed (as in the Send Fax procedure).

If Include Digital Cover Page is selected, list the entire group of broadcast recipients, including Cc: recipients on the cover page.

When scanning the document, one entry should be added to the user's Outbox list for each fax recipient (at a different fax number). This allows users to see the status of and redial individual faxes within a broadcast.

If Print Confirmation Report is on, issue a summary Confirmation Report. Do not issue individual Confirmation Reports for each transmission. See the Basic Activity Reporting section for more information.

Exceptions

Since each recipient's message is handled as a separate Send, all the same Send Fax exceptions apply.

Relay Fax Request

Description

The user can specify that the fax should be sent via a "relay point." This relay point must be another IFAX machine, since relay is not part of the adopted G3 standard or the 1992 proposed G3 enhancements.

Relay addresses can be stored in the Phonebook for easy access or created on the fly during each send operation.

Options:
Direct Relay Combinations allow users to specify recipients that reside on the relaying IFAX machine (the relay point) in combination with other relay recipients that reside at different fax numbers.
Multiple Relay Recipients can be specified so that the relay point is actually performing a Broadcast operation.
Nested Relay Recipients can be included so that one relay point will send a broadcast list to another relay point, and so on. This enables advanced document distribution over complex corporate networks.
Discount Rate Relays control the time and costs of the relay point transfer. This option specifies that the Relay Point should forward the fax to the relay recipient during its discount rate period.
Relay Confirmation Report returns a summary, of receipts and failures to the original caller.
Relay Password Security restricts access to relay point machines to callers that include a special password for fax relays. A different password may be required for each relay point.
System Password Security, restricts access to relay point machines to calling machines that share the same system password as the relay point.
Automatic Relay Request allows the user to set up a system-wide table of automatic relays, as discussed in the Automatic Relay Request feature.

Procedure

When a Relay Station is requested, the IFAX Machine sends the document to a Relay Station with the addresses of the intended recipient(s).

A Relay Fax Request consists of a Relay Station Address, a Relay List, a Relay Password and discount rate information. The Relay Station Address consists of a Name, a Fax Number and an alternate fax number. The Relay List consists of EFAX Addresses for each recipient.

To the Sender's IFAX Machine, the Relay Fax Request is handled like a typical Send operation. All the Send Options and Exceptions apply.

Once the relay station is connected, the calling system makes a relay request. The Relay Station checks the Relay, Password Security. If this fails, it checks the System Password Security. If neither password is accepted, it returns an error report. However, if either of the passwords are correct, it accepts the documents.

Be sure to check for Direct Relay Combinations. In some cases, the message can be delivered to recipients that reside at the relay station even if the passwords fail for other relay recipients.

For information on how Relay Fax Requests are handled see the Advanced Fax Store and Forward section.

Manual and Automatic Redial

Description

Figure 103:
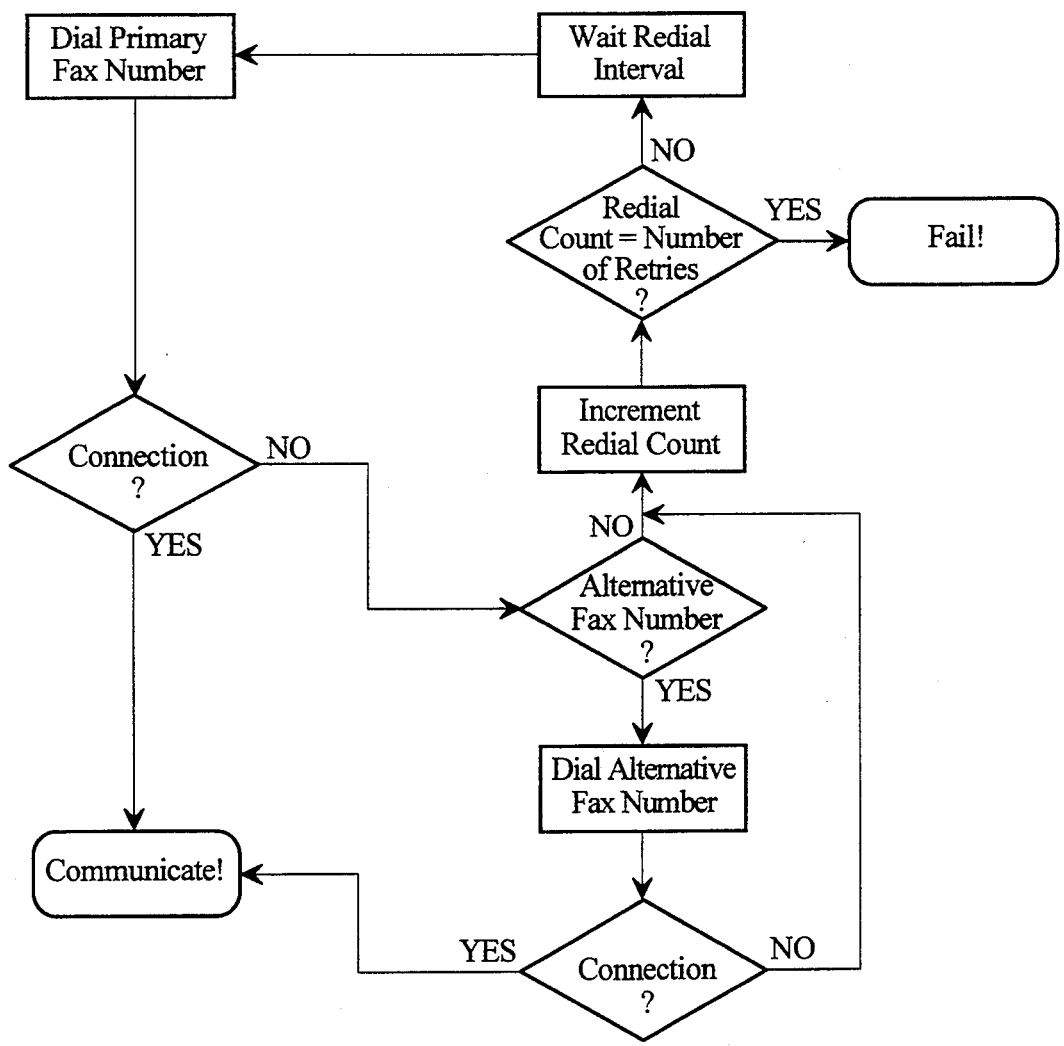
FIG. 103 is a flowchart used by the present invention for automatic redial.

Upon reception of a busy signal, the IFAX machine will automatically redial a prescribed number of times at a prescribed interval. The automatic redial flowchart is shown in FIG. 103. If the IFAX fails to receive a fax tone from the destination x consecutive times, it will assume that this is not a fax phone number and will stop redialing.

This option will be settable for the entire system rather than on a per-user basis.

Each user will also have the ability to manually initiate a redial of a previously attempted job that is queued in the outbox or scanner.

Options:
Number of Retries specifies the number of attempts to make before aborting the transmission.
Redial Interval the number of minutes to wait in between attempts.

Procedure

If a connection cannot be made, attempt to connect the Alternative Fax Number (if available). If the connection still fails, increment the redial count.

After each attempt, wait the number of minutes specified by the user in the Redial Interval. Random intervals of 10–50 seconds will be added on to this period to prevent glare situations.

When the redial count is equal to the Number of Retries, abort the operation and print an "Could not connect to recipient fax machine" Error Message.

Multi Access

Description

The IFAX 10 is designed so that any activities that can be done at the same time without contending for the same hardware will be allowed. The set of simultaneous activities possible at any one time may be limited by system parameters, such as the available memory.

Multi Access also allows the system to continue to function even when a particular peripheral is not functional. For example, the system will continue to send and receive faxes (to the extent of available memory) even when the machine's printer is disabled (e.g., paper out, toner out, paper jam, door open, etc.).

Procedure

Figure 104:
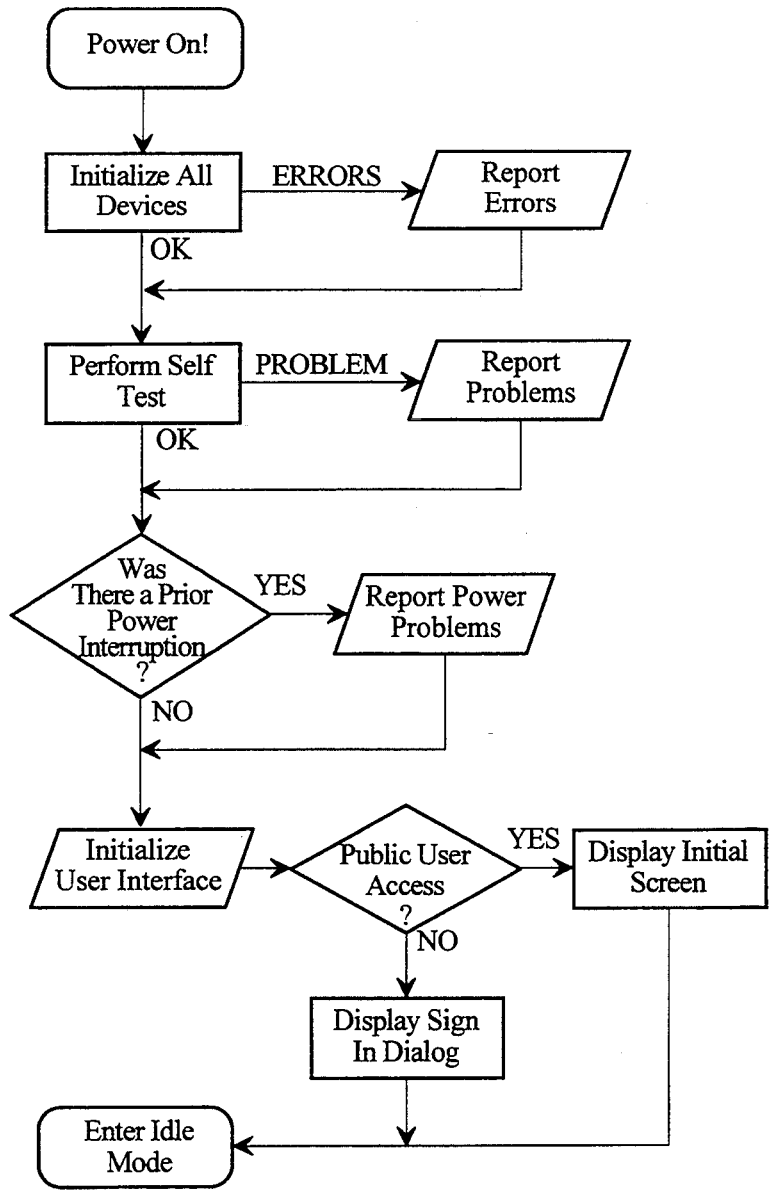
FIG. 104 is a flowchart used by the present invention for a power-on procedure.
Figure 105:
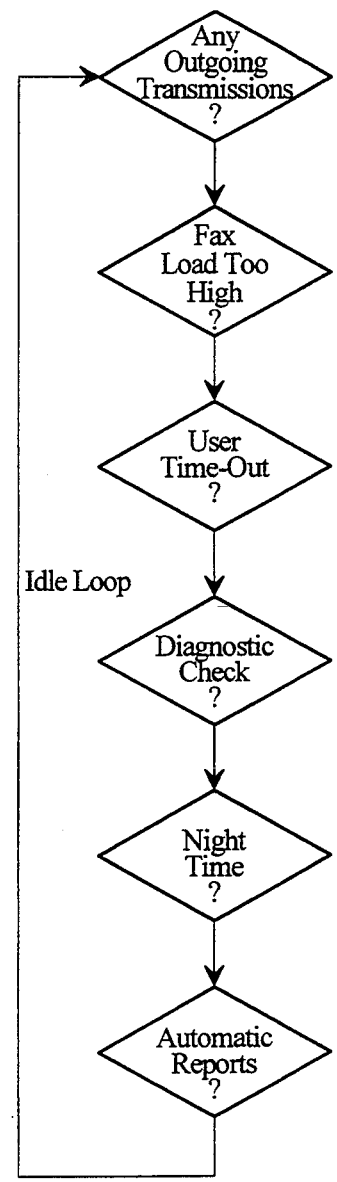
FIG. 105 is a flowchart used by the present invention for an idle loop.

There are basically four key components with regard to Multi Access: the User Interface, the Printer, the Scanner, and the Fax Modem. However, this section will also describe the Power On/Idle control flow, multi access handling of the Stop hardware key and multi user requirements of the Outbox. The power on and idle flowchart are shown in FIGS. 104 and 105.

The User Interface should be available at all times. Thus, all processes spawned by user commands work in the background, leaving the interface available to the user.

The remaining three components should be able to operate simultaneously. Thus, a given feature should be available if the components it needs are available. If they are not, the completion of the feature must be placed on hold.

Sometimes this will require that the User Interface display a dialog indicating that the operation is on hold. For example, if the user requests a copy while an incoming fax is being printed.

The following Table 1 describes the IFAX's capabilities at an internal system level:

TABLE 1

| User Foreground Tasks | Background Tasks | | | | | | | | | | | | |
|---|---|---|---|---|---|---|---|---|---|---|---|---|---|
| | Send Fax From Scanner | Send Fax From Storage | Receive Fax and Print | Receive Fax and Store | Poll Retrieve Fax and Print | Poll Retrieve Fax and Store | Advanced Fax Store and Forward | Basic Activity Reporting | Remote Diagnostics | Remote Trouble Reporting | Copy | Remote Print from Windows | Routing EFAX Messages via Serial/LAN |
| Send Fax | | | | | | | | | | | | | |
| Receive Fax | | | | | | | | | | | | | |
| Poll Store | | | | | | | | | | | | | |
| Poll Retrieve | | | | | | | | | | | | | |
| User/ System Administration | | | | | | | | | | | | | |
| Fax Mailbox Administration | | | | | | | | | | | | | |
| Run Application | | | | | | | | | | | | | |
| Basic Activity Reporting | | | | | | | | | | | | | |
| Copy | | | | | | | | | | | | | |
| Remote Scan | | | | | | | | | | | | | |
| On-Line Help | | | | | | | | | | | | | |

At Power On, the system should follow these steps:
Initialize All Devices. Report any errors that occur.
Perform Self Test. Report any problems that exist.
Check For Power Interruption. If the machine lost power during an important operation, issue a Power Interruption Report.
Initialize User Interface. If public user access is allowed, display the main menu. Otherwise, display the Sign In dialog.
Enter Idle Mode During Idle Mode, the system should:
Check For Outgoing Transmissions every minute. Poll the Outbox every sixty seconds for outgoing faxes and redial operations.
Monitor Fax Load balancing every five minutes.
Check Night Timer (if included) every fifteen minutes to see if the printer engine should be turned off during certain hours.
Re-Initialize User Interface every fifteen minutes. Sign out the current user. If public user access is allowed, display the main menu. Otherwise, display the Sign In dialog.
Perform Quick Diagnostic Check every fifteen minutes. Report any problems that exist.
Check Automatic Reporting every fifteen minutes. Route reports if the automatic reporting interval has passed.

Multi Access complicates the handling of the Stop hardware key. Follow these steps whenever the Stop key is pressed:
Does Stop apply to the action the user is currently performing? For example, is the user copying a document? Are they recording a quick key sequence? If so, stop the user's current action.
Does Stop apply to a background task owned by the current user? For example, is a job currently being transmitted that was queued as Send From Memory? If so, display a dialog asking the user if they'd like to interrupt this task, cancel this task or continue working.
Does Stop apply to a background task owned by another user? For example, is a job currently being transmitted that was queued by another private user? If so, display a dialog that says "You do not have authorization to interrupt this transmission."

Multi Access also complicates the functionality, of the Outbox. IFAX platforms support an Inbox/Outbox messaging model. All immediate outgoing, scheduled outgoing, poll store, persistent poll retrieve and relay messages are stored in the system Outbox until they are ready for transmission (in the case of immediate outgoing messages, this is usually a very. brief time period). They are removed from the Outbox once the messages have been successfully delivered or redialed to failure.

The System Outbox can be filtered in four different ways:
Private Outbox filter is used once someone signs in. The Outbox only shows messages owned by the current signed in user and publicly available messages.
Public Outbox filter is used when no one is signed in. The Outbox shows all publicly available outgoing messages.
Relay Outbox filter shows messages from other machines that are being stored and forwarded.
Administrator Outbox shows and provides access to all messages in the System Outbox when a user with administrative privileges signs in.

Immediate Scan
Description
In order to reduce the time required to send a fax, the IFAX machine can begin scanning the document into memory immediately after the start button has been depressed.
When this feature is disabled, the system will wait until it attempts to connect with the recipient before beginning to scan.
Options:
Send From Memory turns off immediate scan. Each fax is scanned completely into memory before being transmitted.

Broadcast Fax automatically turns off immediate scan. Send From Memory is always used for broadcasts.

Full G3 Compatibility

Description

The system will offer full backward compatibility with the existing worldwide G3 Fax Network.

Options:

Error Correction Mode (ECM) for highly accurate image and data transmission.

Page Retransmission Mode for re-transmission of corrupted pages.

1D and 2D Data Compression and Encoding Modes, including Modified Huffman (MH), Modified Read (MR), and Modified Modified Read (MMR) fax data encoding and decoding.

Voice Request on machines that support this feature.

Image reduction to accommodate different send and receive paper sizes.

8 minute close (for the German market)

Copy Document

Description

Figure 106:
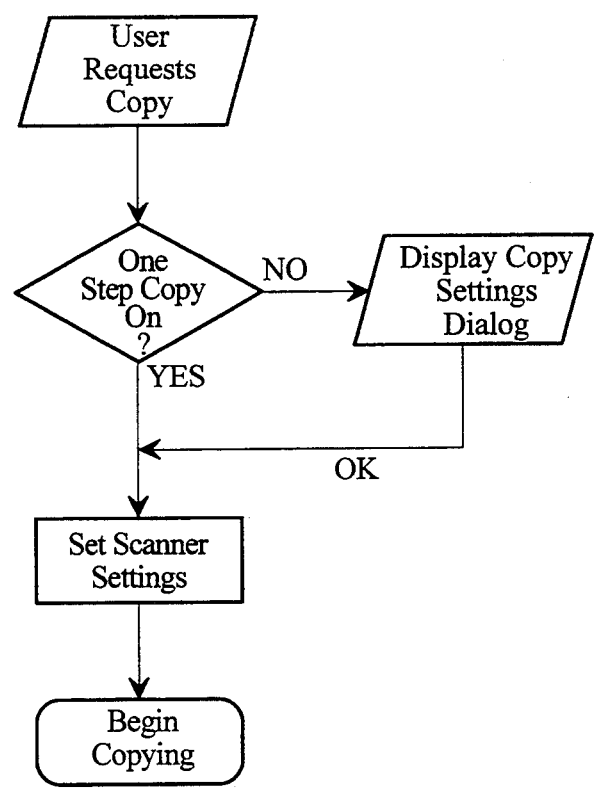
FIG. 106 is a flowchart used by the present invention for a copy document setup operation.
Figure 107:
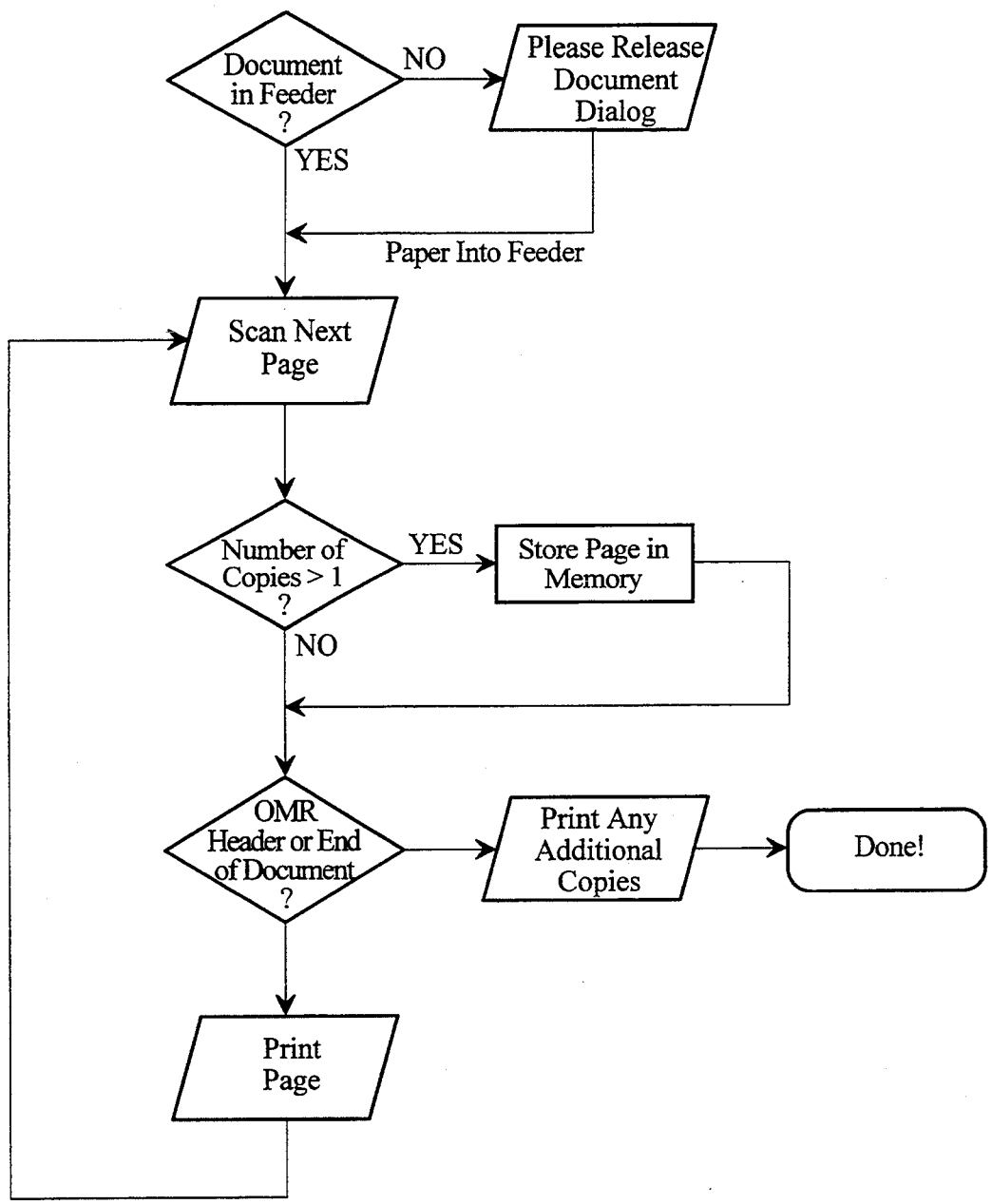
FIG. 107 is a flowchart used by the present invention for a copy document operation.

The user will be able to make copies of documents by inserting the document in the IFAX document feeder and pressing the copy button. The copy document setup flowchart is shown in FIG. 106. The copy document control flowchart is shown in FIG. 107.

Options:

One Step Copy automatically makes one copy at the currently selected resolution when the user touches the Copy button. When this option is off, an additional dialog lets the user set these other options below:

Number of copies, supported on machines with sufficient memory.

Resolution, Contrast and Halftoning See the High Resolution Scan, Print, Send & Receive section for details.

Image enhancement removes stray pixels from scanned copy images.

Reduction/enlargement provided for certain paper sizes.

Procedure

If One Steep Copy is on, begin the copy operation with Number of Copies=1 and use the currently set Resolution, Contrast and Halftoning modes. Otherwise, begin the copy operation when the user presses Start (following the Copy settings dialog box).

If there is no document in the feeder, display a "Please Insert Document" dialog box. Continue when a document is inserted.

Scan and copy the document according to the settings (either from the Copy settings dialog or the One Step Copy instructions).

If Number of Copies is greater than one, collate the copies. In other words, while making the first copy, store the entire document in memory to make the remaining copies.

If Image Enhancement is on, follow the steps described in the Image Enhancement For G3 section.

| Exceptions: | |
|---|---|
| Document Cover Open | Display a "Close Document Cover" dialog box. |
| Memory Full | Display a "Memory Full. Can only make one copy" dialog box. i.e. There is not enough memory to collate multiple copies. |
| Paper Jam | Display a "Paper Jam" dialog box. |// -continued
| Exceptions: | |
|---|---|
| Paper Out | Display a "Paper Out" dialog box. |
| Power Off | At next Power On, clear the paper feeder. |
| Stop | Abort the operation. Clear the paper feeder. |

Programmable Function Keys (Autokeys).

Description

Figure 108:
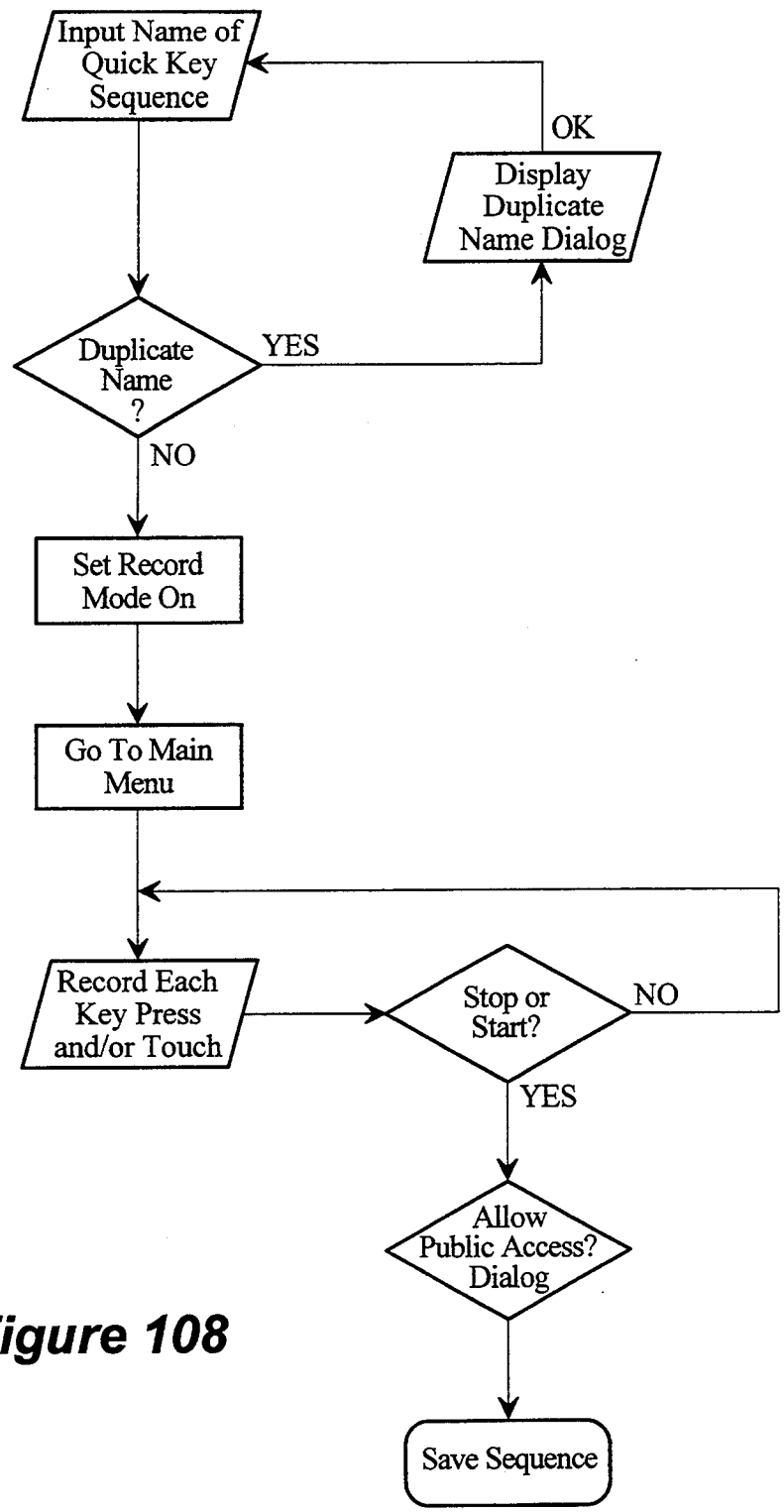
FIG. 108 is a flowchart used by the present invention for an autokey reporting operation.

The user will be able to record software macros for single step execution from the top level menu. The Autokey recording flowchart is shown in FIG. 108. Entire send or broadcast sequences can be easily recorded and repeated at the touch of a button.

Options:

Start begins execution of selected Autokeys.

Record allows the user to record a new Quick Key macro.

Remove removes a Quick Key sequence.

Procedure

Quick Key sequences should be executed as if the user was pressing each button. This should be a simple procedure. If the user presses Stop during a Quick Key sequence, display a dialog "End Quick Key sequence x?"

Recording Quick Key sequences is a bit more complicated. When in Record mode, the status indicator of each screen and dialog should show "RECORD". When the user presses Start or Stop, terminate the record sequence.

Ask the user if the sequence just recorded should be set for public access. If not, this is a private key sequence (visible only when the current user is signed on).

Advanced Document Transmission

High Quality Renderable Document Transmission

Description

The user will be able to send a renderable document, one that can be printed on IFAX machines and EFAX PCs with high quality. When this option has been specified and the IFAX is communicating with a G3 fax machine, the IFAX will render the document into G3 format using the highest resolution supported by the receiving fax machine.

Procedure

This feature refers to the ability of an EFAX PC to render a document for transmission from an IFAX connected via LAN/Serial interface.

The IFAX can transmit and render the Jumbo data to other fax machines, including G3 and IFAX.

Editable Document Transmission

Description

The user will be able to send a native format document (binary file) to the recipient. The IFAX will send such documents without regard to their contents. If the IFAX encounters a G3 fax machine, it will abort transmission and inform the sender of the failure and reason.

The user can also choose to send both a renderable and editable version of a document, if they so desire.

Procedure

The IFAX can transmit Editable documents as binary Attachments. The IFAX will send such documents without regard to their contents. Only EFAX aware recipients will be able to receive the binary attachment.

Each binary attachment should be counted as a single page at the end of the document. The Fax Viewer and the Mailbox will allow users to transfer these binary attachments to their PC's using the Mailbox Feature Save to Floppy.

Exceptions

If the IFAX encounters a G3 fax machine, render a short message stating that a binary attachment could not be transmitted.

Support for Different Message Types

Description

The IFAX machine and EFAX protocol will be desired to support the sending and receiving of documents that consist of multiple parts, each of which may contain different media types.

Some messages will contain binary Attachments of different types. Other messages will contain Phonebook information, Custom Cover Sheets, Configuration Settings, etc.

Some of these message types will be automatically recognized and acted on by the system while others will require the user to extract elements from each of these message types. Most of these message types will have to be defined in the Remote Access section.

Digital Cover Sheets

Description

IFAX platforms can automatically generate digital cover sheets with custom styles and fax header information.

In communications between two IFAX 10 machines of the same construction, the cover sheet will be generated at the recipient's machine from message header information and the style template, contained as a message part. This will save transmission costs. However, when transmitting to G3 fax machines, the IFAX machine will render the cover page to a G3 format for transmission.

Unless the system also supports the Multiple Digital Cover Sheet Administration feature, the machine will probably ship with only one default Cover Style.

Options

Customized Style defined by a cover page template editor. This style will affect the layout of the cover page and the remaining options.

Recipient List includes recipient names, fax numbers, phone numbers, (different cover styles display the list differently), To:'s and Cc:'s.

Personal or Corporate Logo, not supported on low end fax machines, the cover page template can include a small corporate logo on each cover page Time and Date displays the time and date of the transmission.

Number of Pages displays the number of pages transmitted and (if known) the number of pages the user specified.

Procedure

If the Include Digital Cover Page option is on, insert a digital cover page as the first page of the document. If you are communicating with an intelligent machine, transmit the cover template, otherwise (if G3), render the template to the current resolution.

It can include the following dynamic fields from the transmission:

Sender's Name, Company name and Address, Phone Number and Fax Number

Sender's cover page bitmap or default IFAX Logo

Recipient List with To:/Cc: designations

Time and Date

Number of Pages

List of Binary Attachments/Enclosures as "Encl:"

Cover sheets will be created with a Windows Cover Page Template Editor Applet. The editor will support dragging and dropping of text, picture objects and dynamic fields onto a blank cover sheet.

Text can be any caption in a user selectable font & style placed anywhere on the page. Picture objects are any OLE compatible bitmap format that can also be placed anywhere on the page. And finally, Dynamic Fields are like those listed above: Name, Company, Recipient List, Time and Date, Number of Pages etc. The dynamic fields are filled in differently for each transmission whereas the other objects are static. Note: custom fonts may be substituted by default font styles on other IFAX Machines.

Multiple Distal Cover Sheet Administration

Description

The IFAX 10 supports a library of cover sheet styles. Each can be used for different tasks, formal, informal, confidential, personal, corporate, etc. Once created on a Windows Cover Page Template Editor, Cover Sheets can be downloaded to IFAX machines, transmitted to other intelligent platforms, etc. Each user can maintain a private library of cover sheets in addition to the publicly available cover sheets on their system.

When a user sends a message, they will be presented the option of including a cover page. If the select "yes," they can accept the default cover page specified during the user setup process or select an special purpose cover page.

Options:

Install adds cover sheet styles to the public or private library on a given IFAX Machine.

Remove deletes cover sheet styles from an IFAX Machine.

Enclose allows users to send CPX files to other users so that they can share and exchange cover sheet styles.

Print allows users to print a copy of the cover page template before using.

Preview allows users to see the cover page template on the LCD display before using or printing.

Procedure

Figure 109:
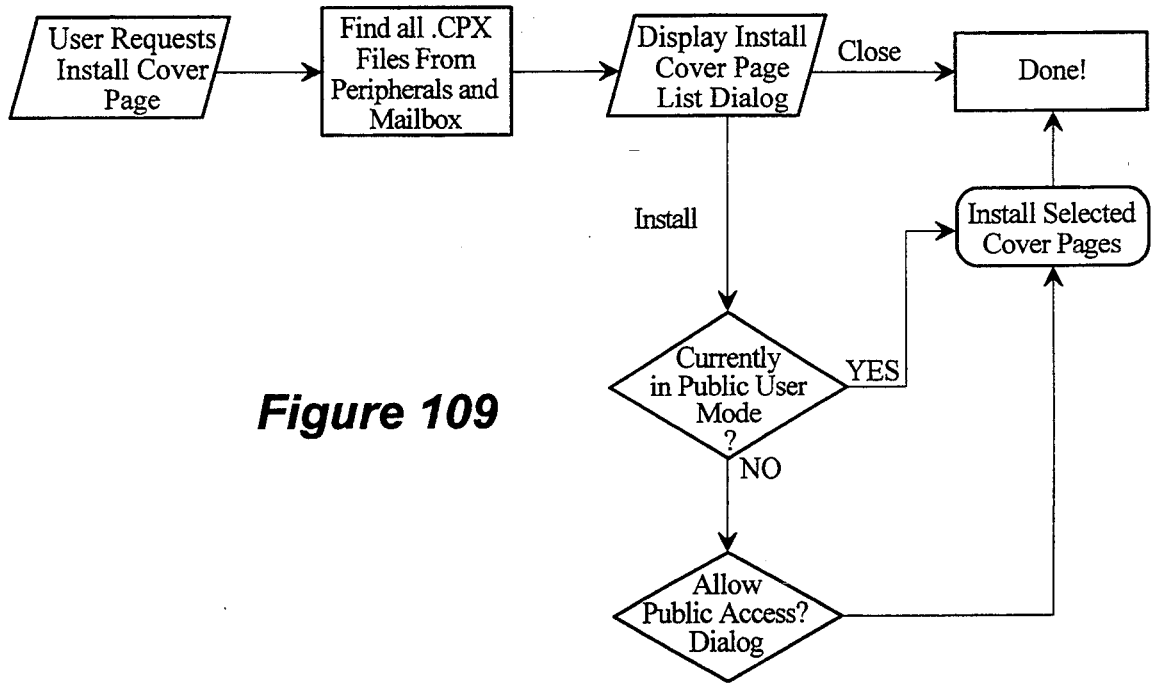
FIG. 109 is a flowchart used by the present invention for a cover page installation operation.

IFAX platforms support the storage of Multiple Digital Cover Sheets. Users can add or remove cover sheets to a private or public library of system cover styles. The cover page installation flowchart is shown in FIG. 109.

When new cover styles are installed, display a "Allow public access?" dialog. If the user presses no, then the cover style should be added to the user's private list instead of the public list.

Automatic Relay Fax Request

Description

The system will optionally support automated routing of faxes via selectable relay points. Administrators can establish that either all messages should be routed via a relay point or that messages with particular area codes or country codes should be relayed.

If the relay is unsuccessful, the system can be configured to either retry the relay point at a later time or attempt to send the message directly.

For more information, see the Relay Fax Request feature description.

Options:

Default Relay Point specifies that all outgoing transmissions should be sent through this relay point.

Relay by Prefix specifies that outgoing transmissions should be routed through various relay points according to their prefix.

Send Directly After Failure specifies that the machine should try to send the message itself if the relay connection fails.

Procedure

Figure 110:
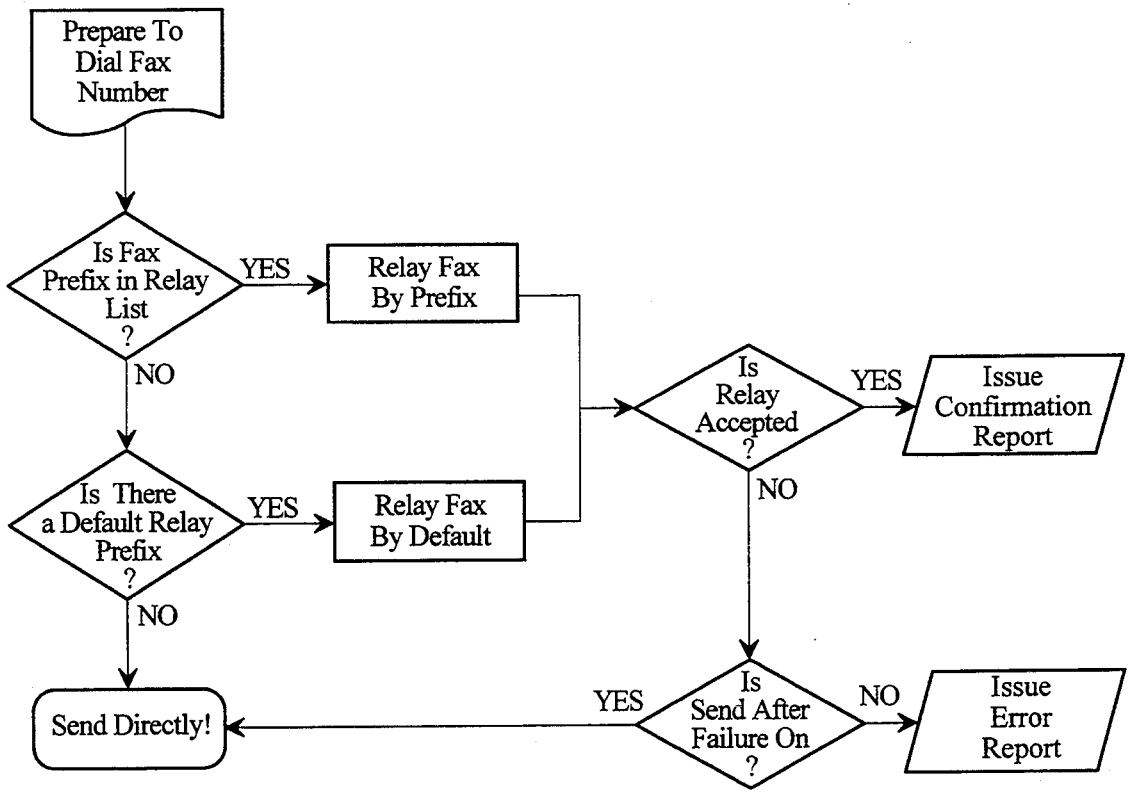
FIG. 110 is a flowchart used by the present invention for an automatic relay facsimile request operation.

The automatic relay flowchart is shown in FIG. 110. With each outgoing transmission, compare the prefix to those in the Automatic Fax Relay Request List. If they match, automatically re-route the transmission through the relay point.

If a Default Relay Point is specified, route all transmissions through this relay point. Note: Relay By Prefix settings have preference over the default.

If any of the relay connections fail and Send Directly After Failure is specified, transmit the document directly to the destination.

See the Relay Fax Request section for more information.

Advanced Fax Store and Forward

Description

The system will be able to accept relay requests described in the Relay Fax Request and Automatic Relay Request features. Forwarding requests can be of the following types:

Direct Relay Combinations allow users to specify recipients that reside on this relay point in combination with other relay recipients that reside at different fax numbers.

Multiple Relay Recipients can be specified so that this relay point will actually perform a Broadcast operation.

Nested Relay Recipients can be included so that this relay point will send a broadcast list to another relay point, and so on. This enables advanced document distribution over complex corporate networks.

Discount Rate Relays control the time and costs of the relay point transfer. This option specifies the relay execution should wait until the discount rate period begins.

Procedure

Figure 111:
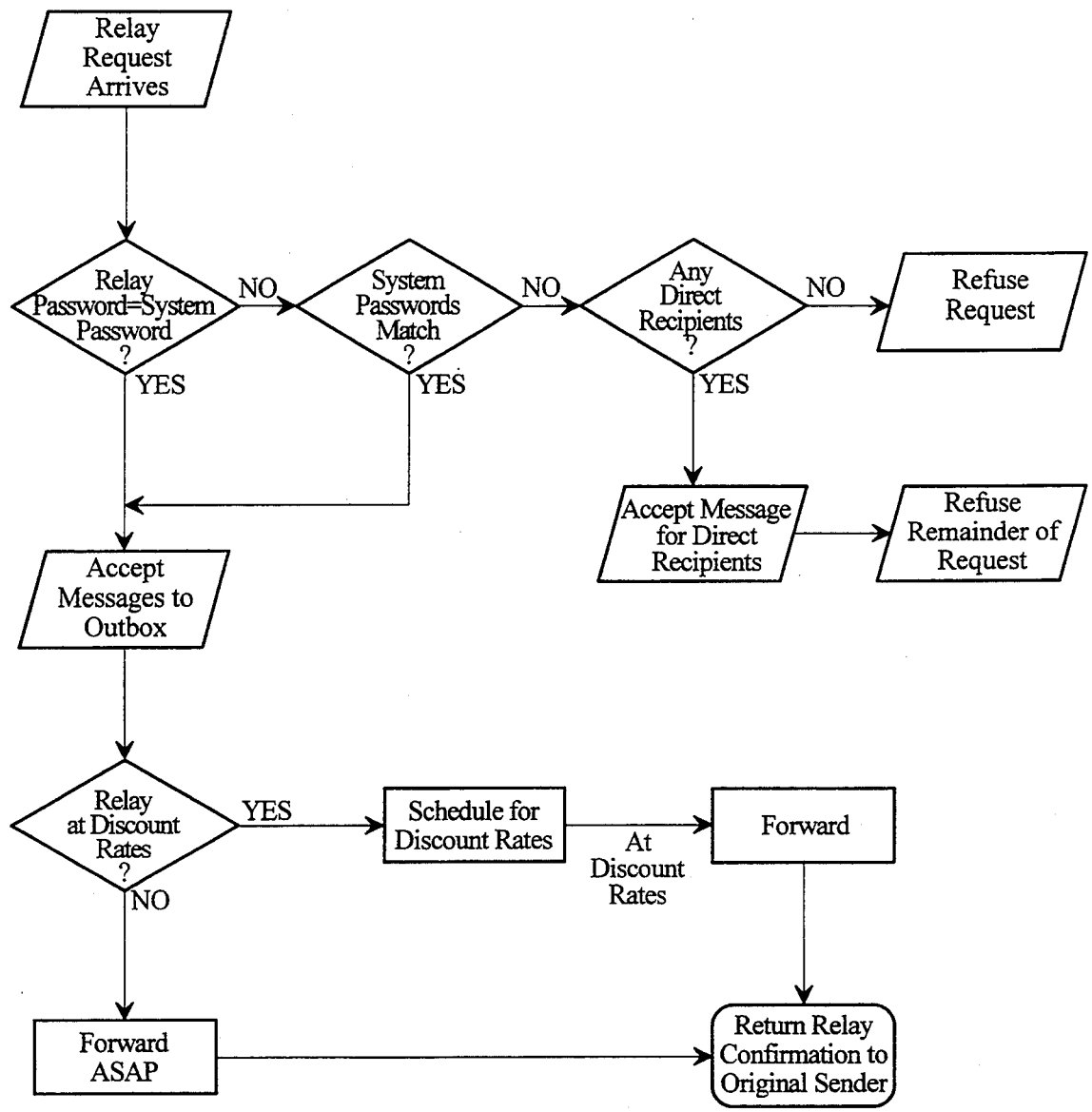
FIG. 111 is a flowchart used by the present invention for an advanced facsimile message store and forward operation.

The IF AX 10 can operate as a Relay Station to provide Advanced Fax Store and Forward capabilities. The Relay Station accepts incoming Fax Relay Requests and then forwards them to the designated recipient(s). The advanced store and forward flowchart is shown in FIG. 111.

When the Relay Station receives the Relay Fax Request, it must first verify the caller's relay access rights. Compare the Relay Password to the relay station's System Password. If they don't match, compare both system's System Password. If they don't match, issue an error report.

Be sure to check for Direct Relay. Combinations. In some cases, the message can be delivered to recipients that reside at the relay station even if the passwords fail for other relay recipients.

If either of the passwords match, accept the relay message and store it in the Outbox. If Discount Rate Relay is specified, store the message in the Outbox until the start of the discount rate period.

As soon as the phone line is available, begin broadcasting the message to members of the Relay List. Since this operates as a normal Broadcast operation originating from the Relay Station, all of the Broadcast procedures should be used including Intelligent Fax Queuing, Automatic Relay Fax Request and Fax Load Balancing checks.

If the original sender requested a Confirmation Report, print a Confirmation Report when the Relay Station accepts the fax. Once the Relay Station delivers all the messages, send back a Relay Confirmation Report to the original Sender (using the return relay address, still an open issue).

Relay Stations can also be Polled for the transmission status of Relay Messages. See the Check Relay Status section of the Polled Fax Retrieve feature.

For more information on Fax Relay Requests, see the Fax Relay Request section.

| Exceptions: | |
| --- | --- |
| Password Invalid | If neither the Relay Password or the System Passwords match, return an Error Report to the Sender stating that they have no Relay Access on this Relay Station. |
| Relay Delivery Failure | If the Relay Station cannot successfully relay the message to its destination(s), send back a Relay Failure Report to the original Sender. |

Intelligent Fax Queuing and Multicasting

Description

IFAX platforms will automatically consolidate faxes headed to the same destination into one fax transmission. This will send multiple messages in a single call, saving connection charges.

When a single fax is sent to multiple recipients associated with a single destination IFAX machine, that fax will be sent only once and distributed to each user by the destination IFAX machine (only supported during transmissions between two IFAX 10 of the same construction).

Procedure

Figure 112:
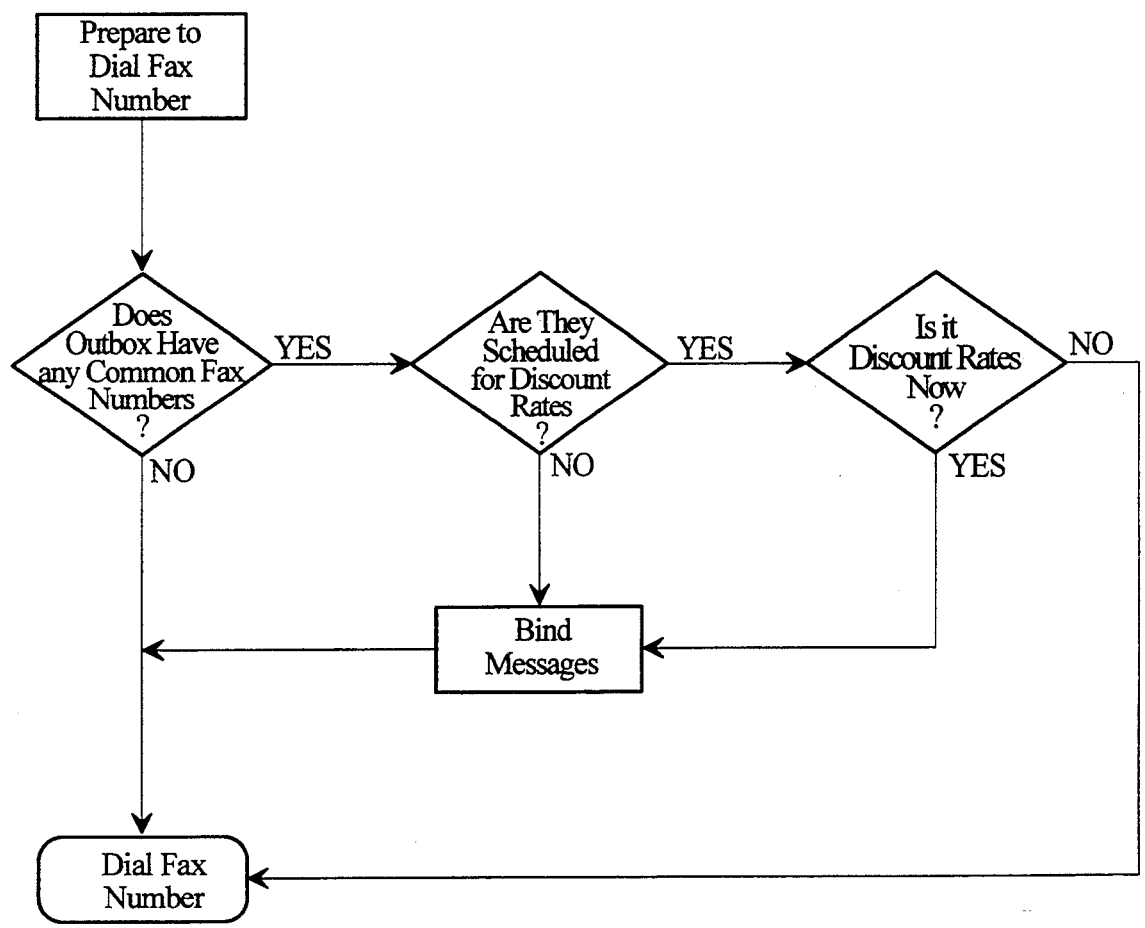
FIG. 112 is a flowchart used by the present invention for intelligent facsimile message queuing and multicasting.

The intelligent facsimile queuing and multicasting flowchart is shown in FIG. 112. Whenever a fax number is about to be dialed, the system Outbox should be checked for other faxes waiting to go to the same destination. this includes recipients at a common fax number on the initial message.

Transmissions scheduled for discount rates should never be consolidated with transmissions made during peak hours.

We should be careful about consolidating Secure faxes without maintaining the same high level of security.

Separate Confirmation Reports should still be generated for each consolidated fax message.

Fax Load Balancing

Description

IFAX platforms will automatically monitor system loads and reallocate jobs across a Local Area Network when necessary. When a machine becomes heavily loaded, it will send a message to other machines looking for assistance. When another available machine responds, the IFAX machine will transfer outgoing fax messages to this available machine via a simple relay request.

Procedure

Figure 113:
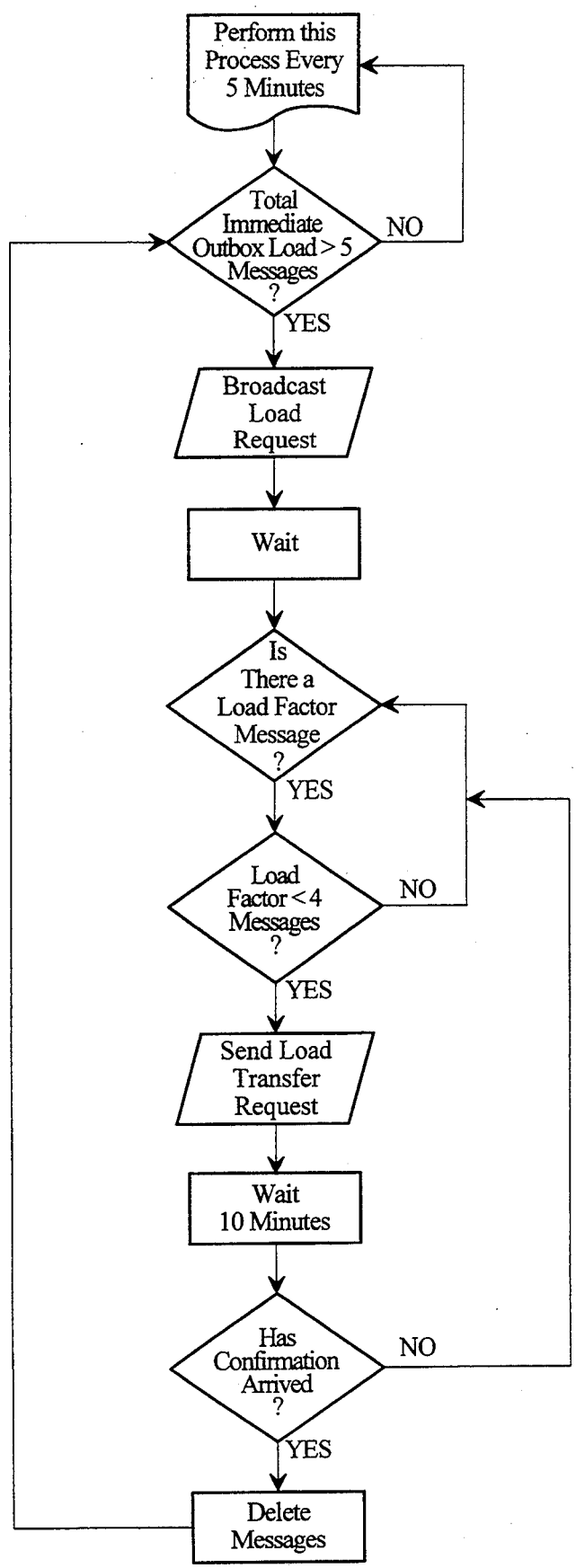
FIG. 113 is a flowchart used by the present invention for facsimile machine load balancing.

The load balancing flowchart is shown in FIG. 113. When there are more than five outgoing faxes (scheduled for as soon as possible) waiting in the Outbox, send out a request for assistance over the LAN to each of the IFAX Machines in the Load Balancing configuration list. This list must be set up in advance by a user or system administrator. Each machine must have identical system passwords.

If the requesting IFAX is listed in the other IFAX Machines' Fax Load Balancing List, they will respond with a Load Factor message. This shows the number of messages on their queue.

The requesting IFAX can then distribute the overloaded messages via LAN to the other IFAX Machines. An IFAX Machine should use caution not to overload another IFAX Machine's queue more than its own. The number of messages distributed should not force the destination machine's Load Factor over five messages.

The request is called a Load Balance Transfer Request. If the machine accepts the Transfer Request, it will send a confirmation to the original machine. If the confirmation message is not received within ten minutes, assume that the transfer request failed (was denied). This should assure that messages do not get lost while between two machines. Therefore, don't delete the message from the Outbox until the Transfer Request confirmation has been received.

Once the messages have been transferred to the other IFAX Machines, they behave just like Relay Fax Requests. So status and confirmation work similarly to the Advanced Fax Store and Forward section.

IFAX Machines cannot make Transfer Requests on messages that they have accepted from other IFAX Machines. This should prevent a glare situation on the network.

Alternatively, the IFAX 10 could make a Load Balance Transfer Request based on the size of the outgoing facsimile messages or the time required to transmit the outgoing facsimile messages.

| Exceptions: | |
|---|---|
| Network, IFAX No Permission | If the requesting IFAX Machine is not listed in the Network, IFAX's Fax Load Balancing List, permission will be denied. An Error Report should be sent to the System Administrator. |
| Network IFAX Not Found | The IFAX Machine in the Fax Load Balancing List was not found on the network. Send an Error Report to the System Administrator. Put the original message back in the EFAX Machine's own queue. |
| Transfer Request Denied | If the destination Load Balancing machine denies the transfer request, attempt to transfer jobs to other machines. |

Fax Stacking
 Description

When the IFAX machine's document feeder contains a fax message that is either being scanned or waiting to be scanned, the user will be able to "stack" another fax on top of the currently loaded sheets. The first page of a stacked message must be an OMR-coded IF AX cover sheet, from which the system will determine the message's sender and recipient.
 Procedure When scanning the top of each page, check for the OMR mark at the top left of the page. If the mark is found, the previous job should be completed and the OMR job started next.

| Exceptions: | |
|---|---|
| Missing Information | If the OMR Engine cannot locate parts of the data, the fax should be fed through until another OMR Cover Page is found. An Error Message should be printed after the fax is fed through indicating that it was not sent. |
| Paper Stuck | If the last page of one fax feeds in with the OMR Cover Page of the next fax, we might accidentally |

| Exceptions: | |
|---|---|
| | transfer documents to an incorrect destination. |

Alternative Number Calling
 Description

The user may specify an alternative number to send a fax to if the first number is busy or otherwise unavailable. The alterative fax number is part of the standard intelligent fax address type.
 Procedure If a Send, Broadcast, Poll Retrieve or Relay Fax Request is unable to connect to a remote machine (No Carrier), it should try the Alternative Fax Number entry of the Recipient Address (if available) before incrementing the Redial count.

Each subsequent retry should try both the standard fax number and the alterative fax number in that order. For more details, see the Manual and Automatic Redial feature description.

Fax Outbox Management
 Description

The user will be able to view a list of all messages queued for transmission and perform the following actions:
 View Messages allows users to use the previewer to look at outgoing messages and see the status of the transmission.
 Print Messages prints copies of outgoing messages.
 Cancel A Fax aborts outgoing fax messages and cancels persistent poll retrievals.
 Edit A Fax allows users to change the recipient list and fax settings of outgoing transmissions.
 Manual Redial specifies immediate redial of outgoing messages.
 Sort orders outgoing faxes by recipient or status.

Received Fax Preview
 Description

The system will support viewing fax messages held in the user's mailbox. Users will be able to select from several viewing modes, including full page, and actual size. The quality of viewing in these modes will depend upon the resolution of the IFAX machine's screen and the fax message.
 Options:
 View Messages allows users to look at received faxes, zooming in or out on specific areas and providing special handling of binary attachments.
 Print Messages prints copies of received faxes.
 Delete removes messages from the Mailbox.
 Save copies the message and attachments to a peripheral drive (e.g. floppy)
 Forward lets users send messages on to other recipients.
 Sort orders received faxes by sender or status.

Remote Access
 Description

Users will be able to control features of their IFAX 10 from remote locations using Windows PC's connected via serial or through any PSTN interface using an IFAX or EFAX PC.
 Options:
 Fax From Windows allows users to send, receive, broadcast, poll, etc. from a Windows platform using an [FAX Machine as a gateway.

Remote Printing From Windows allows users to print documents from Windows using the IFAX Machine.

Remote Scanning From Windows allows users to scan documents to their PC using the IFAX Machine.

Remote Mailbox Control allows users to browse their mailbox, view, print and retrieve files remotely.

User Administration allows users to setup the preferences from a remote location. Users will be able to access all features described in the User Administration feature description previously described in connection with FIG. 61.

System Administration allows administrators to configure and monitor a single IFAX 10 or entire network of IFAX Machines from a Windows PC. System administrators will be able to access all features described in the System Administration feature description.

The system will support such remote connections via all available and appropriate external interfaces e.g., PSTN, LAN, and serial connections (including those with attached external data modems-this connection method is considered low priority for the first release).

Voice Playback and Record Support

Description

The IFAX 10 will provide the ability to install voice playback and recording hardware, as would be used in a fax-on-demand application. The hardware vendor will be responsible for developing the system driver to support this functionality and the application that uses this functionality. The IFAX software will provide system level support, which includes storing and accessing sound files and delivering these files to the sound device driver.

The installation of such systems can have potentially significant impact on system hardware requirements. These include additional system memory, hardware to decompress and play sound files, hardware to receive microphone input and convert it to sampled, compressed sound files, and the ability to distinguish between voice and fax incoming calls.

Secure Transmission and Reception

Document Encryption

Description

The system will allow users to encrypt fax transmissions to guard against reception of readable documents by unintended recipients.

Procedure

If the Encryption option is on, the contents of the document is encrypted with the public key of the Recipient(s). The encryption process must be done separately for each Recipient.

If the Recipient's Public key is stored with their address, the encryption can be done before the call is initiated. Otherwise, the encryption may have to occur on the fly once the key has been obtained.

The Public Key should be stored for later use with the Recipient's Address.

Document Authentication

Description

The IFAX 10 has the ability to verify the identity of the sender and recipient before transmitting the fax message.

Procedure

If the Authentication option is on, the document should be encrypted with the private key of the sender and attached to the sender's Digital Certificate.

The Digital Certificate is a copy of the sender's Public Key encrypted with the Private Key of the IFAX Security Authority.

The Recipient can then verify the identity of the Sender by decrypting the Digital Certificate with the Public key of the IFAX Security Authority and using it to decrypt the document.

The Authentication process can occur before the call is made since all the necessary keys should be available.

Digital Signature

Description

The system will have the ability to include a checksum (or conceptual equivalent) to verify that the received document contents are the same as those sent by the sender.

Procedure

If the Digital Signature option is on, the document should be processed through an IFAX hashing algorithm. The resulting hash code should be encrypted with the Public Key of the Recipient(s).

The receiving IFAX Machines in the document through the IFAX Hashing algorithm as well and compare their hash code result to the hash code they decrypt with their private key.

If the hash codes are identical, the document has not been tampered with.

The Hashing can be done before the call is made but the encryption of the hash code must be done when the Recipients' Public Keys are available (possibly before the call).

Send, Receive, and Relay Access Restriction

Description

This feature allows users to place restrictions on the external fax machines that can communicate with their fax machine.

Options:

Restrict Transmission To Phonebook List prevents users from sending to members outside the phonebook. This can prevent mis-dialing as well as unwanted long distance calling. Of course, users can override this by adding members to the phonebook.

Restrict Reception By Phonebook List prevents junk fax by restricting accepted faxes from members of the phonebook.

Restrict Reception By System Password restricts reception of faxes to machines that have the same system password, usually a small closed network of machines.

Remote Procedure Calls Allowed turns on/off remote access to the fax machine.

Relay Passwords prevent outside callers from using fax relay features without specifying a specific password.

User Access Restriction

Description

Users and administrators can create password-protected personal mailboxes for receiving and storing faxes. IFAX platforms also support personalization of user account settings and preferences. Users can access these personal mailboxes and settings by signing in to the IFAX Machine.

Options:

Sign In personalizes the system according to the user's preferences and provides them access to their personal mailbox.

Sign Out returns the system to its default mode, restricting access to secure mailboxes.

Public Access allows the system to be used without signing in. Public access provides the same functionality as personalized access without the security.

Procedure

Figure 114:
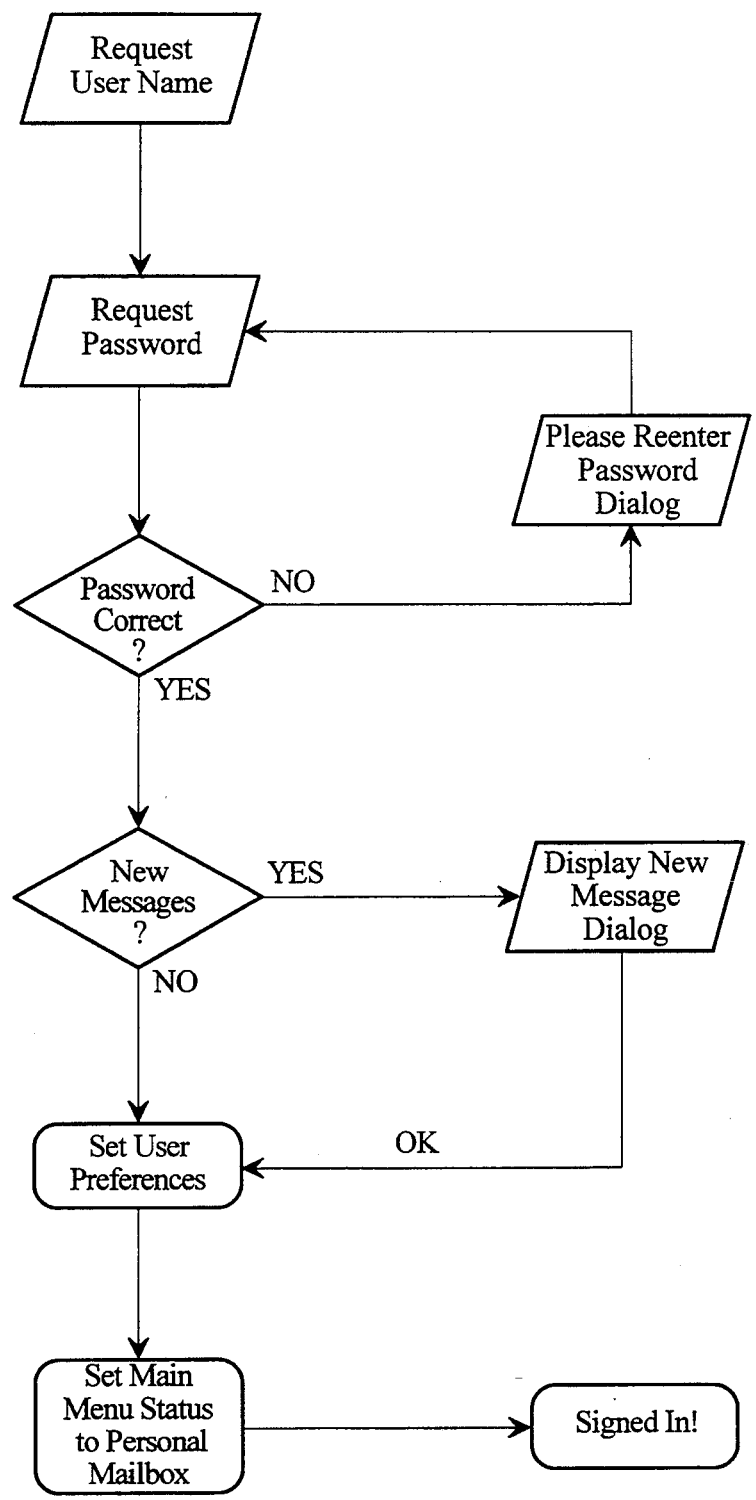
FIG. 114 is a flowchart used by the present invention for a sing-in operation.

The sign in flowchart is shown in FIG. 114. At Sign In, request a password to verify the user's identity. If the password is correct, check to see if the user has any new unread messages. If so, display the "You have x unread messages" dialog.

Switch the main menu Mailbox status indicators so that they indicate the status of the personal Mailbox. Adhere to personal preferences specified in the User Level Administration section.

Figure 115:
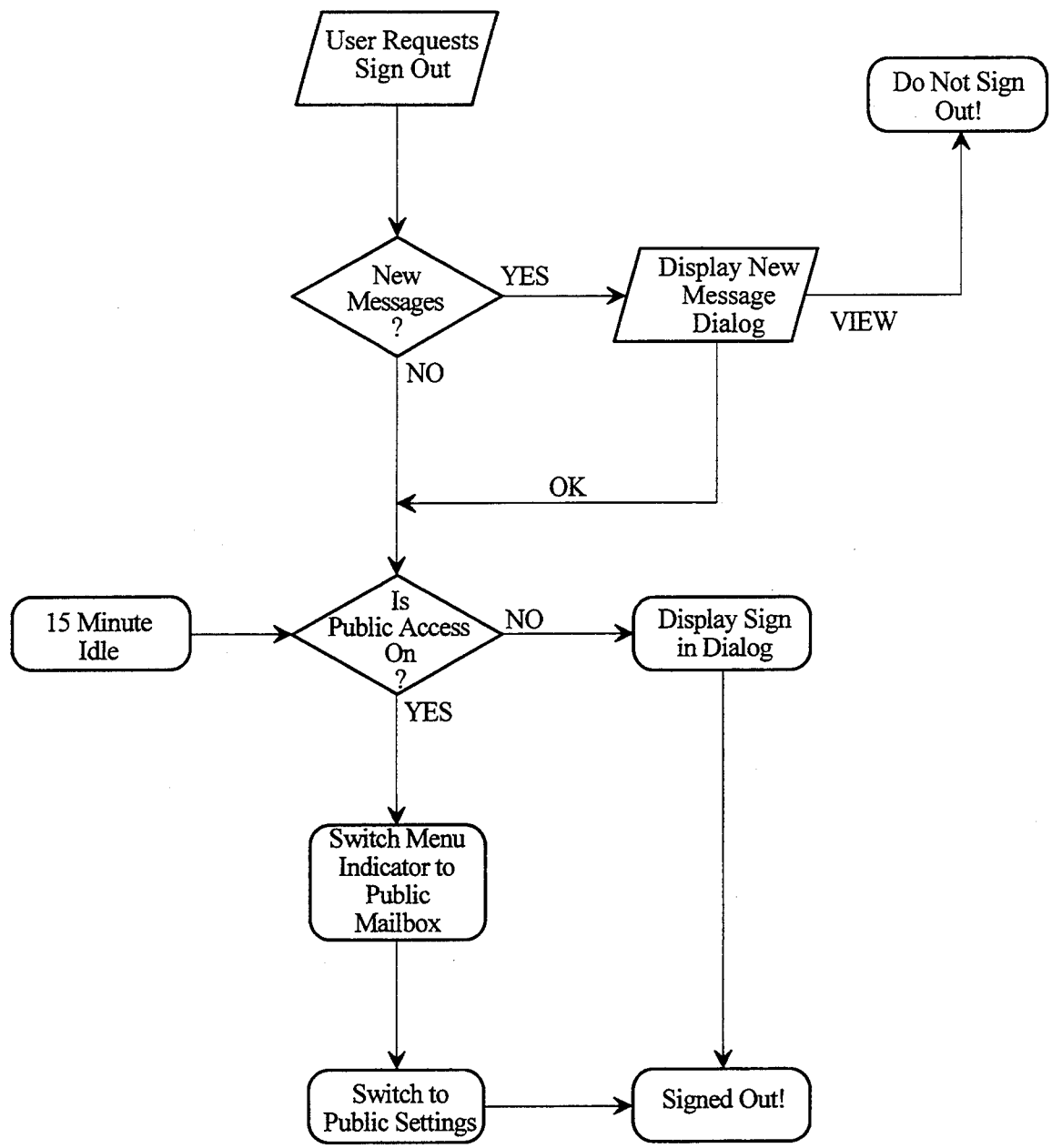
FIG. 115 is a flowchart used by the present invention for a sing-out operation.

If the system has been idle for fifteen minutes, automatically sign out any logged-in user. The sign out flowchart is shown in FIG. 115.

PC Connectivity

Automatic Inbound Routing

Description

The IFAX 10 support automatic routing of incoming messages. When a fax message is received from another IFAX machine or a G3 message is received that includes an OMR cover sheet, that message will be routed to the destination specified by the recipient.

Options:

Print Received Faxes specifies that incoming faxes should be printed.

Store In Mailbox specifies that incoming faxes should be stored in the recipient's own mailbox.

Forward To PC actually routes the faxes directly to the recipients PC via LAN or Serial.

Forward To Tool Application routes the fax to a specific Tool Application for special handling.

Support for Automated G3 Inbound Routing Software

Description

The IFAX 10 can support different methods for inbound routing of G3 faxes.

Options:

Optical Mark Recognition (OMR) determines recipient's from marks on a special cover page.

Optical Character Recognition (OCR) converts cover page to text and searches for the recipient's name.

Direct Inward Dial (DID) provides each fax user a unique fax phone number. Many such phone numbers are mapped by the telephone company's switch onto a physical telephone line. When an incoming call is answered, the central office sends touch tones that represent the number being called.

Dual Tone Multifrequency (DTMF) prompts the sender to enter touch tone digits to identify the fax recipient when a fax call is answered.

G3 Sub-addressing Field supports future extensions of G3 that identify recipients.

Route To Special Mailbox specifies that G3 and unknown faxes should just be routed to a particular mailbox where they will be handled manually.

Procedure

If Route To Special Mailbox is selected, the all unknown faxes should be routed to the specified mailbox.

Otherwise, unknown faxes should be routed to the specified Toolbox Application. The Application will then handle the routing as above.

Automatic G3 OMR Cover Sheet Recognition

Description

The system will automatically scan received G3 messages and detect whether the first page is an IFAX-compatible OMR cover sheet. If so, it will do the following:

1. Read the OMR-coded information (including at least the sender and recipient name)

2. Determine whether the recipient is a valid IFAX user.

3. If so, route it in the manner designated by that user for all incoming messages. The sender's name decoded from the OMR marks will be displayed in the incoming fax log.

4. If the decoded recipient is not a valid user or the system is unable to decode the recipient from the cover page, the message will be routed to a mailbox designated for such messages by the system administrator.

Procedure

Scan the upper left corner and look for an OMR identifying symbol. If the symbol is not present, this is not an OMR cover page.

Scan the OMR bar code and determine what kind of form this is. Scan the fields and form appropriately and return the information to the calling application.

Local and Remote Administration

User Level Administration

Description

IFAX platforms will let individual users personalize their system and maintain a secure mailbox for storing messages. Because IFAX platforms are consumer devices, we do not assume that an administrator is necessary. Therefore, individual users can also change system settings listed in the System Administration section.

Options: Create/Edit Personal Mailbox allows the user to set up a secure personal mailbox for receiving and storing fax messages. Also lets the user fill in their EFAX Address information.

Security Keys allows the user to obtain, add and remove their RSA IFAX Public Security Keys.

Handling of Incoming Faxes allows the user to select from among the routing options described in the Receive Fax feature description.

Preferred Initial Screen allows the user to select a default initial screen.

Cover Page Styles allows the user to modify the public and private Cover Style library.

Phonebook allows the user to modify the public and private phonebook list.

Procedure

If a user Creates A Personal Mailbox, create a mailbox file for them on the hard disk. Add their name and password to the accounts list. Also, add their name and address to the public phonebook.

In Security Keys, if the user chooses to change their public key, dial the Key Authority and issue a change key request. Delete the old key and store the new key. If the user chooses to print the key, render a fat bits image of the 512 bit key. Ask the user if they want to remove the key from the system so they are holding the a secure paper copy. If so, delete the key from the system. They can always re-install the key by scanning the paper Copy. Use OMR to scan fat bit security keys into memory.

The Preferred Initial Screen should be displayed at Power On, after a transmission operation has been successfully Started (by user pressing Start), or after fifteen minutes of idle time.

When the user asks to install Cover Page Styles, search the mailbox and peripheral drives for cover page files or attachments. For each one, ask the user if they want to install it and whether it should be public or private access. If they do install it, add it to the Cover Page Style list.

For comments on Incoming Fax Handing, see the Receive Fax section. For comments on Phonebook, see the Phonebook Maintenance section.

| Exceptions: | |
|---|---|
| Duplicate Mailbox Name | If a user tries to create a mailbox with a name that already exists, display a "Duplicate Mailbox Name" dialog and force them to change the name somewhat so that there is not an exact match. |

System Administration

Description

IFAX platforms support changing of System settings and other Administration functions by individual users or administrators. Because IFAX platforms are consumer devices, we do not assume that an administrator is necessary. Therefore, at first, individual users can change most of these feature settings. Later, experienced users can add higher levels of security very easily.

Options:

IFAX Identification Information allows the changing of TTI, RTI and CSI-equivalent fields.

Time and Date sets the system clock.

Discount Rate Period sets the starting time for discount rates or lets the IFAX Machine determine this automatically.

Automatic Redial sets the number of retries and redial interval.

Phone Line Settings sets the dial mode (pulse/tone) and other settings.

Mailbox Accounts lets administrators configure and remove mailbox accounts.

Administration Mode turns on more of the security features. Administration mode can limit system settings to particular users.

Touch Screen Calibration allows setup and re-calibration of the touch screen display.

Access Restriction sets the transmission and reception restrictions.

Automated Store and Forwarding sets default relay stations.

Automated Activity Reporting sets the frequency and destination of automated activity reports.

Automated G3 Routing sets the handling for G3 and unknown faxes.

Fax Load Balancing sets the network for Fax Load Balancing.

Fax Overflow sets the handling of fax overflow situations.

Remote Trouble Notification sets the user and location for remote trouble reporting.

Procedure

The Administration Mode dialog is the most important since it allows administrators to restrict access of some system activities. In order to access this feature, users must present the system access code or already have administrative privileges.

Phonebook Maintenance

Description

The phonebook 62 (see FIG. 62) allows users to quickly send to commonly used fax destinations. Phonebook entries are entered by the users directly or automatically during send and receive operations.

Options:

Public/Private entries are separated in the address book so that each user can have his own private list.

Group Addresses are supported so that users can pre-program commonly used broadcast lists.

Relay Addresses are supported for simplifying complex fax network transmission.

Procedure

Each Phonebook has three types of entries: Single Recipient entries, Group entries, and Relay Station entries.

Single Recipient entries consist of the following:

Name

Fax Number

Alternative Fax Number

Voice number

Company Name/Comment

Street Address

Technical Protocol Parameters

Group entries consist of:

Group Name

Member List of Phonebook entries (Single Entry, Group, or Relay Station)

Relay Stations consist of:

Relay Station

Relay Fax Number

Relay Alternative Fax Number

Relay List of Phonebook entries (Single Entry, Group, or other Relay Stations)

Relay Password

Relay Discount Rates Setting

When users change a phonebook entry, check all outgoing faxes to see if they are affected. Before changing the entry, ask the user if the outgoing fax addresses should be updated.

| Exceptions: | |
|---|---|
| Duplicate Address | If a duplicate address is entered, display a dialog to the user. Do not create a copy. |
| Duplicate Name | If just the Name is duplicated, display a dialog to alert the user that there is a name entry with multiple fax numbers. |
| Phonebook Corrupted | If the Phonebook is corrupted, incomplete entries should be printed in the Error Report and then erased. |
| Phonebook Full | If the Phonebook becomes full, a dialog should alert the user that no more entries can be added. No additional EFAX Addresses from Received Faxes should be added to the Phonebook. |

Fax Overflow

Description

The IFAX 10 allows users or administrators to designate how the system should respond when there is insufficient storage space to receive and store another fax message.

Options:

Alert User/Administrator will send a message to this person that the fax is in overflow mode.

Don't Answer will prevent other faxes from coming in.

Route To PC presents messages to a PC attached to the IFAX via Serial/LAN

The system will also display a "Fax Overflow" dialog box on the LCD indicating that the fax can no longer receive messages due to the overflow condition.

Procedure

If a fax overflow condition occurs, display a "Fax Overflow" dialog box. Redisplay the dialog every fifteen minutes as necessary. Notify the user specified about the overflow condition.

If Don't Answer is specified, don't answer the phone if it rings. Otherwise, route incoming messages to a PC attached via Serial/LAN (running special IFAX software).

On-line Help

Description

The user will be able to access help information at all times. When users press the Help button, help specific to the operation being performed will be presented (context-sensitive help). The user will also be able to access an index of available help and search for help on a particular subject.

Activity and Trouble Reporting

Basic Activity Reporting

Description

The IFAX 10 provides the following reports automatically:

Activity Report (TCR) describes each fax reception/transmission.

Reception Report announces each fax reception.

Transmission Confirmation Report describes the final status of each transmitted message.

Error Report describes any errors that occur in the system.

Communication Failure reports any line failures that occur during transmission and reception.

Power Failure Report notifies the user of any power interruptions and what actions they may have disturbed.

Relay Result Report details the final results of a relay operation.

Poll Store Report printed when a document is stored for later retrieval.

Poll Result Report printed when documents are retrieved from a remote fax machine.

Poll Clear Report printed when a stored poll file is removed from the system.

The IFAX 10 can provide the following reports at the user's request:

Activity Report (TCR) provides a break down of each fax transmission and reception. This can be filtered by user and/or department code. It also includes the value of each system counter.

Diagnostics Report provides the results of a self-test on any group of available system components.

Phone List contents of private or public phone listings.

Quick Key List shows each of the names of private or public programmable functions.

Mailbox Account List shows the names of each the mailbox owners and the current status, number of read/unread messages, percentage capacity remaining, etc.

File List shows a public and/or private breakdown of all the documents stored on the system.

User Settings summarizes all of the current user preferences.

System Settings summarizes the current system configuration.

Remote Trouble Reporting

Description

An alert message will be sent to an address specified by the system administrator (either email address or phone number) that a problem has been detected with the IFAX machine. Each error will also be logged for reporting purposes.

Options:

Diagnostic Failure on power up or periodic test

Off-line for more than a specified period (e.g., open lid, detached phone line, phone off-hook, etc.)

Out of Paper

Toner Low

Paper Jam

Persistent Line Failures

Persistent HDLC Transfer Errors

Persistent Remote Terminal Incompatibilities

Apparent Unauthorized User Access Attempt

Persistent Out of Memory Condition

It is to be understood that even though various embodiments and advantages of the present invention have been set forth in the foregoing description, the above disclosure is illustrative only, and changes may be made in detail, yet remain within the broad principles of the invention. Therefore, the present invention is to be limited only by the appended claims.

We claim:

1. A method in a facsimile machine having a display and a user input device, for storage and use of a facsimile cover page, the method comprising the steps of:

maintaining at least one facsimile cover page in a first storage location continuously accessible by any of a plurality of users of the facsimile machine;

maintaining at least another facsimile cover page in a second storage location accessible by a selected one of said plurality of users, said selected user having a corresponding user identification;

sensing if a user inputs a user identification; and enabling access to said, second storage location only if said sensed user identification corresponds to said user identification of said selected user, said first storage area being continuously enabled for any of said plurality of users and said second storage area being enabled only when said sensed user identification corresponds to said user identification of said selected user.

2. The method of claim 1, further including the steps of:

scanning a user created cover page in a scan engine on the facsimile machine to create a scanned page;

storing said scanned user created cover page in said second storage location as said another cover page if said sensed identification data corresponds to said user identification of said selected one user; and storing said scanned user created cover page in said first storage location as said one facsimile cover page if said sensed identification data does not correspond to said user identification of said selected one user.

3. The method of claim 1, further including the steps of:

storing a user created cover page in said second storage location as said another facsimile cover page if said sensed identification data corresponds to said user identification of said selected one user; and storing said user created cover page in said first storage location as said one facsimile cover page if said sensed identification data does not correspond to said user identification of said selected one user.

4. A method in a facsimile machine having a user input device for the storage and use of a facsimile cover page, the method comprising the steps of:

maintaining at least one facsimile cover page in a first storage location continuously accessible by any of a plurality of users of the facsimile machine;

maintaining at least another facsimile cover page in a second storage location accessible by a selected one of said plurality of users, said selected user having a corresponding user identification;

sensing if a user inputs a user identification; and enabling access to said second storage location only if said sensed user identification corresponds to said user identification of said selected user, said first storage area being continuously enabled for any of said plurality of users and said second storage area being enabled only when said second user identification corresponds to said user identification of said selected user;

sensing a user input on the user input device to select a particular one of said stored cover pages from said first storage location or said second storage location if said user identification data corresponds to said selected one of said plurality of users;

selecting said particular cover page in response to said user input; and transmitting said particular cover page as a cover page for a facsimile message.

5. The method of claim 4 for use on a facsimile machine having a scan engine, further including the steps of:

scanning a user created cover page in the scan engine to create a scanned page;

storing said scanned cover page in said second storage location as said another cover page if said sensed identification data corresponds to said user identification of said selected one user; and storing said scanned cover page in said first storage location as said one facsimile cover page if said sensed identification data does not correspond to said user identification of said selected one user.

6. The method of claim 5, further including the steps of:

storing a user created cover page in said second storage location as said another facsimile cover page if said sensed identification data corresponds to said user identification of said selected one user; and storing said stored user created cover page in said first storage location as said one facsimile cover page if said sensed identification data does not correspond to said user identification of said selected one user.

7. A system for the storage and use of facsimile cover pages by a facsimile machine, the system comprising:

a public storage area accessible by the facsimile machine and designated for storage of at least one facsimile cover page to be used by any of a plurality of users of the facsimile machine;

a private storage area accessible by the facsimile machine and designated for storage of at least another facsimile cover page to be used by a selected one of said plurality of users; and a user input device to sense entry of a user identification, said selected one user having a corresponding user identification, said user input device enabling use of said private storage area if said sensed user identification corresponds to said selected one user, said public storage area being continuously enabled by any of said plurality of users and said private storage area being enabled only when said sensed user identification corresponds to said user identification of said selected one user.

8. The system of claim 7, further including selection means for user selection of a facsimile cover page from said private storage area if said sensed user identification corresponds to said user identification of said selected one user and for the display of at least a portion of said public storage area if said sensed user identification does not correspond to said user identification of said selected one user.

9. The system of claim 7, further including a display viewable by the user for the display of at least a portion of said public and private storage areas if said sensed user identification data corresponds to said user identification of said selected one user and for the display of at least a portion of said public storage area if said sensed user identification data does not correspond to said user identification of said selected one user.

10. The system of claim 9, further including selection means operable in conjunction with said display for user selection of a facsimile cover page from said displayed portion.

* * * * *

UNITED STATES PATENT AND TRADEMARK OFFICE
CERTIFICATE OF CORRECTION

PATENT NO. : 5,438,433
DATED : August 1, 1995
INVENTOR(S) : Jeffrey B. Reifman, Kurt D. DelBene, Chris E. Tobey and Renee Marceau It is certified that error appears in the above-indentified patent and that said Letters Patent is hereby corrected as shown below:

In column 75, line 36, please delete "5" and substitute therefor --4--.

Signed and Sealed this

Twenty-first Day of November, 1995

Attest:

BRUCE LEHMAN

*Attesting Officer*    *Commissioner of Patents and Trademarks*